US012557717B2

(12) United States Patent
Radtke et al.

(10) Patent No.: US 12,557,717 B2
(45) Date of Patent: Feb. 24, 2026

(54) ROW CLEANER

(71) Applicant: Precision Planting LLC, Tremont, IL (US)

(72) Inventors: Ian Radtke, Washington, IL (US); Jason J. Stoller, Eureka, IL (US); Cory Muhlbauer, Tremont, IL (US); Aaron Herrmann, Tremont, IL (US); John Weigand, Tremont, IL (US); Paul Wildermuth, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 586 days.

(21) Appl. No.: 17/907,142

(22) PCT Filed: Mar. 23, 2021

(86) PCT No.: PCT/IB2021/052374
§ 371 (c)(1),
(2) Date: Sep. 23, 2022

(87) PCT Pub. No.: WO2021/205264
PCT Pub. Date: Oct. 14, 2021

(65) Prior Publication Data
US 2023/0165185 A1     Jun. 1, 2023

Related U.S. Application Data

(60) Provisional application No. 63/122,735, filed on Dec. 8, 2020, provisional application No. 63/115,875, filed
(Continued)

(51) Int. Cl.
*A01C 7/00*          (2006.01)
*A01C 7/20*          (2006.01)

(52) U.S. Cl.
CPC .............. *A01C 7/006* (2013.01); *A01C 7/203* (2013.01); *A01C 7/205* (2013.01)

(58) Field of Classification Search
CPC ......... A01C 5/064; A01B 35/08; A01B 35/28; A01B 39/08
See application file for complete search history.

(56)          References Cited

U.S. PATENT DOCUMENTS 5,704,430 A     1/1998  Smith et al.
8,393,407 B2 *  3/2013  Freed ..................... A01B 35/28
                                                           172/551
(Continued)

FOREIGN PATENT DOCUMENTS

WO      WO-2012149415 A1 *  11/2012   ............. A01B 49/04

OTHER PUBLICATIONS

Mullen, C.A.; Ellison, C.; Elkasabi, Y. Pyrolytic Conversion of Cellulosic Pulps from "Lignin-First" Biomass Fractionation. Energies 2023, 16, 3236. https://doi.org/10.3390/en16073236 (Year: 2023).*

(Continued)

*Primary Examiner* — Theodore N Yao

(57)          ABSTRACT

A row cleaner assembly includes an upper subframe mounted to an agricultural planter forward of the planter row unit and longitudinally aligned with the trench opening assembly. A lower subframe rotatably supports first and second row cleaner wheels. An intermediate subframe is pivotally connected at a forward end to the upper subframe and is pivotally connected at a rearward end to the lower subframe. A first and second linkages are pivotally connected at a forward end to the upper subframe and are pivotally connected at a rearward end to the lower subframe. An actuator system is capable of applying a downforce and an optional lift force to the lower subframe. The row cleaner assembly may include a gauge wheel supported by a rear
(Continued)

strut subframe. The row cleaner assembly may include a depth selector to change the depth of penetration of the row cleaner wheels into the soil surface.

24 Claims, 79 Drawing Sheets

Related U.S. Application Data on Nov. 19, 2020, provisional application No. 63/074,684, filed on Sep. 4, 2020, provisional application No. 63/040,311, filed on Jun. 17, 2020, provisional application No. 63/017,869, filed on Apr. 30, 2020, provisional application No. 63/010,833, filed on Apr. 16, 2020, provisional application No. 63/005,559, filed on Apr. 6, 2020.

(56) References Cited

U.S. PATENT DOCUMENTS

| | | | | |
|---|---|---|---|---|
| 8,505,473 | B1 * | 8/2013 | Martin | A01C 7/205 |
| | | | | 111/926 |
| 8,631,879 | B1 | 1/2014 | Martin | |
| 2005/0263050 | A1 | 12/2005 | Bassett et al. | |
| 2011/0247537 | A1 | 10/2011 | Freed | |
| 2012/0291680 | A1 | 11/2012 | Rylander | |
| 2013/0192855 | A1 | 8/2013 | Meek | |
| 2016/0227701 | A1 | 8/2016 | Nelson et al. | |
| 2016/0360690 | A1 * | 12/2016 | Jia | A01B 49/027 |
| 2018/0125002 | A1 * | 5/2018 | Stoller | A01C 7/201 |
| 2019/0230842 | A1 * | 8/2019 | Martin | A01C 7/203 |
| 2019/0281756 | A1 * | 9/2019 | Sivinski | A01C 7/203 |

OTHER PUBLICATIONS

Candice Ellison, et al (2018) Dielectric characterization of bentonite clay at various moisture contents and with mixtures of biomass in the microwave spectrum, Journal of Microwave Power and Electromagnetic Energy, 52:1, 3-15, DOI: 10.1080/08327823.2017.1421407 (Year: 2018).*

Uk Intellectual Property Office, Search report for related UK Application No. GB2005937.4, dated Oct. 15, 2020.

European Patent Office, International Search Report related to International Patent Application No. PCT/IB2021/052374, mail date Jun. 25, 2021.

File history response from corresponding EP Application No. 21714676 responding to the ISRWO from the corresponding PCT application, dated May 15, 2023.

Chinese Examination Report for corresponding Application No. CN202180037087.8, dated Oct. 26, 2024.

\* cited by examiner

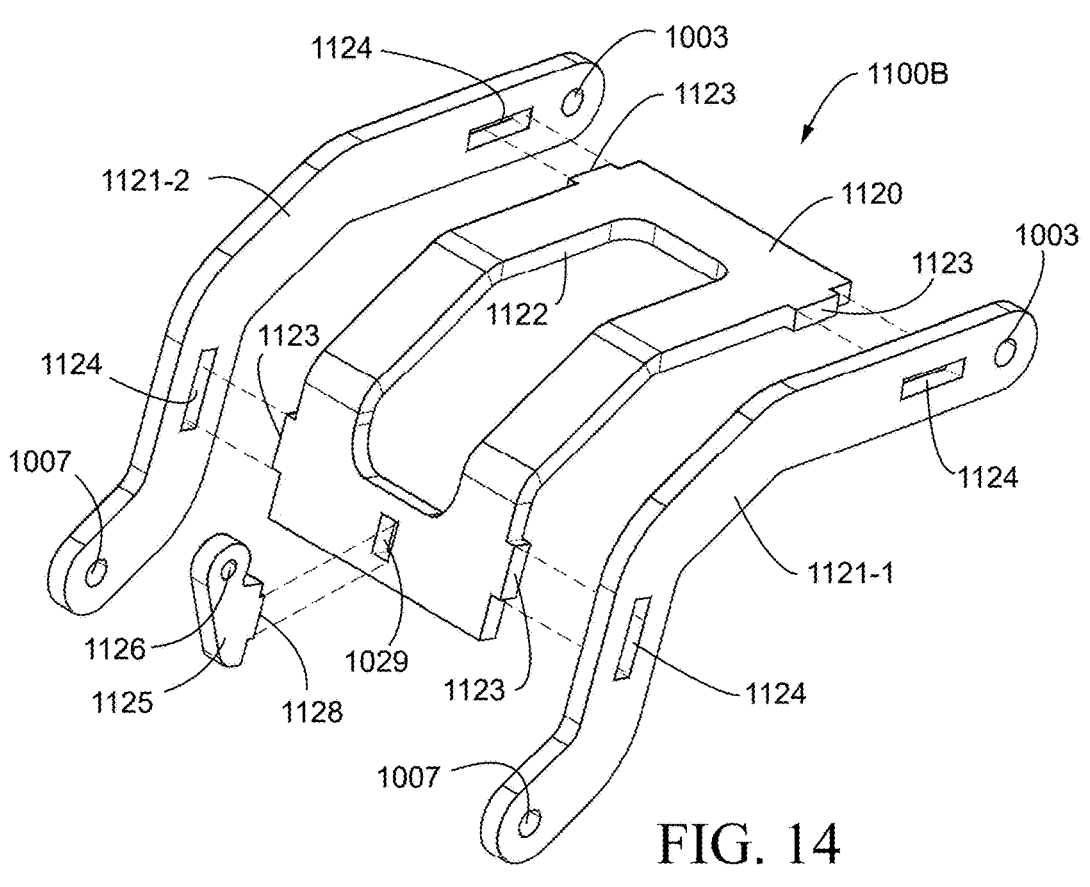
FIG. 14
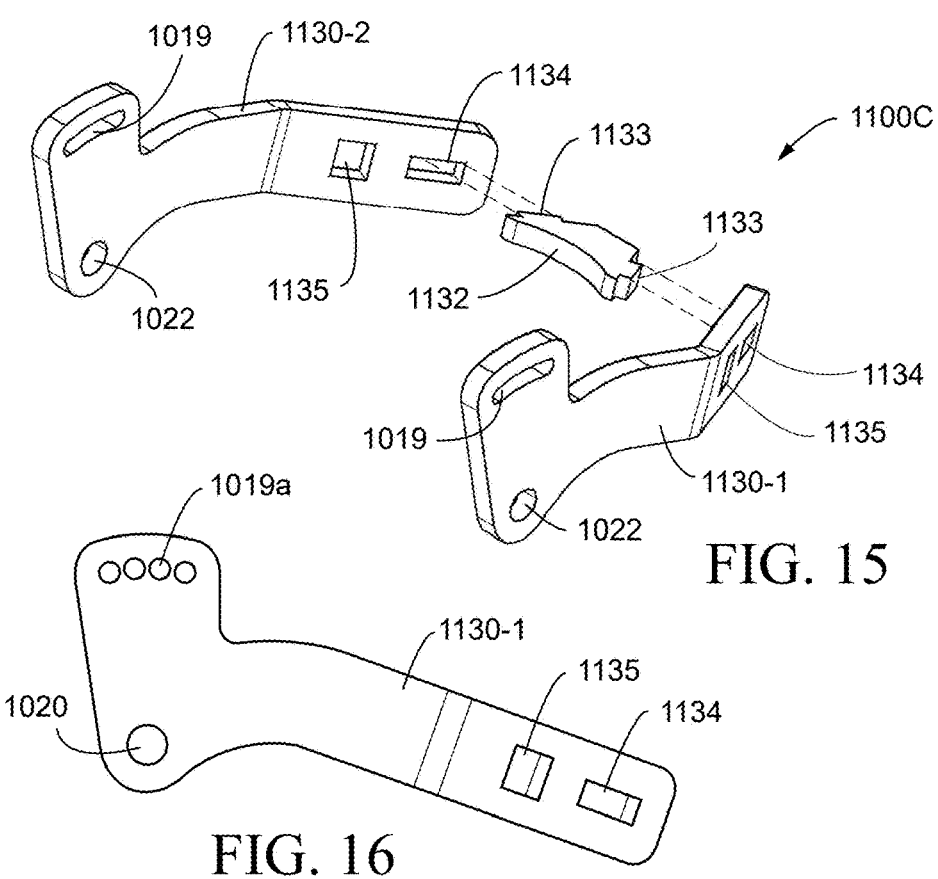
FIG. 15
FIG. 16

2101

2032

2002

2108

2100

2011

2010

2036

2028

2100B 2200-2

2014

2015

2302

2310

2003

2038

2125

2007

2100D

2021

2008

2023

2024

2006

2018

2019

2054

2009

2022

2053

2022

2151

2100A

2012 — 2037

2033

2032

2002

2004

2034, 2320

2108

2030, 2312

2038

2003

2036

2011

2028

2029

2010

2200-1

2016

2014

2026

2021

2008

2023

2025

2019

2100C

2018

2024

2006

2009

1000, 1000A,
2000, 2000A,
3000, 3000A,
4000, 4000A

6000

6010

1100, 2100,
3100, 4100

6060

1060-2, 2060-2
3060-2, 4060-2

1060-1, 2060-1
3060-1, 4060-1

1050, 2050
3050, 4050

6000

1100, 2100,
3100, 4100

1060-1, 2060-1
3060-1, 4060-1

6060

6010

1060-2, 2060-2
3060-2, 4060-2

6060

6010

6000

1060-1, 2060-1
3060-1, 4060-1

1060-2, 2060-2
3060-2, 4060-2

1100, 2100,
3100, 4100

1050, 2050
3050, 4050

6000

6060

6010

1060-1, 2060-1
3060-1, 4060-1

1060-2, 2060-2
3060-2, 4060-2

1100, 2100,
3100, 4100

1050, 2050
3050, 4050

7010

7000

1060-1, 2060-1
3060-1, 4060-1

1060-2, 2060-2
3060-2, 4060-2

1100, 2100,
3100, 4100

1050, 2050
3050, 4050

11

7010

7000

1060-1, 2060-1
3060-1, 4060-1

1060-2, 2060-2
3060-2, 4060-2

1100, 2100,
3100, 4100

1050, 2050
3050, 4050

11

8000, 8010

3000, 3000A 8050, 3061

8000, 8004

8000, 8002

3100C,
3130-1, 3130-2

8000, 8010

4000, 4000A 8000, 8004

8050, 4061

8000, 8002

4100C,
4130-1, 4130-2

ROW CLEANER

CROSS-REFERENCE TO RELATED APPLICATIONS

This application is a national phase entry under 35 U.S.C. § 371 of International Patent Application PCT/IB2021/052374, filed Mar. 23, 2021, designating the United States of America and published in English as International Patent Publication WO2020/205264 A1 on Oct. 14, 2021, which claims the benefit of U.S. Provisional Application Nos. 63/005,559, filed 6 Apr. 2020; 63/010,833, filed 16 Apr. 2020; 63/017,869, filed 30 Apr. 2020; 63/040,311, filed 17 Jun. 2020; 63/074,684, filed 4 Sep. 2020; 63/115,875, filed 19 Nov. 2020; and 63/122,735, filed 8 Dec. 2020.

BACKGROUND

Row cleaners are disposed forward of a trench opening assembly on planters to move any crop residue, soil clods or other debris laterally outwardly to provide a cleaner seed bed area in preparation for the rearwardly aligned trench opening assembly that opens the seed trench into which the seeds are deposited. While many commercially available row cleaners serve their intended purpose, a need exists for a row cleaner assembly that provides improved performance.

BRIEF DESCRIPTION OF THE DRAWINGS

FIG. 14 is an exploded rear perspective view of an embodiment of the intermediate subframe of the frame assembly of FIG. 10.

FIG. 15 is an exploded rear perspective view of an embodiment of the lower subframe of the frame assembly of FIG. 10.

FIG. 16 is a side elevation view of an alternative embodiment of the lower subframe for the frame assembly of FIG. 10.

DETAILED DESCRIPTION

All references cited herein are incorporated herein in their entireties. If there is a conflict between a definition herein and in an incorporated reference, the definition herein shall control.

Figure 1:
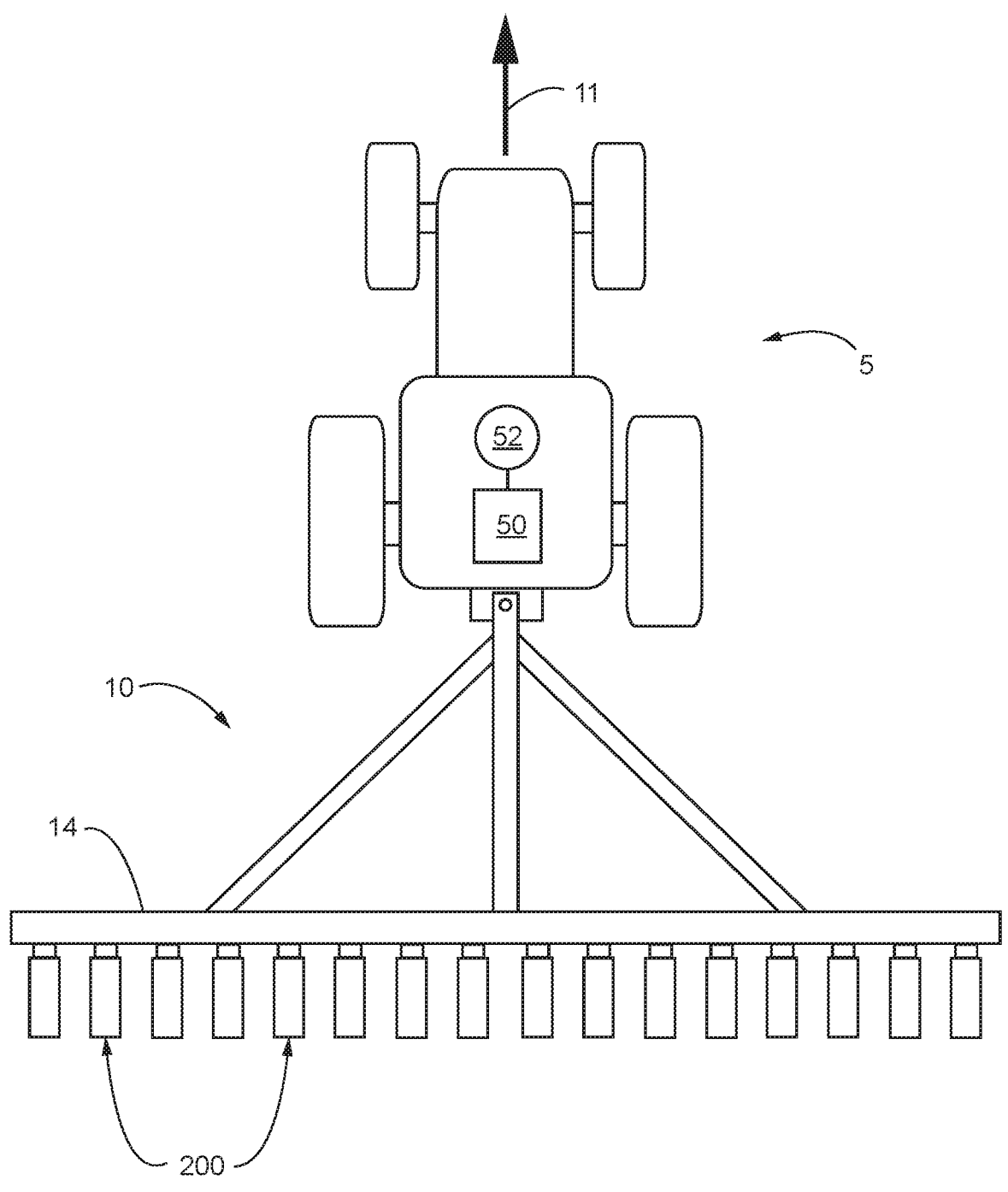
FIG. 1 is a top plan view of an embodiment of an agricultural planter.

Referring now to the drawings, wherein like reference numerals designate identical or corresponding parts throughout the several views, FIG. 1 illustrates a tractor 5 drawing an agricultural planter 10 in a forward direction of travel designated by arrow 11. The planter 10 includes a toolbar 14 operatively supporting multiple planter row units 200. A planter monitor 50 which may include a central processing unit ("CPU"), memory and graphical user interface ("GUI") (e.g., a touch-screen interface) may be located in the cab of the tractor 5. A global positioning system ("GPS") receiver 52 may be mounted to the tractor 5.

Figure 2:
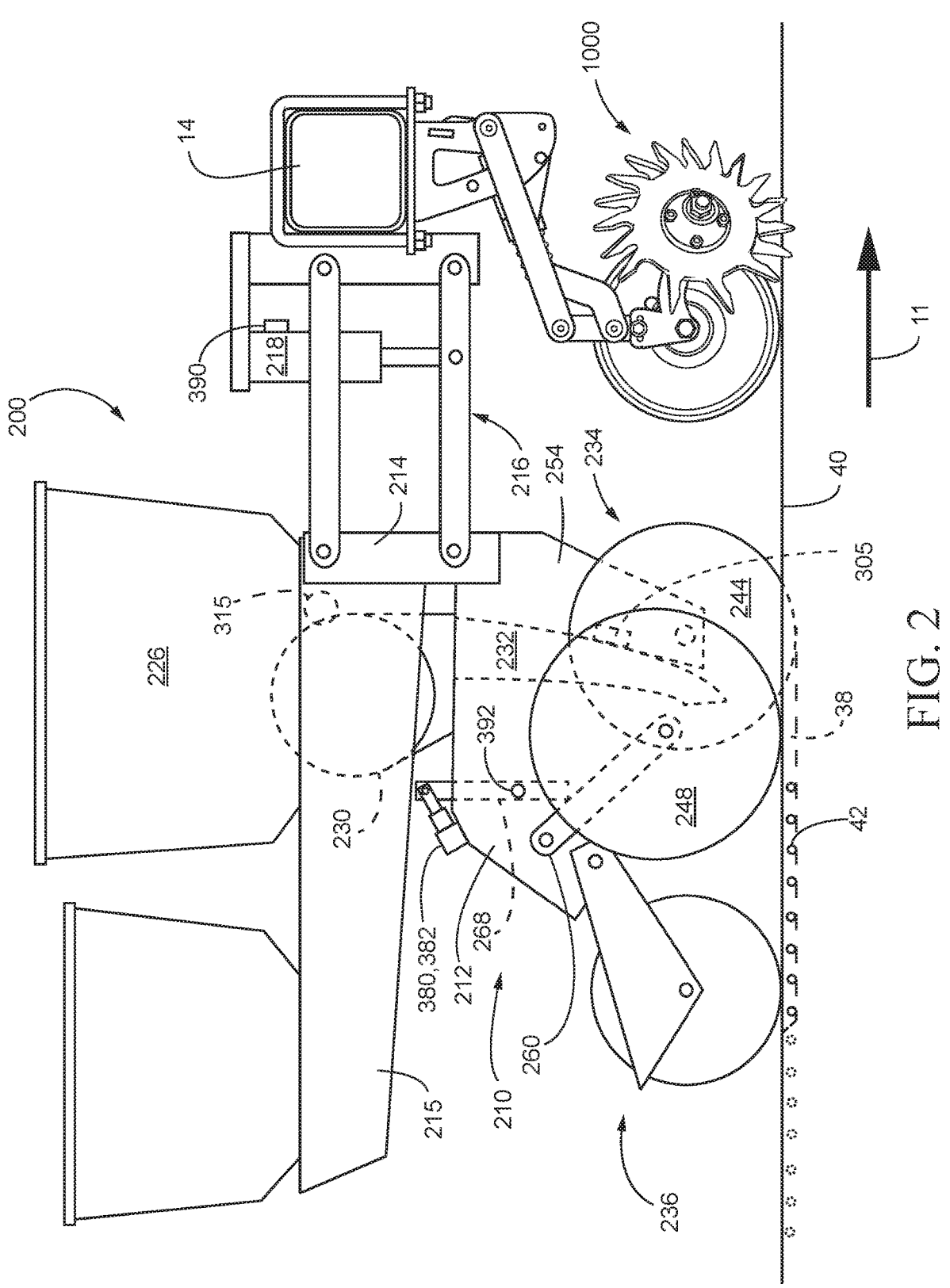
FIG. 2 is a side elevation view of an embodiment of a planter row unit showing an embodiment of row cleaner assembly incorporating a gauge wheel.

FIG. 2 is a side elevation view of an embodiment of the planter row unit 200. The row unit 200 includes a row unit frame 210 that includes a downwardly extending shank 254 and a rearwardly extending frame member 212 supported from a forward bracket 214. The row unit frame 210 may also include an upper beam 215 also supported from the forward bracket 214. The upper beam 215 may support one or more hoppers 226 containing a supply of seed and optionally a supply of fertilizer or other chemical inputs. The row unit frame 202 may be pivotally connected to the toolbar 14 by a parallel linkage 216. An actuator 218 may be disposed to apply lift and/or downforce on the row unit 200. A solenoid valve 390 may be in fluid communication with the actuator 218 for modifying the lift and/or downforce applied by the actuator 218. An opening system 234 may include two opening disks 244 rollingly mounted the downwardly extending shank 254 and disposed to open a v-shaped trench 38 in the soil 40. A pair of gauge wheels 248 may be pivotally supported from the frame member 204 by a pair of corresponding gauge wheel arms 260. As is well known, the upward travel of the gauge wheels 248 relative to the opening disks 244 defines the depth of the trench 38. A depth adjustment rocker 268 limits the upward travel of the gauge wheel arms 260 and thus the upward travel of the gauge wheels 248. A depth adjustment actuator 380 may be configured to modify a position of the depth adjustment rocker 268 and thus the height of the gauge wheels 248. The actuator 380 may be a linear actuator mounted to the row unit 200 and pivotally coupled to an upper end of the rocker 268. In some embodiments, the depth adjustment actuator 380 may comprise a device such as disclosed in International Patent Application No. PCT/US2012/035585 (Publication No. WO2012149415). An encoder 382 may be configured to generate a signal related to the linear extension of the actuator 380; it should be appreciated that the linear extension of the actuator 380 is related to the depth of the trench 38 when the gauge wheel arms 260 are in contact with the rocker 268. A downforce sensor 392 may be configured to generate a signal related to the amount of force imposed by the gauge wheels 248 on the soil 40; in some embodiments the downforce sensor 392 may comprise an instrumented pin about which the rocker 268 is pivotally coupled to the row unit 200, such as those instrumented pins disclosed in U.S. Patent Publication No. US2010/0180695.

Continuing to refer to FIG. 2, a seed meter 230 such as that disclosed in International Patent Application No. PCT/US2012/030192 (Publication No. WO2012129442) may be disposed to deposit seeds 42 from a hopper 226 into the trench 38, e.g., through a seed tube 232 disposed to guide the seeds toward the trench. In some embodiments, the seed meter 230 may be powered by an electric drive 315 configured to drive a seed disc within the seed meter. In other embodiments, the drive 315 may comprise a hydraulic drive configured to drive the seed disc. A seed sensor 305 (e.g., an optical or electromagnetic seed sensor configured to generate a signal indicating passage of a seed) may be mounted to the seed tube 232 and disposed to send light or electromagnetic waves across the path of seeds 42 to detect the passage of each seed. A closing system 236 which may include one or more closing wheels may be pivotally coupled to the row unit 200 and configured to close the trench 38.

FIG. 2 also shows an embodiment of a row cleaner assembly 1000 mounted to the toolbar 14 and positioned forward of the trench opening assembly 234. It should be appreciated that each row unit 200 of the planter 10 would have an associated row cleaner assembly 1000 longitudinally aligned with the respective trench opening assembly 234 of the row unit 200. In the embodiment shown, the row cleaner assembly 1000 includes a gauge wheel 1050 (identified in FIG. 3). The row cleaner assembly 1000 extends rearward of the toolbar 14 and is rigidly mounted to the underside of toolbar 14 by suitable mounting structure, which may include a mounting plate 1101 and one or more U-bolts 1001 as shown. Alternatively, the row cleaner assembly 1000 may be mounted to the top side, rear side or forward side of the toolbar 14 by any suitable mounting structure or connection, including bolted brackets or by welding.

Figure 2A:
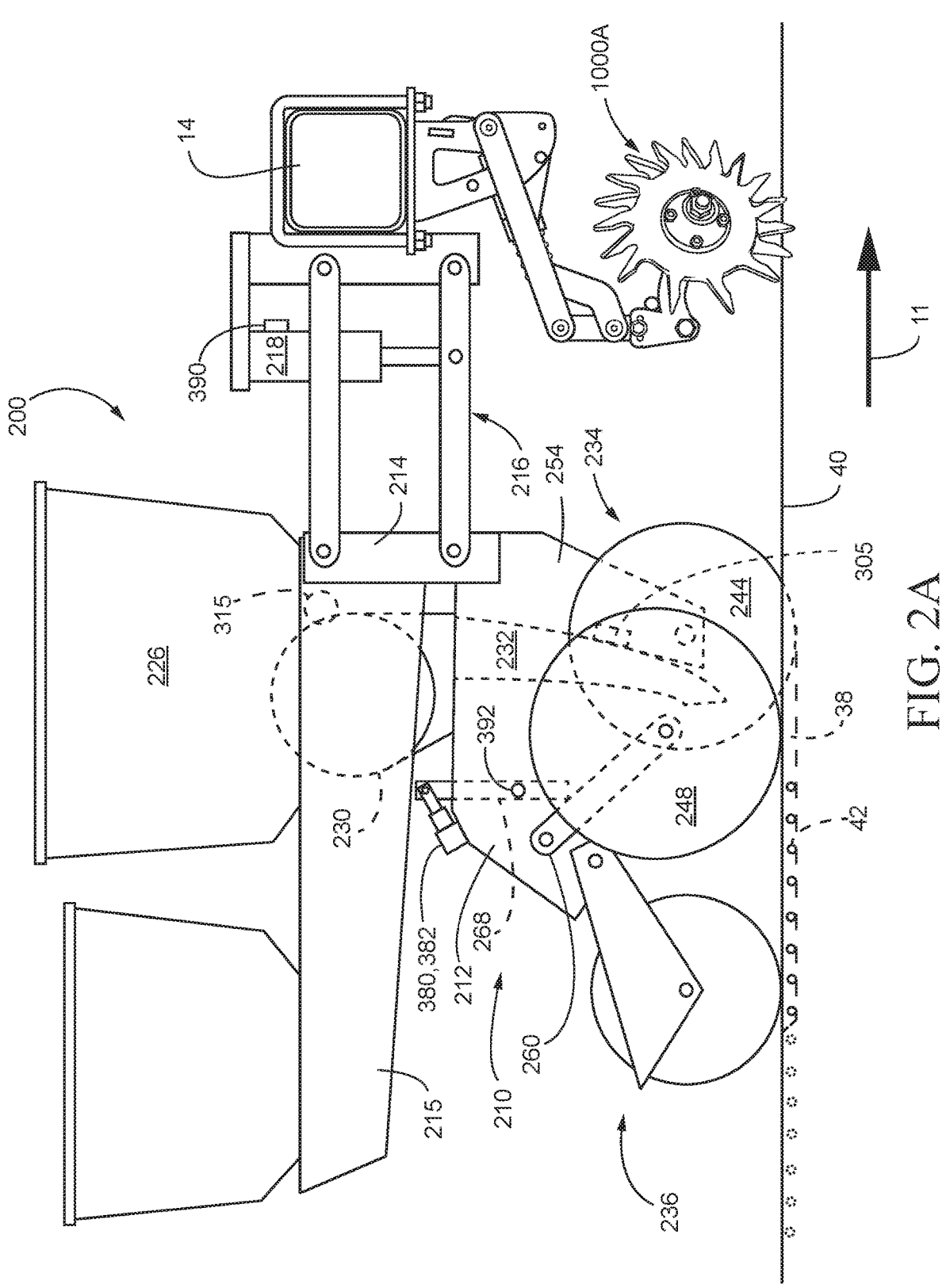
FIG. 2A is another side elevation view of an embodiment of a planter row unit showing another embodiment of a row cleaner assembly substantially the same as shown in FIG. 2, but without a gauge wheel.

FIG. 2A shows an alternative embodiment of a row cleaner assembly designated by reference number 1000A. The embodiment of the row cleaner assembly 1000A is substantially the same as the embodiment of the row cleaner assembly 1000 except the embodiment of 1000A does not include the gauge wheel.

Figure 3:
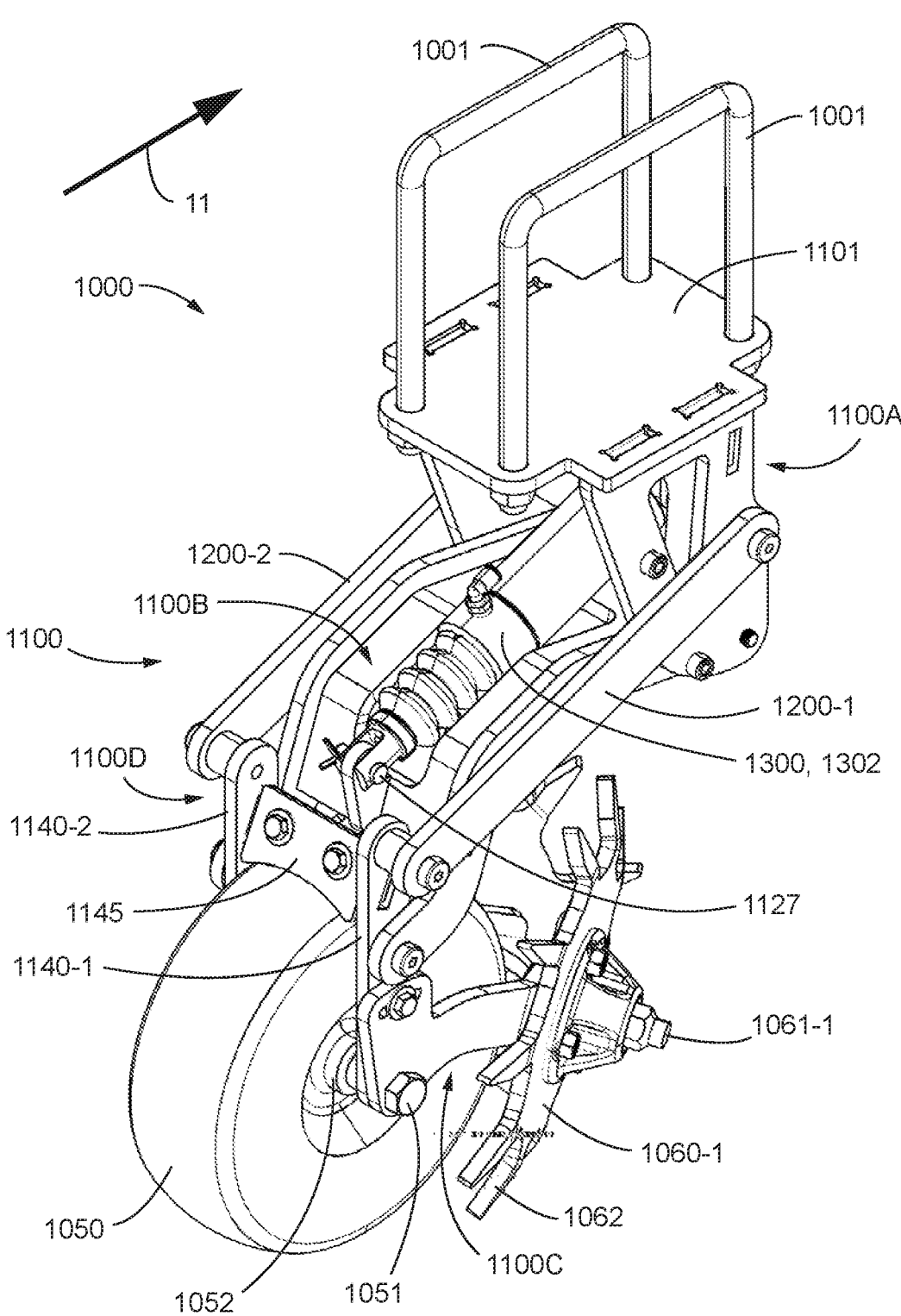
FIG. 3 is a rear perspective view of the row cleaner assembly of FIG. 2.
Figure 3A:
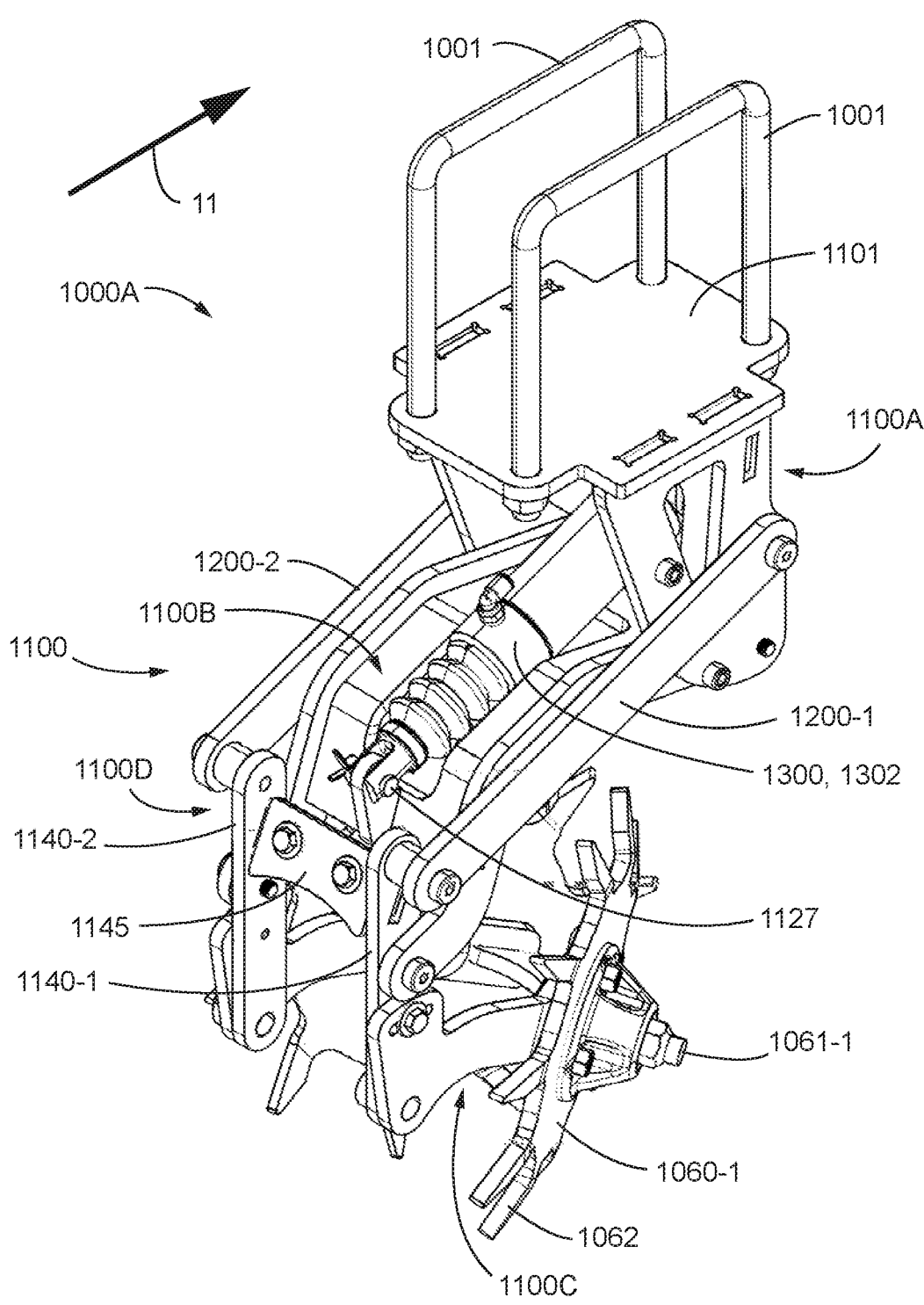
FIG. 3A is a rear perspective view of the row cleaner assembly of FIG. 2A.

FIG. 3 is an enlarged rear perspective view of the row cleaner assembly 1000 shown in FIG. 2. FIG. 3A is the same view as in FIG. 3 but shows the embodiment of the row cleaner assembly 1000A without the gauge wheel. Since both embodiments of the row cleaner assembly 1000 and 1000A are substantially the same, other than the removal of the gauge wheel in embodiment 1000A, only the embodiment 1000 is described, recognizing that any reference to the gauge wheel 1050, the gauge wheel axle 1051 and associated components would not be applicable to the 1000A embodiment.

Figure 4:
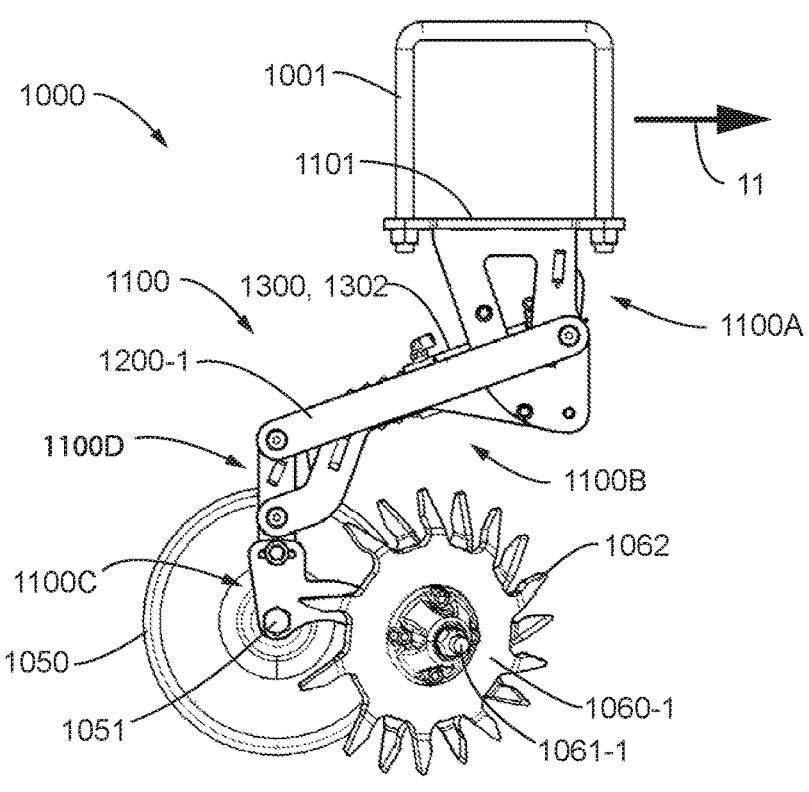
FIG. 4 is a right side elevation view of the row cleaner assembly of FIG. 3.
Figure 5:
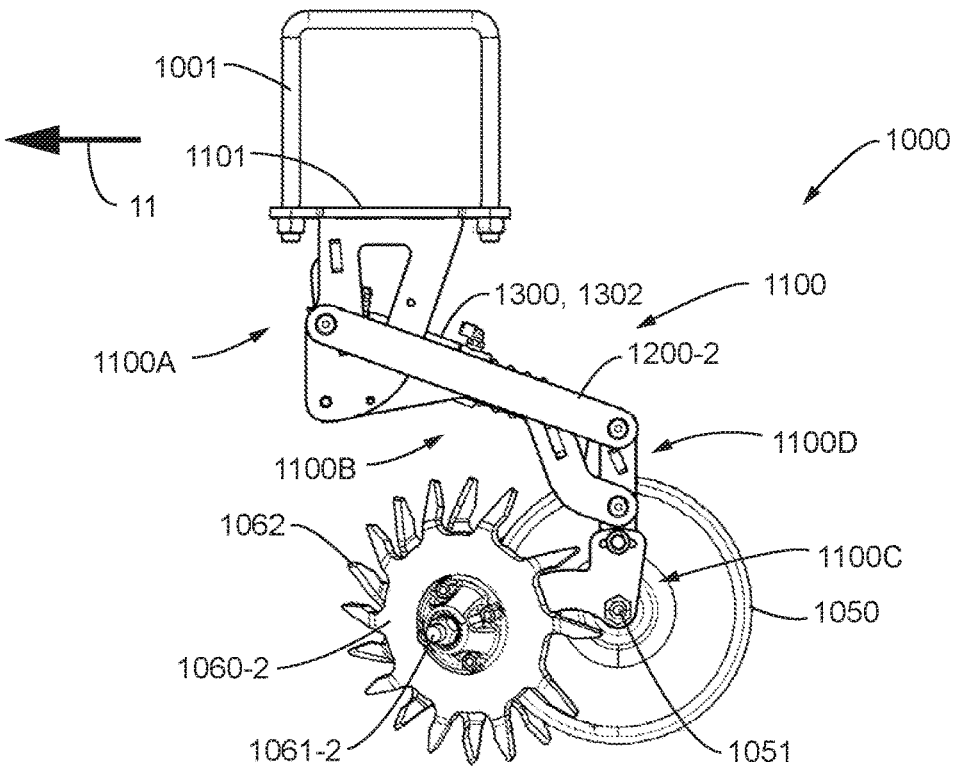
FIG. 5 is a left side elevation view of the row cleaner assembly of FIG. 3.
Figure 6:
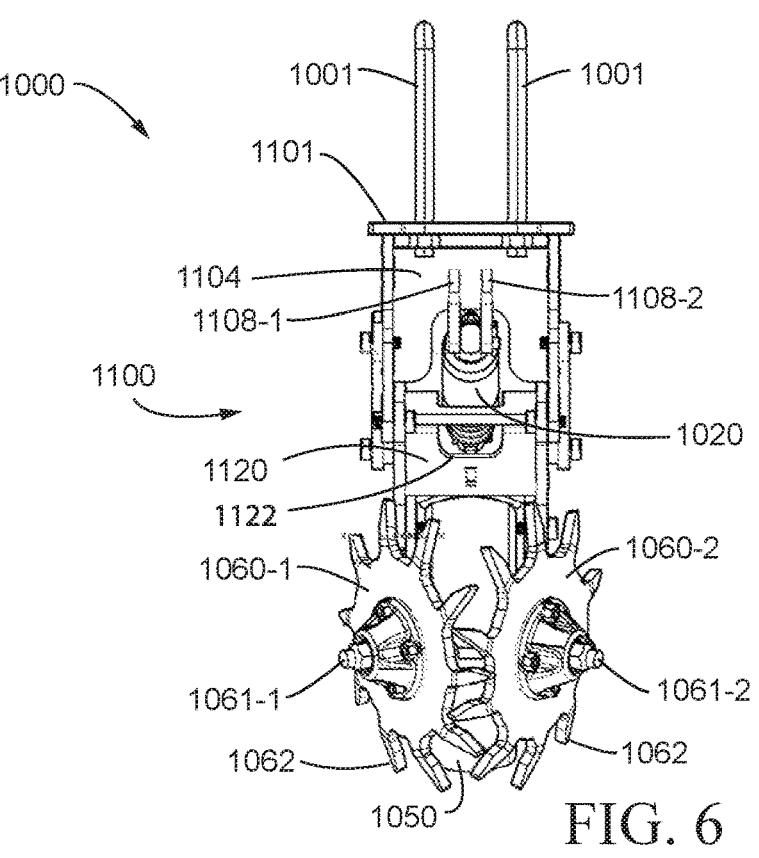
FIG. 6 is front elevation view of the row cleaner assembly of FIG. 3.
Figure 7:
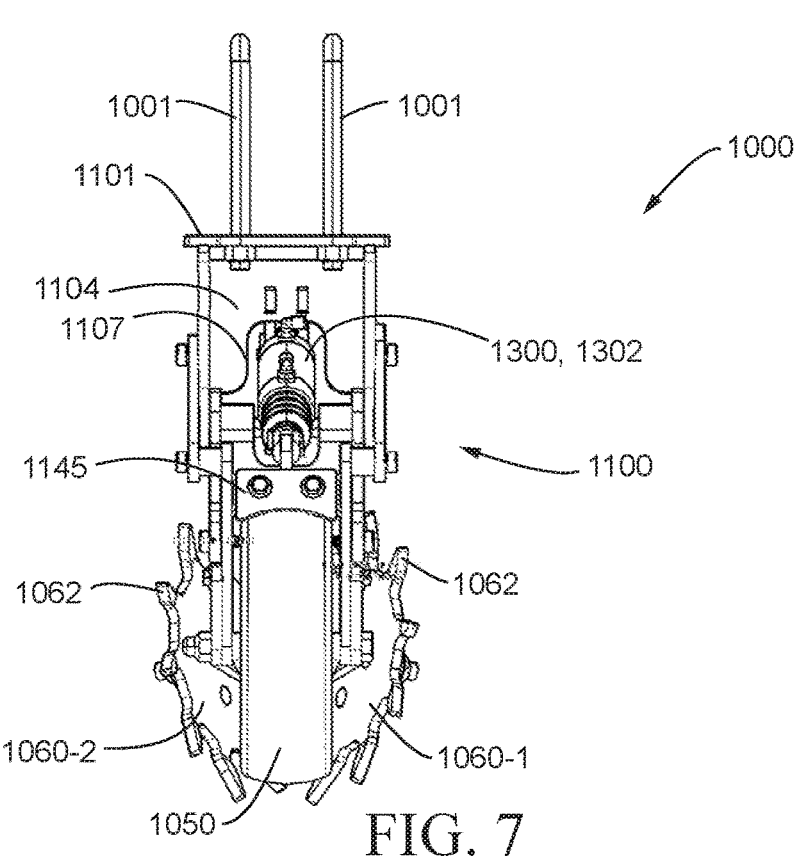
FIG. 7 is a rear elevation view of the row cleaner assembly of FIG. 3.
Figure 8:
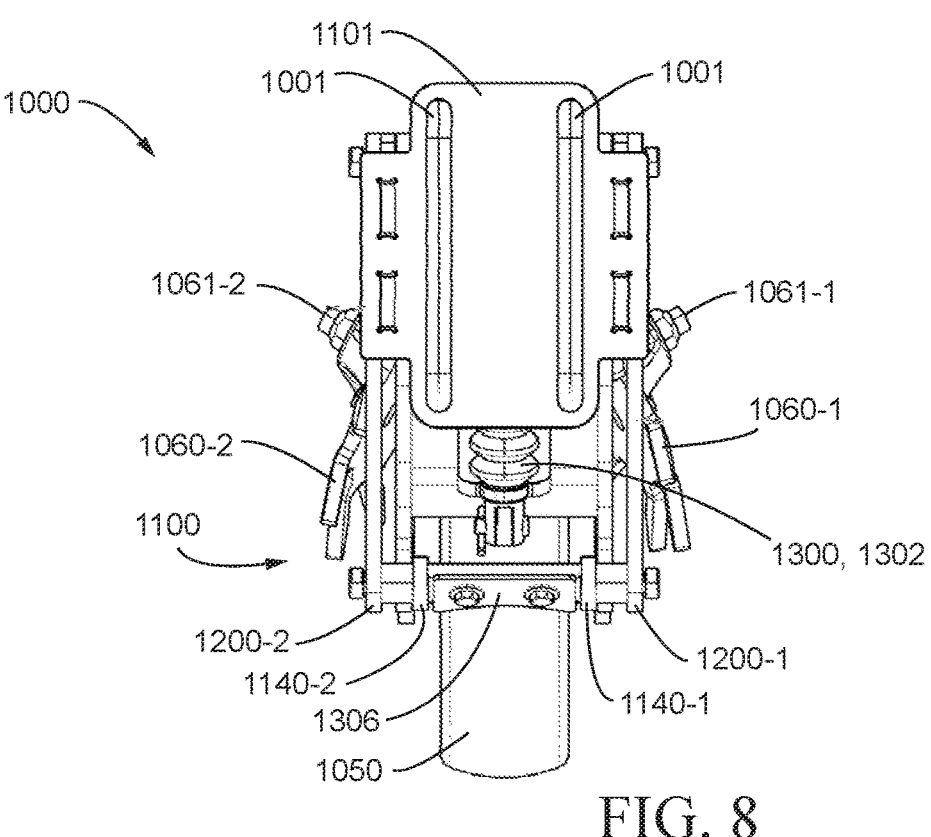
FIG. 8 is a top plan view of the row cleaner assembly of FIG. 3.
Figure 9:
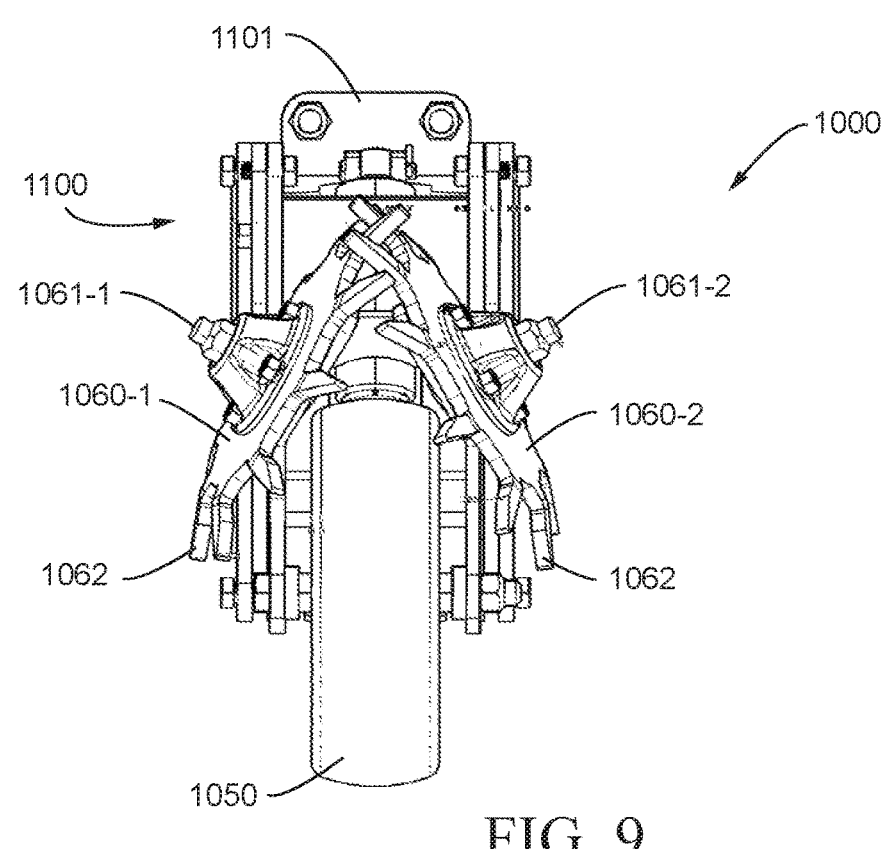
FIG. 9 is a bottom plan view of the row cleaner assembly of FIG. 3.

FIGS. 4 and 5 are right and left side elevation views, respectively, of the row cleaner assembly 1000. FIGS. 6 and 7 are front and rear elevation views, respectively, and FIGS. 8 and 9 are top and bottom views, respectively. The row cleaner assembly 1000 includes a frame assembly 1100 supported at its rearward end by a gauge wheel 1050. Row cleaner wheels 1060-1, 1060-2 are rotatably supported by the frame assembly 1100. Each row cleaner wheel 1060-1, 1060-2 includes radially spaced tines 1062 around its circumference. The row cleaner wheels 1060-1, 1060-2 are oriented to diverge outwardly and rearwardly such that the tines 1062 of the row cleaner wheels 1060-1, 1060-2 interlace at the forward end as they rotate. In operation, as the planter 10 moves in the forward direction of travel 11, the soil engages with the tines 1062, causing the row cleaner wheels 1060-1, 1060-2 to rotate. Due to their orientation, as the row cleaner wheels 1060-1, 1060-2 rotate, they direct any crop residue, soil clods or other debris laterally outwardly to provide a cleaner seed bed for the rearwardly aligned trench opening assembly 234. The gauge wheel 1050 serves to firm the soil 40 that may be disturbed by row cleaner wheels 1060-1, 1060-2 before the trench 38 is opened by the trench opening assembly 234. Firming the soil with the gauge wheel 1050 may be advantageous in dry soils to prevent soil 40 from falling into trench 38.

An actuator system 1300 is positioned within the fame assembly 1100 to provide an adjustable downforce and optionally a lift force to the gauge wheel 1050 and row cleaner wheels 1060-1, 1060-2. In this embodiment, the actuator system 1300 comprises a pneumatic cylinder 1302, but the actuator system 1300 may utilize any actuator that provides an adjustable downforce and an optional lift force, including pneumatic cylinders, hydraulic cylinders, air bags, and electromechanical actuators as discussed in more detail later.

Figure 10:
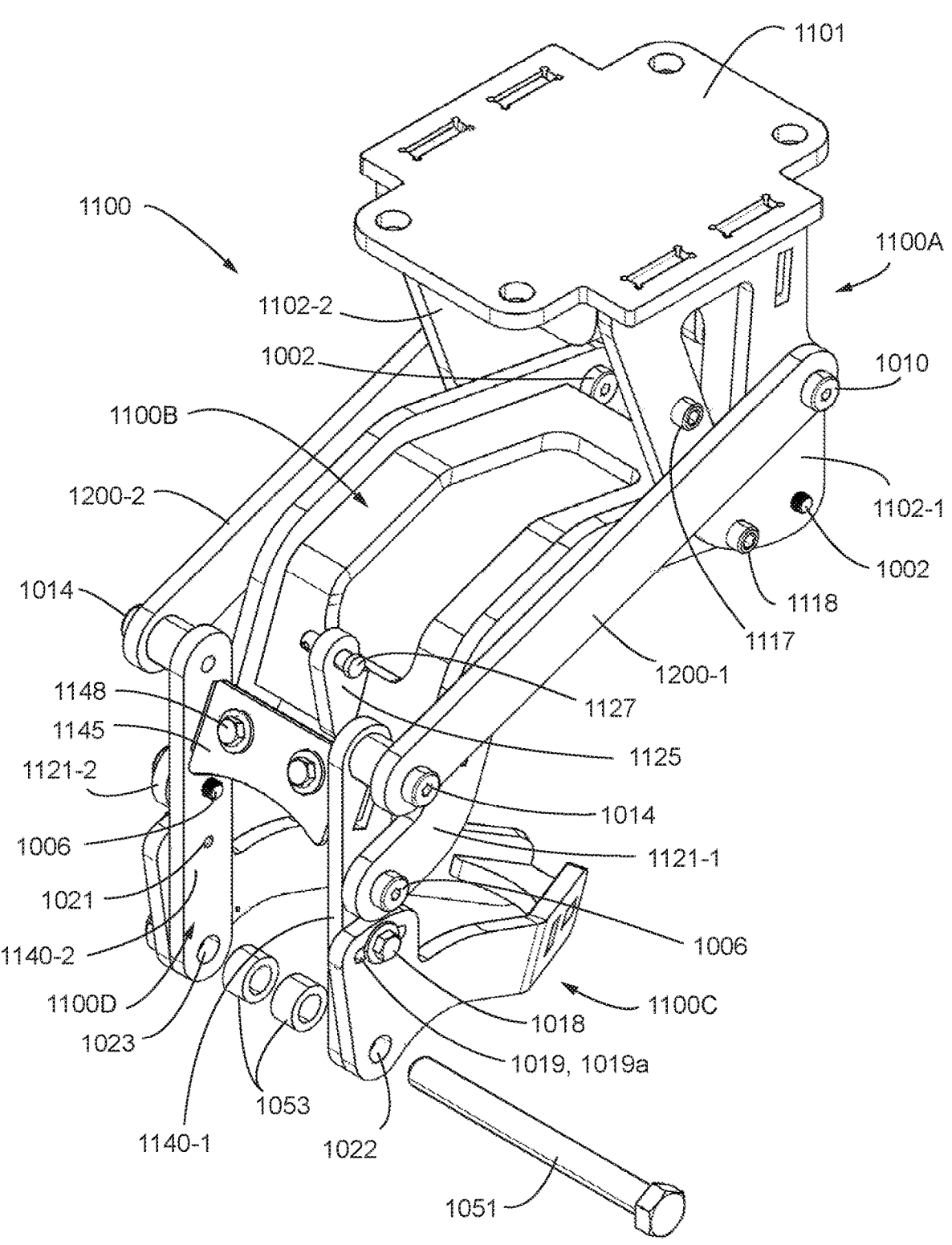
FIG. 10 is a rear perspective view of the frame assembly of the row cleaner assembly of FIG. 3 with the row cleaning wheels and gauge wheel removed to better illustrate an embodiment of the frame assembly.
Figure 11:
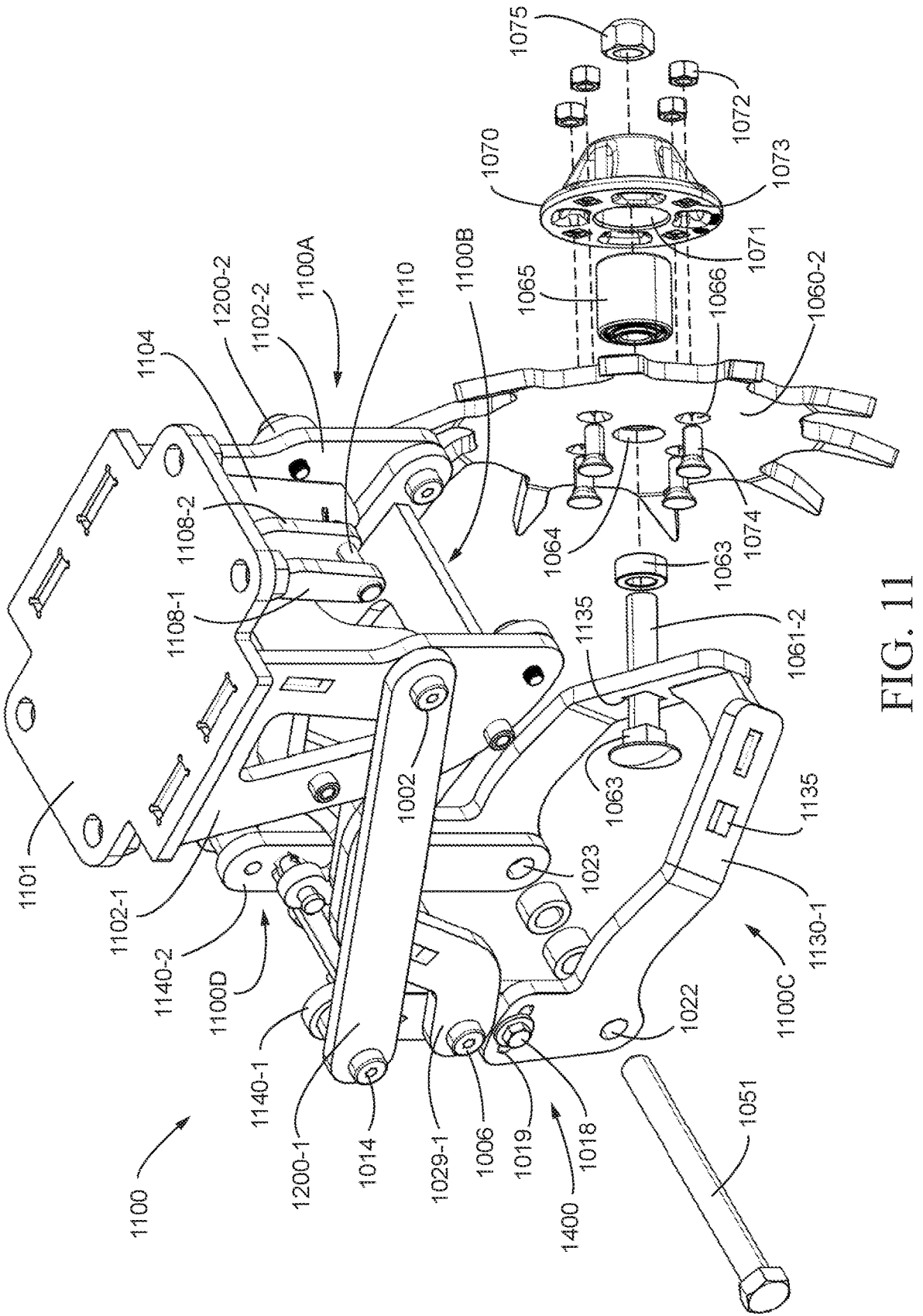
FIG. 11 is front perspective view of the frame assembly of FIG. 10 and showing an exploded view of an embodiment of one of the row cleaner wheels.
Figure 12:
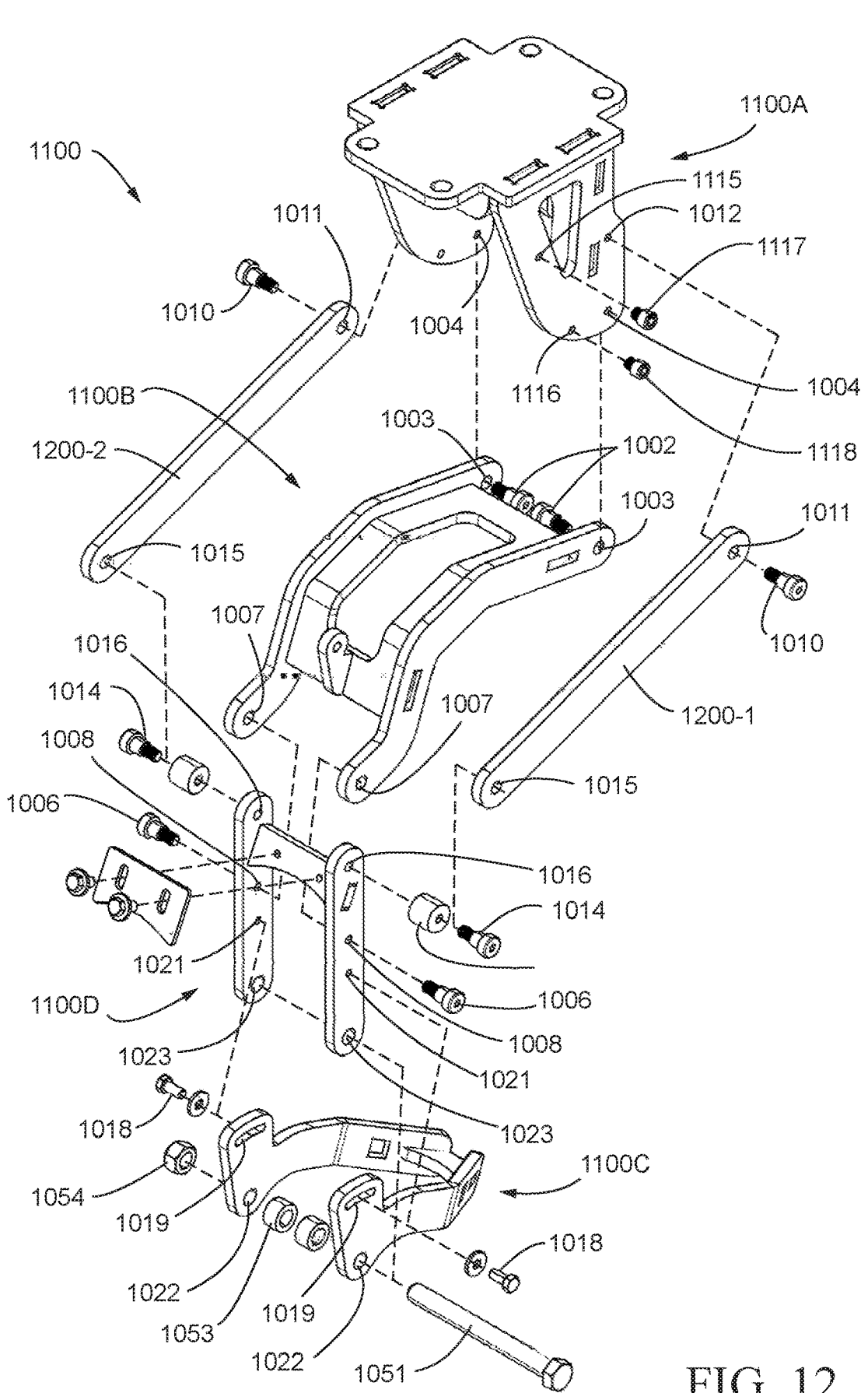
FIG. 12 is an exploded rear perspective view of the frame assembly of FIG. 10.

FIG. 10 is a rear perspective view of the frame assembly 1100 with the gauge wheel 1050, the row cleaner wheels 1060-1, 1060-2 and the actuator system 1300 removed for clarity. FIG. 11 is a front perspective view of the frame assembly 1100 with the gauge wheel 1050 and actuator system 1300 and the first row cleaner wheel 1060-1 removed, but showing an exploded view of the second row cleaning wheel 1060-2 and its mounting components. FIG. 12 is an exploded rear perspective view of the frame assembly 1100. Referring to FIGS. 10-12, the frame assembly 1100 includes an upper subframe 1100A, an intermediate subframe 1100B, a lower subframe 1100C, a rear strut subframe 1100D and first and second side linkages 1200-1, 1200-2. The rear strut subframe 1100D comprises a part of the lower subframe 1100C. The components comprising the subframes 1100A, 1100B, 1100C and 1100D are described in more detail later.

As best illustrated in FIG. 12, the intermediate subframe 1100B is pivotally connected at its forward end to the upper subframe 1100A by threaded connectors 1002 received within aligned apertures 1003, 1004 in the respective intermediate subframe 1100B and upper subframe 1100A. The intermediate subframe 1100B is also pivotally connected at its rearward end to the rear strut subframe 1100D comprising a part of the lower subframe 1100C by threaded connectors 1006 received within aligned apertures 1007, 1008 in the respective intermediate subframe 1100B and rear strut subframe 1100D. First and second side linkages 1200-1, 1200-2 are pivotally connected at their forward end to the upper subframe 1100A by threaded connectors 1010 received within aligned apertures 1011, 1012 in the respective first and second side linkages 1200-1, 1200-2 and upper subframe 1100A. The first and second side linkages 1200-1, 1200-2 are pivotally connected at their rearward end to the rear strut subframe 1100D by threaded connectors 1014 received within aligned apertures 1015, 1016 in the respective first and second linkages 1200-1, 1200-2 and rear strut subframe 1100D. The rear strut subframe 1100D is rotationally fixed with the lower subframe 1100C by threaded connectors 1018 received within an arcuate slot 1019 in the lower frame 1100C and which threadably engages with an opening 1021 in the rear strut subframe 1100D. The rear strut subframe 1100D is connected with the lower subframe 1100C by the gauge wheel axle bolt 1051 received through aligned apertures 1022, 1023 in the respective lower frame 1100C and rear strut subframe 1100D. It should be apparent that in the 1000A embodiment which omits the gauge wheel 1050, short bolts may extend through the apertures 1022, 1023 secured by nuts (not shown) in place of the gauge wheel axle bolt 1051. It should be appreciated that the forward pivotal connections of the upper subframe 1100A with the intermediate subframe 1100B and the side linkages 1200-1, 1200-2, together with the rearward pivotal connections of the intermediate subframe 1100B and the side linkages 1200-1, 1200-2 with the rear strut subframe 1100D provides a four bar linkage that permits the intermediate and lower subframes 1100B, 1100C to move vertically with respect to the upper subframe 1100A rigidly secured to the toolbar 14.

Figure 13:
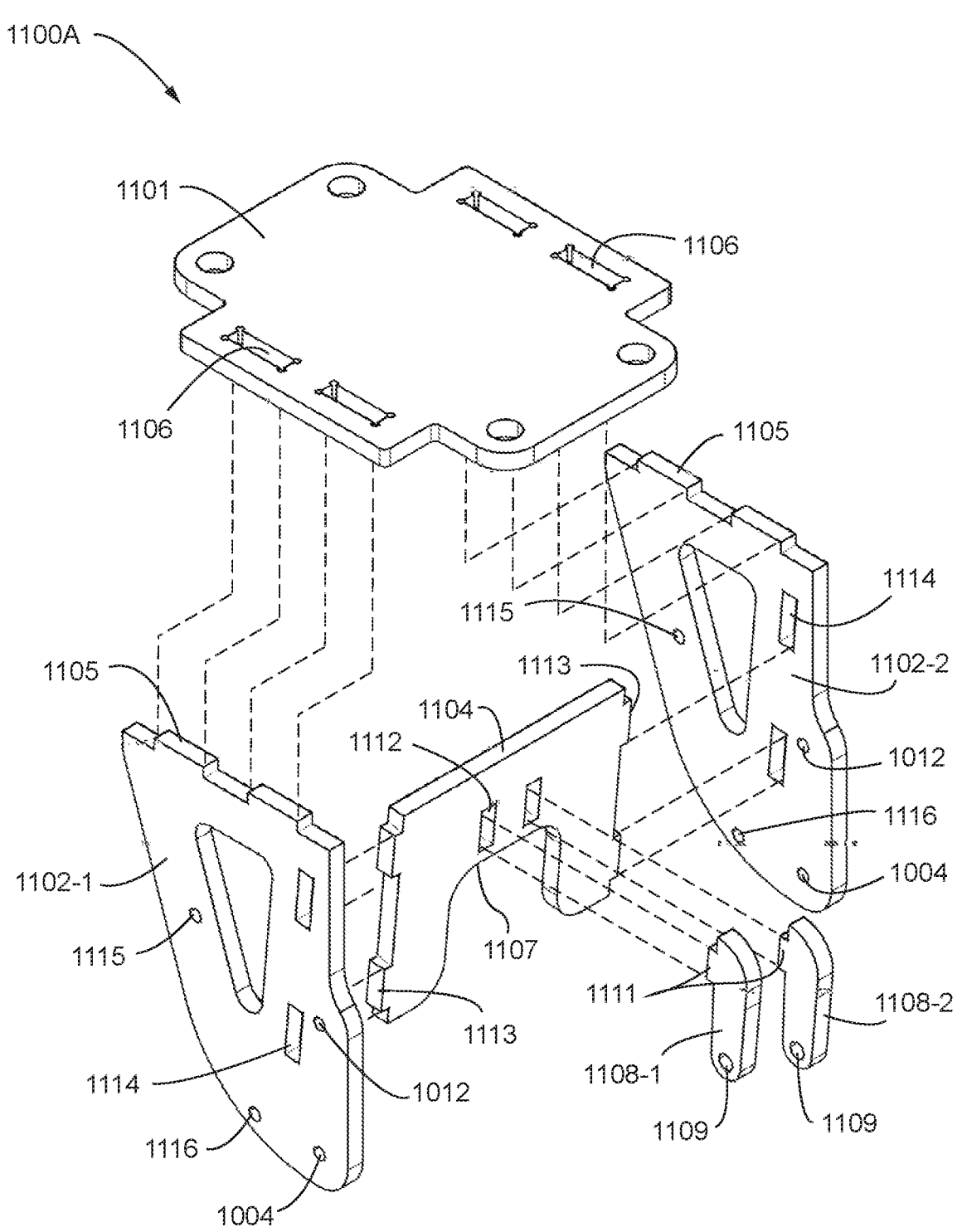
FIG. 13 is an exploded front perspective view of an embodiment of the upper subframe of the frame assembly of FIG. 10.

FIG. 13 shows an exploded front perspective view of the upper subframe 1100A. The upper subframe 1100A includes first and second gusset plates 1102-1, 1102-2 that extend downwardly from the mounting plate 1101 and are laterally spaced by a front plate 1104. The gusset plates 1102-1, 1102-2 may include gusset tabs 1105 which are received in gusset tab slots 1106 in the mounting plate 1101. The front plate 1104 includes a cutout 1107 to accommodate the actuator 1302 passing therethrough (see FIGS. 6-7). The front plate 1104 may include actuator front mounting cars 1108-1, 1108-2 extending downwardly from the front plate 1104. Each of the actuator front mounting cars 1108-1, 1108-2 may include a hole 1109 to receive a pin 1110 (FIG. 11) for mounting the forward end of the actuator 1302 to the upper subframe 1100A (scc FIG. 6). Each of the actuator front mounting cars 1108-1, 1108-2 may include an car tab 1111 that is received within respective car tab slots 1112 in the front plate 1104. The front plate 1104 may also include side tabs 1113 that are received with side tab slots 1114 in the gusset plates 1102-1, 1102-2. It should be appreciated that rather than using tabs and slots connecting the individual parts of the upper subframe 1100A, the individual parts of the upper subframe 1100A may be connected by welding or by bolted connections. Alternatively, the upper subframe 1100A may be fabricated as a single part, such as by casting. The gusset plates 1102-1, 1102-2 include the apertures 1004 for receiving the threaded connectors 1002 for pivotally securing the intermediate subframe 1100B thereto as described above in connection with FIG. 12. Additionally, the gusset plates 1102-1, 1102-2 include the apertures 1012 for receiving the threaded connectors 1010 for pivotally securing the first and second side linkages 1200-1, 1200-2 described above in connection with FIG. 12. The gusset plates 1102-1, 1102-2 also include apertures 1115 and 1116 for receiving upper and lower threaded connectors 1117, 1118 (FIGS. 11 and 12) which function as upper and lower stops by abutting with the first and second side linkages 1200-1, 1200-2 to limit the upward and downward vertical movement of the four bar linkage.

FIG. 14 shows an exploded rear perspective view of the intermediate subframe 1100B. The intermediate subframe 1100B includes a base member 1120 and first and second side rails 1121-1, 1121-2. The base member 1120 includes a cutout 1122 to accommodate the actuator 1302 (see FIGS. 3, 6). The base member 1120 may include side tabs 1123 that are received within side tab slots 1124 in the side rails 1121-1, 1121-2. The rearward end of the base member 1120 may include an actuator rear mounting ear 1125. The actuator rear mounting car 1125 may include a hole 1126 to receive a pin 1127 (FIG. 3, 10) for mounting the rear end of the actuator 1302 to the intermediate subframe 1100B. The actuator rear mounting car 1125 may include an car tab 1128 that is received within an car tab slot 1129 in the base member 1120. It should be appreciated that rather than using tabs and slots connecting the individual parts of the intermediate subframe 1100B, the individual parts of the intermediate subframe 1100B may be connected by welding or by bolted connections. Alternatively, the intermediate subframe 1100B may be fabricated as a single part, such as by casting. The side rails 1121-1, 1121-2 include the forward aperture 1003 for receiving the threaded connector 1002 for pivotally securing the side rails 1121-1, 1121-2 of the intermediate subframe 1100B to the gussets 1102-1, 1102-2 of the upper subframe 1100A as described above in connection with FIG. 12 and the side rails 1121-1, 1121-2 include the rearward aperture 1007 for receiving the threaded connector 1006 for pivotally securing the side rails 1121-1, 1121-2 of the intermediate subframe 1100B to the rear strut subframe 1100D as described above in connection with FIG. 12.

FIG. 15 shows an exploded rear perspective view of the lower subframe 1100C. The lower subframe 1100C includes first and second row cleaner wheel support arms 1130-1, 1130-2 connected at their forward end by a forward plate 1132. The forward plate 1132 may include side tabs 1133 that are received within side tab slots 1134 in the first and second row cleaner wheel support arms 1130-1, 1130-2. It should be appreciated that rather than using tabs and slots connecting the individual parts of the lower subframe 1100C, the individual parts of the lower subframe 1100C may be connected by welding or by bolted connections. Alternatively, the lower subframe 1100C may be fabricated as a single part, such as by casting. Each of the first and second row cleaner wheel support arms 1130-1, 1130-2 includes a square opening 1135 for receiving a square shank portion 1063 (FIG. 11) of a respective one of the row cleaner wheel axle bolts 1061-1, 1061-2 (FIG. 11) as discussed in more detail later. Each row cleaner wheel support arm 1130-1, 1130-2 also includes the opening 1022 for receiving the gauge wheel axle bolt 1051 as shown in FIGS. 10-12. Each row cleaner wheel support arm 1130-1, 1130-2 also includes the arcuate slot 1019 for receiving the threaded connector 1018 that is threadably received by the rear strut subframe 1100D for securing the row cleaner wheel support arms 1130-1, 1130-2 to the rear strut subframe 1100D as described above in connection with FIG. 12. It should be appreciated that the arcuate slot 1019 and threaded connector 1018 cooperate to form a depth selector 1400 permitting the lower subframe 1100C to pivot about the gauge wheel axle bolt 1051 such that the row cleaner wheels 1060-1, 1060-2 are adjustably positionable relative to the rear strut subframe 1100D and the gauge wheel 1050 in order to vary the depth setting of the row cleaner wheels 1060-1, 1060-2 relative to the gauge wheel 1050. In an alternative embodiment as shown in FIG. 16, instead of a single arcuate slot 1019, a series of discrete openings 1019a disposed along an arc may be used instead to provide discrete depth settings for the row cleaner wheels 1060-1, 1060-2 relative to the gauge wheel 1050.

Figure 17:
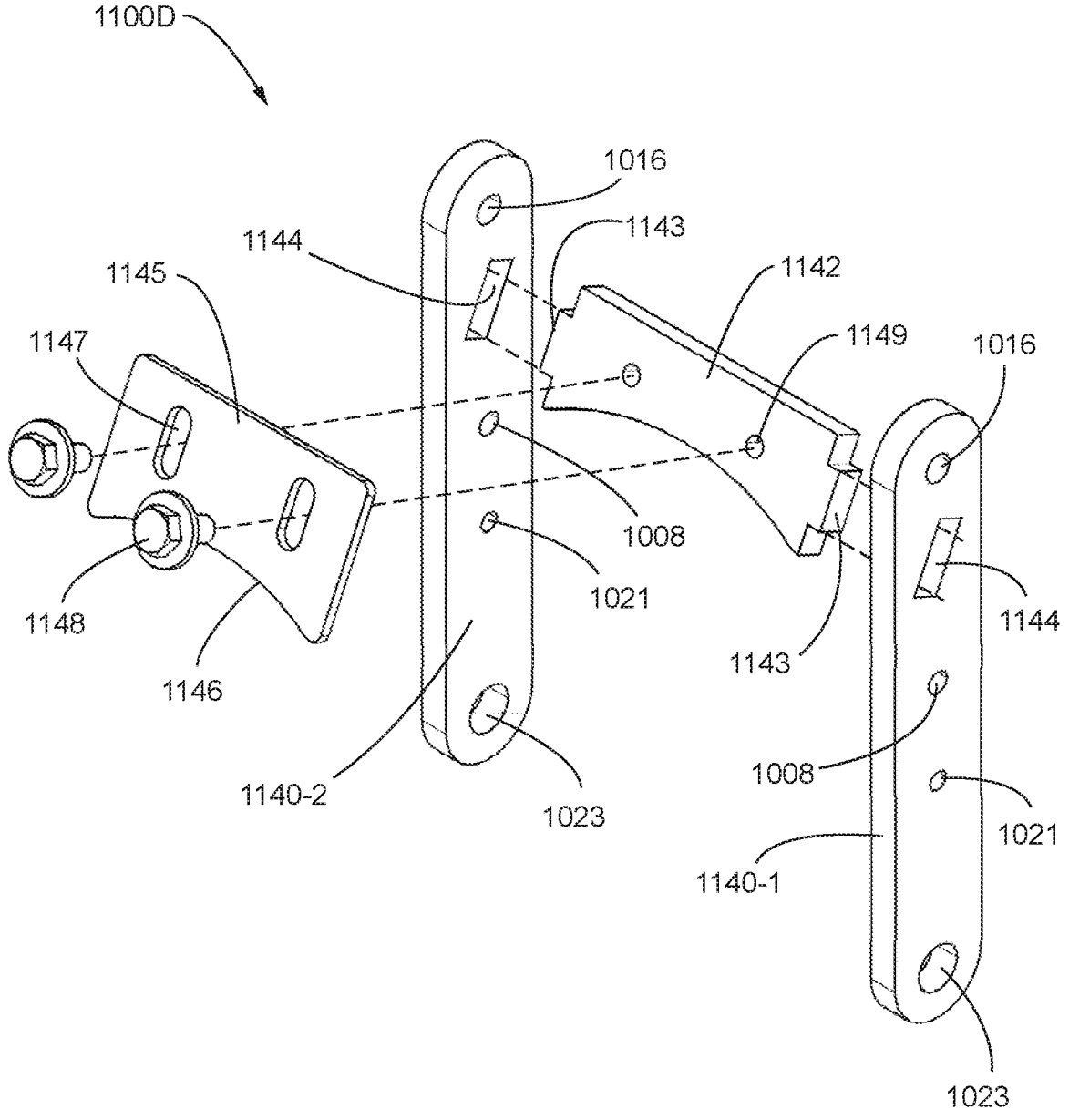
FIG. 17 is a rear perspective view of rear strut subframe of the frame assembly of FIG. 10.

FIG. 17 is a rear perspective view of the rear strut subframe 1100D. The rear strut subframe 1100D includes first and second struts 1140-1, 1140-2 spaced by a lateral plate 1142. The lateral plate 1142 may include tabs 1143 that are received within slots 1144 of each of the first and second struts 1140-1, 1140-2. Alternatively, the lateral plate 1142 may be attached to the struts 1140-1, 1140-2 by welding or bolted connections. Alternatively, the struts 1140-1, 1140-2 and the lateral plate 1142 may be fabricated as a single part, such as by casting. Each of the first and second struts 1140-1, 1140-2 include the aperture 1016 for receiving the threaded connector 1014 for connecting with the respective side linkages 1200-1, 1200-2 and each of the first and second struts 1140-1, 1140-2 include the aperture 1023 for receiving the gauge wheel axle bolt 1051 as described above in connection with FIG. 12.

The rear strut subframe 1100D may include a scraper 1145 to remove soil or debris that may build up on the gauge wheel 1050 during operation. The scraper 1145 may be attached to the lateral plate 1142 between the rear struts 1140-1, 1140-2 of the rear strut subframe 1100D and may comprise a plate having an arcuate edge 1146 that approximates the profile of the gauge wheel 1050 (see FIGS. 3, 7 and 8). The scraper 1145 may be attached to the lateral plate 1142 with threaded connectors 1148 extending through elongated holes 1147 that align with internally threaded apertures 1149 in the lateral plate 1142. The elongated holes 1147 will permit the scraper 1145 to be adjustably positioned relative to the lateral plate 1142 to vary the distance to the gauge wheel 1050 to accommodate different gauge wheel sizes and profiles and to account for wear of the gauge wheel tread and the scraper 1145.

Referring to FIG. 11, the square opening 1135 in each of the row cleaner wheel support arms 1130-1, 1130-2 and the square shank portion 1063 of the row cleaner wheel axle bolts 1061-1, 1061-2 cooperate to rotationally restrain the row cleaner axle bolts 1061-1, 1061-2 to the row cleaner wheel support arms 1130-1, 1130-2. Each row cleaner wheel axle bolt 1061-2, 1061-2 receives a spacer 1063. Each row cleaner wheel axle bolt 1061-2, 1061-2 extends through a central opening 1064 within each of the respective first and second cleaner wheels 1060-1, 1060-2. A bushing 1065 is received over the end of each row cleaner wheel axle bolts 1061-2, 1061-2 and the bushing is received within a hub 1070 having a central opening 1071. The hub 1070 is secured to the respective first and second row cleaner wheels 1060-1, 1060-2 by nuts 1072 threadably received over threaded connectors 1074 which extend through apertures 1066 in the row cleaner wheels 1060-1, 1060-2 and through aligned holes 1073 in the hub 1070. A lug nut 1075 threadably receives the end of the wheel axle bolts 1061-2, 1061-2 thereby axially restraining the row cleaner wheels 1060-1, 1060-2 onto the respective row cleaner wheel axle bolts 1061-2, 1061-2, while the spacer 1063 and the bushing 1065 permit the row cleaner wheels row cleaner wheels 1060-1, 1060-2 to freely rotate about the respective row cleaner wheel axle bolts 1061-2, 1061-2.

Referring to FIGS. 3 and 12, the gauge wheel axle bolt 1051 extends through the aligned apertures 1022, 1023 in the respective first and second row cleaner wheel support arms 1130-1, 1130-2 of the lower subframe 1100C and the struts 1140-1, 1140-2 of the rear strut subframe 1100D and through the hub 1052 (FIG. 3) of the gauge wheel 1050. Spacer bushings 1053 (FIG. 12) may be disposed on the gauge wheel axle bolt 1051 on each side of the hub 1052 to keep the gauge wheel 1050 centered between the struts 1140-1, 1140-2. A nut 1054 threads onto the end of the gauge wheel axle bolt 1051 securing the gauge wheel 1050 to the lower subframe 1100C and rear strut subframe 1100D.

As previously stated, the actuator system 1300 may utilize any actuator that provides an adjustable downforce and an optional lift force, including pneumatic cylinders, hydraulic cylinders, air bags, and electromechanical actuators. In one embodiment, the actuator 1302 comprising the actuator system 1300 is a CleenSweep® cylinder available from Precision Planting LLC, 23207 Townline Rd, Tremont, IL 61568, which is described in U.S. Pat. No. 8,550,020 or a DeltaForce® cylinder also available from Precision Planting, which is described in U.S. Pat. No. 9,144,189. The downforce exerted by the actuator system 1302 on the gauge wheel 1050 may be controlled by a controller (such as the "controller 300" referenced in U.S. Pat. No. 8,550,020) or by a fluid control port (such as the "fluid control port 10" described in PCT Publication No. WO2020/056395). The actuators 1302 of each of the row cleaner assemblies 1000 of the planter 10 may be controlled on a row-by-row basis, or as groups by section of the planter 10, or collectively across the entire planter 10.

The desired amount of downforce may be a function of the soil conditions and the amount or type of crop residue and the depth at which the row cleaner wheels 1060 are set for engagement with the soil. For example, in dry soil conditions, more downforce may be desired such that the gauge wheel 1050 will more firmly pack the soil 40 in front of the opening assembly 234 for formation of a better seed trench 38 and to prevent or minimize soil falling into the seed trench 38 before the seed is deposited. Alternatively in wet soil conditions, less downforce may be desired. A downforce monitoring system (discussed later) may be employed for determining and regulating the downforce applied by the actuator system 1300.

Figure 18:
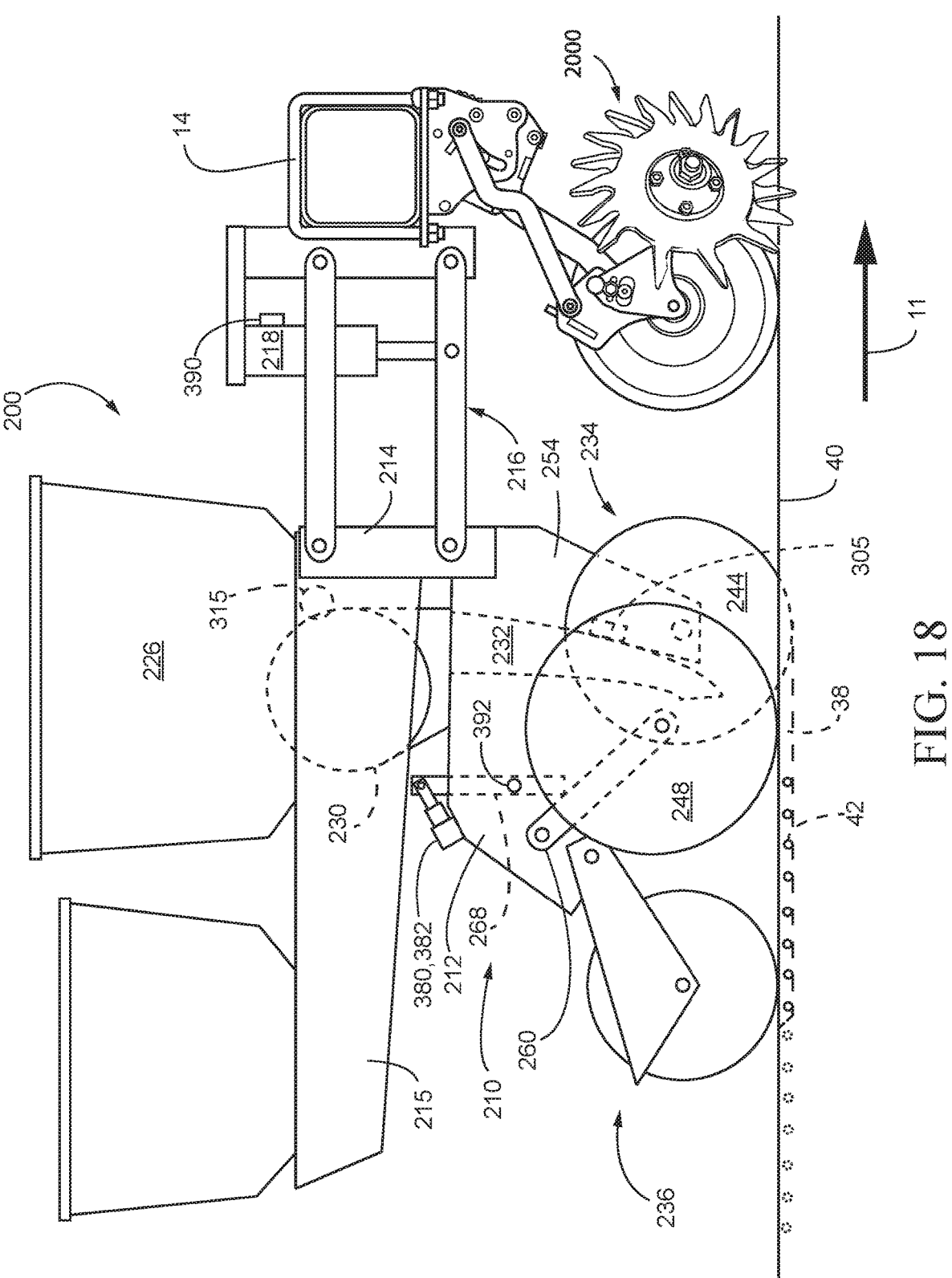
FIG. 18 is a side elevation view of an embodiment of a planter row showing another embodiment of a row cleaner assembly incorporating a gauge wheel.

FIG. 18 is a side elevation of the planter row unit 200 as previously described above in connection with FIG. 2, but with another embodiment of a row cleaner assembly designated by reference number 2000. The row cleaner assembly 2000 is mounted to the toolbar 14 and is positioned forward of the trench opening assembly 234. Again, it should be appreciated that each row unit 200 of the planter 10 would have an associated row cleaner assembly 2000 longitudinally aligned with the respective trench opening assembly 234 of the row unit 200. In the embodiment shown, the row cleaner assembly 2000 includes a gauge wheel 2050 (identified in FIG. 19). The row cleaner assembly 2000 extends rearward of the toolbar 14 and is rigidly mounted to the underside of toolbar 14 by suitable mounting structure, which may include a mounting plate 2101 and one or more U-bolts 2001 as shown. Alternatively, the row cleaner assembly 2000 may be mounted to the top side, rear side or forward side of the toolbar 14 by any suitable mounting structure or connection, including bolted brackets or by welding.

Figure 18A:
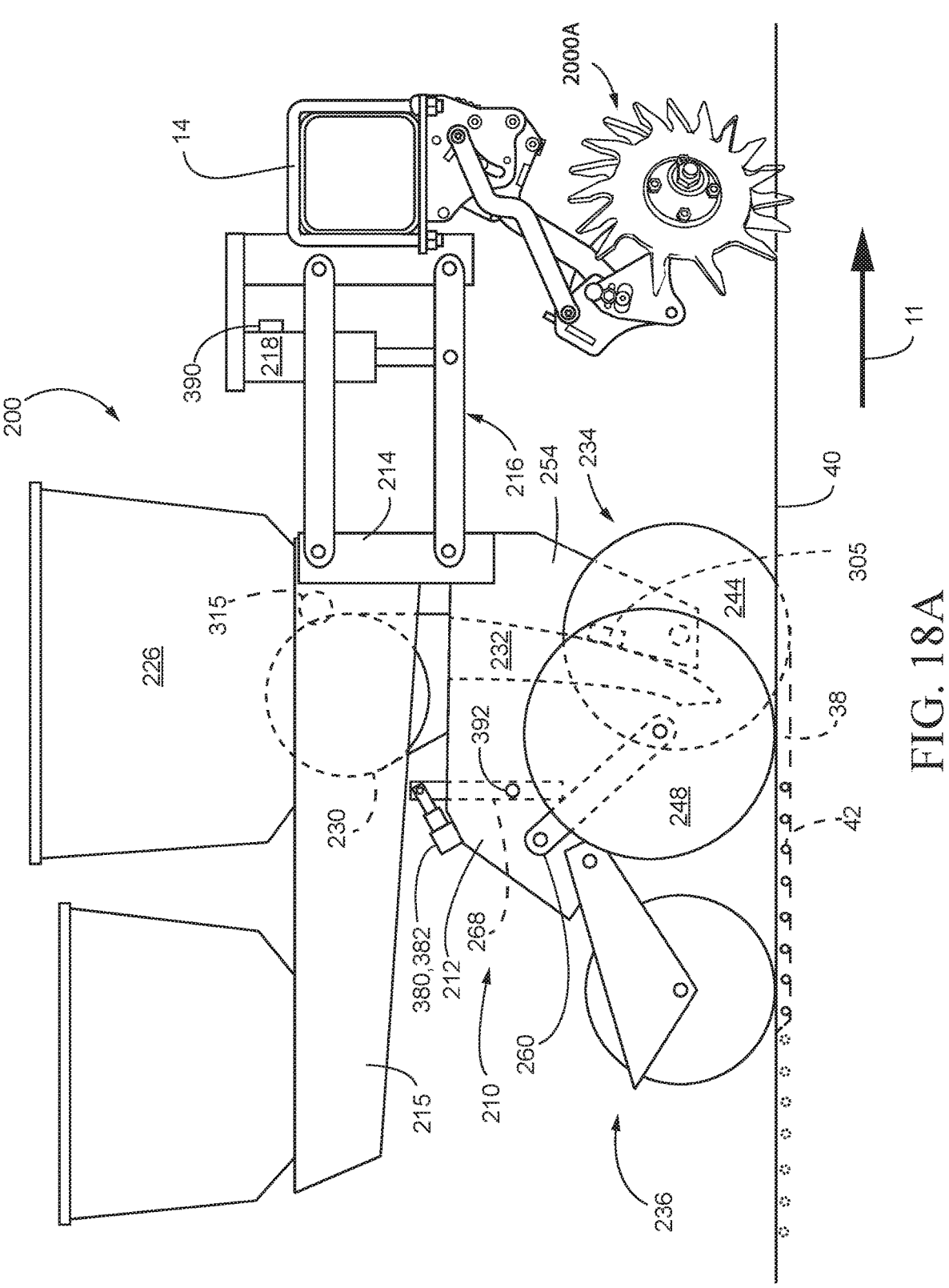
FIG. 18A is another side elevation view of an embodiment of a planter row unit showing another embodiment of a row cleaner assembly substantially the same as shown in FIG. 18, but without a gauge wheel.

FIG. 18A shows an alternative embodiment of a row cleaner assembly designated by reference number 2000A. The embodiment of the row cleaner assembly 2000A is substantially the same as the embodiment of the row cleaner assembly 2000 except the embodiment of 2000A does not include the gauge wheel.

Figure 19:
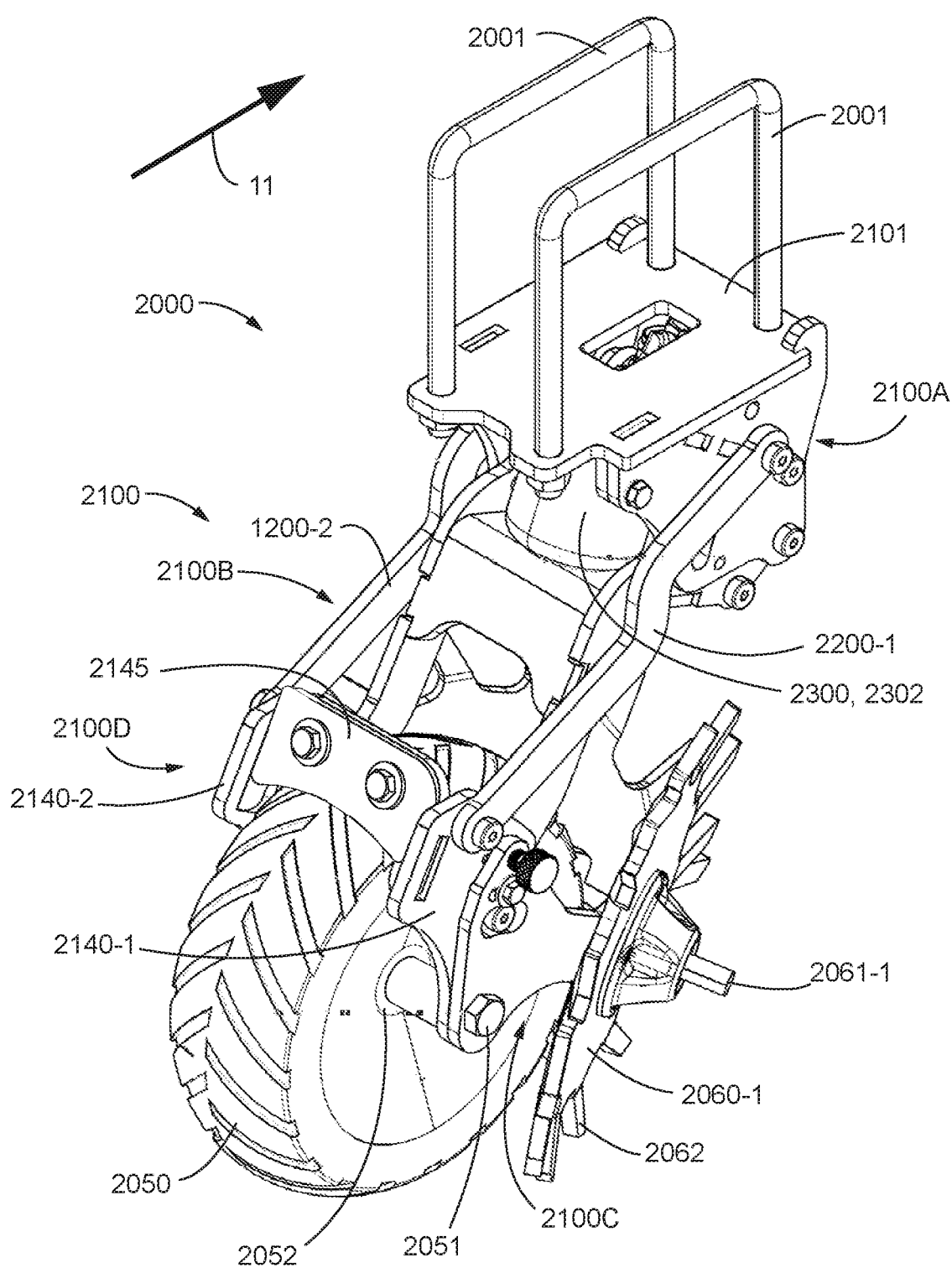
FIG. 19 is a rear perspective view of the row cleaner assembly of FIG. 18.
Figure 19A:
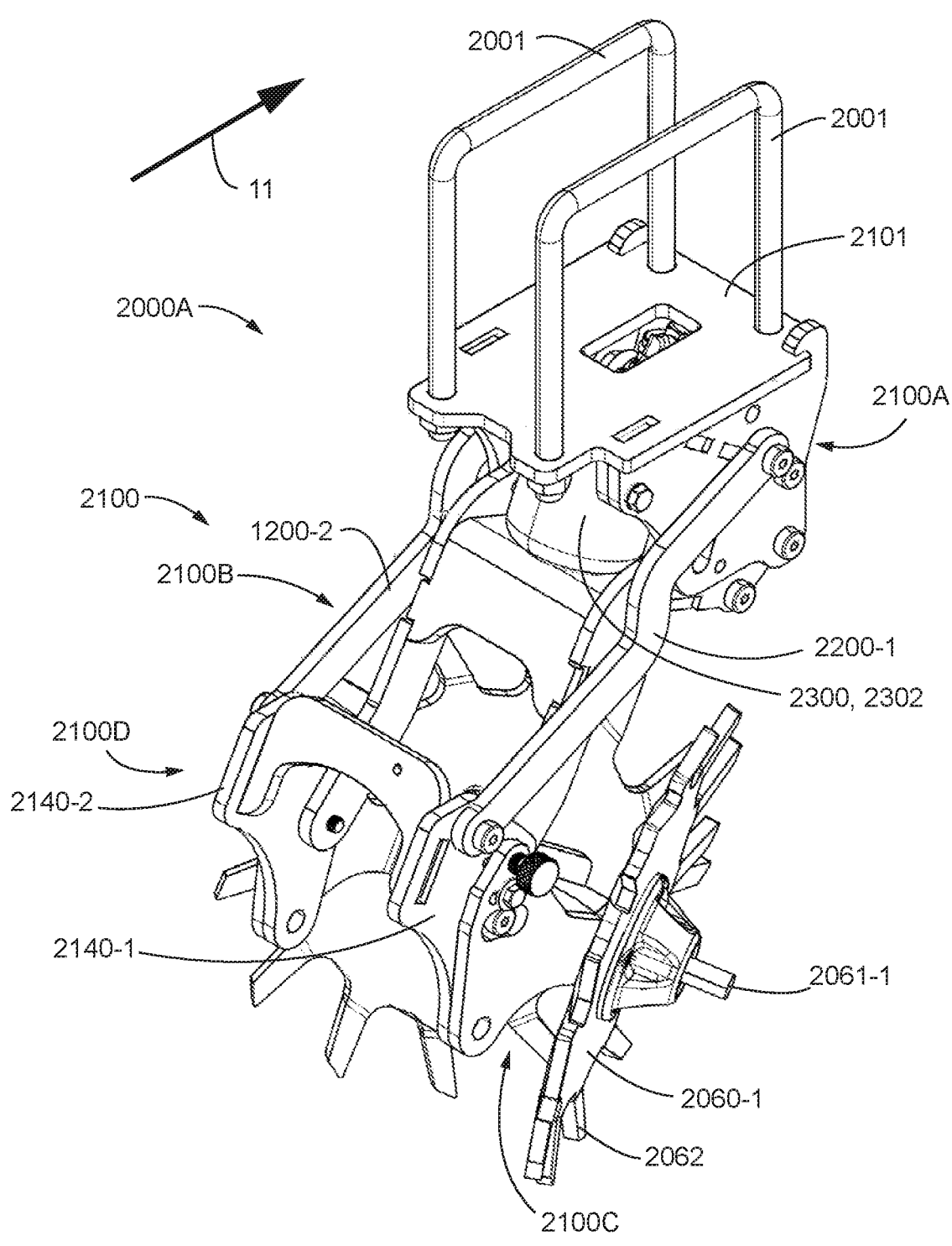
FIG. 19A is a rear perspective view of the row cleaner assembly of FIG. 18A.

FIG. 19 is an enlarged rear perspective view of the row cleaner assembly 2000 shown in FIG. 18. FIG. 19A is the same view as in FIG. 19 but shows the embodiment of the row cleaner assembly 2000A without the gauge wheel. Since both embodiments of the row cleaner assembly 2000 and 2000A are substantially the same, other than the removal of the gauge wheel in embodiment 2000A, only the embodiment 2000 is described, recognizing that any reference to the gauge wheel 2050, the gauge wheel axle 2051 and associated components would not be applicable to the 2000A embodiment.

Figure 20:
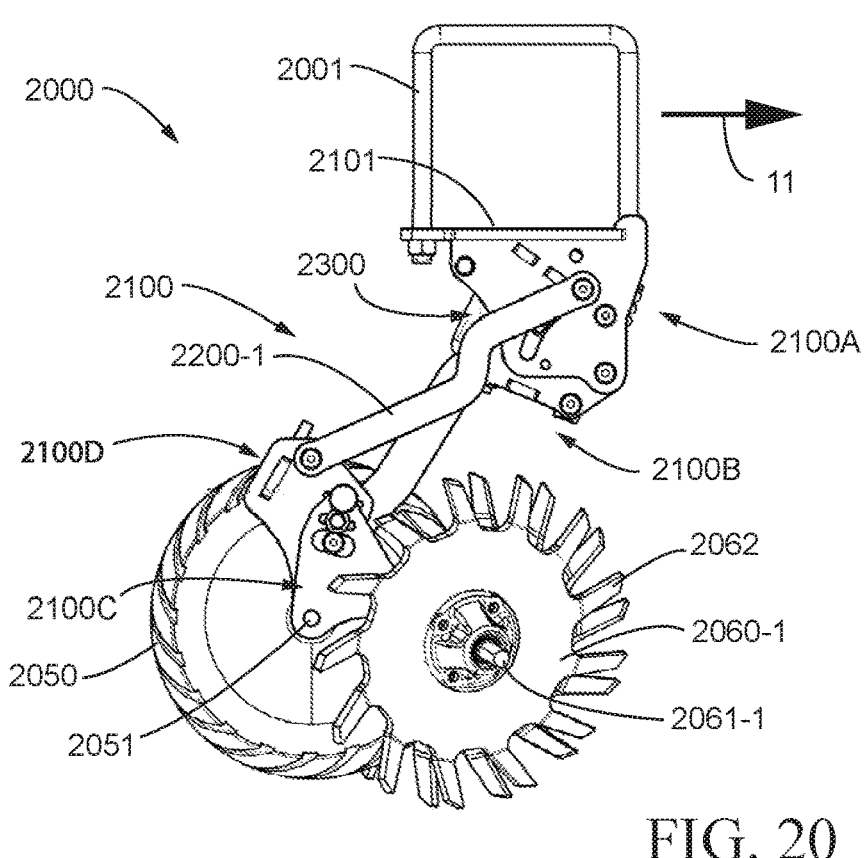
FIG. 20 is a right side elevation view of the row cleaner assembly of FIG. 19.
Figure 21:
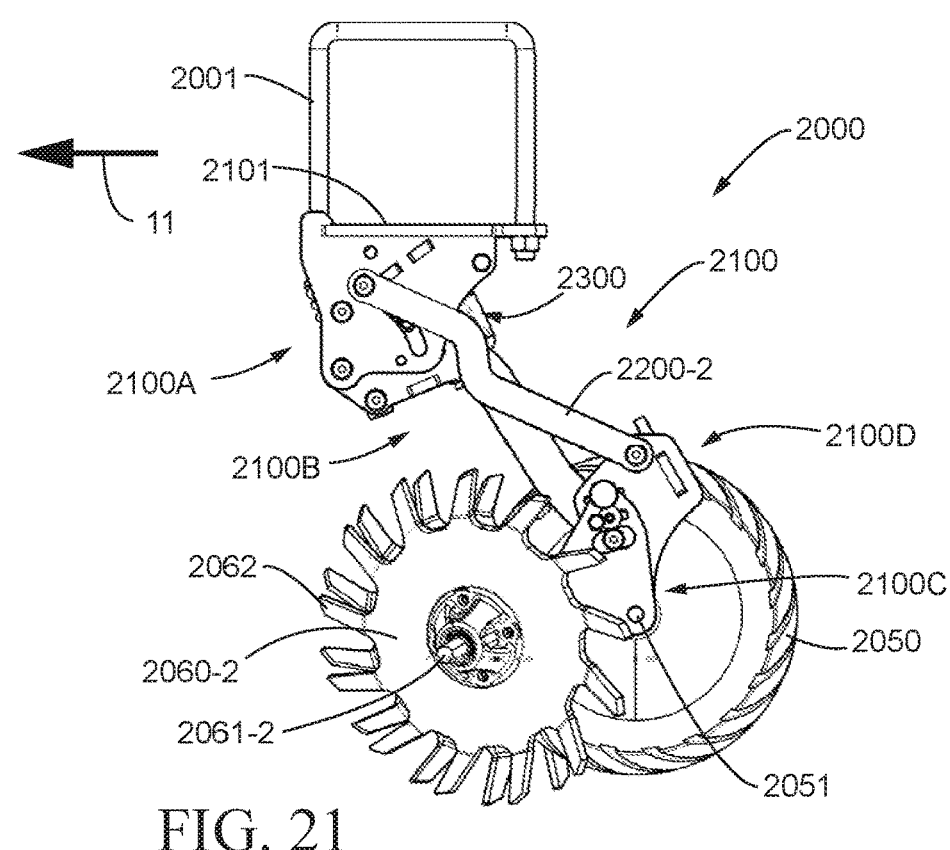
FIG. 21 is a left side elevation view of the row cleaner assembly of FIG. 19.
Figure 22:
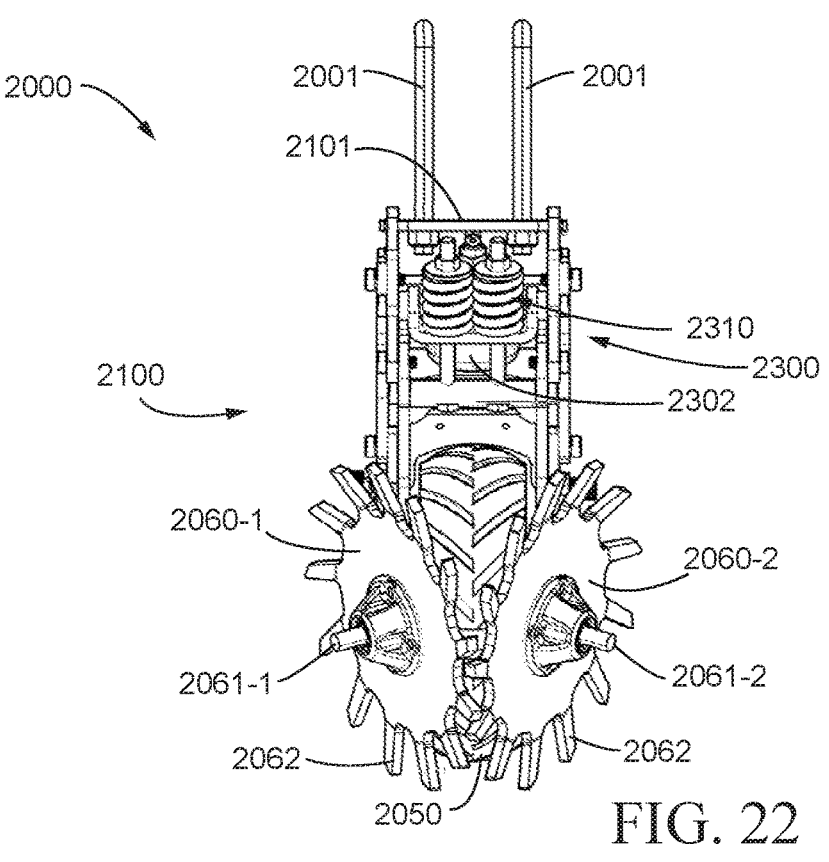
FIG. 22 is front elevation view of the row cleaner assembly of FIG. 19.
Figure 23:
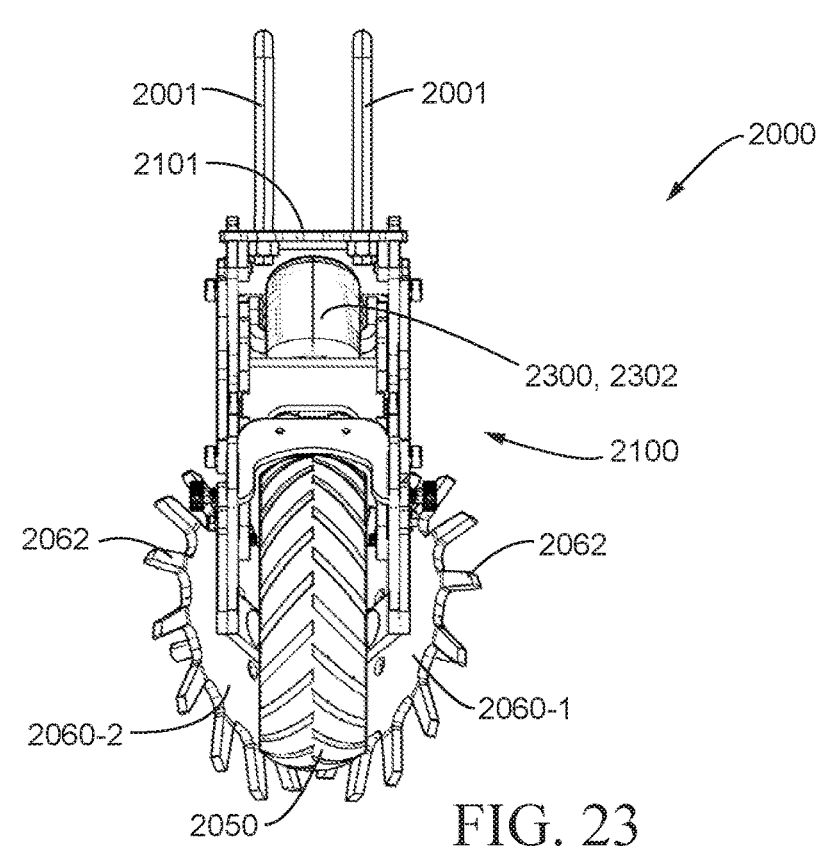
FIG. 23 is a rear elevation view of the row cleaner assembly of FIG. 19.
Figure 24:
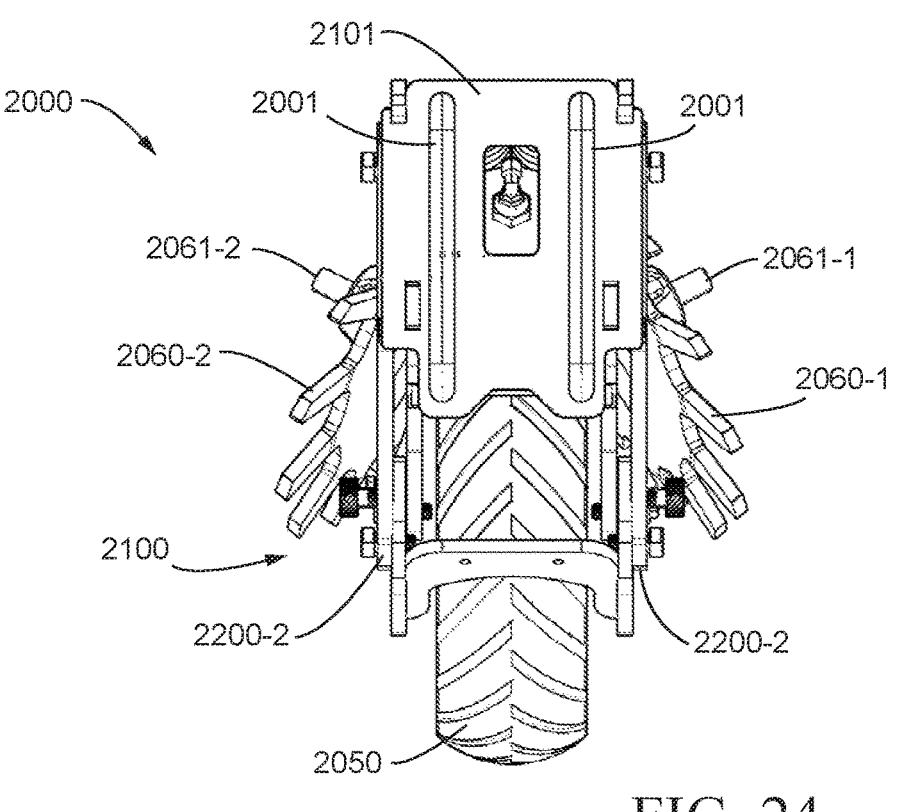
FIG. 24 is a top plan view of the row cleaner assembly of FIG. 19.
Figure 25:
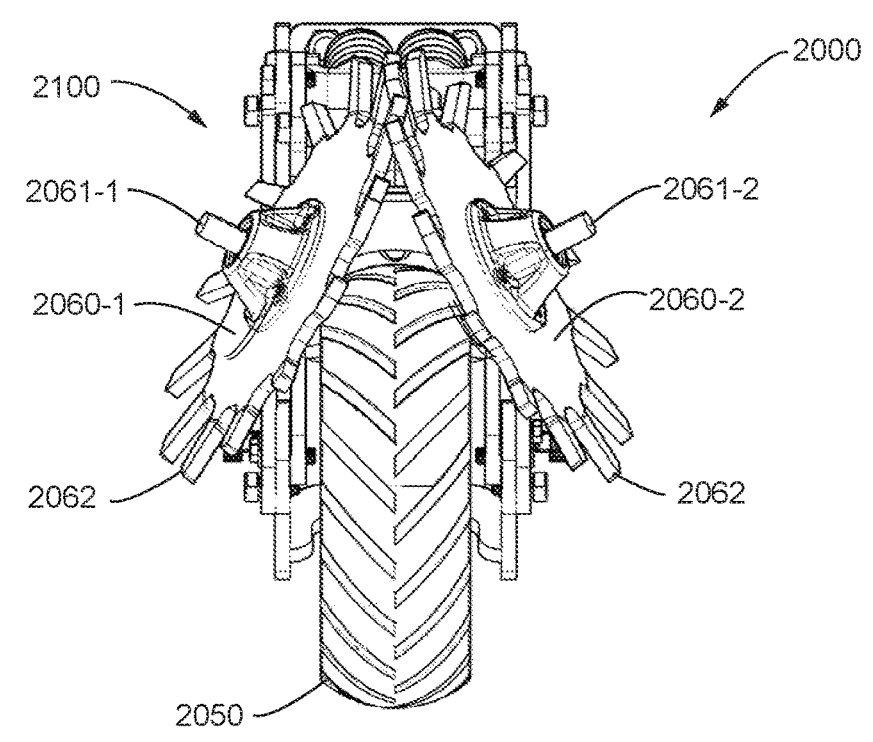
FIG. 25 is a bottom plan view of the row cleaner assembly of FIG. 19.

FIGS. 20 and 21 are right and left side elevation views, respectively, of the row cleaner assembly 2000. FIGS. 22 and 23 are front and rear elevation views, respectively, and FIGS. 24 and 25 are top and bottom views, respectively. The row cleaner assembly 2000 includes a frame assembly 2100 supported at its rearward end by a gauge wheel 2050. Row cleaner wheels 2060-1, 2060-2 are rotatably supported by the frame assembly 2100. Each row cleaner wheel 2060-1, 2060-2 includes radially spaced tines 2062 around its circumference. The row cleaner wheels 2060-1, 2060-2 are oriented to diverge outwardly and rearwardly such that the tines 2062 of the row cleaner wheels 2060-1, 2060-2 interlace at the forward end as they rotate. In operation, as the planter 10 moves in the forward direction of travel 11, the soil engages with the tines 2062, causing the row cleaner wheels 2060-1, 2060-2 to rotate. Due to their orientation, as the row cleaner wheels 2060-1, 2060-2 rotate, they direct any crop residue, soil clods or other debris laterally outwardly to provide a cleaner seed bed for the rearwardly aligned trench opening assembly 234. The gauge wheel 2050 serves to firm the soil 40 that may be disturbed by row cleaner wheels 2060-1, 2060-2 before the trench 38 is opened by the trench opening assembly 234. Firming the soil with the gauge wheel 2050 may be advantageous in dry soils to prevent soil 40 from falling into trench 38.

An actuator system 2300 is positioned within the fame assembly 2100 to provide an adjustable downforce and optionally a lift force to the gauge wheel 2050 and row cleaner wheels 2060-1, 2060-2. In this embodiment, the actuator system 2300 comprises an air bag 2302 and a spring assembly 2310, but the actuator system 1300 may utilize any actuator that provides an adjustable downforce and an optional lift force, including pneumatic cylinders, hydraulic cylinders, air bags, and electromechanical actuators as discussed in more detail later.

Figure 26:
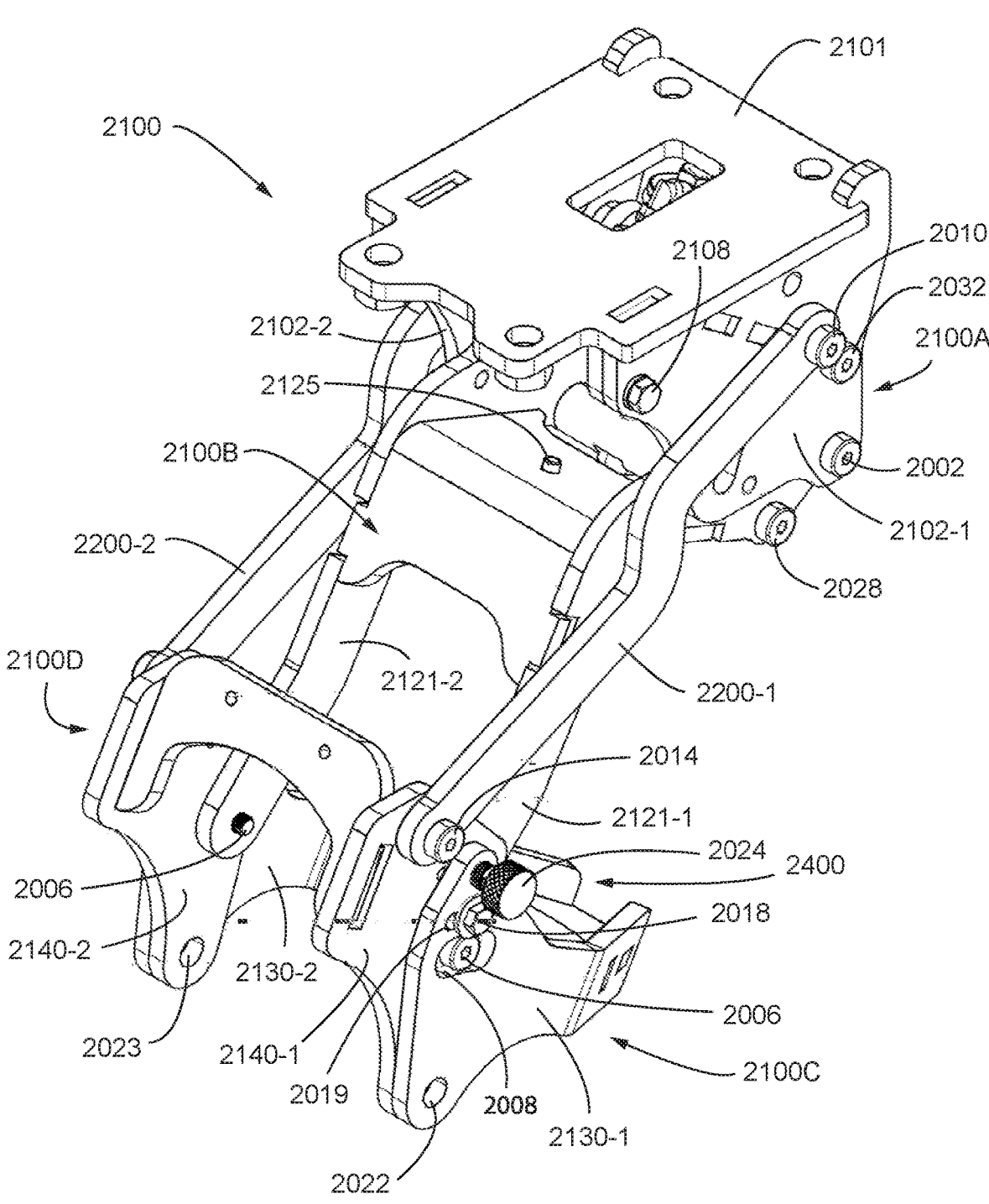
FIG. 26 is a rear perspective view of the row cleaner assembly of FIG. 19 with the row cleaning wheels and gauge wheel removed to better illustrate an embodiment of the frame assembly.
Figure 27:
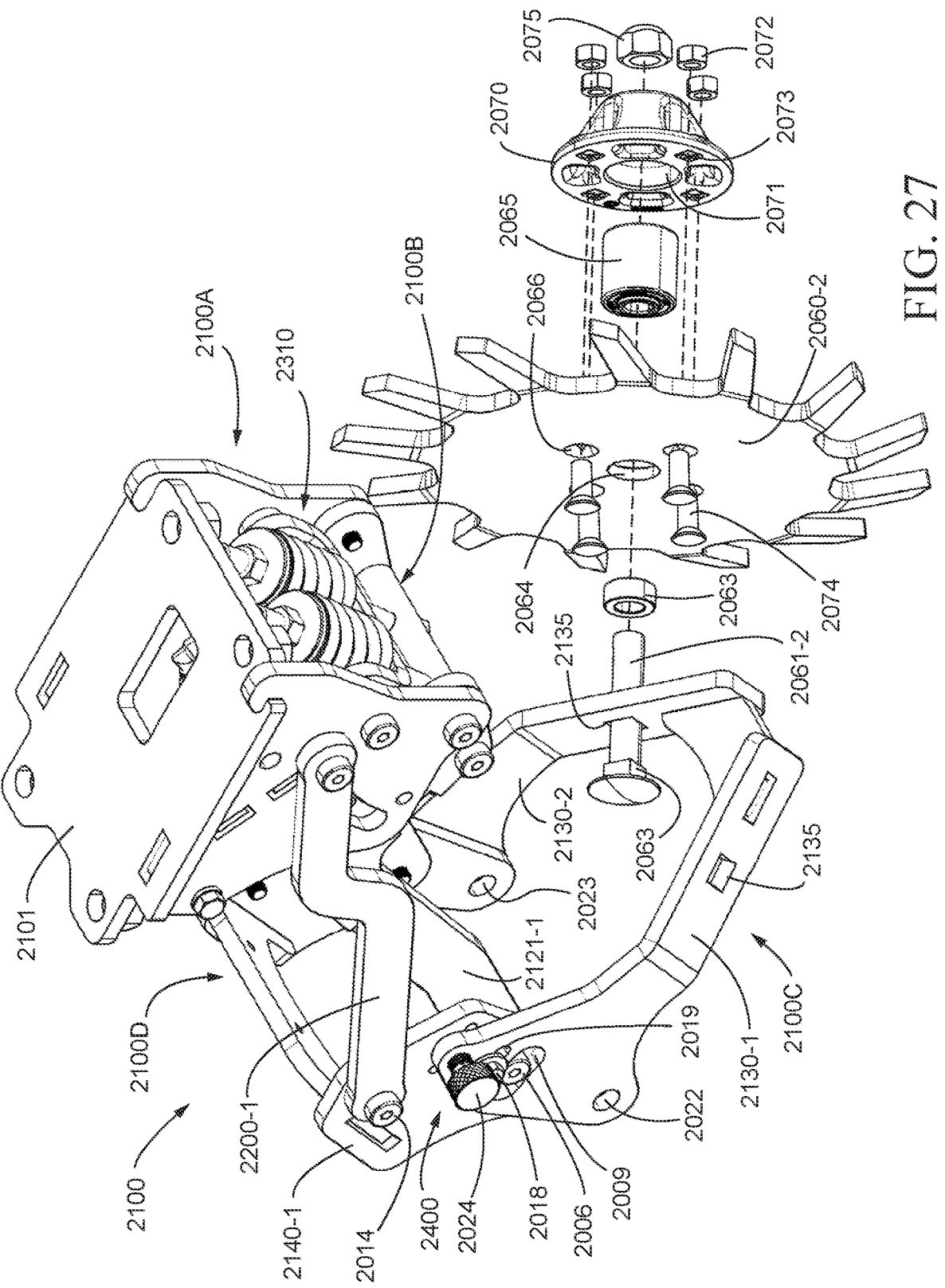
FIG. 27 is front perspective view of the frame assembly of FIG. 26 and showing an exploded view of an embodiment of one of the row cleaner wheels.
Figure 28:
FIG. 28 is an exploded rear perspective view of the frame assembly of FIG. 26.

FIG. 26 is a rear perspective view of the frame assembly 2100 with the gauge wheel 2050, the row cleaner wheels 2060-1, 2060-2 and the actuator system 2300 removed for clarity. FIG. 27 is a front perspective view of the frame assembly 2100 with the gauge wheel 2050 and actuator system 2300 and the first row cleaner wheel 2060-1 removed, but showing an exploded view of the second row cleaning wheel 2060-2 and its mounting components. FIG. 28 is an exploded rear perspective view of the frame assembly 2100. Referring to FIGS. 26-28, the frame assembly 2100 includes an upper subframe 2100A, an intermediate subframe 2100B, a lower subframe 2100C, a rear strut subframe 2100D, and first and second linkages 2200-1, 2200-2. The rear strut subframe 2100D comprises a part of the lower subframe 2100C. The subframes 2100A, 2100B, 2100C and 2100D are described in more detail later.

As best illustrated in FIG. 28, the intermediate subframe 2100B is pivotally connected at its forward end to the upper subframe 2100A by threaded connectors 2002 received within aligned apertures 2003, 2004 in the respective intermediate subframe 2100B and upper subframe 2100A. The intermediate subframe 2100B is pivotally connected at its rearward end by threaded connectors 2006 received within aligned apertures 2007, 2008 and 2009 in the respective intermediate subframe 2100B, the rear strut subframe 2100D and in the lower subframe 2100C. It should be appreciated that apertures 2007 in the rearward end of the intermediate subframe 2100B is internally threaded for receiving the threads of the threaded connector 2006. The aperture 2008 in the rear strut subframe 2100D is sized to pivotally receive the unthreaded shank of the threaded connector 2006, and the aperture 2008 in the lower subframe 2100C is an elongated opening 2008 sized to receive the head of the threaded connector 2006. Thus the lower subframe 2100C is not connected with the rear strut subframe by the threaded connector 2006. Instead the elongated opening 2008 serves as a guide within which the head of the threaded connector 2006 moves.

First and second linkages 2200-1, 2200-2 are pivotally connected at their forward end to the upper subframe 2100A by threaded connectors 2010 received within aligned apertures 2011, 2012 in the respective first and second linkages 2200-1, 2200-2 and the upper subframe 2100A. The first and second linkages 2200-1, 2200-2 are pivotally connected at their rearward end to the rear strut subframe 2100D by threaded connectors 2014 received within aligned apertures 2015, 2016 in the respective first and second linkages 2200-1, 2200-2 and rear strut subframe 2100D.

The rear strut subframe 2100D is rotationally fixed to the lower subframe 2100C by threaded connectors 2018 received within an arcuate slot 2019 in the lower frame 2100C and which threadably engages with a threaded aperture 2021 in the rear strut subframe 2100D. The rear strut subframe 2100D is connected with the lower subframe 2100C by the gauge wheel axle bolt 2051 received through aligned apertures 2022, 2023 in the respective lower frame 2100C and the rear strut subframe 2100D. It should be apparent that in the 2000A embodiment which omits the gauge wheel 2050, short bolts may extend through apertures 2022, 2023 secured by nuts (not shown) in place of the gauge wheel axle bolt 2051. It should be appreciated that the forward pivotal connections of the upper subframe 2100A with the intermediate subframe 2100B and the linkages 2200-1, 2200-2, together with the rearward pivotal connections of the intermediate subframe 2100B and the linkages 2200-1, 2200-2 with the rear strut subframe 2100D and the lower subframe 2100C provides a four bar linkage that permits the intermediate and lower subframes 2100B, 2100C to move vertically with respect to the upper subframe 2100A rigidly secured to toolbar 14.

Continuing to refer to the exploded view of FIG. 28, the rear strut subframe 2100D may also include an optional depth selector 2400 in order to vary the depth setting of the row cleaner wheels 2060-1, 2060-2 relative to the gauge wheel 2050. The depth selector 2400 includes a thumbscrew 2024 having a threaded shank and a peg end. The threaded shank of the thumbscrew 2024 threads into an internally threaded hole 2025 in the lower subframe 2100C while the peg end of the thumbscrew 2024 engages with one of a series of discrete holes 2026 are arranged in an arc in the rear strut subframe 2100D. It should be appreciated that the relative angle or position of the lower subframe 2100C is able to be movably adjusted with respect to the rear strut subframe 2100D, by loosening the threaded connector 2018 passing through the arcuate slot 2019 and into the threaded aperture 2021. When the lower subframe 2100C is adjusted to the desired angle or position (the threaded connector moving within the arcuate slot 2019 and the threaded connector 2006 moving within the elongated opening 2009), the thumbscrew 2024 can be turned to cause the peg end to seat within one of the discrete holes 2026. The threaded connector 2018 can then be tightened to secure the lower subframe 2100C to the rear strut subframe 2100D. Alternatively, as described above in connection with FIG. 16 of the row cleaner embodiment 1000, the arcuate slot 2019 may be replaced with a series of discrete holes arranged in an arc (not shown but corresponding to holes 2019a in FIG. 16) and the thumbscrew 2024 and the holes 2019 and 2026 may be eliminated, but the use of the depth selector 2400 described above makes it easier to set the desired angle or position of the lower subframe 2100C with respect to the rearward strut subframe 2100D.

Continuing to refer to FIG. 28, a spring assembly 2310 comprising a portion of the actuator system 2300 (discussed later) is secured to the intermediate subframe 2100B by threaded connectors 2028 received within aligned apertures 2029, 2030 in the respective intermediate subframe 2100B and a lower rod 2302 of the spring assembly 2310. The spring assembly 2310 is secured to the upper subframe 2100A by threaded connectors 2032 received within aligned apertures 2033, 2034 in the respective upper subframe 2100A and a U-shaped bracket 2320 (discussed later) of the spring assembly 2310.

Continuing to refer to FIG. 28, a threaded connector 2036 passes through an arched opening 2037 in the upper subframe 2100A and is received within an aperture 2038 in the intermediate subframe 2100B. As discussed later, as the intermediate subframe 2100D moves relative to the upper subframe 2100B (as part of the four bar linkage), the threaded connector 2036 moves along the arched opening 2037. When the threaded connector 2026 abuts with the upper end of the arched opening 2037 it serves as an upward stop, preventing further upward movement of the intermediate subframe 2100B. When the threaded connector 2026 abuts with the lower end of the arched opening 2037 it serves as a downward stop, preventing further downward movement of the intermediate subframe 2100B.

Figure 29:
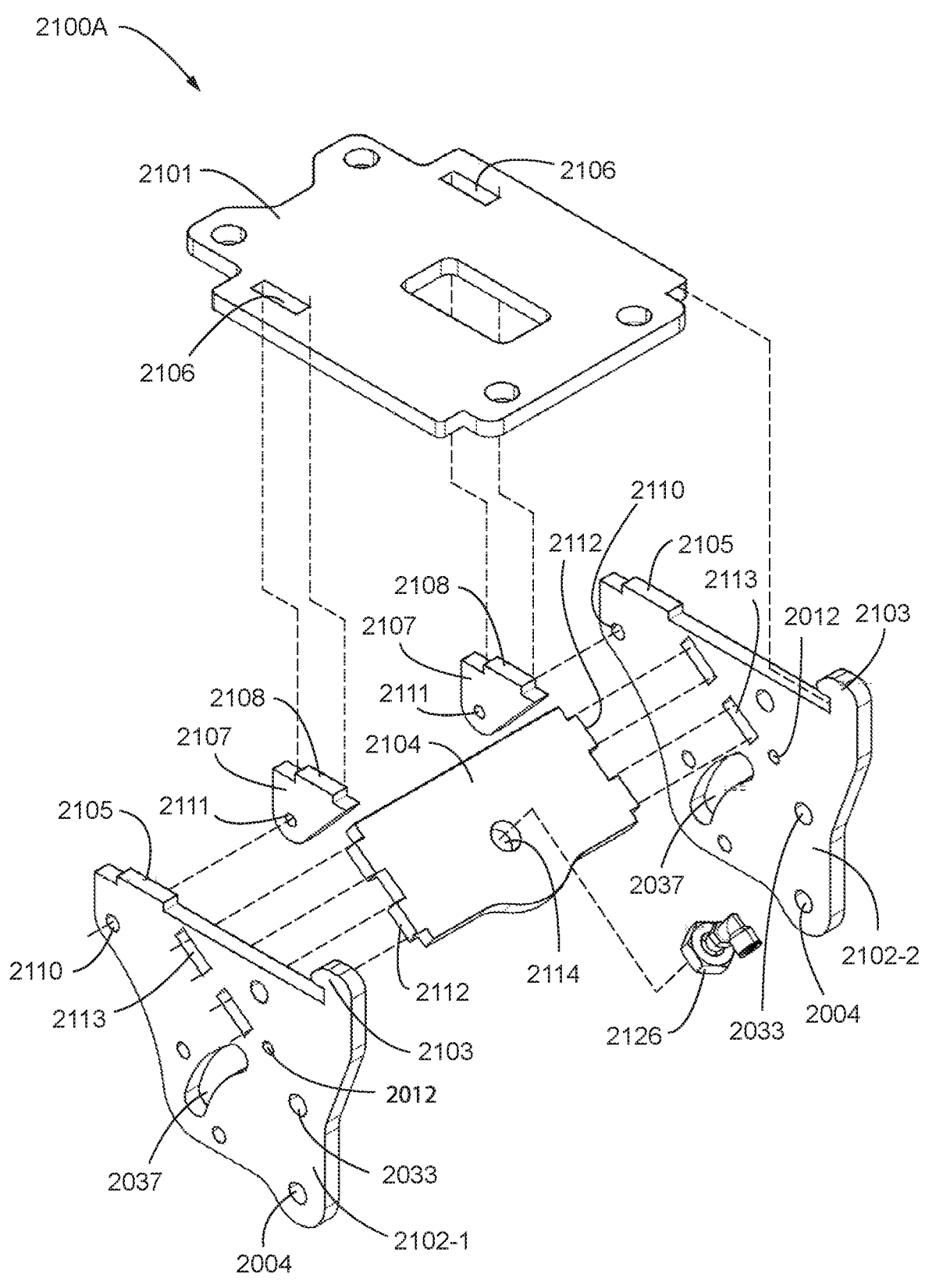
FIG. 29 is an exploded front perspective view of an embodiment of the upper subframe of the frame assembly of FIG. 26.

FIG. 29 shows an exploded front perspective view of the upper subframe 2100A. The upper subframe 2100A includes first and second gusset plates 2102-1, 2102-2 that extend downwardly from the mounting plate 2101 and are laterally spaced by a front plate 2104. The gusset plates 2102-1, 2102-2 may have an upper forward hook 2103 for receiving the forward edge of the mounting plate 2101 The gusset plates 2102-1, 2102-2 may include gusset tabs 2105 which are received in gusset tab slots 2106 in the mounting plate 2101. Alternatively, car plates 2107 having gusset tabs 2109 may be received in the gusset tab slots 2106 in the mounting plate 2101. The car plates 2107 may be attached to the gusset plates 2102-1, 2102-2 by threaded connectors 2108 (FIG.

28) received within aligned apertures 2110, 2111 in the respective gusset plates 2102-1, 2102-2 and car plates 2107. The front plate 2104 may include side tabs 2112 that are received with side tab slots 2113 in the gusset plates 2102-1, 2102-2. It should be appreciated that rather than using tabs and slots connecting the individual parts of the upper subframe 2100A, the individual parts of the upper subframe 2100A may be connected by welding or by bolted connections. Alternatively, the upper subframe 2100A may be fabricated as a single part, such as by casting.

The front plate 2104 includes an aperture 2114 through which extends an upper nipple of the airbag 2302 and onto which a fitting 2126 is threadably received (discussed later). The gusset plates 2102-1, 2102-2 include the apertures 2004 for receiving the threaded connectors 2002 for pivotally securing the intermediate subframe 2100B thereto as described above in connection with FIG. 28. Additionally, each of the gusset plates 2102-1, 2102-2 includes the apertures 2012 for receiving the threaded connectors 2010 for pivotally securing the first and second linkages 2200-1, 2200-2 thereto as described above in connection with FIG. 28. Each of the gusset plates 2102-1, 2102-2 also includes the aperture 2033 that receives the threaded connector 2032 that secures the U-shaped bracket of the spring assembly 2310 (discussed later). Additionally, each of the gusset plates 2102-1, 2102-2 also includes the arched opening 2037 in which the threaded connector 2036 is movable as described above in connection with FIG. 28.

Figure 30:
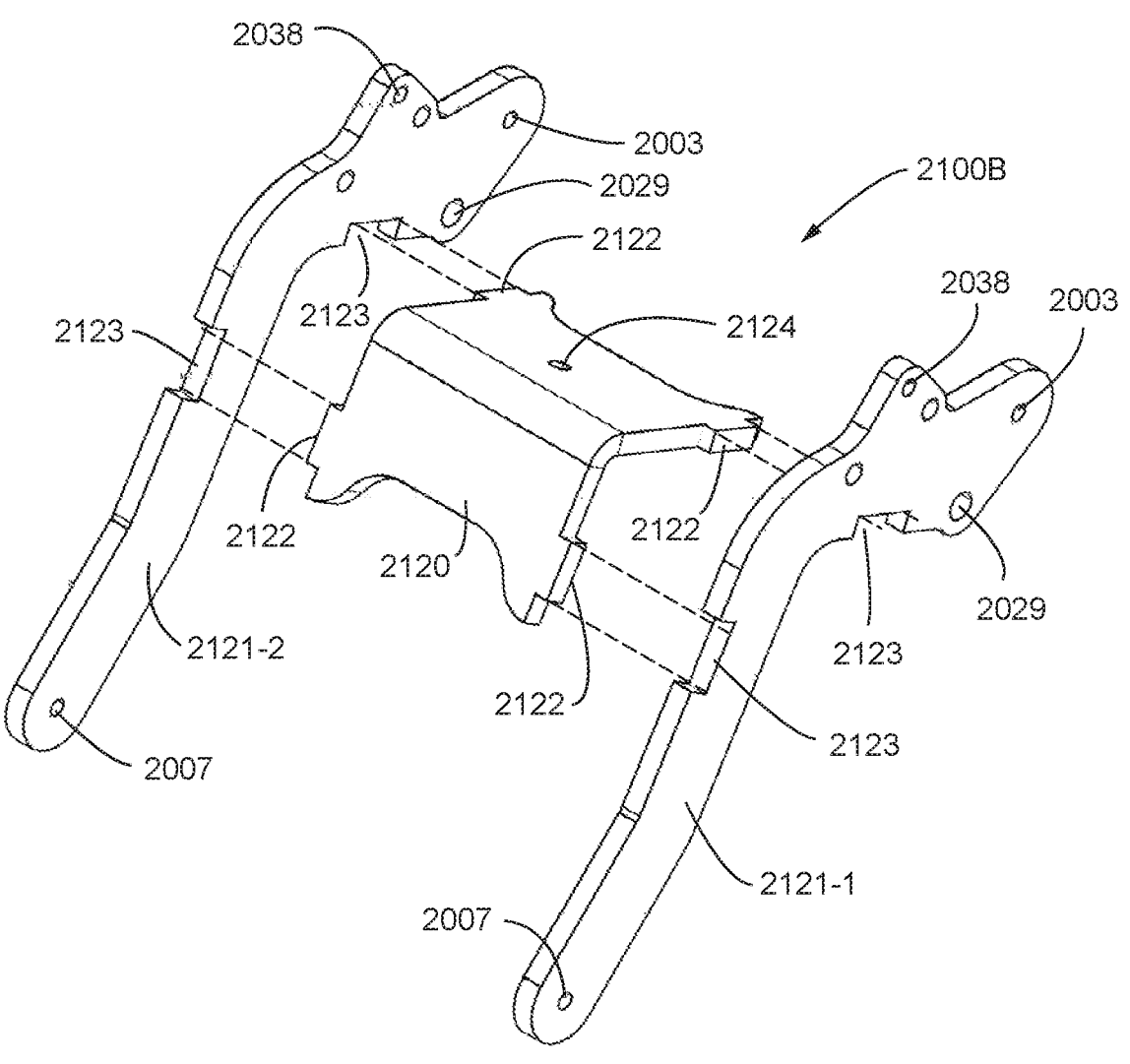
FIG. 30 is an exploded rear perspective view of an embodiment of the intermediate subframe of the frame assembly of FIG. 26.

FIG. 30 shows an exploded rear perspective view of the intermediate subframe 2100B. The intermediate subframe 2100B includes a base member 2120 and first and second side rails 2121-1, 2121-2. The base member 2120 may include side tabs 2122 that are received within side tab notches 2123 in the side rails 2121-1, 2121-2. The base member 2120 includes an aperture 2124 through which extends a threaded connector 2125 (FIG. 28) for securing the lower end of the airbag 2302 to the base member 2120. It should be appreciated that rather than using tabs and slots connecting the individual parts of the intermediate subframe 2100B, the individual parts of the intermediate subframe 2100B may be connected by welding or by bolted connections. Alternatively, the intermediate subframe 2100B may be fabricated as a single part, such as by casting. Each of the side rails 2121-1, 2121-2 includes the forward aperture 2003 for receiving the threaded connector 2002 for pivotally securing the side rails 2121-1, 2121-2 of the intermediate subframe 2100B to the gussets 2102-1, 2102-2 of the upper subframe 2100A as described above in connection with FIG. 28. Each of the side rails 2121-1, 2121-2 includes the rearward aperture 2007 for receiving the threaded connector 2006 as described above in connection with FIG. 28. Each of the side rails 2121-1, 2121-2 includes aperture 2029 for receiving the threaded connector 2028 for attaching the rod of the spring assembly 2310 (discussed later). Each of the side rails 2121-1, 2121-2 includes the aperture 2038 for receiving the threaded connectors 2036 that is received within the arched opening 2037 of the upper subframe 2100A as described above in connection with FIG. 28.

Figure 31:
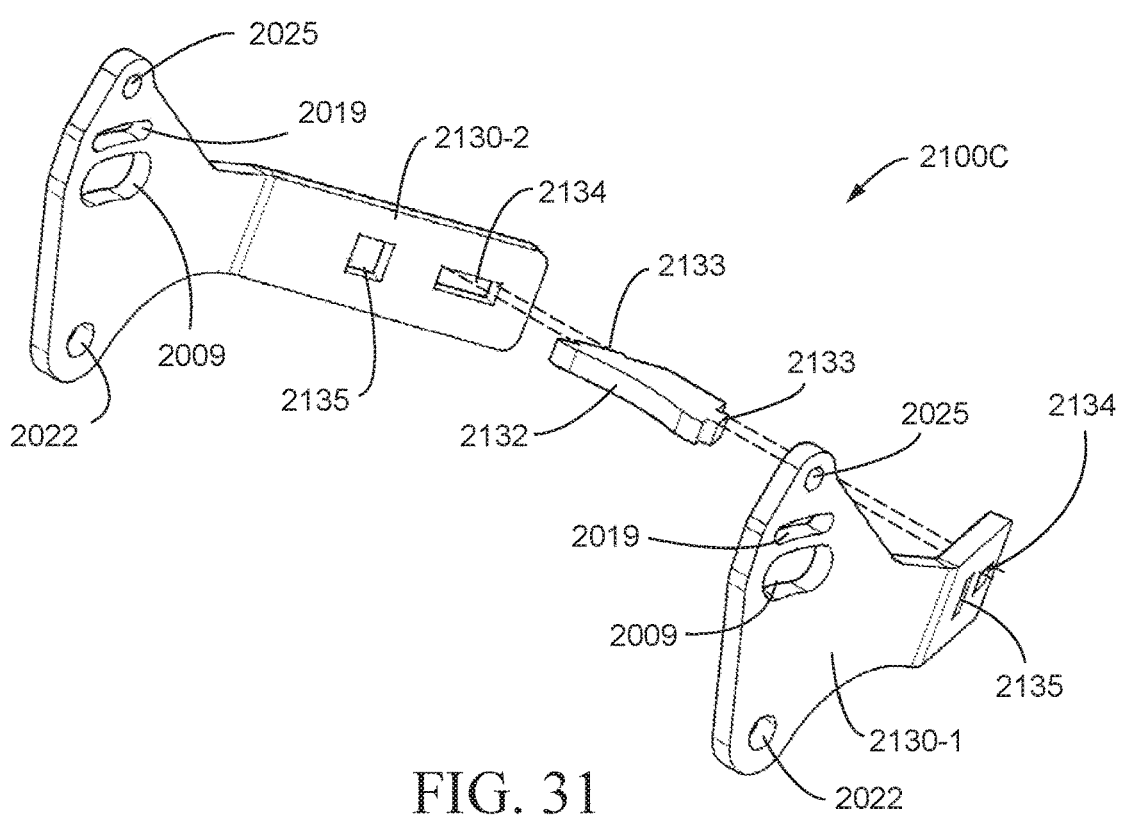
FIG. 31 is an exploded rear perspective view of an embodiment of the lower subframe of the frame assembly of FIG. 26.

FIG. 31 shows an exploded rear perspective view of the lower subframe 2100C. The lower subframe 2100C includes first and second row cleaner wheel support arms 2130-1, 2130-2 connected at their forward end by a forward plate 2132. The forward plate 2132 may include side tabs 2133 that are received within side tab slots 2134 in the first and second row cleaner wheel support arms 2130-1, 2130-2. It should be appreciated that rather than using tabs and slots connecting the individual parts of the lower subframe

2100C, the individual parts of the lower subframe 2100C may be connected by welding or by bolted connections. Alternatively, the lower subframe 2100C may be fabricated as a single part, such as by casting. Each of the first and second row cleaner wheel support arms 2130-1, 2130-2 includes a square opening 2135 for receiving a square shank portion 2063 (FIG. 27) of a respective one of the row cleaner wheel axle bolts 2061-1, 2061-2 (FIG. 27) as discussed in more detail below. Each row cleaner wheel support arm 2130-1, 2130-2 also includes the opening 2022 for receiving the gauge wheel axle bolt 2051 as shown in FIG. 28. Each row cleaner wheel support arm 2130-1, 2130-2 also includes the elongated opening 2009 in which the threaded connector 2006 is received as described above in connection with FIG. 28. Each row cleaner wheel support arm 2130-1, 2130-2 also includes the arcuate slot 2019 for receiving the threaded connector 2018 as described above in connection with FIG. 28. Each row cleaner wheel support arm 2130-1, 2130-2 also includes the aperture 2025 for receiving the thumbscrew 2024 as described above in connection with FIG. 28.

Figure 32:
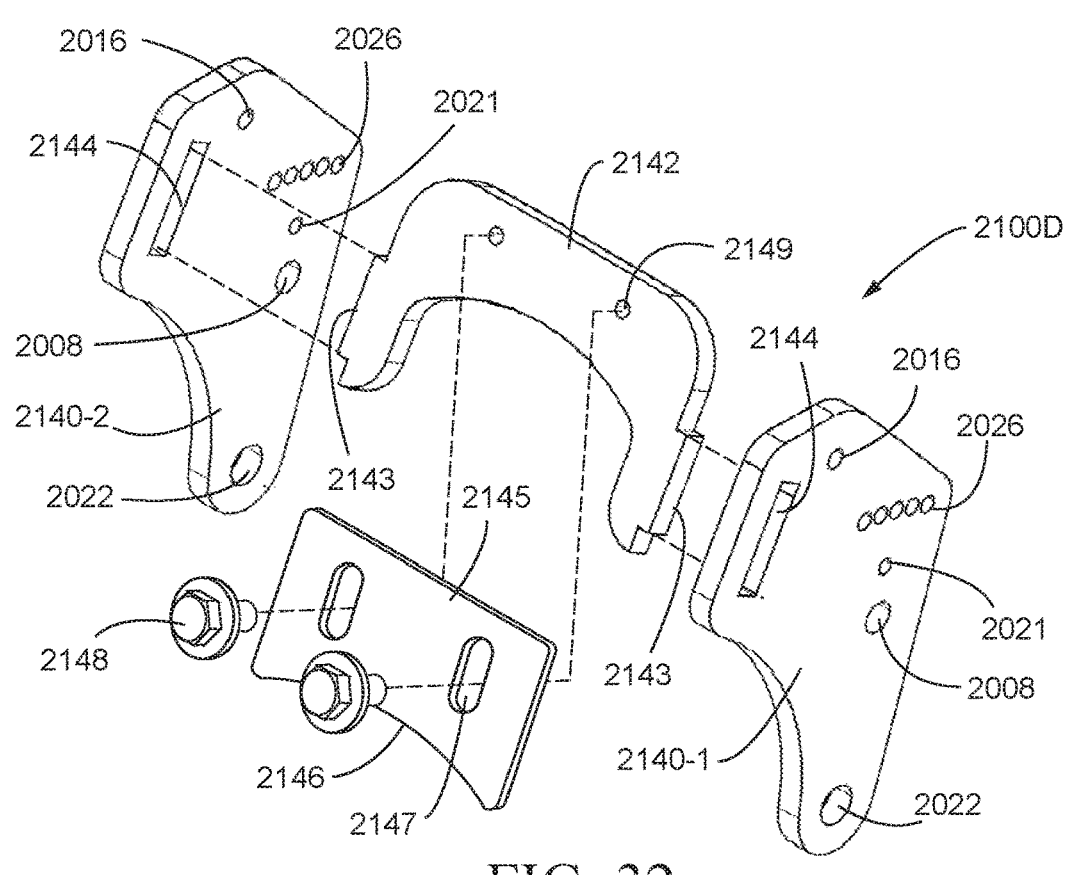
FIG. 32 is an exploded rear perspective view of an embodiment of the rear strut subframe of the frame assembly of FIG. 26.

FIG. 32 is a rear perspective view of the rear strut subframe 2100D. The rear strut subframe 2100D includes first and second struts 2140-1, 2140-2 spaced by a lateral plate 2142. The lateral plate 2142 may include tabs 2143 that are received within slots 2144 of each of the first and second struts 2140-1, 2140-2. Alternatively, the lateral plate 2142 may be attached to the struts 2140-1, 2140-2 by welding or bolted connections. Alternatively, the struts 2140-1, 2140-2 and the lateral plate 2142 may be fabricated as a single part, such as by casting. Each of the struts 2140-1, 2140-2 include the aperture 2022 that aligns with the aperture 2023 in the lower subframe 2100C for receiving the axle wheel bolt 2051 as described above in connection with FIG. 28. Each of the struts 2140-1, 2140-2 also include the aperture 2008 through which the threaded connector 2006 extends, as well as the aperture 2016 for receiving the threaded connector 2014, and the internally threaded aperture 2021 for receiving the threaded connector 2018, as well as the series of holes 2026 arranged in an arc into which the peg end of the thumbscrew 2024 are received all as described above in connection with FIG. 28.

The rear strut subframe 2100D may include a scraper 2145 to remove soil or debris that may build up on the gauge wheel 2050 during operation. The scraper 2145 may be attached to the lateral plate 2142 between the rear struts 2140-1, 2140-2 of the rear strut subframe 2100D and may comprise a plate having an arcuate edge 2146 that approximates the profile of the gauge wheel 2050 (see FIG. 19). The scraper 2145 may be attached to the lateral plate 2142 with threaded connectors 2148 extending through elongated holes 2147 that align with internally threaded apertures 2149 in the lateral plate 2142. The elongated holes 2147 will permit the scraper 2145 to be adjustably positioned relative to the lateral plate 2142 to vary the distance to the gauge wheel 2050 to accommodate different gauge wheel sizes and profiles and to account for wear of the gauge wheel tread and the scraper 2145.

Referring to FIG. 27, the square opening 2135 in each of the row cleaner wheel support arms 2130-1, 2130-2 and the square shank portion 2063 of the row cleaner wheel axle bolts 2061-1, 2061-2 cooperate to rotationally restrain the row cleaner axle bolts 2061-1, 2061-2 to the row cleaner wheel support arms 2130-1, 2130-2. Each row cleaner wheel axle bolt 2061-2, 2061-2 receives a spacer 2063. Each row cleaner wheel axle bolt 2061-2, 2061-2 extends through a central opening 2064 within each of the respective first and second cleaner wheels 2060-1, 2060-2. A bushing 2065 is received over the end of each row cleaner wheel axle bolts 2061-2, 2061-2 and the bushing is received within a hub 2070 having a central opening 2071. The hub 2070 is secured to the respective first and second row cleaner wheels 2060-1, 2060-2 by nuts 2072 threadably received over threaded connectors 2074 which extend through apertures 2066 in the row cleaner wheels 2060-1, 2060-2 and through aligned holes 2073 in the hub 2070. A lug nut 2075 threadably receives the end of the wheel axle bolts 2061-2, 2061-2 thereby axially restraining the row cleaner wheels 2060-1, 2060-2 onto the respective row cleaner wheel axle bolts 2061-2, 2061-2, while the spacer 2063 and the bushing 2065 permit the row cleaner wheels 2060-1, 2060-2 to freely rotate about the respective row cleaner wheel axle bolts 2061-2, 2061-2.

Referring to FIGS. 19 and 28, the gauge wheel axle bolt 2051 extends through the aligned apertures 2022, 2023, respectively in the first and second row cleaner wheel support arms 2130-1, 2130-2 of the lower subframe 2100C and the struts 2040-1, 2040-2 of the rear strut subframe 2100D and through the hub 2052 (FIG. 19) of the gauge wheel 2050. Spacer bushings 2053 (FIG. 28) may be disposed on the gauge wheel axle bolt 2051 on each side of the hub 2052 to keep the gauge wheel 2050 centered between the struts 2040-1, 2040-2. A nut 2054 threads onto the end of the gauge wheel axle bolt 2051 securing the gauge wheel 2050 to the lower subframe 2100C and rear strut subframe 2100D.

Figure 33:
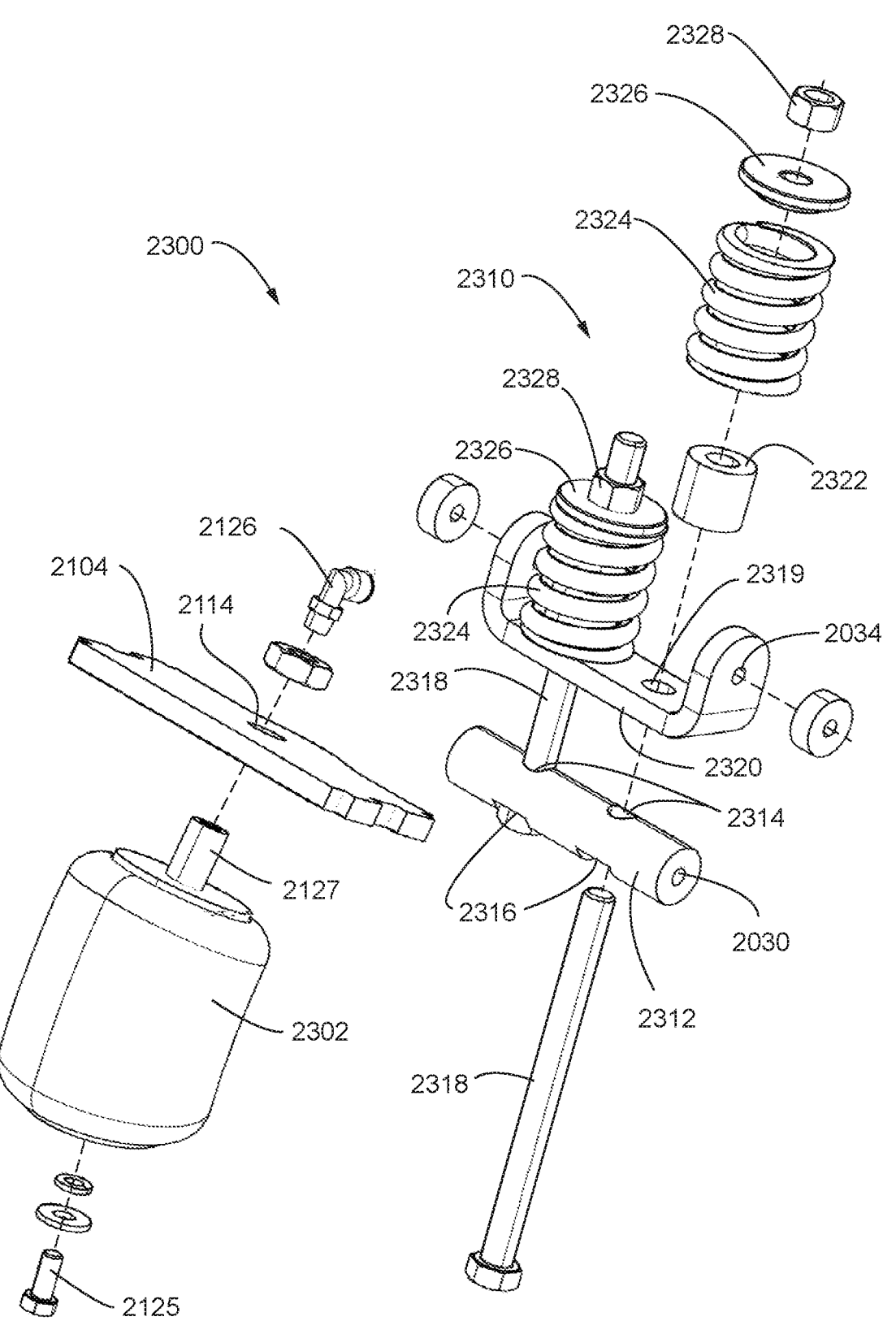
FIG. 33 is a perspective view of components of an embodiment of an actuator system showing an embodiment of an airbag actuator and a partially exploded spring assembly.

FIG. 33 is an exploded perspective view of the actuator system 2300 comprising the airbag 2302 and the spring assembly 2310. Referring to FIG. 33 in combination with FIG. 29, the airbag 2302 is secured at its upper end by the fitting 2126 threadably receiving the nipple 2127 extending through the aperture 2114 in the front plate 2040 of the upper subframe 2100A. Referring to FIG. 33 in combination with FIGS. 28 and 30, the airbag 2302 is secured at its lower end by the threaded connector 2125 extending through the aperture 2124 in the base member 2120 of the intermediate subframe 2100B. Referring to FIG. 33 in combination with FIGS. 27, 28 and 29, the spring assembly 2310 is secured to the intermediate subframe 2100B and is received between the gusset plates 2102-1, 2102-2 of the upper subframe 2100A forward of the front plate 2104 and forward of the airbag 2302. The spring assembly 2310 includes a rod 2312 having the internally threaded apertures 2030 in which the threaded connector 2028 is received as described above in connection with FIG. 28. Transverse bores 2314 pass through the rod 2312 transverse to the rod's longitudinal axis. The rod 2312 includes transverse channels 2316 sized to receive the head of the bolts 2318 to prevent the bolts 2318 from turning. The shaft of the bolts 2318 pass through apertures 2319 in a U-shaped bracket 2320. The upwardly turned ends of the U-shaped bracket 2320 include apertures 2034 which receive threaded connectors 2032 as described above in connection with FIG. 28. The shaft of the bolts 2318 receive a collar 2322. A spring 2324 seats over the collar 2322. The upper end of the bolt 2318 receives a washer 2326 and threadably receives a nut 2328. It should be appreciated that because the rod 2312 is secured to the intermediate subframe 2100B and the U-shaped bracket 2320 is secured to the upper subframe 2100A, when the nut 2327 is tightened onto the bolt 2317 the spring 2325 is compressed, tending to pivot the intermediate subframe 2100B in a clockwise direction (in the view of FIG. 28) about axis passing through the threaded connectors 2002 pivotally securing the forward end of the intermediate subframe 2100B to the upper subframe 2100A. Thus, it should be appreciated that the spring assembly 2310 functions to provide a lift force at the rearward end of the intermediate frame 2100B (and thus to the lower subframe 2100C and the rear strut subframe 2100D). By tightening the nuts 2327 onto the bolts 2317 the compression of the springs 2325 increases the lift force on the intermediate subframe 2100B. By loosening the nuts 2327 on the bolts 2317 the amount of lift-force can be decreased. In one embodiment, the amount of lift force provided by spring assembly is sufficient to raise the row cleaner wheels 2060-1, 2060-2 out of contact with soil 40. Although the spring assembly 2310 is shown with two springs 2325, the spring assembly 2310 may be constructed with a single spring 2325 received over a single bolt 2317 positioned at the midpoint of the rod 2312. The airbag 2302, on the other hand, applies a downforce on the intermediate subframe 2100B to counteract the lift force of the spring assembly 2310. By increasing and decreasing the air pressure in the airbag 2302, causing the airbag 2302 to respectively expand and contract, the desired amount of downforce applied to the gauge wheel 2050 and the row cleaner wheels 2060-1, 2060-2 can be achieved.

While the foregoing embodiment of the actuator system 2300 describes an airbag 1302 in combination with a spring assembly 2310, it should be appreciated that the actuator system 2300 may utilize any actuator that provides an adjustable downforce and an optional lift force may be suitable. The downforce exerted by the actuator 2302 on the gauge wheel 2050 may be controlled by a controller (such as the "controller 300" referenced in U.S. Pat. No. 8,550,020) or by a fluid control port (such as the "fluid control port 10" described in PCT Publication No. WO2020/056395). The airbag 2302 of each of the row cleaner assemblies 2000 of the planter 10 may be controlled on a row-by-row basis, or as groups by section of the planter 10, or collectively across the entire planter 10.

The desired amount of downforce may be a function of the soil conditions and the amount or type of crop residue and the depth at which the row cleaner wheels 2060 are set for engagement with the soil. For example, in dry soil conditions, more downforce may be desired such that the gauge wheel 2050 will more firmly pack the soil 40 in front of the opening assembly 234 for formation of a better seed trench 38 and to prevent or minimize soil falling into the seed trench 38 before the seed is deposited. Alternatively in wet soil conditions, less downforce may be desired. A downforce monitoring system (discussed later) may be employed for determining and regulating the downforce applied by the actuator system 2300.

Figure 34:
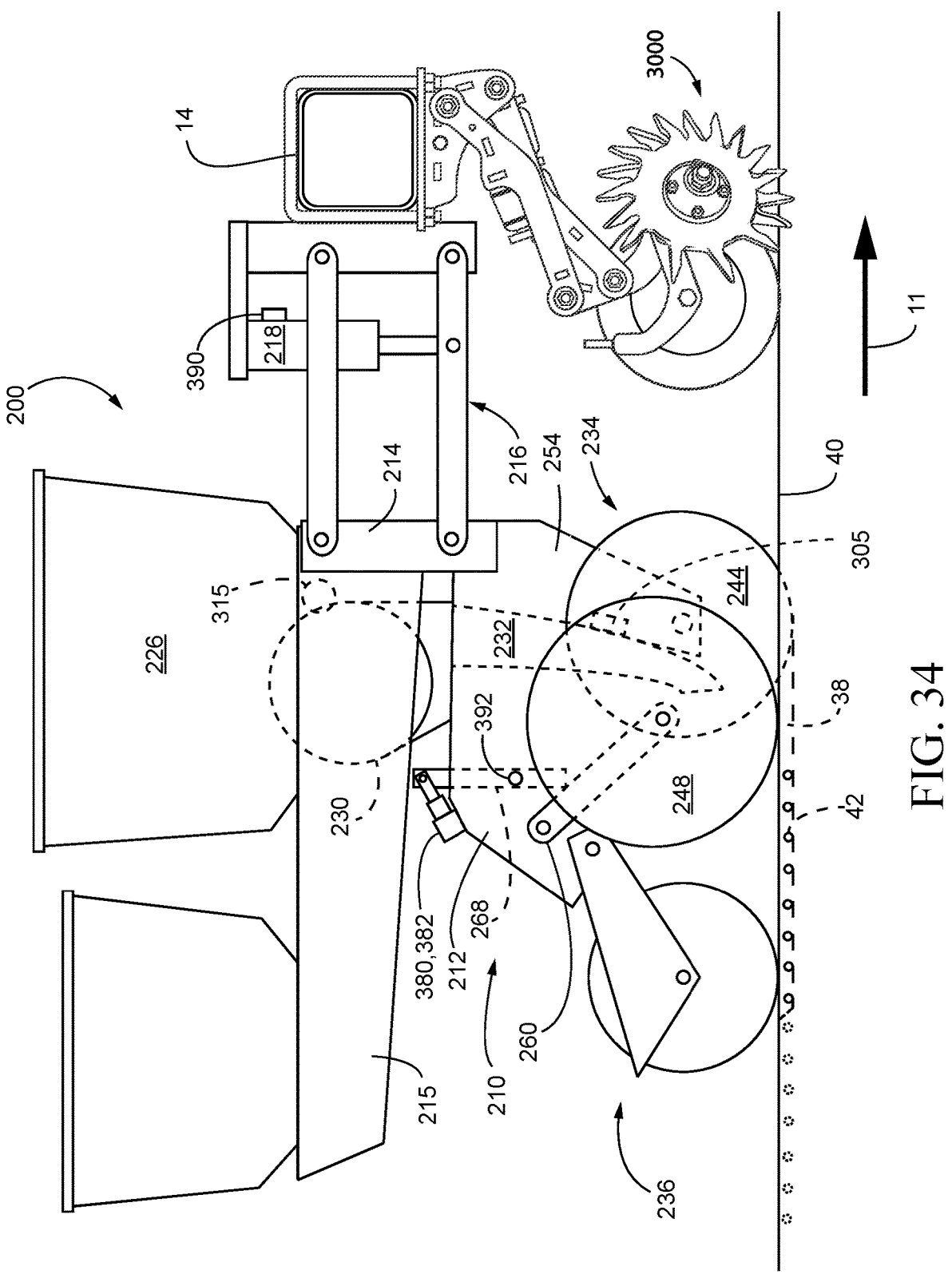
FIG. 34 is another side elevation view of an embodiment of a planter row unit showing another embodiment of a row cleaner assembly incorporating a gauge wheel.

FIG. 34 is a side elevation of the planter row unit 200 as previously described above in connection with FIG. 2, but with another embodiment of a row cleaner assembly designated by reference number 3000. The row cleaner assembly 3000 is mounted to the toolbar 14 and is positioned forward of the trench opening assembly 234. Again, it should be appreciated that each row unit 200 of the planter 10 would have an associated row cleaner assembly 3000 longitudinally aligned with the respective trench opening assembly 234 of the row unit 200. In the embodiment shown, the row cleaner assembly 3000 includes a gauge wheel 3050 (identified in FIG. 35). The row cleaner assembly 3000 extends rearward of the toolbar 14 and is rigidly mounted to the underside of toolbar 14 by suitable mounting structure, which may include a mounting plate 3101 and one or more U-bolts 3001 as shown. Alternatively, the row cleaner assembly 3000 may be mounted to the top side, rear side or forward side of the toolbar 14 by any suitable mounting structure or connection, including bolted brackets or by welding.

Figure 34A:
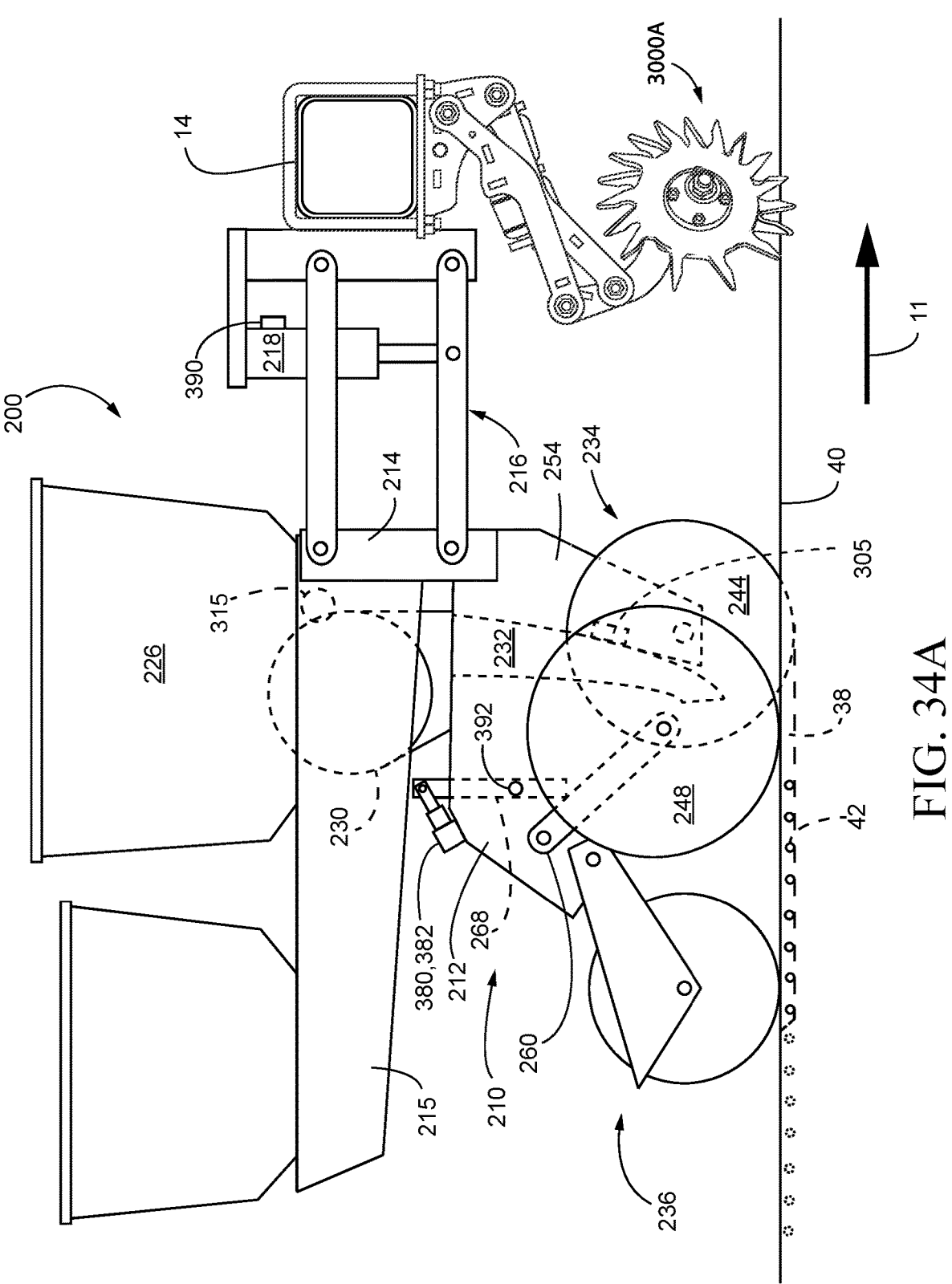
FIG. 34A is another side elevation view of an embodiment of a planter row unit showing another embodiment of a row cleaner assembly substantially the same as shown in FIG. 34, but without a gauge wheel.

FIG. 34A shows an alternative embodiment of a row cleaner assembly designated by reference number 3000A. The embodiment of the row cleaner assembly 3000A is substantially the same as the embodiment of the row cleaner assembly 3000 except the embodiment of 3000A does not include the gauge wheel 3050. Furthermore, the embodiment of 3000A may omit the rear strut subframe 3100B (described later).

Figure 35:
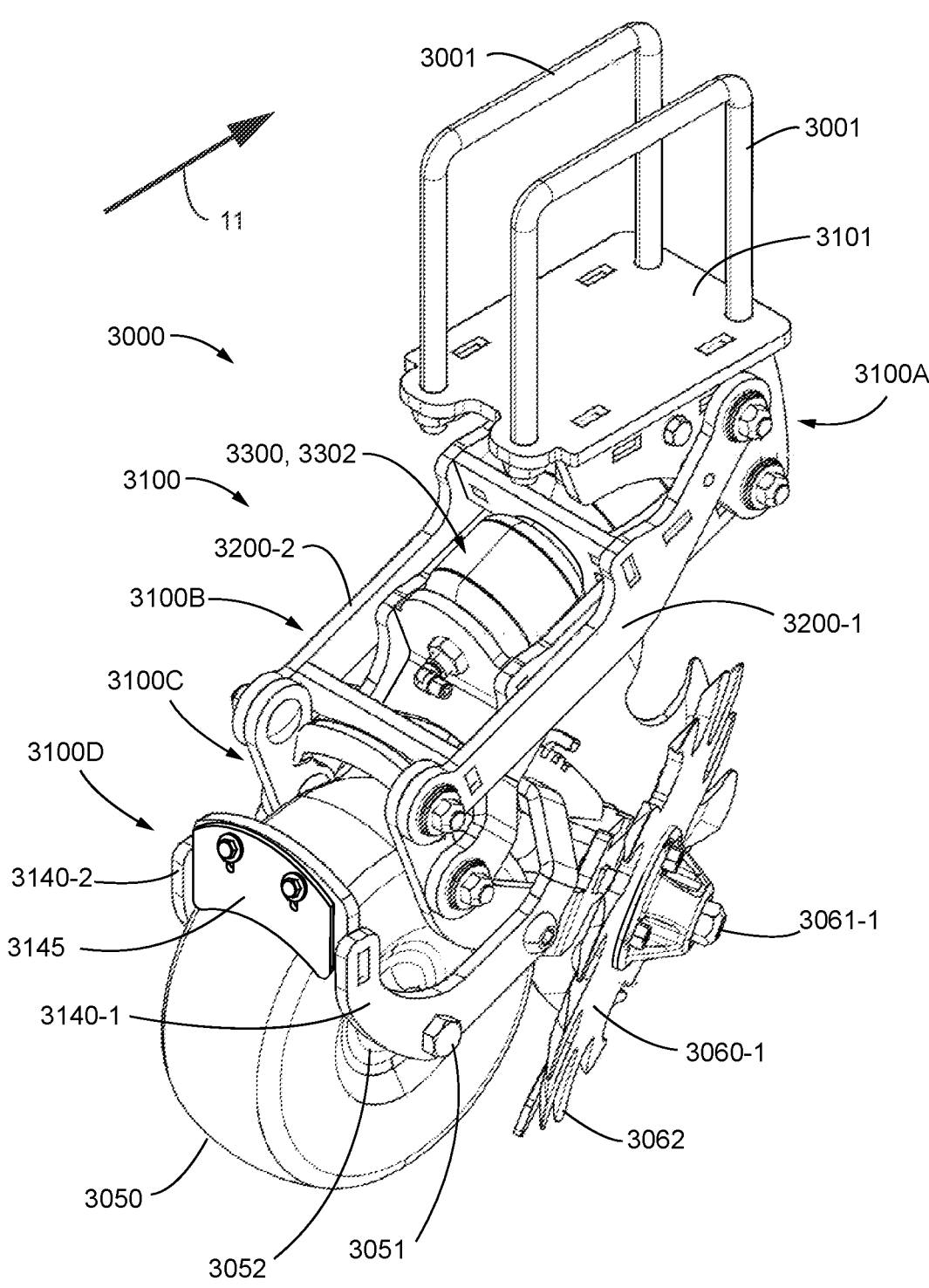
FIG. 35 is a rear perspective view of the row cleaner assembly of FIG. 34.
Figure 35A:
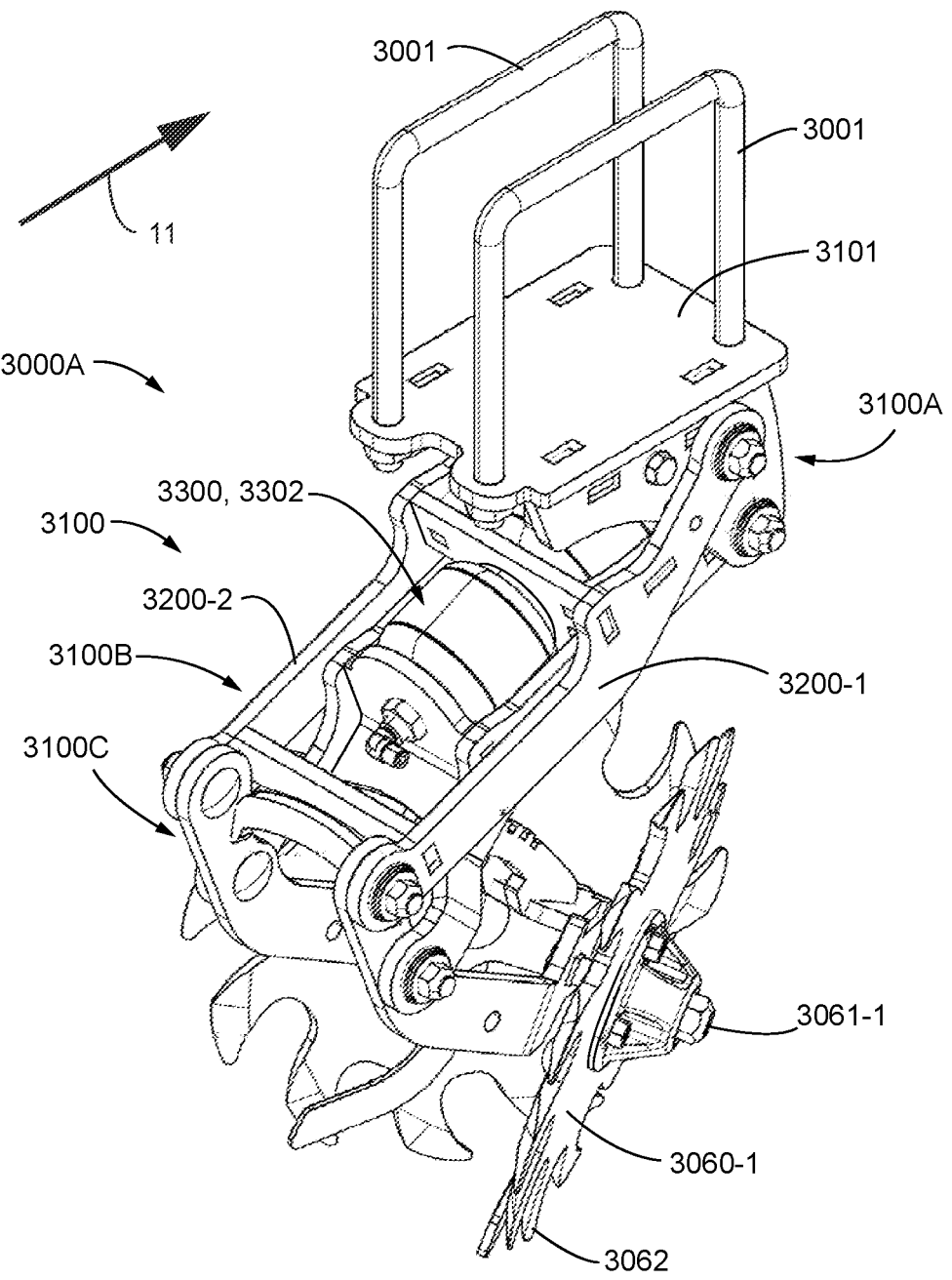
FIG. 35A is a rear perspective view of the row cleaner assembly of FIG. 34A.

FIG. 35 is an enlarged rear perspective view of the row cleaner assembly 3000 shown in FIG. 34. FIG. 35A is the same view as in FIG. 35 but shows the embodiment of the row cleaner assembly 3000A without the gauge wheel and without the rear strut subframe 3100D (discussed later). Since both embodiments of the row cleaner assembly 3000 and 3000A are substantially the same, other than the removal of the gauge wheel in embodiment 3000A (and optionally the rear strut subframe 3100D discussed later), only the embodiment 3000 is described, recognizing that any reference to the gauge wheel 3050, the gauge wheel axle 3051 and associated components would not be applicable to the 3000A embodiment.

Figure 36:
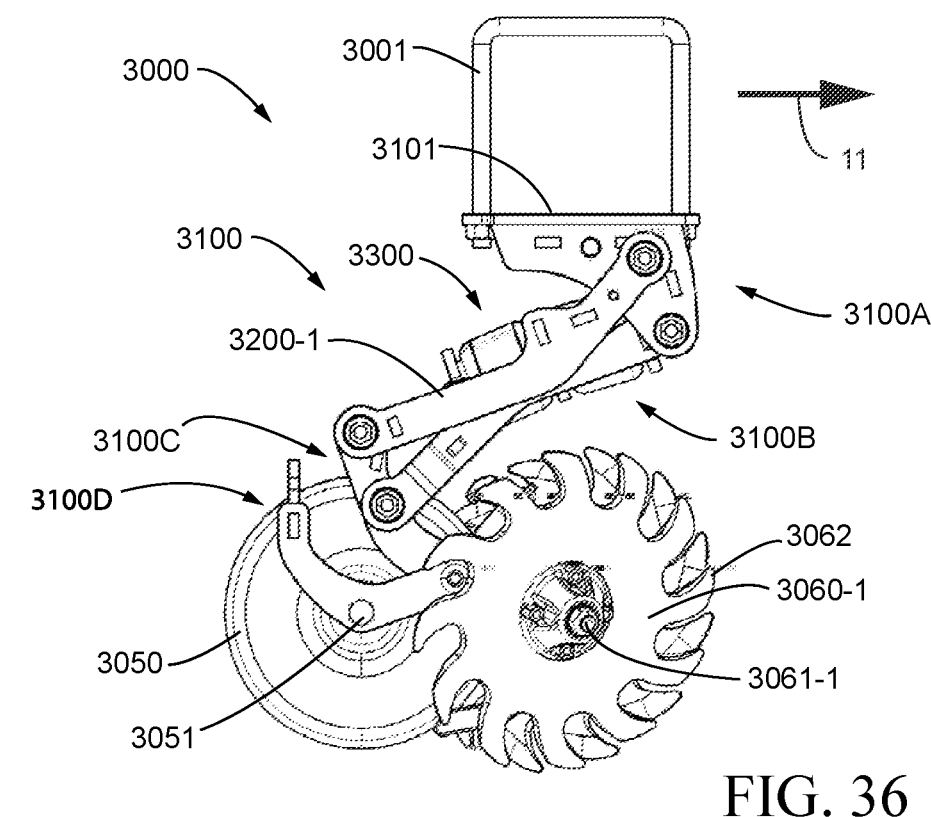
FIG. 36 is a right side elevation view of the row cleaner assembly of FIG. 35.
Figure 37:
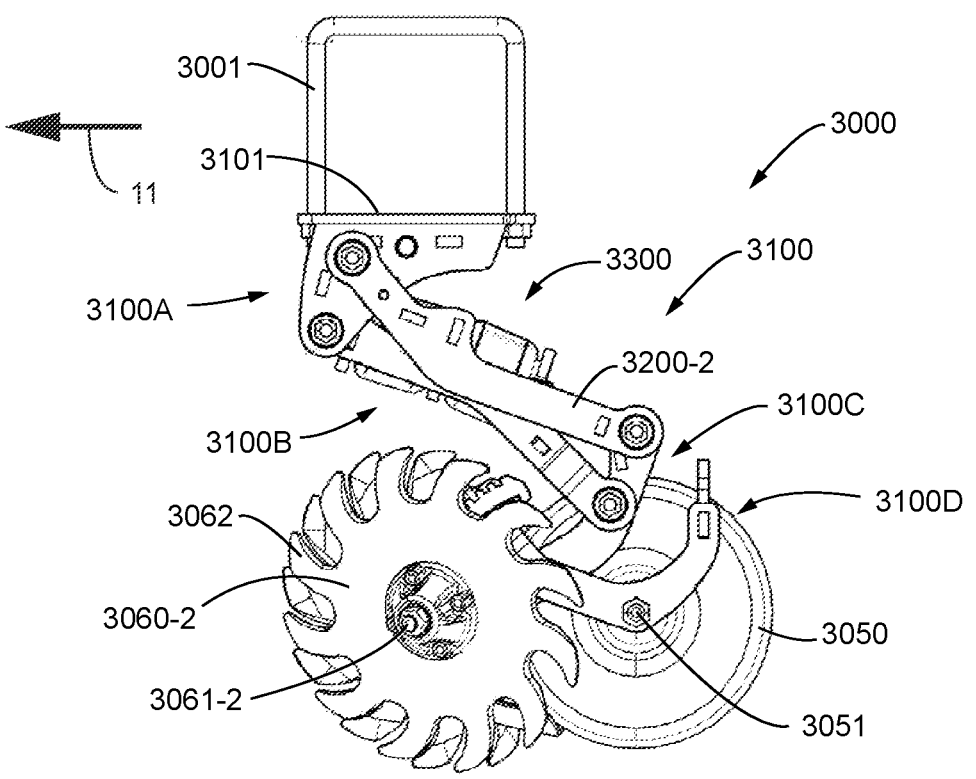
FIG. 37 is a left side elevation view of the row cleaner assembly of FIG. 35.
Figure 38:
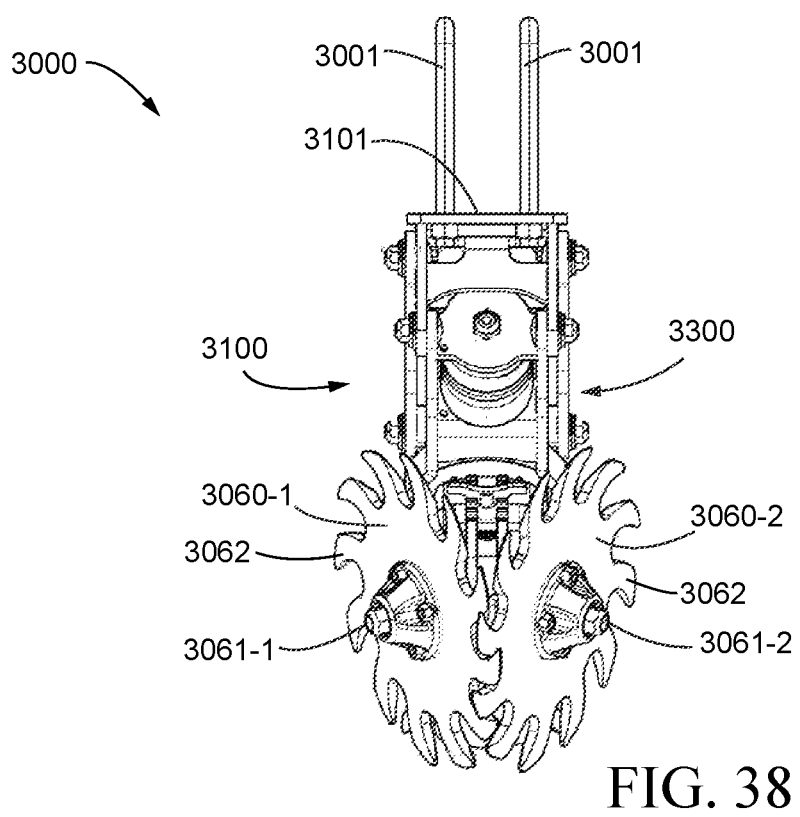
FIG. 38 is front elevation view of the row cleaner assembly of FIG. 35.
Figure 39:
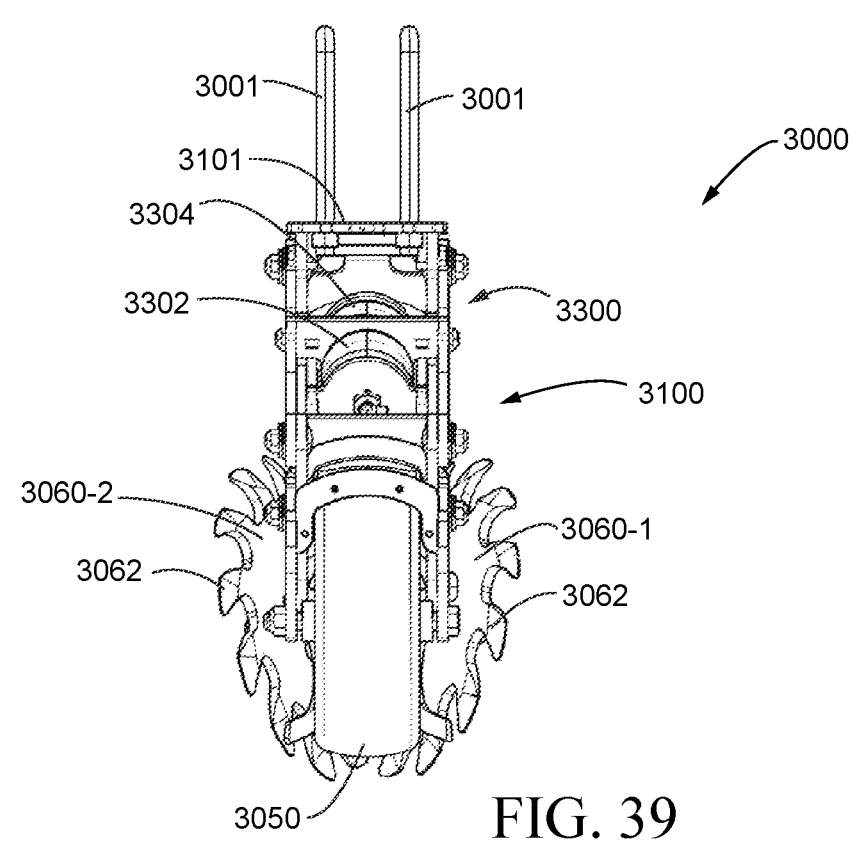
FIG. 39 is a rear elevation view of the row cleaner assembly of FIG. 35.
Figure 40:
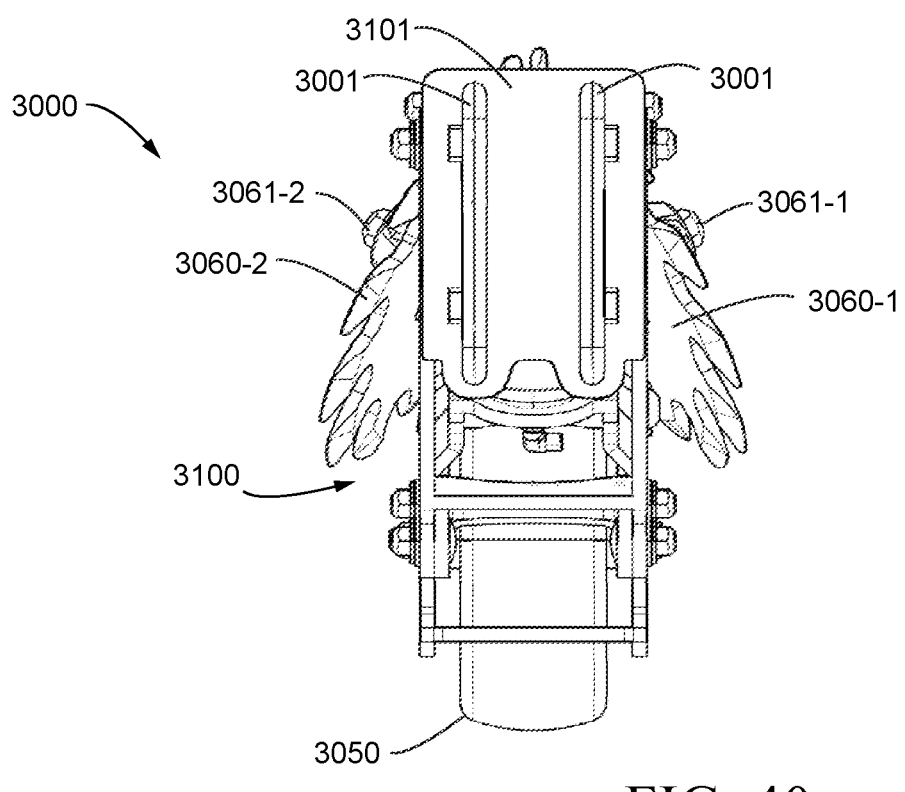
FIG. 40 is a top plan view of the row cleaner assembly of FIG. 35.
Figure 41:
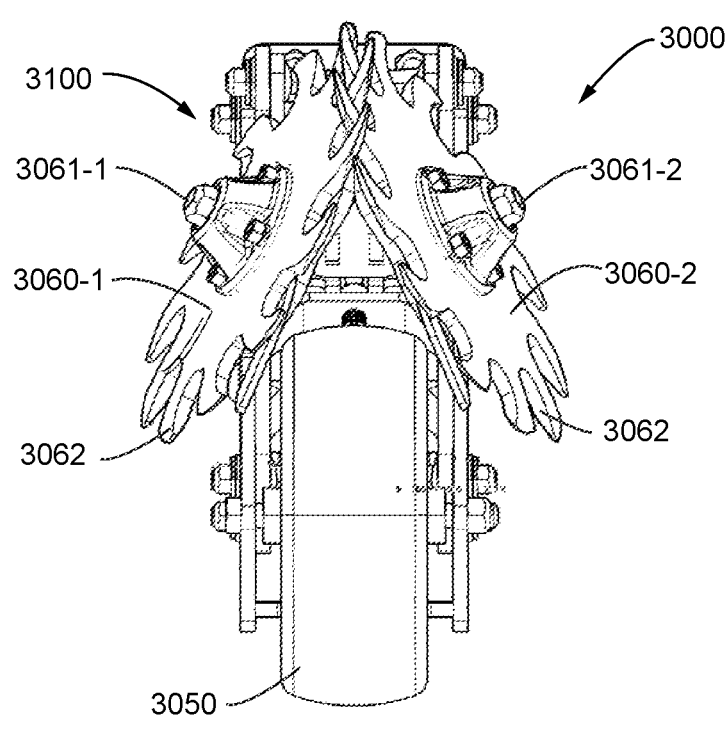
FIG. 41 is a bottom plan view of the row cleaner assembly of FIG. 35.

FIGS. 36 and 37 are right and left side elevation views, respectively, of the row cleaner assembly 3000. FIGS. 38 and 39 are front and rear elevation views, respectively, and FIGS. 40 and 41 are top and bottom views, respectively. The row cleaner assembly 3000 includes a frame assembly 3100 supported at its rearward end by a gauge wheel 3050. Row cleaner wheels 3060-1, 3060-2 are rotatably supported by the frame assembly 3100. Each row cleaner wheel 3060-1, 3060-2 includes radially spaced tines 3062 around its circumference. The row cleaner wheels 3060-1, 3060-2 are oriented to diverge outwardly and rearwardly such that the tines 3062 of the row cleaner wheels 3060-1, 3060-2 interlace at the forward end as they rotate. In operation, as the planter 10 moves in the forward direction of travel 11, the soil engages with the tines 3062, causing the row cleaner wheels 3060-1, 3060-2 to rotate. Due to their orientation, as the row cleaner wheels 3060-1, 3060-2 rotate, they direct any crop residue, soil clods or other debris laterally outwardly to provide a cleaner seed bed for the rearwardly aligned trench opening assembly 234. The gauge wheel 3050 serves to firm the soil 40 that may be disturbed by row cleaner wheels 3060-1, 3060-2 before the trench 38 is opened by the trench opening assembly 234. Firming the soil with the gauge wheel 3050 may be advantageous in dry soils to prevent soil 40 from falling into trench 38.

An actuator system 3300 is positioned within the fame assembly 3100 to provide an adjustable downforce and optionally a lift force to the gauge wheel 3050 and row cleaner wheels 3060-1, 3060-2. In this embodiment, the actuator system 3300 utilizes two airbags 3302 and 3304 (FIG. 45), but the actuator system 3300 may utilize any actuator that provides an adjustable downforce and an optional lift force, including pneumatic cylinders, hydraulic cylinders, air bags, and electromechanical actuators as discussed in more detail later.

Figure 42:
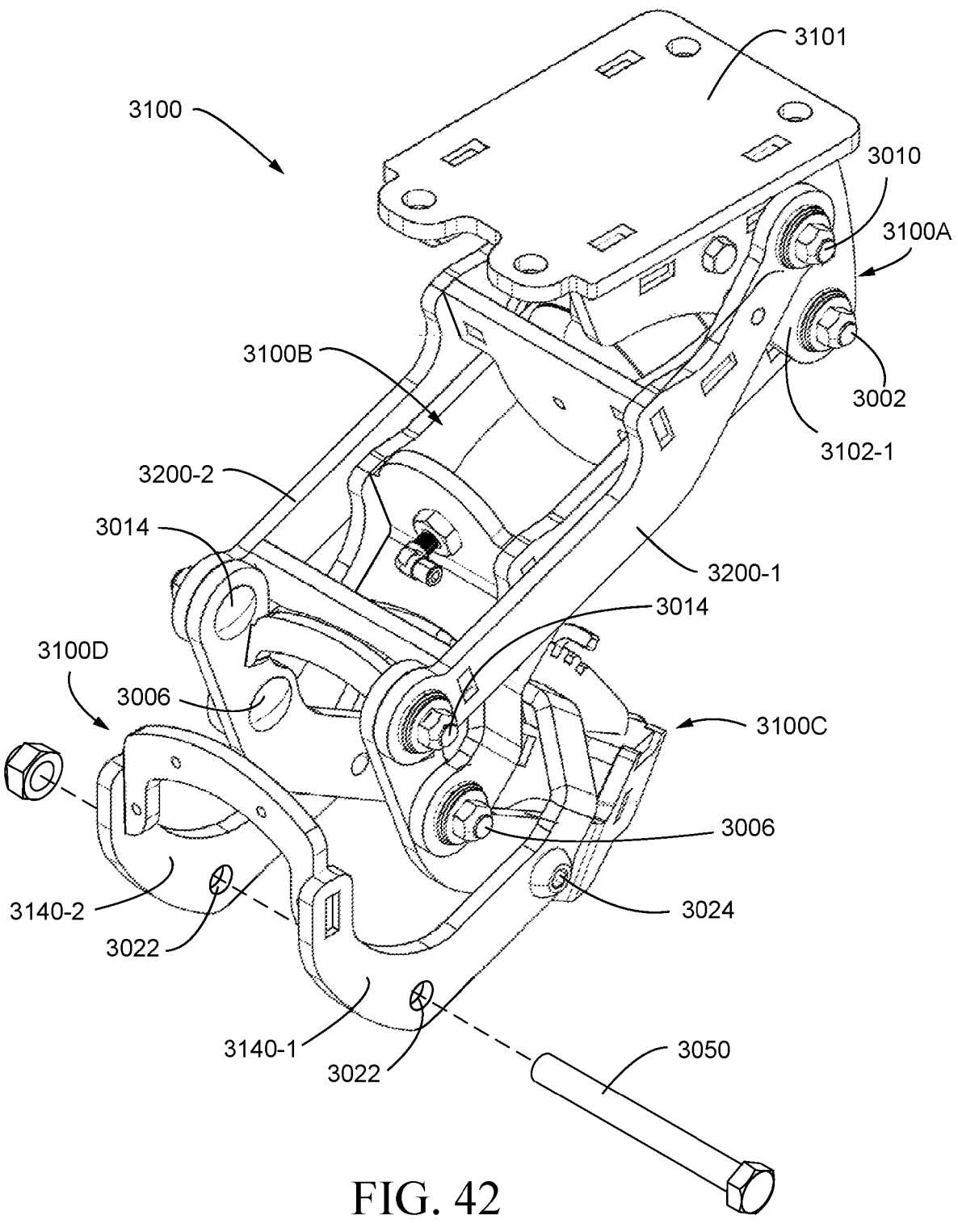
FIG. 42 is a rear perspective view of the row cleaner assembly of FIG. 35 with the row cleaning wheels and gauge wheel removed to better illustrate an embodiment of the frame assembly.
Figure 43:
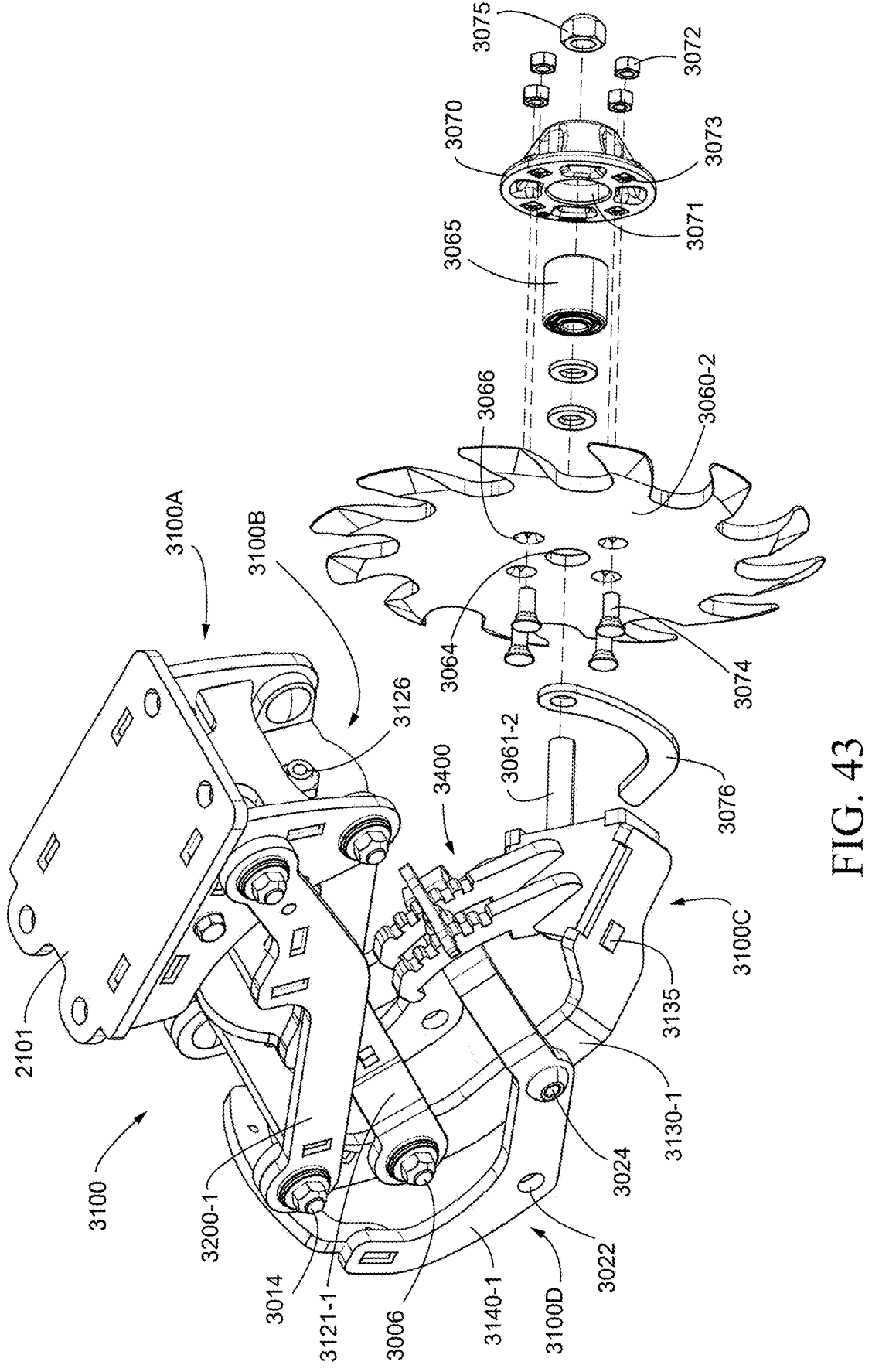
FIG. 43 is front perspective view of the frame assembly of FIG. 42 and showing an exploded view of an embodiment of one of the row cleaner wheels.

FIG. 42 is a rear perspective view of the frame assembly 3100 with the gauge wheel 3050, the row cleaner wheels 3060-1, 3060-2 and the actuator system 3300 removed for clarity. FIG. 43 is a front perspective view of the frame assembly 3100 with the gauge wheel 3050 and actuator system 3300 and the first row cleaner wheel 3060-1 removed, but showing an exploded view of the second row cleaning wheel 3060-2 and its mounting components. FIG.

Figure 44:
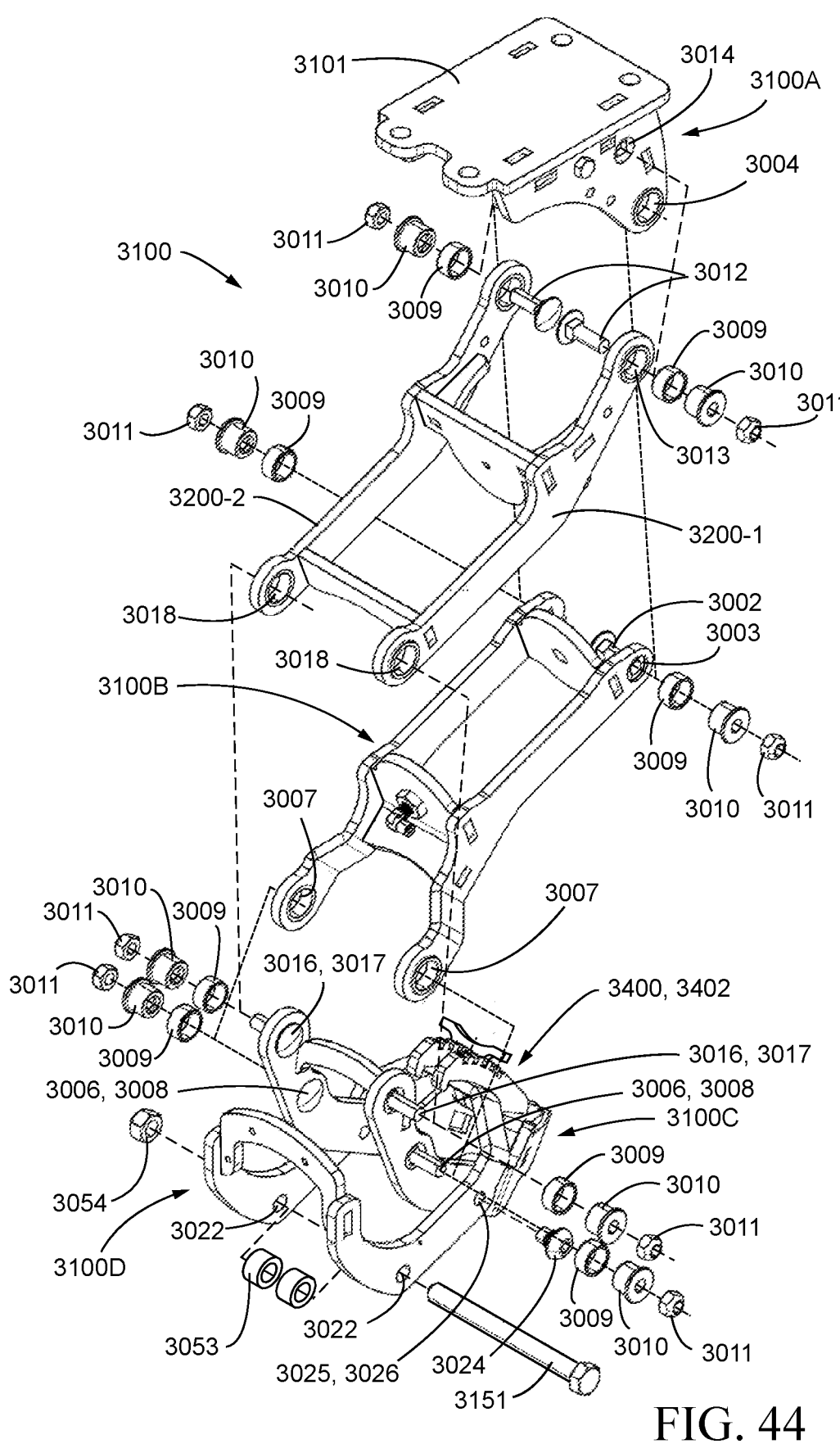
FIG. 44 is an exploded rear perspective view of the frame assembly of FIG. 42.
Figure 45:
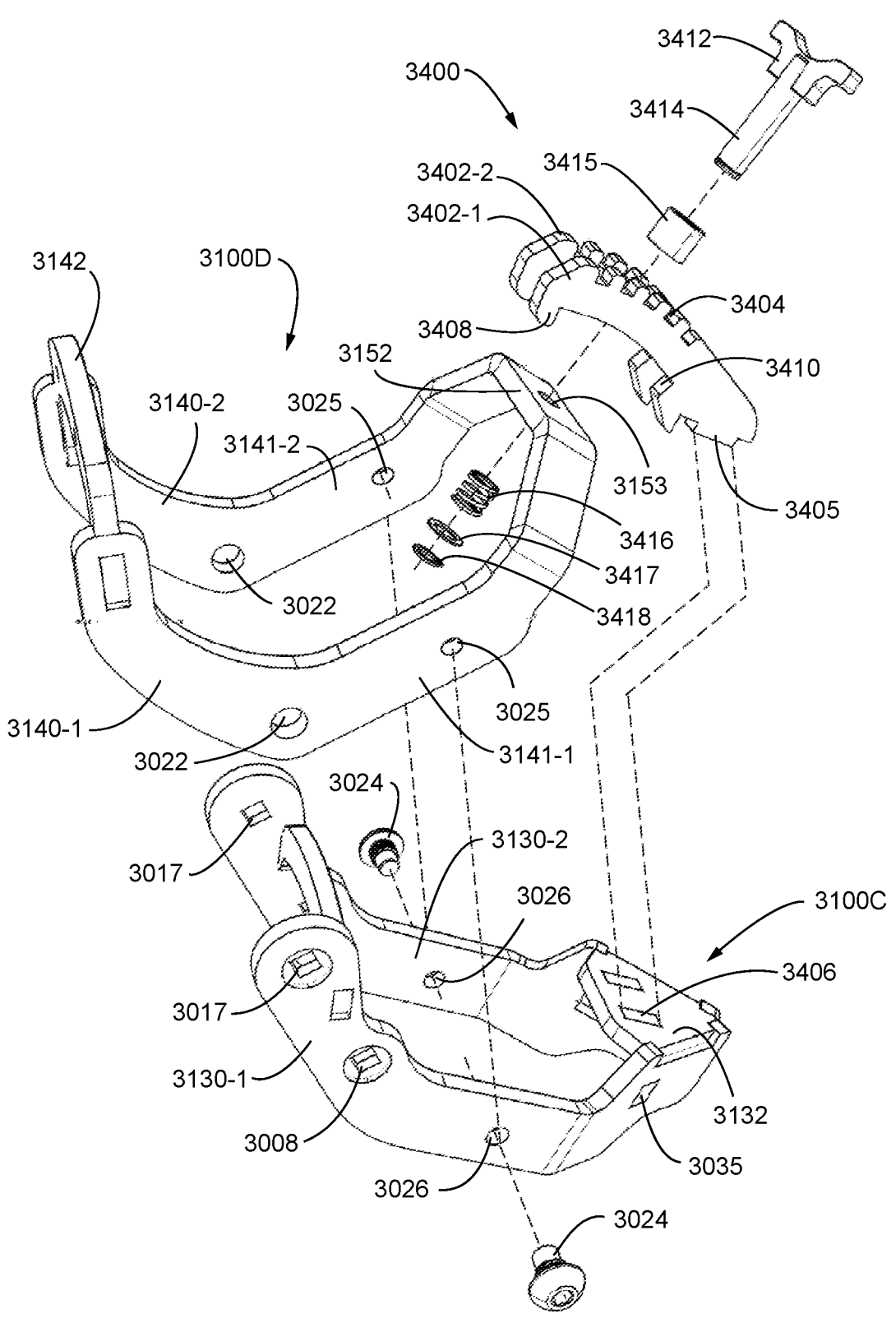
FIG. 45 is an exploded perspective view of the lower subframe and rear strut subframe of the frame assembly of FIG. 42 showing an exploded view of an embodiment of a depth selector.
Figure 46:
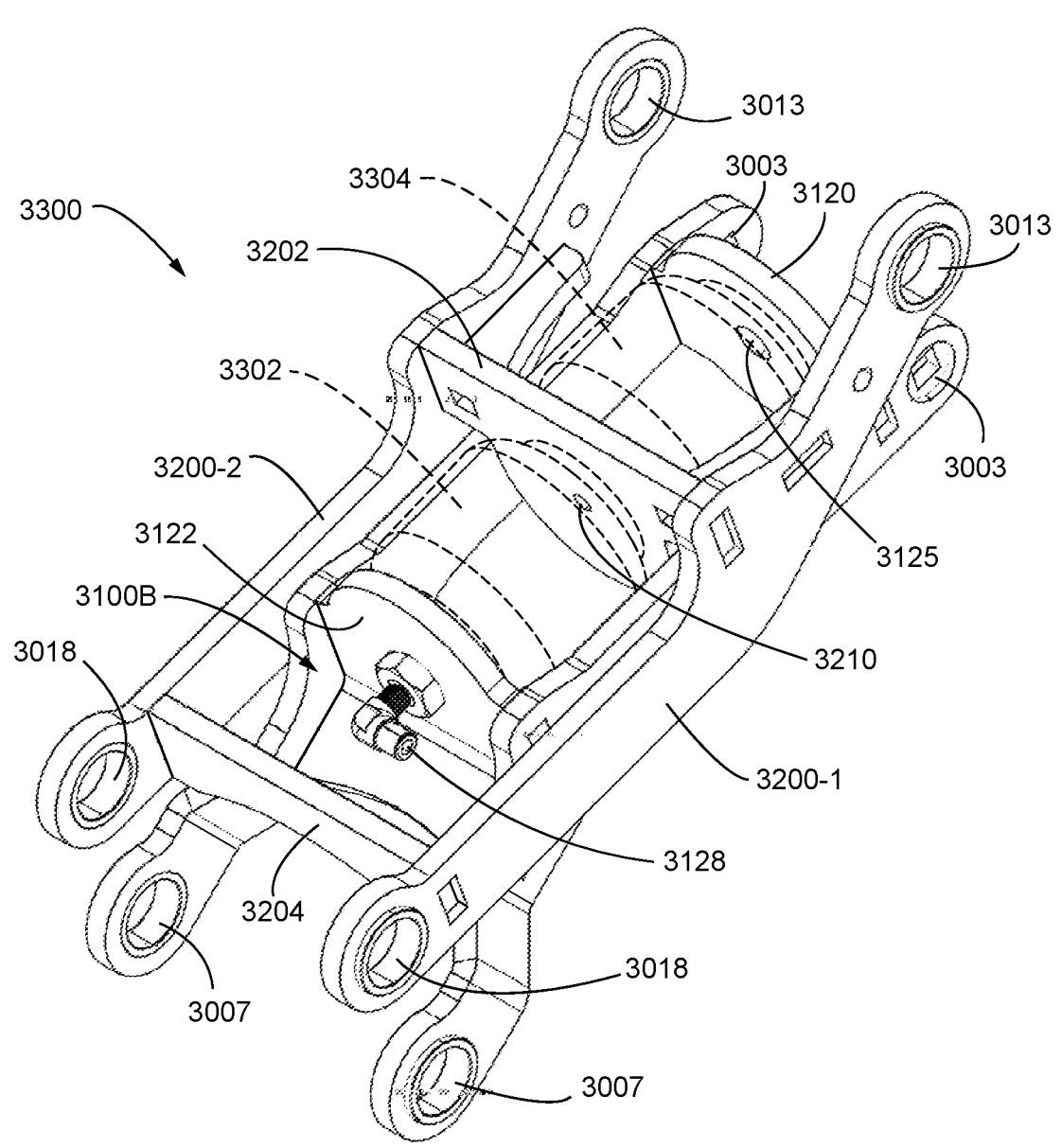
FIG. 46 is a perspective view of the intermediate subframe and linkages of the frame assembly of FIG. 42 and showing an embodiment of an actuator system.

44 is an exploded rear perspective view of the frame assembly 3100. Referring to FIGS. 42-44, the frame assembly 3100 includes an upper subframe 3100A, an intermediate subframe 3100B, a lower subframe 3100C, a rear strut subframe 3100D, and first and second linkages 3200-1, 3200-2. The rear strut subframe 3100D comprises a part of the lower subframe 3100C. FIG. 45 is an exploded front perspective view showing lower subframe 3100C and the rear strut subframe 3100D. FIG. 46 shows a perspective view of the intermediate subframe 3100B and the linkages 3200-1, 3200-2 with the first and second airbags 3302, 3304 of the actuator assembly 3300 shown in hidden lines for clarity. The subframes 3100A, 3100B, 3100C, 3100D and linkages 3200-1, 3200-2 are described in more detail later.

As best illustrated in FIG. 44, the intermediate subframe 3100B is pivotally connected at its forward end to the upper subframe 3100A by threaded connectors 3002 received within aligned apertures 3003, 3004 in the respective intermediate subframe 3100B and upper subframe 3100A. The threaded connectors 3002 and apertures 3003, 3004 may be threaded as shown in the previous embodiments 1000, 2000. Alternatively, as shown, the apertures 2003 in the intermediate subframe 3100B may be square apertures that receive a square shank portion of the threaded connector 3002. The aperture 3004 in the upper subframe 3100A may be sized to receive a sleeve 3009 and collared bushing 3010 retained by a nut 3011 received over the threaded end of the threaded connector 3002. The intermediate subframe 3100B is pivotally connected at its rearward end by threaded connectors 3006 received within apertures 3007, 3008 in the respective intermediate subframe 3100B and in the lower subframe 3100C. The threaded connectors 3006 and apertures 3007, 3008 may be threaded as shown in the previous embodiments 1000, 2000. Alternatively, as shown, the apertures 3008 in the lower subframe 3100C may be square apertures that receive a square shank portion of the threaded connector 3006. The aperture 3007 in the intermediate subframe 3100B may be sized to receive a sleeve 3009 and collared bushing 3010 retained by a nut 3011 received over the threaded end of the threaded connector 3006.

The first and second linkages 3200-1, 3200-2 are pivotally connected at their forward end to the upper subframe 3100A by threaded connectors 3012 received within aligned apertures 3013, 3014 in the respective first and second linkages 3200-1, 3200-2 and the upper subframe 3100A. The threaded connectors 3012 and apertures 3013, 3014 may be threaded as shown in the previous embodiments 1000, 2000. Alternatively, as shown, the apertures 3014 in the upper subframe 3100A may be square apertures that receive a square shank portion of the threaded connector 3012. The aperture 3013 in the first and second linkages 3200-1, 3200-2 may be sized to receive a sleeve 3009 and collared bushing 3010 retained by a nut 3011 received over the threaded end of the threaded connector 3012. The first and second linkages 3200-1, 3200-2 are pivotally connected at their rearward end to the lower subframe 3100C by threaded connectors 3016 received within aligned apertures 3017, 3018 in the respective first and second linkages 3200-1, 3200-2 and lower subframe 3100C. The threaded connectors 3016 and apertures 3017, 3018 may be threaded as shown in the previous embodiments 1000, 2000. Alternatively, as shown, the apertures 3017 in the lower subframe 3100C may be square apertures that receive a square shank portion of the threaded connector 3016. The aperture 3018 in the first and second linkages 3200-1, 3200-2 may be sized to receive a sleeve 3009 and collared bushing 3010 retained by a nut 3011 received over the threaded end of the threaded connector 3016.

The rear strut subframe 3100D is pivotally connected to the lower subframe 3100C by threaded connectors 3024 received within aligned apertures 3025, 3026 (see FIG. 45) in the rear strut subframe 3100D and the lower subframe 3100C. As best viewed in FIGS. 43 and 45, the rear strut subframe 3100D is also linked with the lower subframe 3100C by the hooked arms 3402 of the depth selector 3400 (discussed later). It should be appreciated that the forward pivotal connections of the upper subframe 3100A with the intermediate subframe 3100B and the linkages 3200-1, 3200-2, together with the rearward pivotal connections of the intermediate subframe 3100B and the linkages 3200-1, 3200-2 with the lower subframe 3100C provides a four bar linkage that permits the intermediate and lower subframes 3100B, 3100C to move vertically with respect to the upper subframe 3100A rigidly secured to the toolbar 14. It should be apparent that in the 3000A embodiment, the entire rear strut subframe 3100D may be omitted since its primary purpose is to support the gauge wheel 3050 which is not present in the 3000A embodiment. However, as explained in detail later, the rear strut subframe 3100D cooperates with the lower subframe 3100C to enable depth selection via the depth selector 3400. Thus, if depth selection is desired, the embodiment of the row cleaner assembly 3000A may be used with the rear strut subframe 3100D, thereby simply omitting the gauge wheel 3050 and the gauge wheel axle bolt 3051.

Figure 47:
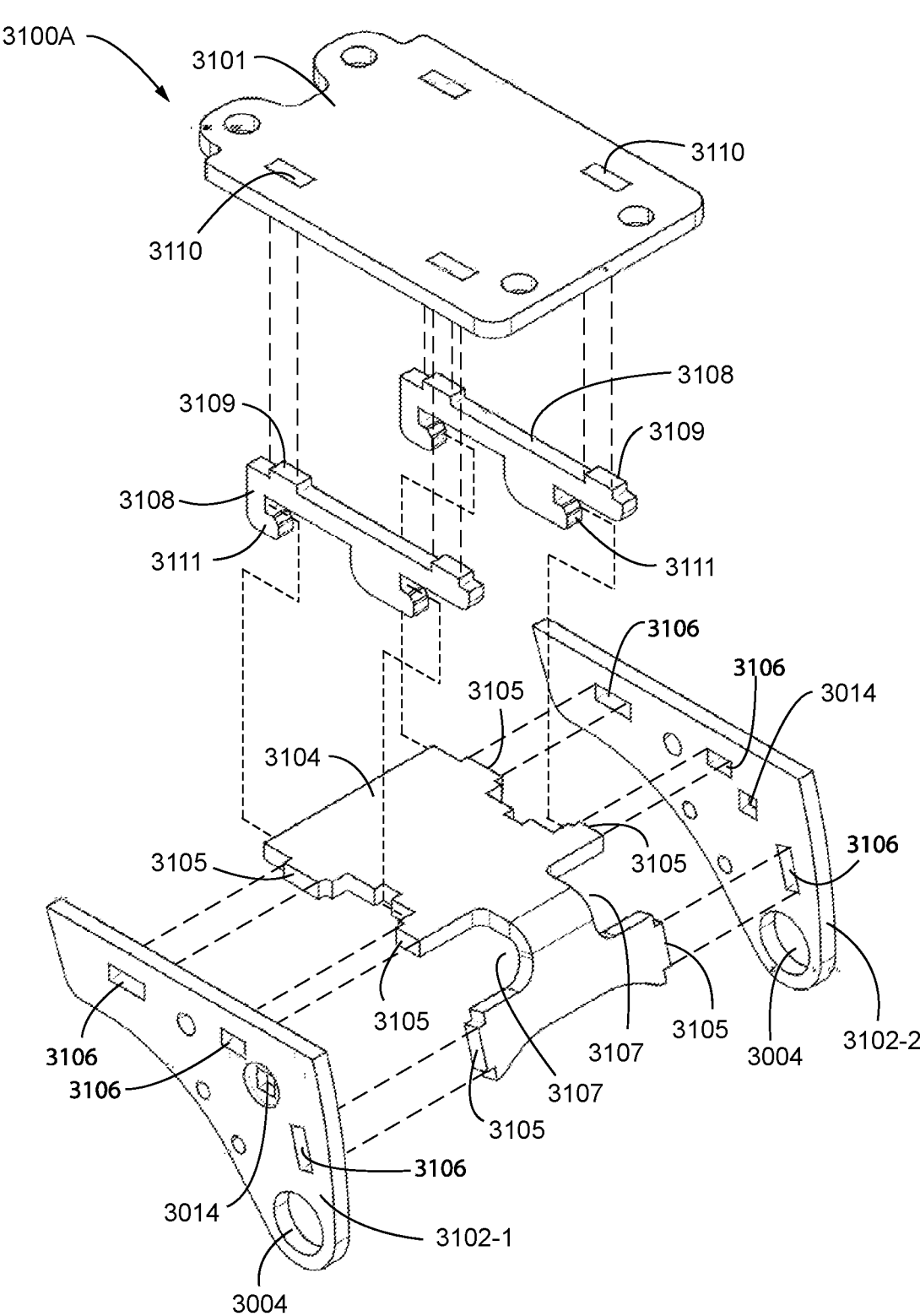
FIG. 47 is an exploded rear perspective view of an embodiment of the upper subframe of the frame assembly of FIG. 42.

FIG. 47 shows an exploded front perspective view of the upper subframe 3100A. The upper subframe 3100A includes first and second gusset plates 3102-1, 3102-2 that extend downwardly from the mounting plate 3101 and are laterally spaced by a front plate 3104. The gusset plates 3102-1, 3102-2 include the apertures 3004, 3014 for receiving the threaded connectors 3002, 3012, respectively, for attaching the intermediate subframe 3100B and the rails 3200-1, 3200-2 respectively as described above in connection with FIG. 44. The front plate 3104 may include side tabs 3105 that are received with side tab slots 3106 in the gusset plates 3102-1, 3102-2. The front plate 3104 includes recesses 3107 to accommodate the insertion of the threaded connectors 3012 into the apertures 3014 in the gusset plates 3102-1, 3102-2. Connecting plates 3108 include upper tabs 3109 that are received within tab slots 3110 in the mounting plate 3101. The connecting plates 3108 also include bottom hooks 3111 that receive and engage with the back edge and recessed areas of the front plate 3104. It should be appreciated that rather than using tabs and slots connecting the individual parts of the upper subframe 3100A, the individual parts of the upper subframe 3100A may be connected by welding or by bolted connections. Alternatively, the upper subframe 3100A may be fabricated as a single part, such as by casting.

Figure 48:
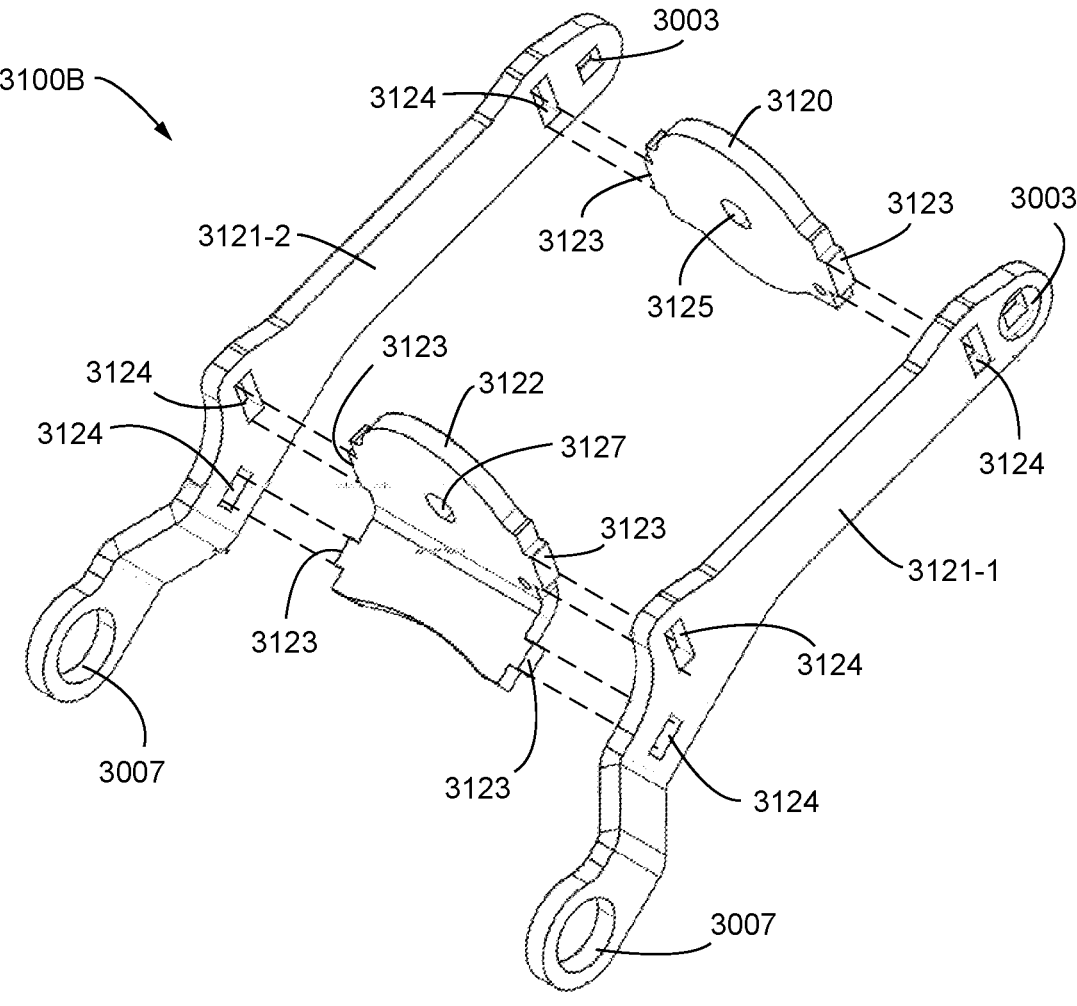
FIG. 48 is an exploded rear perspective view of an embodiment of the intermediate subframe of the frame assembly of FIG. 42.

FIG. 48 shows an exploded rear perspective view of the intermediate subframe 3100B. The intermediate subframe 3100B includes a forward base member 3120 and a rearward base member 3122 and first and second side rails 3121-1, 3121-2. The base members 3120, 3122 may include side tabs 3123 that are received within side tab notches 3124 in the side rails 3121-1, 3121-2. It should be appreciated that rather than using tabs and slots connecting the individual parts of the intermediate subframe 3100B, the individual parts of the intermediate subframe 3100B may be connected by welding or by bolted connections. Alternatively, the intermediate subframe 3100B may be fabricated as a single part, such as by casting. The forward base member 3120 includes an aperture 3125 through which a nipple of the first airbag 3302 extends and which receives a fitting 3126 (FIG. 43) that threadably secures the second airbag 3304 to the forward base member 3120. The rearward base member 3122 includes an aperture 3127 through which a nipple of the first airbag actuator 3302 extends and which receives a fitting 3128 (FIG. 46) that threadably secures the first airbag 3302 to the rearward base member 3122. Each of the side rails 3121-1, 3121-2 includes the forward aperture 3003 for receiving the threaded connector 3002 for pivotally securing the side rails 3121-1, 3121-2 of the intermediate subframe 3100B to the gussets 3102-1, 3102-2 of the upper subframe 3100A as described above in connection with FIG. 44. Each of the side rails 3121-1, 3121-2 includes the rearward aperture 3007 for receiving the threaded connector 3006 as described above in connection with FIG. 44.

Figure 49:
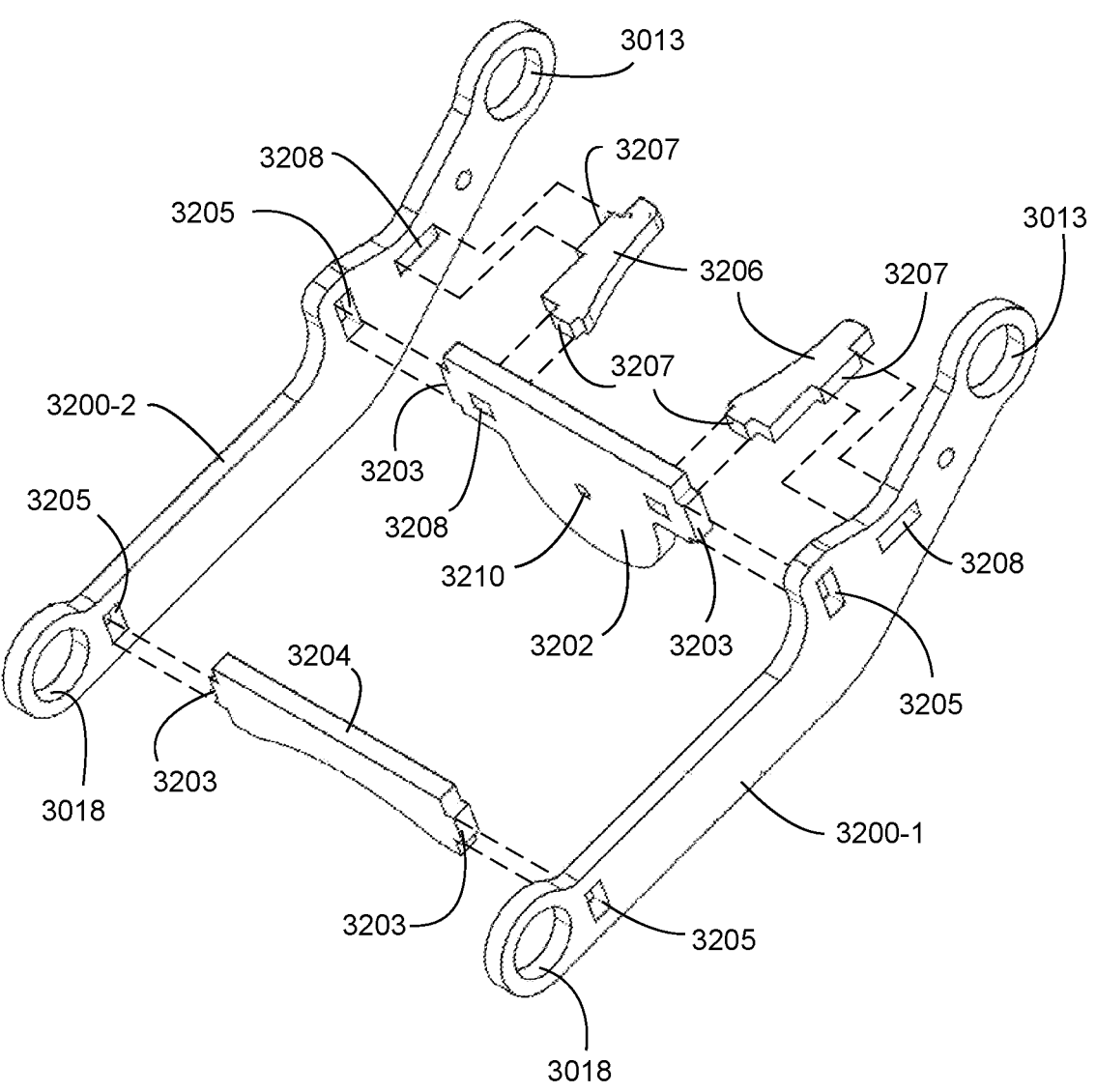
FIG. 49 is an exploded rear perspective view of an embodiment of the linkages of the frame assembly of FIG. 42.

FIG. 49 shows an exploded rear perspective view of the first and second linkages 3200-1, 3200-2. The first and second linkages 3200-1, 3200-2 may be connected by a forward plate 3202 and a rearward plate 3204. Each of the forward and rearward plates 3202, 3204 may include side tabs 3203 that are received within side tab notches 3205 in the linkages 3200-1, 3200-2. Stiffener plates 3206 may be provided to stiffen the forward plate 3202. The stiffener plates 3206 may include tabs 3207 that are received in tab slots 3208 in the forward plate 3202 and the linkages 3200-1, 3200-2. It should be appreciated that rather than using tabs and slots connecting the individual parts of the intermediate subframe 3100B, the individual parts of the intermediate subframe 3100B may be connected by welding or by bolted connections. Alternatively, the intermediate subframe 3100B may be fabricated as a single part, such as by casting. The forward plate member 3202 may include an aperture 3210 for receiving a threaded connector (not shown) for attaching the first and second airbag actuators 3302, 3304 thereto (see FIG. 46).

Figure 50:
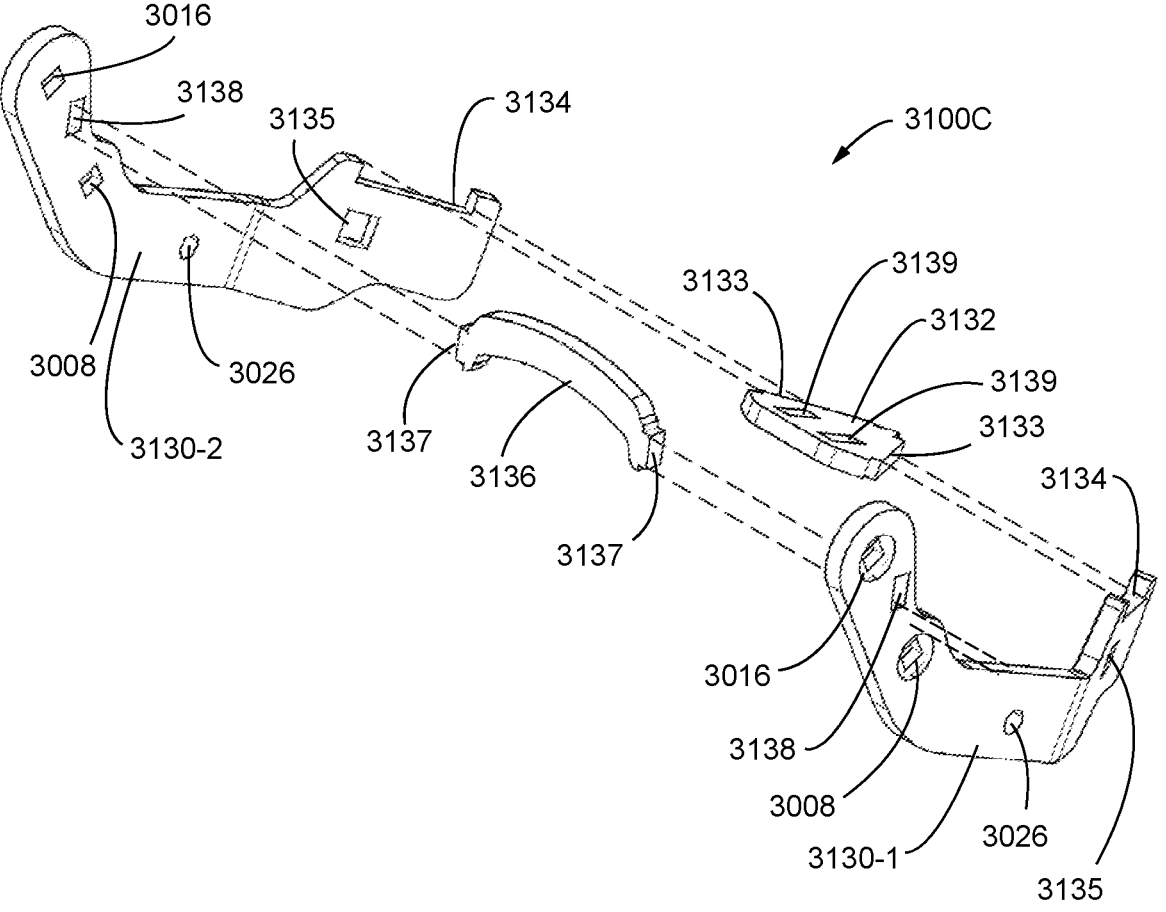
FIG. 50 is an exploded rear perspective view of an embodiment of the lower subframe of the frame assembly of FIG. 42.

FIG. 50 shows an exploded rear perspective view of the lower subframe 3100C. The lower subframe 3100C includes first and second row cleaner wheel support arms 3130-1, 3130-2 connected at their forward end by a forward plate 3132. The forward plate 3132 may include side tabs 3133 that are received within side tab slots 3134 in the first and second row cleaner wheel support arms 3130-1, 3130-2. A rear plate 3136 may be provided to laterally restrain the rearward end of the row cleaner wheel support arms 3130-1, 3130-2. The rear plate 3136 may include side tabs 3137 that are received within side tab slots 3138 in the row cleaner wheel support arms 3130-1, 3130-2. It should be appreciated that rather than using tabs and slots connecting the individual parts of the lower subframe 3100C, the individual parts of the lower subframe 3100C may be connected by welding or by bolted connections. Alternatively, the lower subframe 3100C may be fabricated as a single part, such as by casting. Each of the row cleaner wheel support arm 3130-1, 3130-2 also includes the opening 3026 that aligns with the aperture 3025 in the rear strut subframe 3100D for receiving the threaded connector 3024 for pivotally attaching the lower subframe 3100C to the rear strut subframe 3100D (see FIG. 45). Each row cleaner wheel support arm 3130-1, 3130-2 also includes the apertures 3008, 3017 for receiving the respective threaded connectors 3006, 3008 of the respective intermediate subframe 3100B and the linkages 3200-1, 3200-2 as described above in connection with FIG. 44. Each of the first and second row cleaner wheel support arms 3130-1, 3130-2 includes a square opening 3135 for receiving a square shank portion of a respective one of the row cleaner wheel axle bolts 3061-1, 3061-2 as discussed in more detail below. The forward plate 3132 may include tab slots 3153 for depth selector 3400 discussed later.

Figure 51:
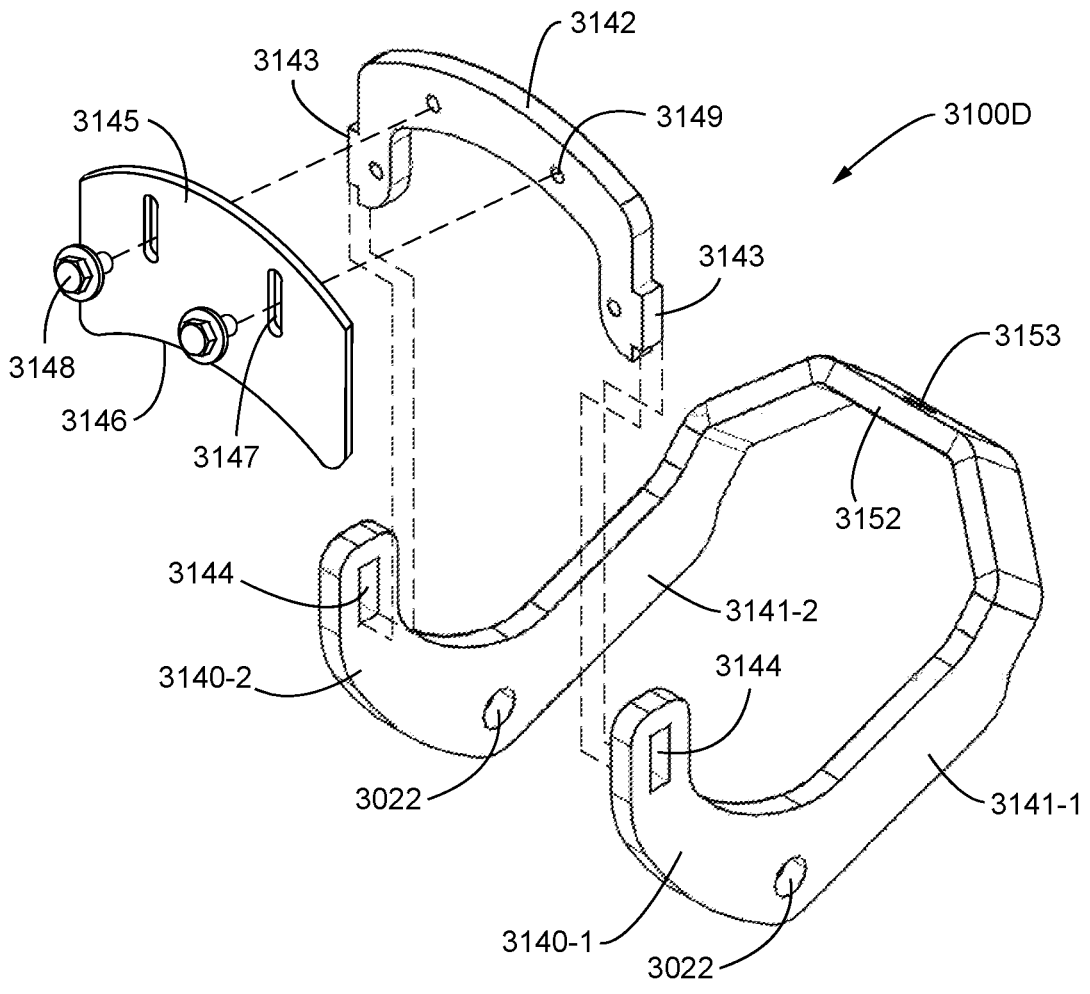
FIG. 51 is a rear perspective view of rear strut subframe of the frame assembly of FIG. 42.

FIG. 51 is a rear perspective view of the rear strut subframe 3100D. The rear strut subframe 3100D includes first and second struts 3140-1, 3140-2 spaced at their rearward end by a lateral plate 3142. The lateral plate 3142 may include tabs 3143 that are received within slots 3144 of each of the first and second struts 3140-1, 3140-2. Alternatively, the lateral plate 3142 may be attached to the struts 3140-1, 3140-2 by welding or bolted connections. Alternatively, the struts 3140-1, 3140-2 and the lateral plate 3142 may be fabricated as a single part, such as by casting. Each of the struts 3140-1, 3140-2 include the aperture 3022 for receiving the axle wheel bolt 3051 as described above in connection with FIG. 44. In this embodiment, each of the struts 3140-1, 3140-2 include forwardly extending arms 3141-1, 3141-2 joined at their forward end by a cross member 3152. The cross member 3152 includes an aperture 3153 for the depth selector 3400 discussed later.

The rear strut subframe 3100D may include a scraper 3145 to remove soil or debris that may build up on the gauge wheel 3050 during operation. The scraper 3145 may be attached to the lateral plate 3142 between the rear struts 3140-1, 3140-2 of the rear strut subframe 3100D and may comprise a plate having an arcuate edge 3146 that approximates the profile of the gauge wheel 3050 (see FIG. 35). The scraper 3145 may be attached to the lateral plate 3142 with threaded connectors 3148 extending through elongated holes 3147 that align with internally threaded apertures 3149 in the lateral plate 3142. The elongated holes 3147 will permit the scraper 3145 to be adjustably positioned relative to the lateral plate 3142 to vary the distance to the gauge wheel 3050 to accommodate different gauge wheel sizes and profiles and to account for wear of the gauge wheel tread and the scraper 3145.

Referring to the exploded view of FIG. 45, a depth selector 3400 enables the angle or position of the lower subframe 3100C to be selectively adjusted relative to the rear strut subframe 3100D. The depth selector 3400 includes laterally spaced hooked arms 3402-1, 3402-2, each having a plurality of notches 3404 formed in their upper surface. Each of the hooked arms 3402-1, 3402-2 may be attached to the lower subframe 3100C by tabs 3405 received within tab slots 3406 in the forward plate 3132 of the lower subframe 3100C. Alternatively, the hooked arms 3402-1, 3402-2 may be attached to the lower subframe 3100C by any suitable means such as by welding or bolting. As illustrated in FIG. 43 in combination with FIG. 45, the hooked arms 3402-1, 3402-2 extend over the forward cross member 3152 of the rear strut subframe 3100D. Each hooked arm 3402-1, 3402-2 includes a forward abutment 3408 and a rearward abutment 3410. Referring to FIG. 43 it should be appreciated that the abutments 3408, 3410 will engage with the forward cross member 3152 restricting the angle of rotation that the lower subframe 3100C may pivot about the axis of the threaded connector 3024 pivotally connecting the lower subframe 3100C with the rear strut subframe 3100D. A handle 3412 is attached to a handle shaft 3414. The handle shaft 3414 passes between the laterally spaced hooked arms 3402-1, 3402-2 and extends through a collar 3415 and through the aperture 3153 in the forward end of the rear strut subframe 3100D. A spring 3416 is received over the end of the handle shaft 3414 and is retained by a washer 3417 and clip 3418. The spring 3416 biases the handle 3412 downwardly such that the handle 3412 is received within one of the plurality of the notches 3404 in the upper surface of the hooked arms 3402-1, 3402-2.

To adjust the angle or position of the lower subframe 3100C with respect to the rear strut subframe (thus increasing or decreasing the depth of penetration of the row cleaner wheels 3060-1, 3060-2 into the soil), the operator grasps the handle 3412 and exerts an upward force causing the spring 3416 to compress, disengaging the handle 3412 from the notches 3402. With the handle disengaged from the notches, the operator can pivot the lower subframe 3100C with respect to the rear strut subframe 3100D about the axis of the threaded connector 3024 pivotally connecting the lower subframe 3100C with the rear strut subframe 3100D. Once the lower subframe is at the desired angle or position, the operator releases the upward pressure on the handle 3412 and the spring bias reseats the handle 3412 within the corresponding notches 3404, thereby securely retaining the lower subframe 3100C at the desired angle or position with respect to the rear strut subframe 3100D corresponding to the desired row cleaner wheel depth.

Referring to FIG. 43, the square opening 3135 in each of the row cleaner wheel support arms 3130-1, 3130-2 is configured to receive a square shank portion (not shown, but see FIG. 27 as an example) of the row cleaner wheel axle bolts 3061-1, 3061-2. The square opening 3135 and the square shank portion of the row cleaner wheel axle bolts 3061-1, 3061-2 cooperate to rotationally restrain the row cleaner axle bolts 3061-1, 3061-2 to the row cleaner wheel support arms 3130-1, 3130-2. Each row cleaner wheel axle bolt 3061-2, 3061-2 extends through a central opening 3064 within each of the respective first and second cleaner wheels 3060-1, 3060-2. A bushing 3065 is received over the end of each row cleaner wheel axle bolts 3061-2, 3061-2 and the bushing is received within a hub 3070 having a central opening 3071. The hub 3070 is secured to the respective first and second row cleaner wheels 3060-1, 3060-2 by nuts 3072 threadably received over threaded connectors 3074 which extend through apertures 3066 in the row cleaner wheels 3060-1, 3060-2 and through aligned holes 3073 in the hub 3070. A lug nut 3075 threadably receives the end of the wheel axle bolts 3061-2, 3061-2 thereby axially restraining the row cleaner wheels 3060-1, 3060-2 onto the respective row cleaner wheel axle bolts 3061-2, 3061-2, while the bushing 3065 permits the row cleaner wheels 3060-1, 3060-2 to freely rotate about the respective row cleaner wheel axle bolts 3061-2, 3061-2. A spacer (not shown) may be provided over the row cleaner axle bolts 3061-1, 3061-2 to position the row cleaner wheels 3060-1, 3060-2 outwardly away from the row cleaner wheel support arms 3130-1, 3130-2. FIG. 43 also shows a scraper 3076 that may be provided over the row cleaner axle bolts 3061-1, 3061-2 to scrape dirt or mud from the row cleaner wheels 3060-1, 3060-2 as they rotate.

Referring to FIGS. 35 and 44, the gauge wheel axle bolt 3051 extends through the aperture 3022 in the rear strut subframe 3100D and through the hub 3052 (FIG. 35) of the gauge wheel 3050. Spacer bushings 3053 (FIG. 44) may be disposed on the gauge wheel axle bolt 3051 on each side of the hub 3052 to keep the gauge wheel 3050 centered between the struts 3040-1, 3040-2. A nut 3054 threads onto the end of the gauge wheel axle bolt 3051 securing the gauge wheel 3050 to the rear strut subframe 3100D.

Figures 52A, 52B:
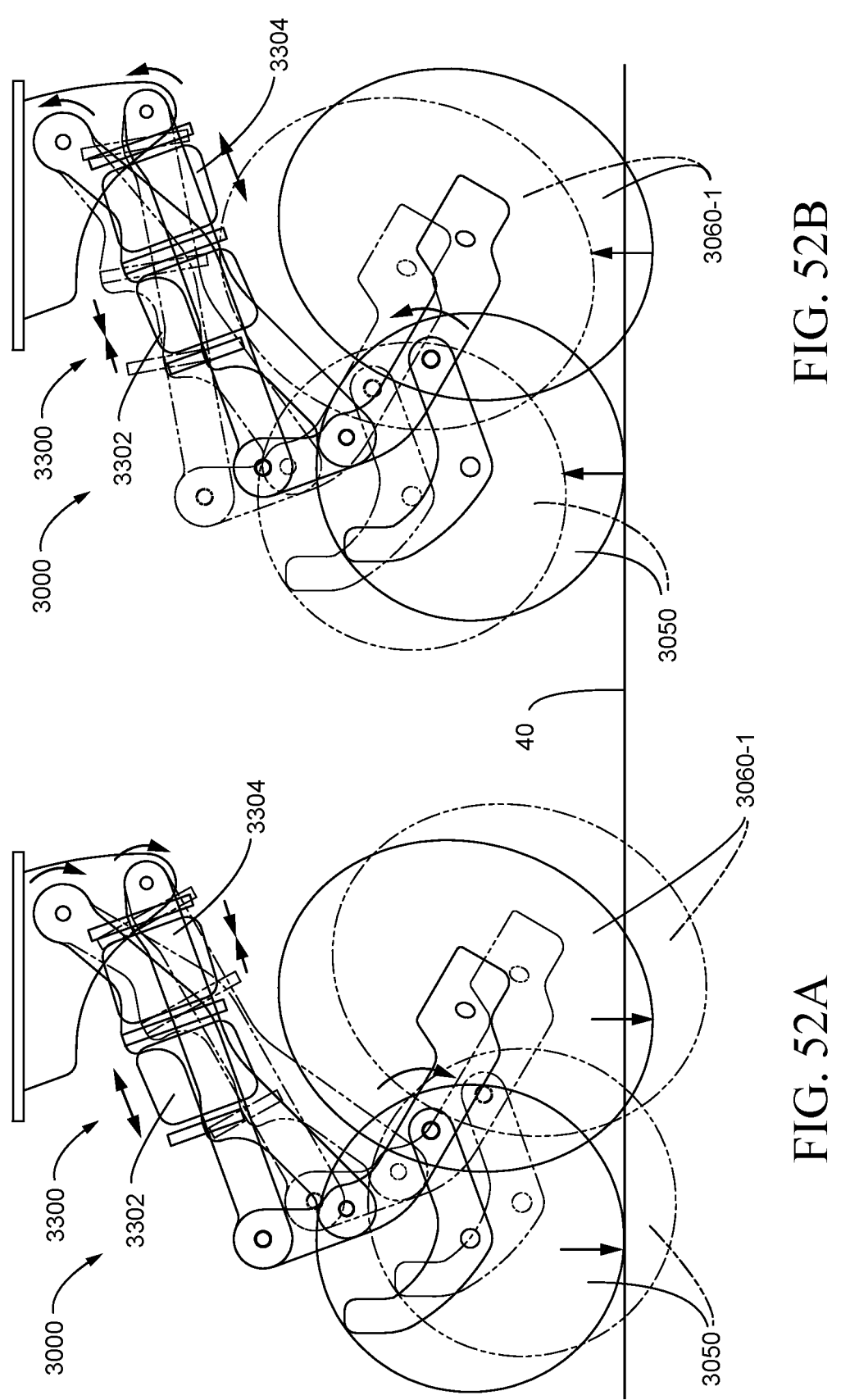
FIG. 52A is a schematic representation illustrating the movement of the row cleaner assembly when the actuator system is actuated to a apply a downforce.
FIG. 52B is a schematic representation illustrating the movement of the row cleaner assembly when the actuator system is actuated to a apply a lift force.

Referring to FIGS. 44 and 46, the actuator system 3300 may comprise first and second airbags 3302, 3304 disposed within the intermediate subframe 3100B and cooperating with the linkages 3200-1, 3200-2. The first airbag 3302, rearward of the second airbag 3304, is connected at its rearward end to the rearward plate 3122 of the intermediate subframe 3100B and is connected at its forward end to the lateral plate 3202 between the first and second linkages 3200-1, 3200-2. The second airbag 3404 is connected at its rearward end to the same lateral plate 3202 and is connected at its forward end to forward plate 3120 of the intermediate subframe 3100B. As schematically illustrated in FIGS. 52A, as the pressure in the first or rearward airbag 3302 is increased causing it to expand, and causing the second or forward airbag 3404 to collapse, a downforce and downward rotational movement will be imparted as indicated by the directional arrows in FIG. 52A forcing the lower subframe 3100C and rear strut subframe 3100D downwardly (as represented by the phantom lines relative to the solid lines) causing the gauge wheel 3050 and the row cleaner wheels 3060-1, 3060-2 to move downwardly or exerting a greater downforce on the soil 40. Conversely, as schematically illustrated in FIGS. 52B, as the pressure in the second or forward airbag 3404 is increased causing it to expand, and causing the first or rearward airbag 3302 to collapse, a lift force and upward rotational movement will be will be imparted as indicated by the directional arrows in FIG. 52B forcing the lower subframe 3100C and rear strut subframe 3100D upwardly (as represented by the phantom lines relative to the solid lines) causing the gauge wheel 3050 and the row cleaner wheels 3060-1, 3060-2 to move upwardly or exerting less downforce on the soil 40. Thus, it should be appreciated by increasing and decreasing the air pressure in the first and second airbags 3302, 3304 causing them to respectively expand and contract, the desired amount of downforce applied to the gauge wheel 3050 and the row cleaner wheels 3060-1, 3060-2 can be achieved.

Rather than airbags for the actuator system 3300, the first and second actuators 3302, 3304 may be any type of single acting or dual acting actuators that may be configured to provide an adjustable downforce and an optional lift force, including pneumatic cylinders, hydraulic cylinders, air bags, and electromechanical actuators. In still other embodiments, a single acting actuator, such as an airbag and a forward spring assembly similar to the spring assembly 2300 described above in connection with the second row cleaner assembly embodiment 2000 may be utilized. The downforce exerted by the actuator system 3300 on the gauge wheel 3050 and row cleaner wheels 3060-1, 3060-2 may be controlled by a controller (such as the "controller 300" referenced in U.S. Pat. No. 8,550,020) or by a fluid control port (such as the "fluid control port 10" described in PCT Publication No. WO2300/056395). The actuator system 3300 of each of the row cleaner assemblies 3000 of the planter 10 may be controlled on a row-by-row basis, or as groups by section of the planter 10, or collectively across the entire planter 10.

The desired amount of downforce may be a function of the soil conditions and the amount or type of crop residue and the depth at which the row cleaner wheels 3060 are set for engagement with the soil. For example, in dry soil conditions, more downforce may be desired such that the gauge wheel 3050 will more firmly pack the soil 40 in front of the opening assembly 234 for formation of a better seed trench 38 and to prevent or minimize soil falling into the seed trench 38 before the seed is deposited. Alternatively in wet soil conditions, less downforce may be desired. A downforce monitoring system (discussed later) may be employed for determining and regulating the downforce applied by the actuator 3300.

Figure 53:
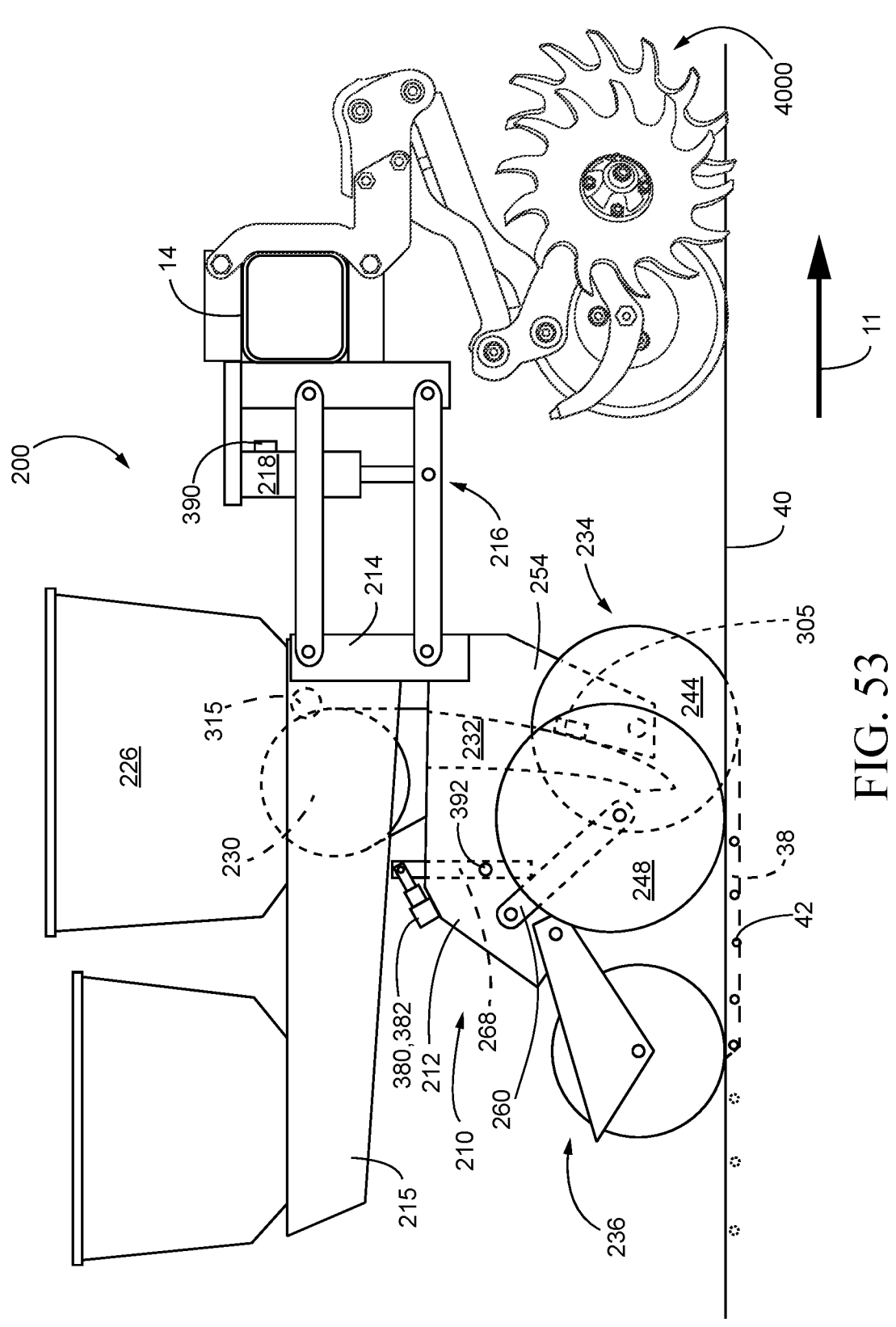
FIG. 53 is another side elevation view of an embodiment of a planter row unit showing another embodiment of a row cleaner assembly incorporating a gauge wheel.

FIG. 53 is a side elevation of the planter row unit 200 as previously described above in connection with FIG. 2, but with another embodiment of a row cleaner assembly designated by reference number 4000. The row cleaner assembly 4000 is mounted to the toolbar 14 and is positioned forward of the trench opening assembly 234. Again, it should be appreciated that each row unit 200 of the planter 10 would have an associated row cleaner assembly 4000 longitudinally aligned with the respective trench opening assembly 234 of the row unit 200. In the embodiment shown, the row cleaner assembly 4000 includes a gauge wheel 4050 (identified in FIG. 54). The row cleaner assembly 4000 extends rearward of the toolbar 14 and is rigidly mounted to the forward side of toolbar 14 by suitable mounting structure, which may include a pair of mounting brackets 4101 that bolt with plates or gussets secured to the toolbar 14. Alternatively, the row cleaner assembly 4000 may be mounted to the top side, rear side or below side of the toolbar 14 by any suitable mounting structure or connection, including bolted brackets or by welding.

Figure 53A:
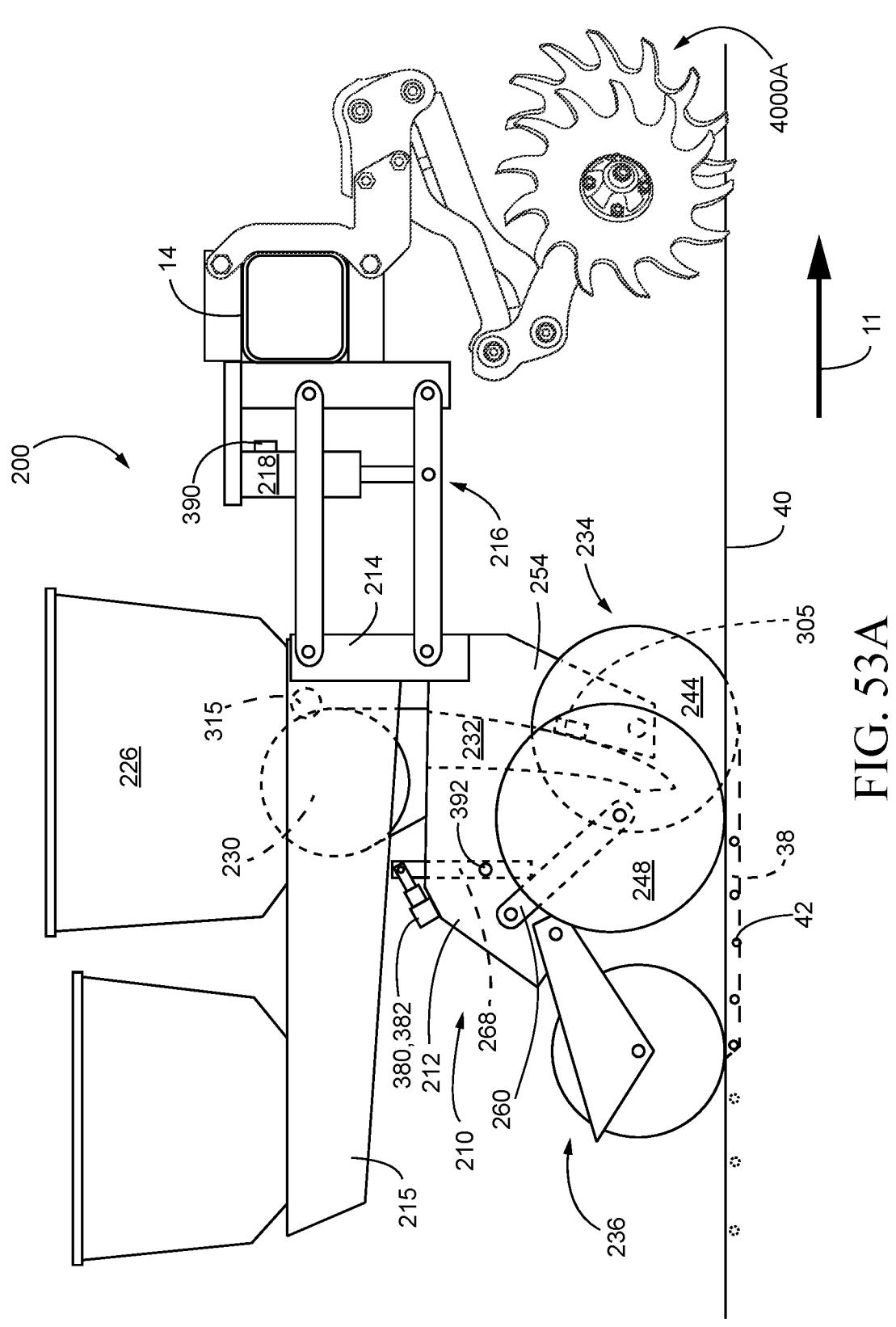
FIG. 53A is another side elevation view of an embodiment of a planter row unit showing another embodiment of a row cleaner assembly substantially the same as shown in FIG. 34, but without a gauge wheel.

FIG. 53A shows an alternative embodiment of a row cleaner assembly designated by reference number 4000A. The embodiment of the row cleaner assembly 4000A is substantially the same as the embodiment of the row cleaner assembly 4000 except the embodiment of 4000A does not include the gauge wheel 4050. Furthermore, the embodiment of 4000A may omit the rear strut subframe 4100B (described later).

Figure 54:
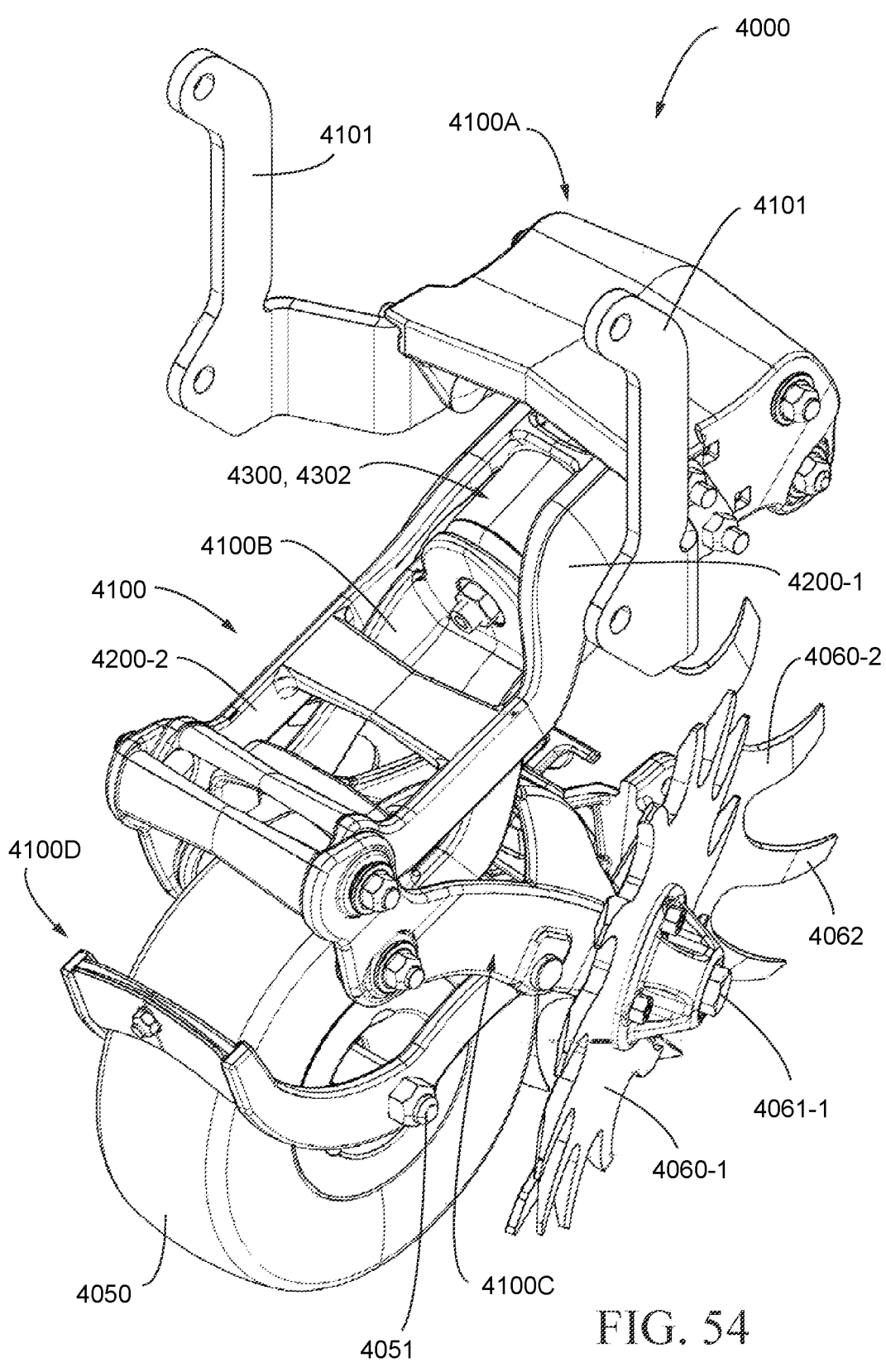
FIG. 54 is a rear perspective view of the row cleaner assembly of FIG. 53.
Figure 54A:
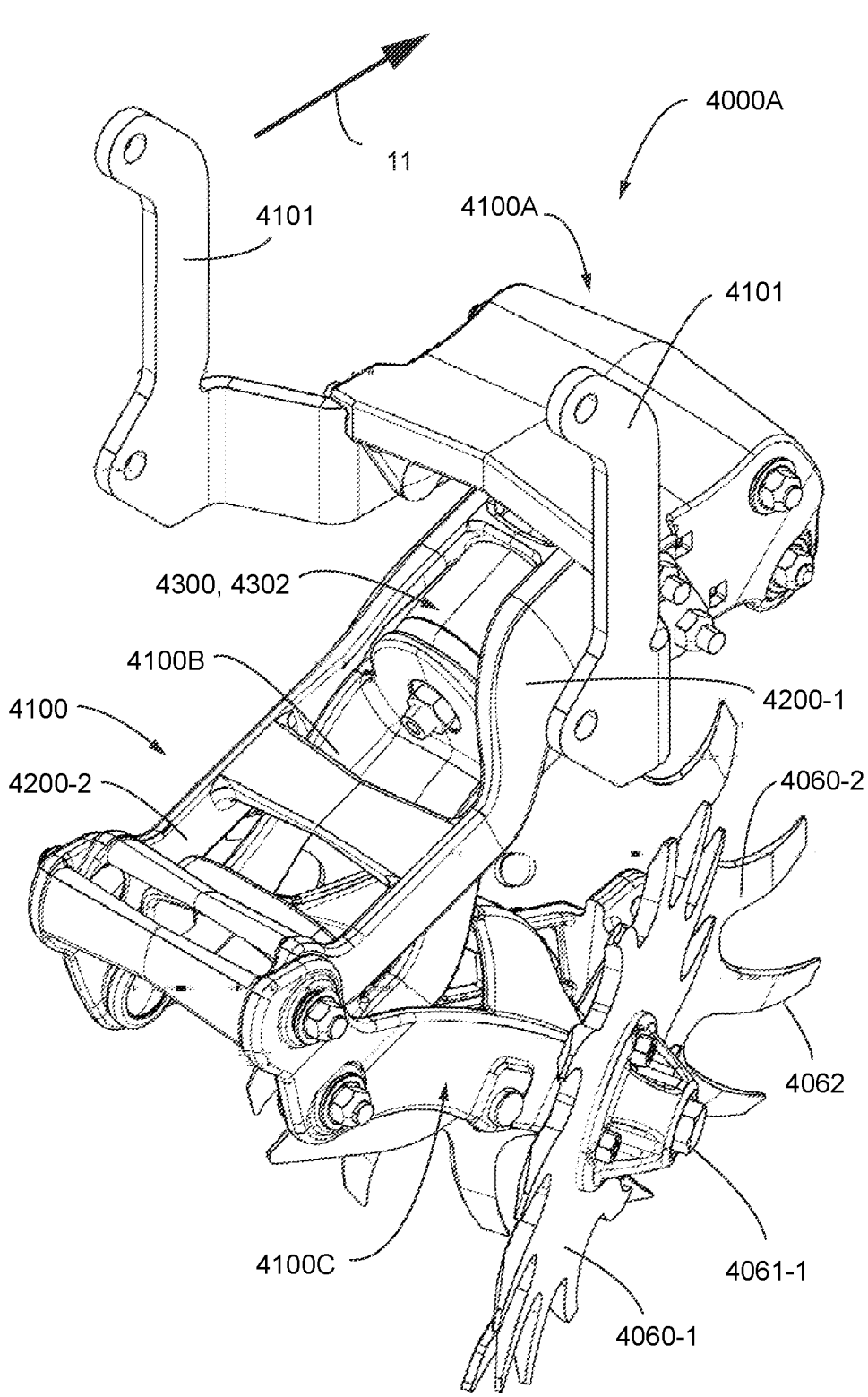
FIG. 54A is a rear perspective view of the row cleaner assembly of FIG. 53A.

FIG. 54 is an enlarged rear perspective view of the row cleaner assembly 4000 shown in FIG. 53. FIG. 54A is the same view as in FIG. 54 but shows the embodiment of the row cleaner assembly 4000A without the gauge wheel 4050 and without the rear strut subframe 4100D (discussed later). Since both embodiments of the row cleaner assembly 4000 and 4000A are substantially the same, other than the removal of the gauge wheel in embodiment 4000A (and optionally the rear strut subframe 4100D discussed later), only the embodiment 4000 is described, recognizing that any reference to the gauge wheel 4050, the gauge wheel axle 4051 and associated components would not be applicable to the 4000A embodiment.

Figure 55:
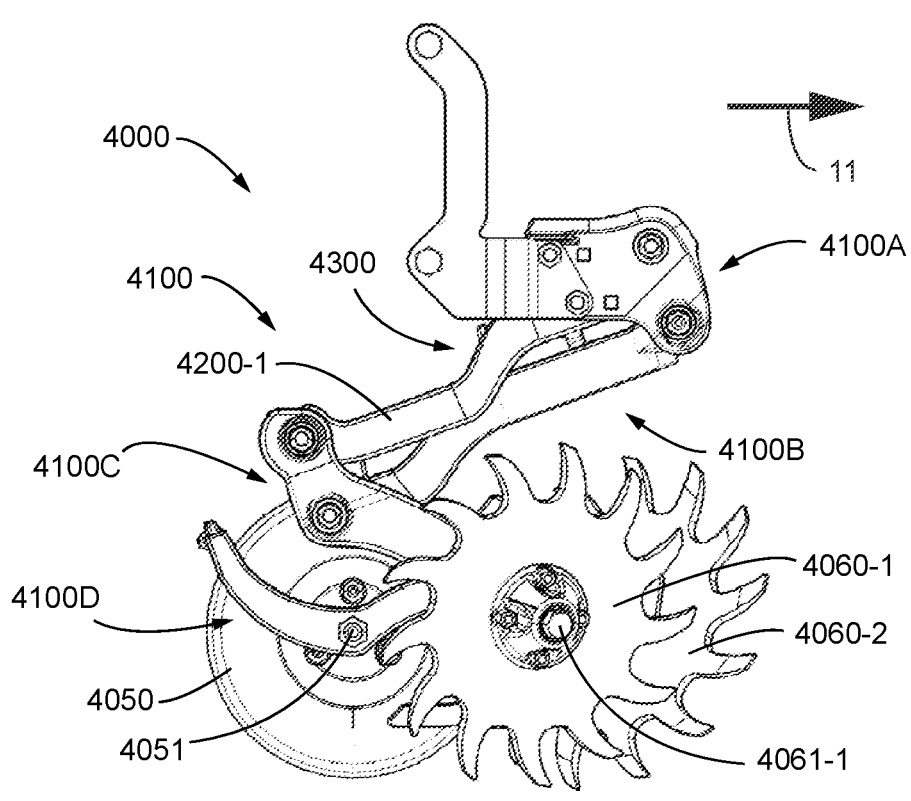
FIG. 55 is a right side elevation view of the row cleaner assembly of FIG. 54.
Figure 56:
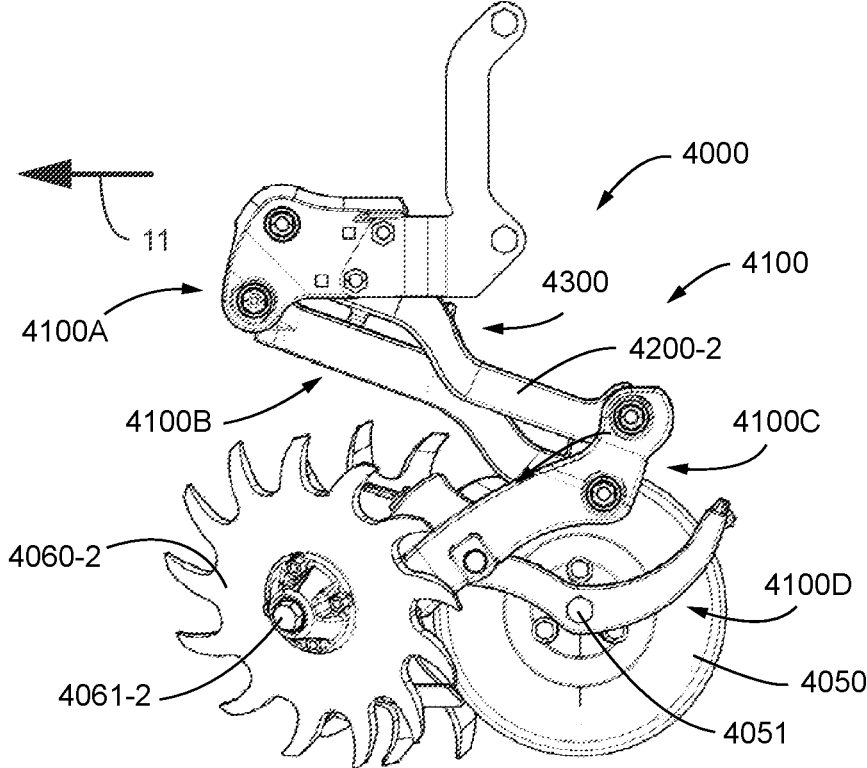
FIG. 56 is a left side elevation view of the row cleaner assembly of FIG. 54.
Figure 57:
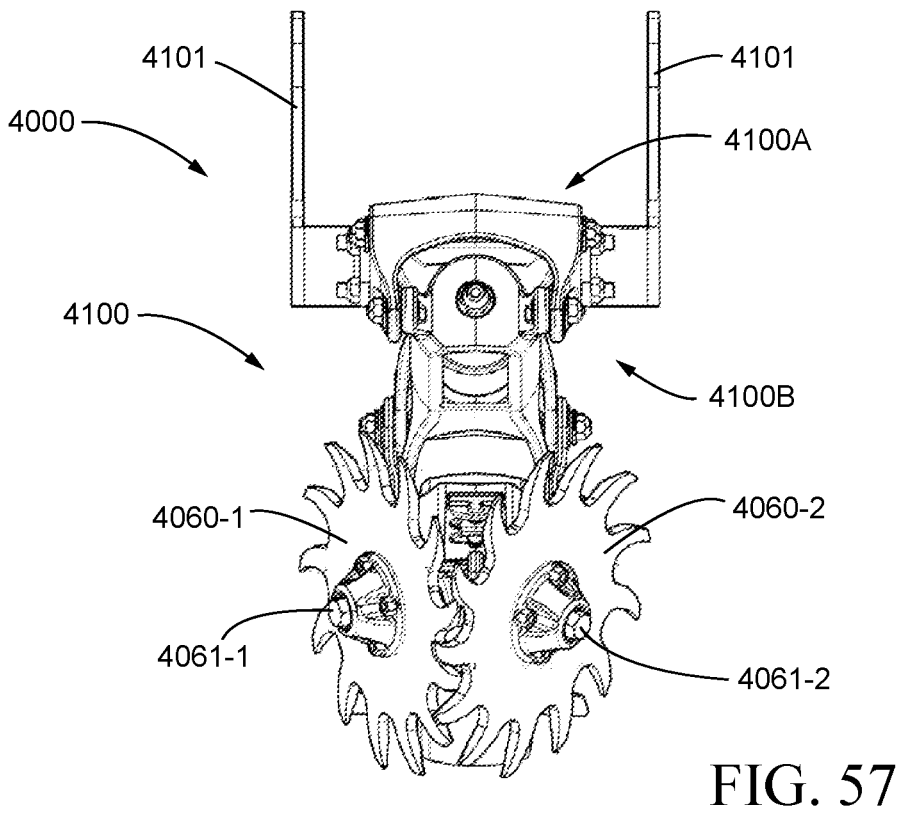
FIG. 57 is front elevation view of the row cleaner assembly of FIG. 54.
Figure 58:
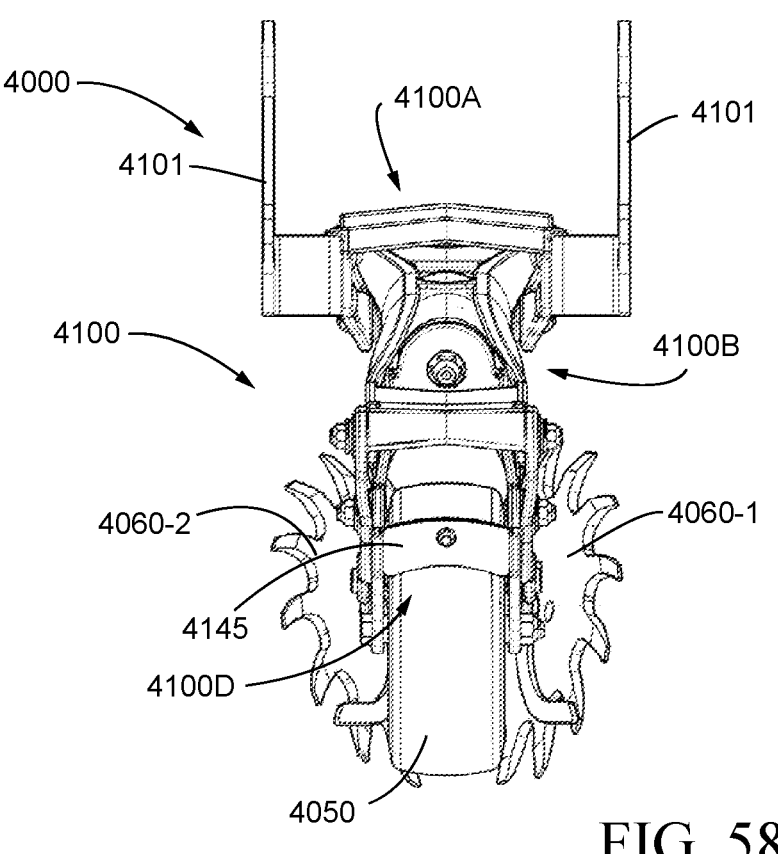
FIG. 58 is a rear elevation view of the row cleaner assembly of FIG. 54.
Figure 59:
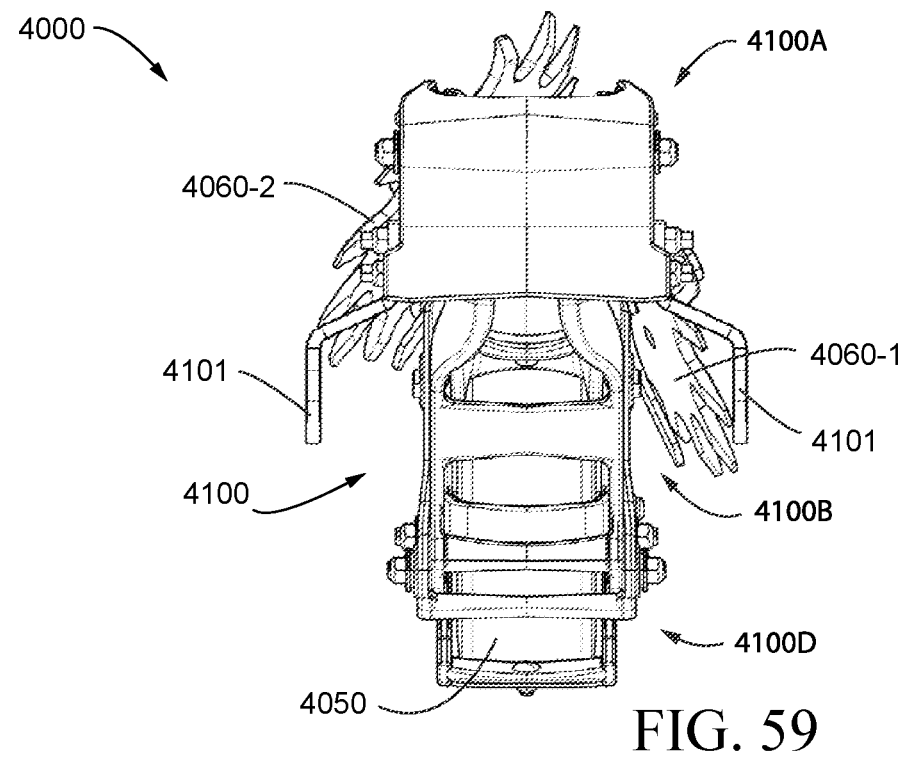
FIG. 59 is a top plan view of the row cleaner assembly of FIG. 54.
Figure 60:
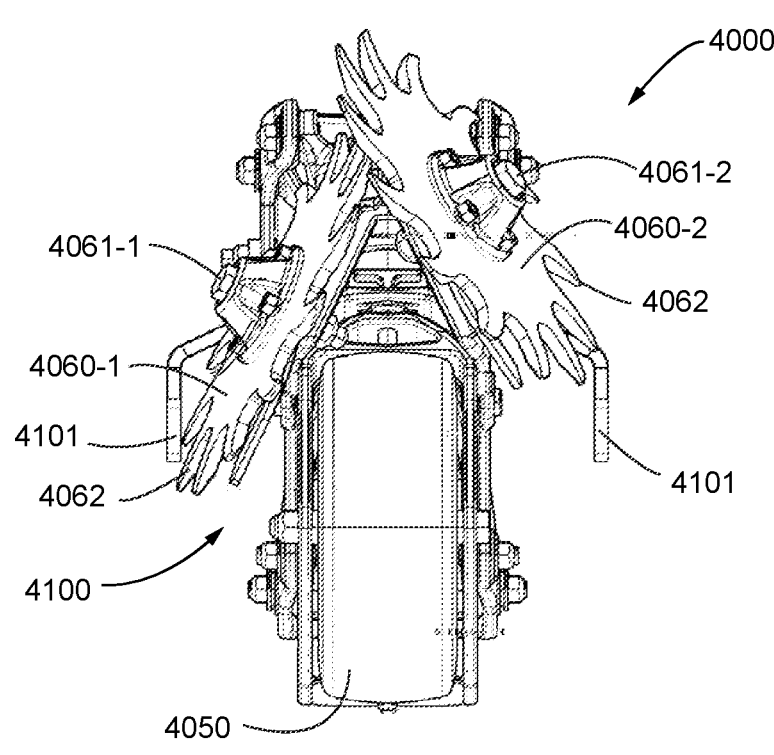
FIG. 60 is a bottom plan view of the row cleaner assembly of FIG. 54.

FIGS. 55 and 56 are right and left side elevation views, respectively, of the row cleaner assembly 4000. FIGS. 57 and 58 are front and rear elevation views, respectively, and FIGS. 59 and 60 arc top and bottom views, respectively. The row cleaner assembly 4000 includes a frame assembly 4100 supported at its rearward end by a gauge wheel 4050. Row cleaner wheels 4060-1, 4060-2 are rotatably supported by the frame assembly 4100. Each row cleaner wheel 4060-1, 4060-2 includes radially spaced tines 4062 around its circumference. The row cleaner wheels 4060-1, 4060-2 are oriented to diverge outwardly and rearwardly such that the tines 4062 of the row cleaner wheels 4060-1, 4060-2 interlace at the forward end as they rotate. In operation, as the planter 10 moves in the forward direction of travel 11, the soil engages with the tines 4062, causing the row cleaner wheels 4060-1, 4060-2 to rotate. Due to their orientation, as the row cleaner wheels 4060-1, 4060-2 rotate, they direct any crop residue, soil clods or other debris laterally outwardly to provide a cleaner seed bed for the rearwardly aligned trench opening assembly 234. The gauge wheel 4050 serves to firm the soil 40 that may be disturbed by row cleaner wheels 4060-1, 4060-2 before the trench 38 is opened by the trench opening assembly 234. Firming the soil with the gauge wheel 4050 may be advantageous in dry soils to prevent soil 40 from falling into trench 38.

An actuator system 4300 is positioned within the fame assembly 4100 to provide an adjustable downforce and optionally a lift force to the gauge wheel 4050 and row cleaner wheels 4060-1, 4060-2. In this embodiment, the actuator system 4300 utilizes two airbags 4302 and 4304 (FIG. 63), but the actuator system 4300 may utilize any actuator that provides an adjustable downforce and an optional lift force, including pneumatic cylinders, hydraulic cylinders, air bags, and electromechanical actuators as discussed in more detail later.

Figure 61:
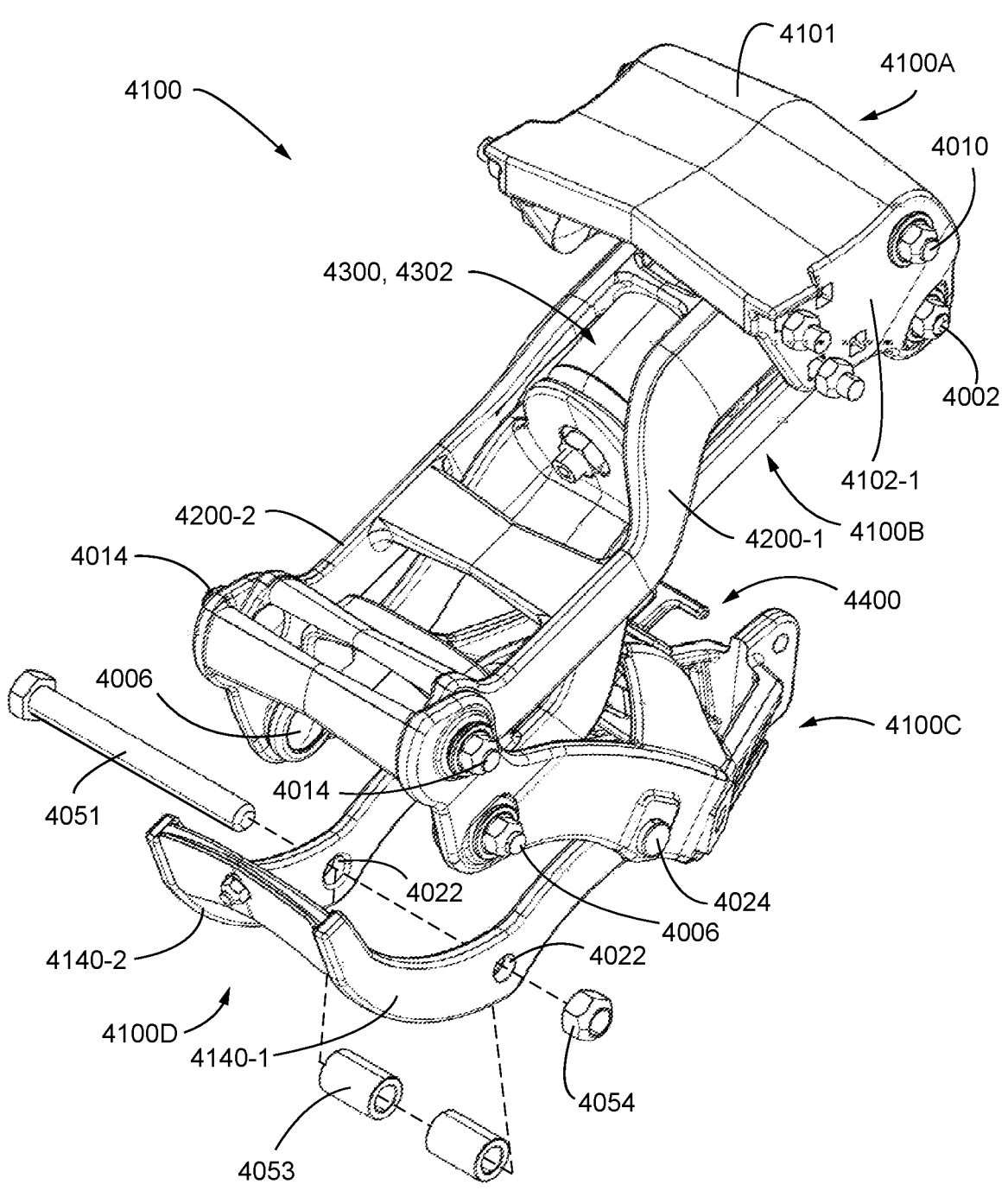
FIG. 61 is a rear perspective view of the row cleaner assembly of FIG. 54 with the row cleaning wheels and gauge wheel removed to better illustrate an embodiment of the frame assembly.
Figure 62:
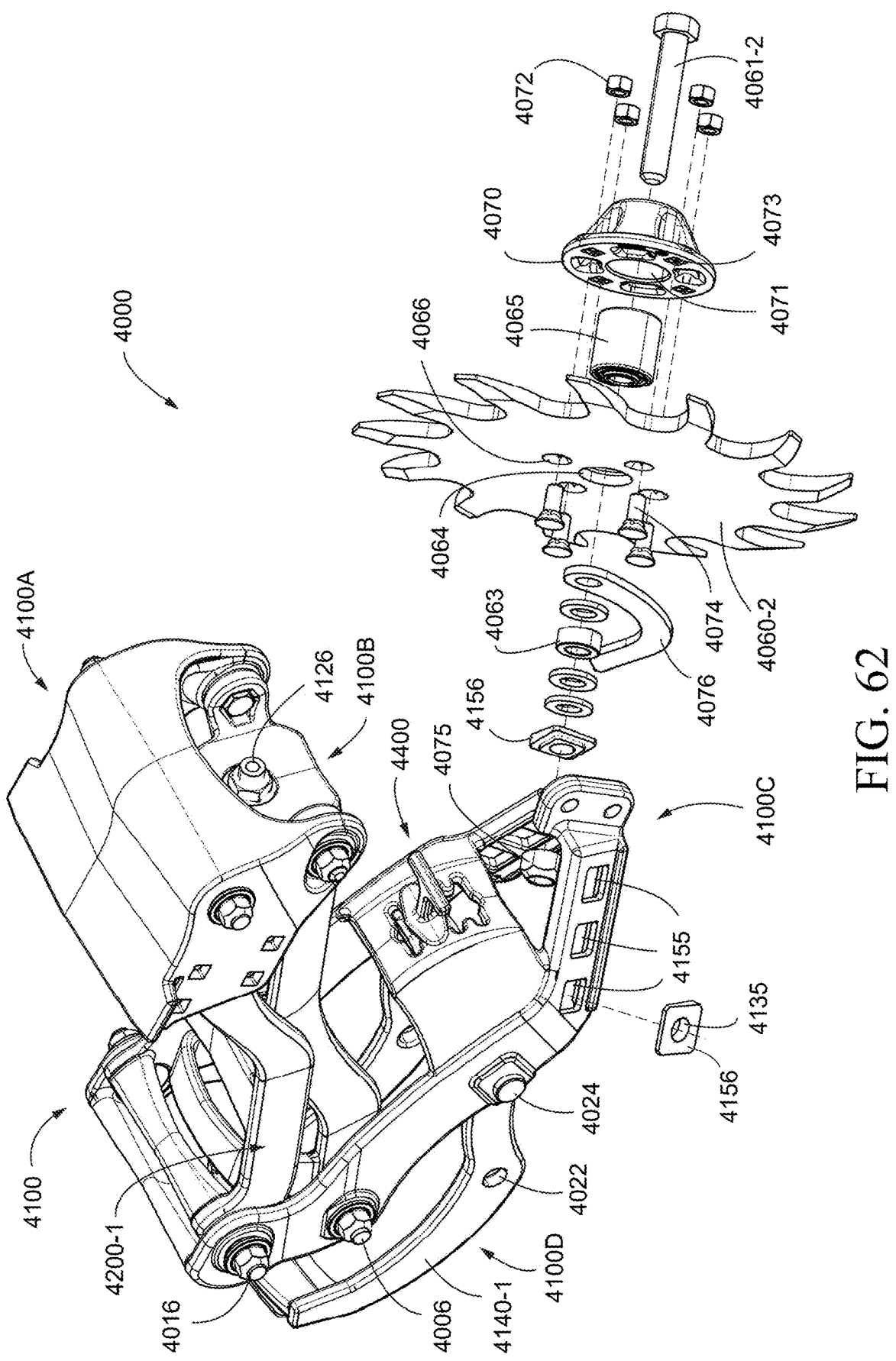
FIG. 62 is front perspective view of the frame assembly of FIG. 54 and showing an exploded view of an embodiment of one of the row cleaner wheels.
Figure 63:
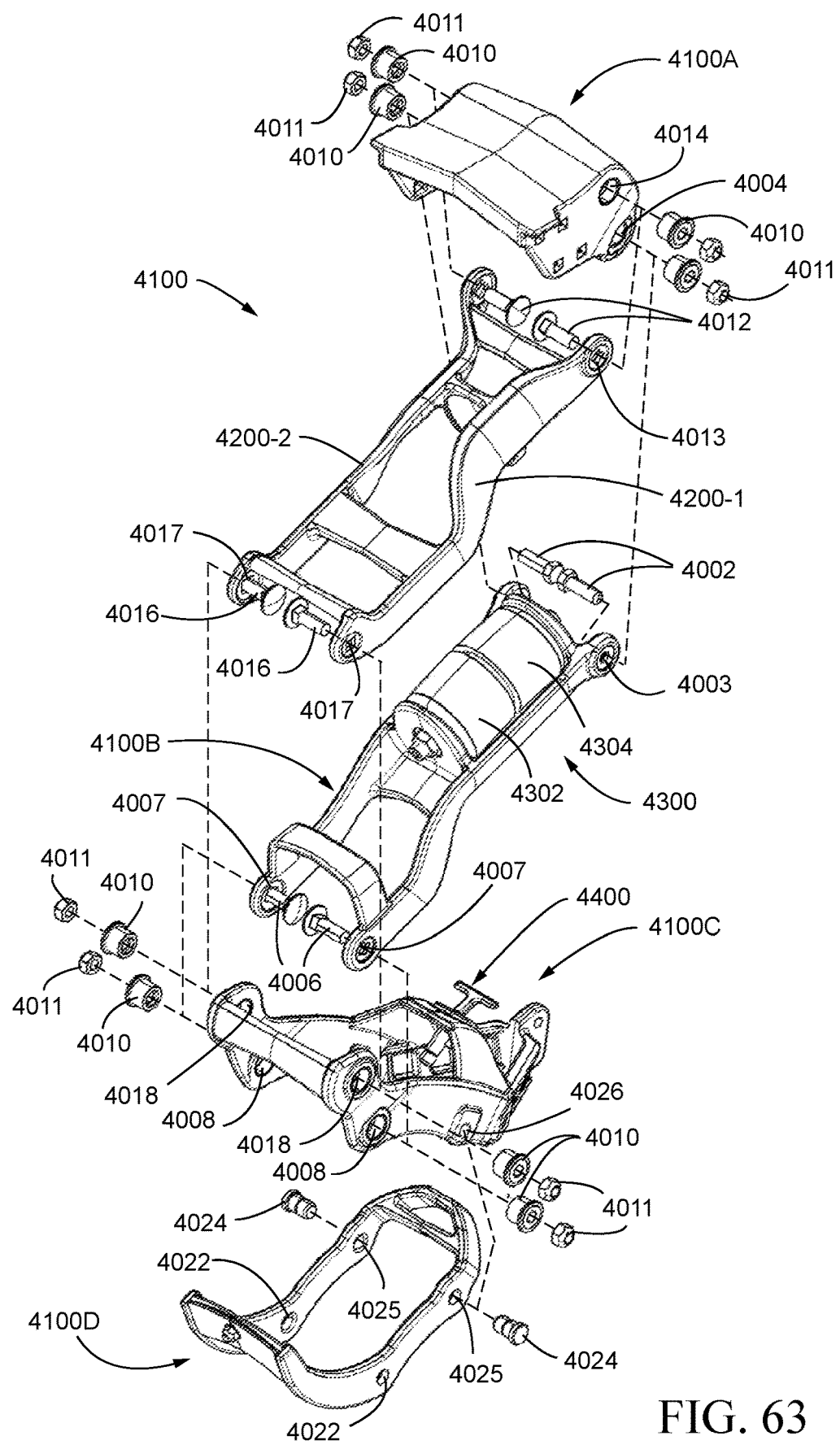
FIG. 63 is an exploded rear perspective view of the frame assembly of FIG. 54.
Figure 64:
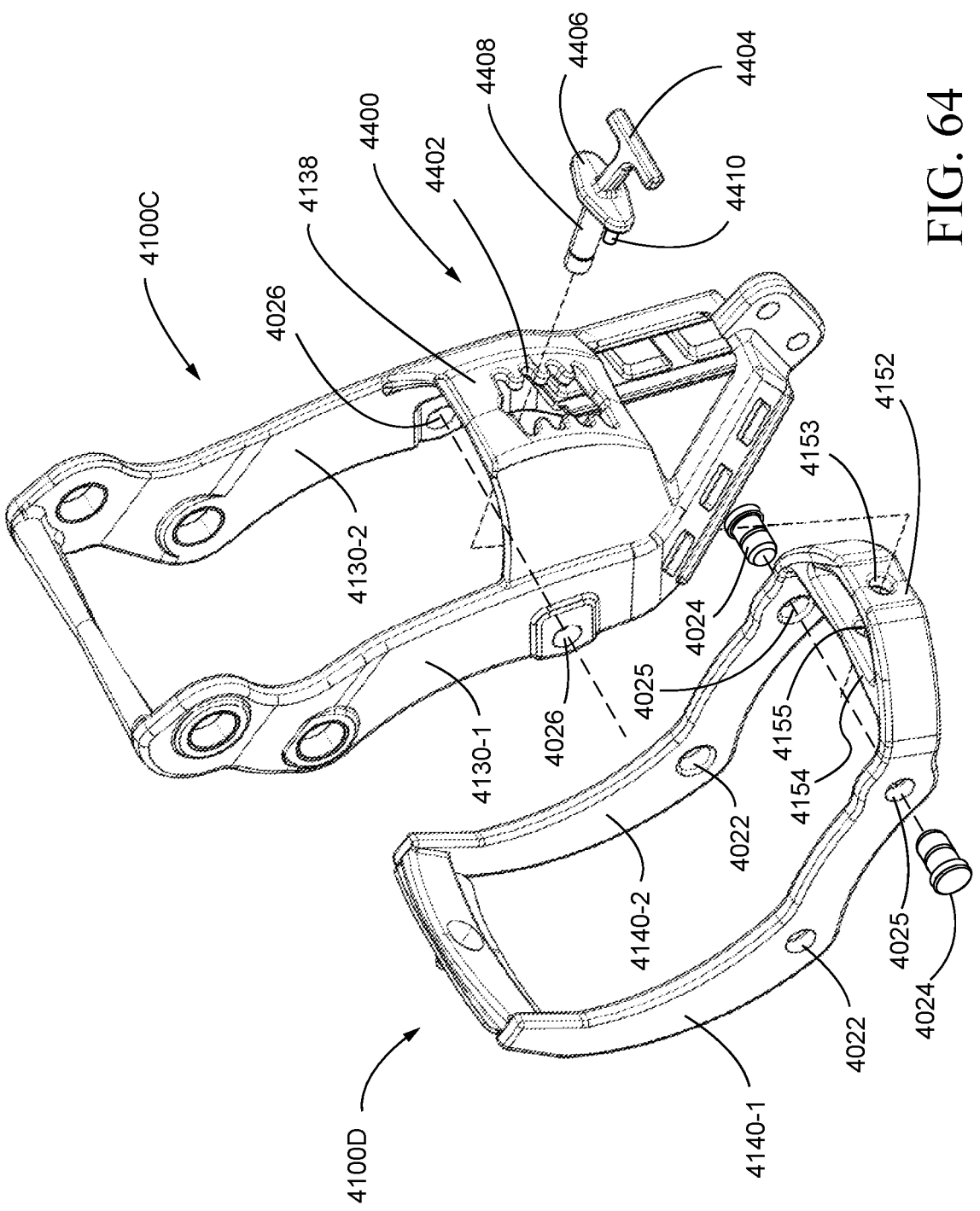
FIG. 64 is an exploded perspective view of the lower subframe and rear strut subframe of the frame assembly of FIG. 54 showing an exploded view of an embodiment of a depth selector.
Figure 65:
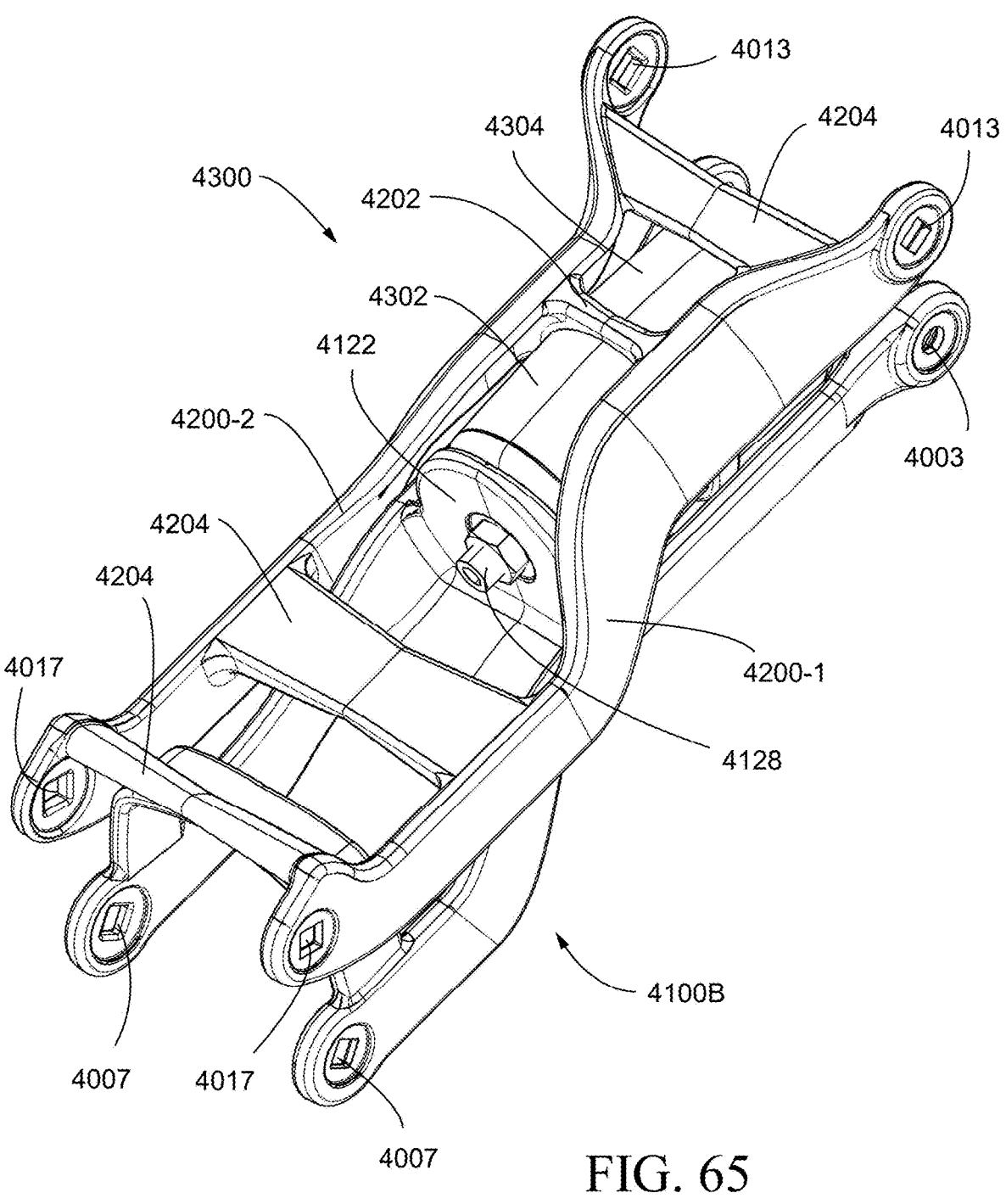
FIG. 65 is a perspective view of the intermediate subframe and linkages of the frame assembly of FIG. 54 and showing an embodiment of an actuator system.

FIG. 61 is a rear perspective view of the frame assembly 4100 with the gauge wheel 4050, the row cleaner wheels 4060-1, 4060-2 removed for clarity. FIG. 62 is a front perspective view of the frame assembly 4100 with the gauge wheel 4050 and actuator system 4300 and the first row cleaner wheel 4060-1 removed, but showing an exploded view of the second row cleaner wheel 4060-2 and its mounting components. FIG. 63 is an exploded rear perspective view of the frame assembly 4100. Referring to FIGS. 61-64, the frame assembly 4100 includes an upper subframe 4100A, an intermediate subframe 4100B, a lower subframe 4100C, a rear strut subframe 4100D, and first and second linkages 4200-1, 4200-2. The rear strut subframe 4100D comprises a part of the lower subframe 4100C. FIG. 64 is an exploded front perspective view showing lower subframe 4100C and the rear strut subframe 4100D. FIG. 65 shows a perspective view of the intermediate subframe 3100B and the linkages 3200-1, 32002 with the first and second airbags 4302, 4304 of the actuator assembly 4300. The subframes 4100A, 4100B, 4100C, 4100D and linkages 4200-1, 4200-2 are described in more detail later.

As best illustrated in FIG. 63, the intermediate subframe 4100B is pivotally connected at its forward end to the upper subframe 4100A by threaded connectors 4002 received within aligned apertures 4003, 4004 in the respective intermediate subframe 4100B and upper subframe 4100A. The threaded connectors 4002 and apertures 4003, 4004 may be threaded as shown in the previous embodiments 1000, 2000. Alternatively, as shown, the apertures 4003 in the intermediate subframe 4100B may be square apertures that receive a square shank portion of the threaded connector 4002. The aperture 4004 in the upper subframe 4100A may be sized to receive a collared bushing 4010 retained by a nut 4011 received over the threaded end of the threaded connector 4002. The intermediate subframe 4100B is pivotally connected at its rearward end by threaded connectors 4006 received within apertures 4007, 4008 in the respective intermediate subframe 4100B and in the lower subframe 4100C. The threaded connectors 4006 and apertures 4007, 4008 may be threaded as shown in the previous embodiments 1000, 2000. Alternatively, as shown, the apertures 4007 in the intermediate subframe 4100B may be square apertures that receive a square shank portion of the threaded connector 4006. The aperture 4008 in the lower subframe 4100C may be sized to receive a collared bushing 4010 retained by a nut 4011 received over the threaded end of the threaded connector 4006.

The first and second linkages 4200-1, 4200-2 are pivotally connected at their forward end to the upper subframe 4100A by threaded connectors 4012 received within aligned apertures 4013, 4014 in the respective first and second linkages 4200-1, 4200-2 and the upper subframe 4100A. The threaded connectors 4012 and apertures 4013, 4014 may be threaded as shown in the previous embodiments 1000, 2000. Alternatively, as shown, the apertures 4013 in the linkages 4200-1, 4200-2 may be square apertures that receive a square shank portion of the threaded connector 4012. The aperture 4014 in the upper subframe 4100A may be sized to receive a collared bushing 4010 retained by a nut 4011 received over the threaded end of the threaded connector 4012. The first and second linkages 4200-1, 4200-2 are pivotally connected at their rearward end to the lower subframe 4100C by threaded connectors 4016 received within aligned apertures 4017, 4018 in the respective first and second linkages 4200-1, 4200-2 and lower subframe 4100C. The threaded connectors 4016 and apertures 4017, 4018 may be threaded as shown in the previous embodiments 1000, 2000. Alternatively, as shown, the apertures 4017 in the linkages 4200-1, 4300-2 may be square apertures that receive a square shank portion of the threaded connector 4016. The aperture 4018 in the lower subframe 4100C may be sized to receive a collared bushing 4010 retained by a nut 4011 received over the threaded end of the threaded connector 4016.

The rear strut subframe 4100D is pivotally connected to the lower subframe 4100C by threaded connectors 4024 received within aligned apertures 4025, 4026 (scc FIG. 63) in the respective rear strut subframe 4100D and the lower subframe 4100C. As best viewed in FIGS. 62 and 64, the rear strut subframe 4100D is also linked with the lower subframe 4100C by the depth selector 4400 (discussed later). It should be appreciated that the forward pivotal connections of the upper subframe 4100A with the intermediate subframe 4100B and the linkages 4200-1, 4200-2, together with the rearward pivotal connections of the intermediate subframe 4100B and the linkages 4200-1, 4200-2 with the lower subframe 4100C provides a four bar linkage that permits the intermediate and lower subframes 4100B, 4100C to move vertically with respect to the upper subframe 4100A rigidly secured to the toolbar 14. It should be apparent that in the 4000A embodiment, the entire rear strut subframe 4100D may be omitted since its primary purpose is to support the gauge wheel 4050 which is not present in the 4000A embodiment. However, as explained in detail later, the rear strut subframe 4100D cooperates with the lower subframe 4100C to enable depth selection via the depth selector 4400. Thus, if depth selection is desired, the embodiment of the row cleaner assembly 4000A may be used with the rear strut subframe 4100D, thereby simply omitting the gauge wheel 4050 and the gauge wheel axle bolt 4051.

Figure 66:
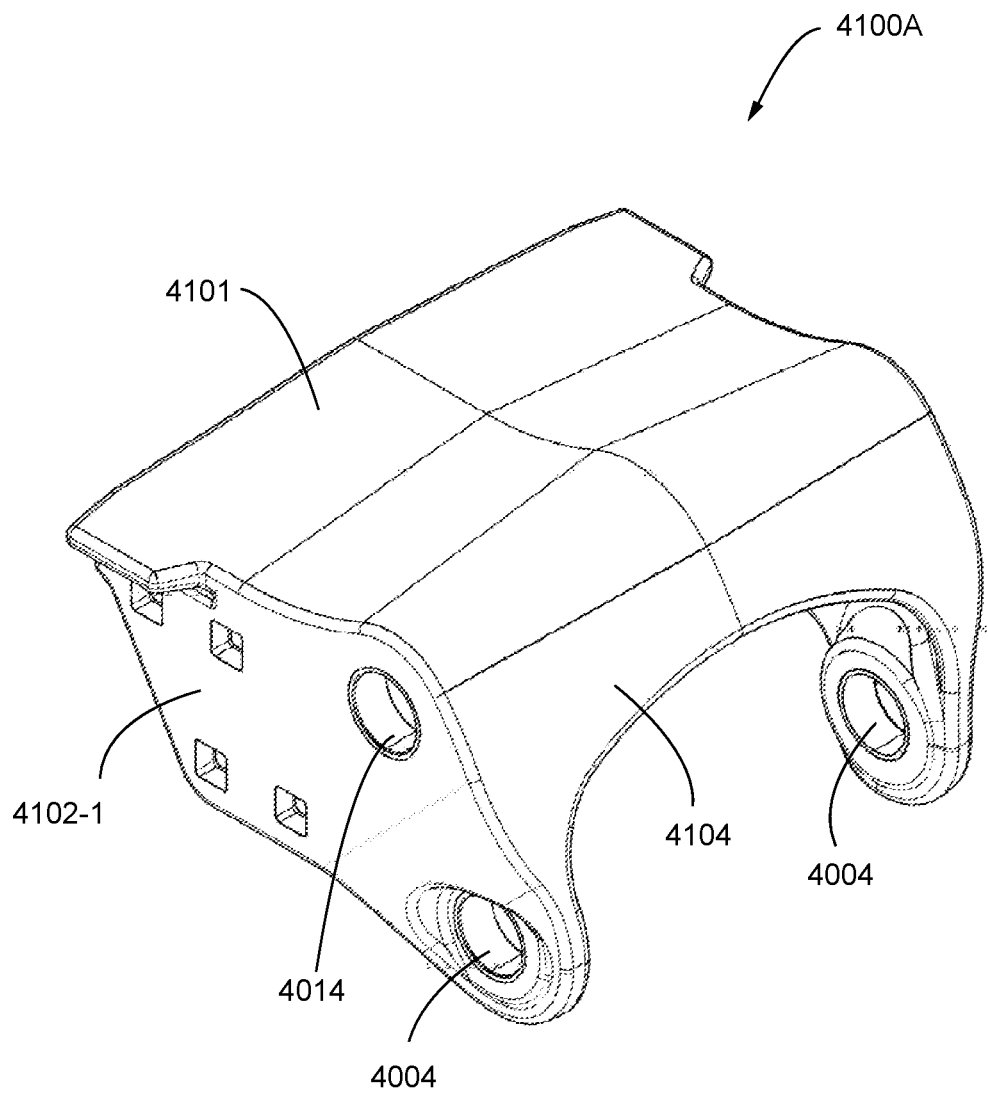
FIG. 66 is an exploded rear perspective view of an embodiment of the upper subframe of the frame assembly of FIG. 54.

FIG. 66 shows a front perspective view of the upper subframe 4100A. In this embodiment, the upper subframe 4100A is shown as being a unitary casted member, but it may be made of individual parts connected by tabs and slots as described in connection with the embodiments 1000, 2000, 3000 above, or the individual parts may be joined by welding or by bolted connections. The upper subframe 4100A includes first and second gusset plates 4102-1, 4102-2 that extend downwardly from a top plate or surface 4101 and are laterally spaced by a front plate or surface 4104. The gusset plates 4102-1, 4102-2 include the apertures 4004, 4014 for receiving the threaded connectors 4002, 4012, respectively, for attaching the intermediate subframe 4100B and the rails 4200-1, 4200-2 respectively as described above in connection with FIG. 63.

Figure 68:
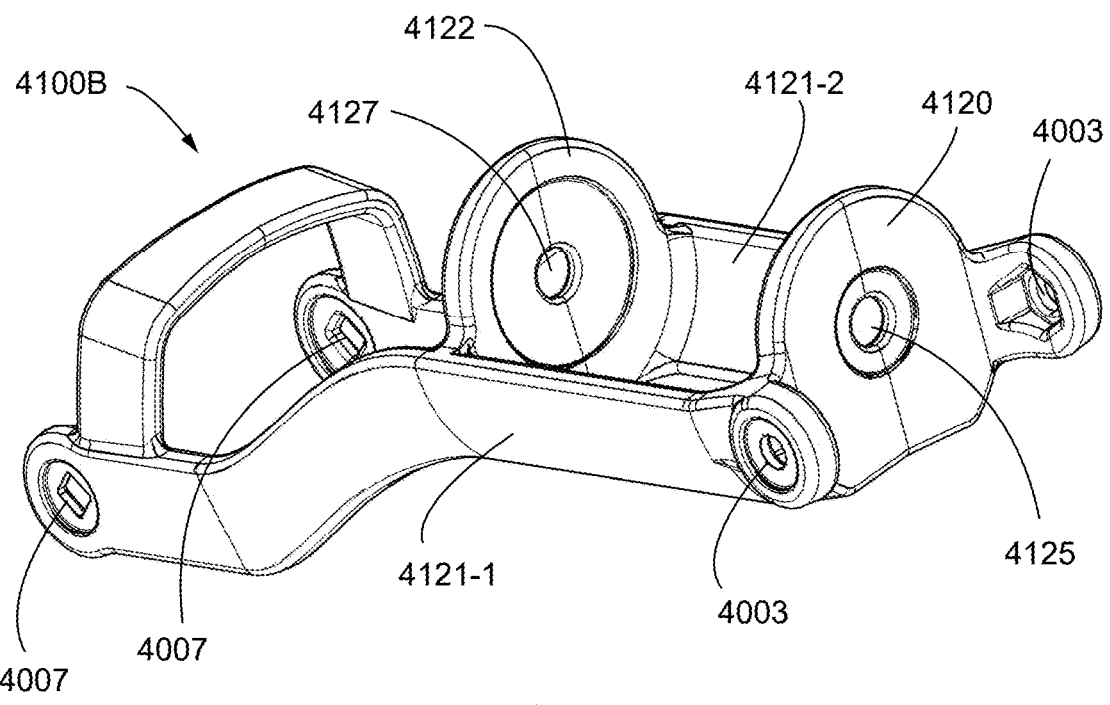
FIG. 68 is a perspective view of an embodiment of intermediate subframe of the frame assembly of FIG. 54.

FIGS. 63 and 68 show rear and front perspective views respectively of the intermediate subframe 4100B. Again, in this embodiment, the intermediate subframe 4100B is shown as being a unitary casted member, but it may be made of individual parts connected by tabs and slots as described in connection with the embodiments 1000, 2000, 3000 above, or the individual parts may be joined by welding or by bolted connections. The intermediate subframe 4100B includes a forward base member 4120 and a rearward base member 4122 and first and second side rails 4121-1, 4121-2. The forward base member 4120 includes an aperture 4125 through which a nipple of the first airbag 4302 extends and which receives a fitting 4126 (FIG. 62) that threadably secures the second airbag 4304 to the forward base member 4120. The rearward base member 4122 includes an aperture 4127 through which a nipple of the first airbag 4302 extends and which receives a fitting 4128 (FIG. 65) that threadably secures the first airbag 4302 to the rearward base member 4122. Each of the side rails 4121-1, 4121-2 includes the forward aperture 4003 for receiving the threaded connector 4002 for pivotally securing the side rails 4121-1, 4121-2 of the intermediate subframe 4100B to the gussets 4102-1, 4102-2 of the upper subframe 4100A as described above in connection with FIG. 63. Each of the side rails 4121-1, 4121-2 includes the rearward aperture 4007 for receiving the threaded connector 4006 as described above in connection with FIG. 63.

Figure 67:
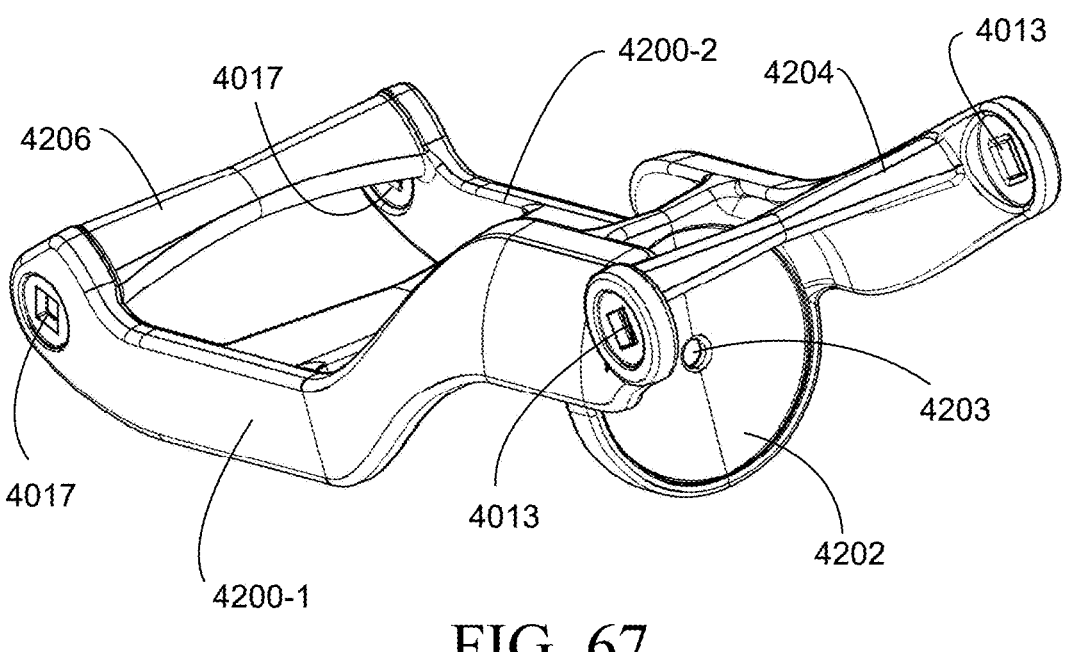
FIG. 67 is perspective view of an embodiment of the linkage of the frame assembly of FIG. 54.

FIGS. 63 and 67 show rear and front perspective views respectively of the first and second linkages 4200-1, 4200-2. Again, in this embodiment, the first and second linkages 4200-1, 4200-2 are shown as being joined as a unitary member, such as by casting, but the linkages may be made of individual parts connected by tabs and slots as described in connection with the embodiment 3000 above, or the individual parts may be joined by welding or by bolted connections. The first and second linkages 4200-1, 4200-2 may be connected by a forward plate 4202. The forward plate may include an aperture 4203 for receiving a threaded connector (not shown) for attaching the forward and rearward ends, respectively of the first and second airbags 4302, 4304 to the forward plate. One or more lateral members 4204 may connect between the first and second linkages 4200-1, 4200-2 to provide structural rigidity. Each of the linkages 4200-1, 4200-2 includes the forward aperture 4013 for receiving the threaded connector 4012 for pivotally securing the linkages 4200-1, 4200-2 to the gussets 4102-1, 4102-2 of the upper subframe 4100A as described above in connection with FIG. 63. Each of the linkages 4200-1, 4200-2 includes the rearward aperture 4017 for receiving the threaded connector 4016 as described above in connection with FIG. 63.

Figure 69:
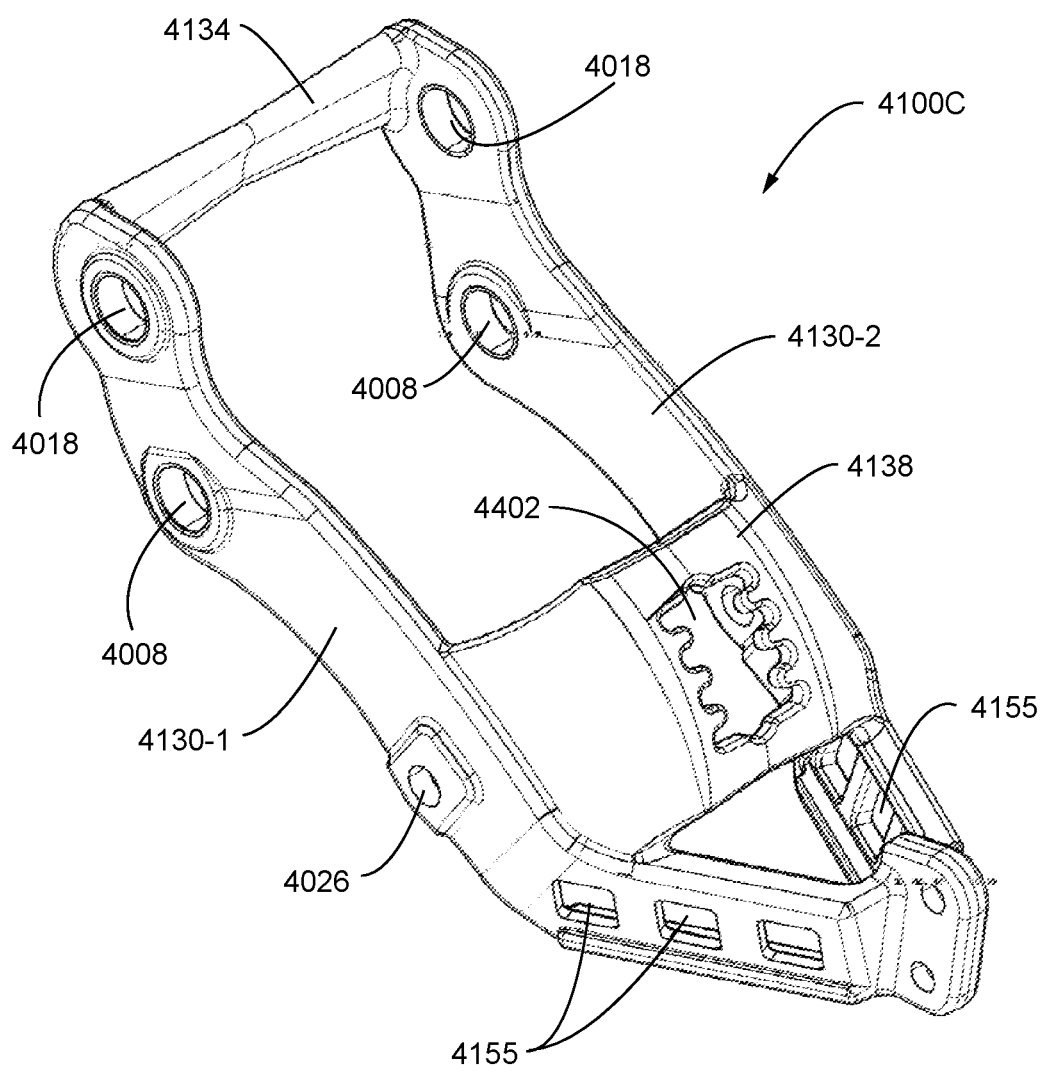
FIG. 69 is a front perspective view of an embodiment of the lower subframe of the frame assembly of FIG. 54.

FIG. 69 shows front perspective view of the lower subframe 4100C. Again, in this embodiment, the lower subframe 4100C is shown as being a unitary casted member, but it may be made of individual parts connected by tabs and slots as described in connection with the embodiments 1000, 2000, 3000 above, or the individual parts may be joined by welding or by bolted connections. The lower subframe 4100C includes first and second row cleaner wheel support arms 4130-1, 4130-2 connected at their forward end. A rear lateral member 4134 may extend between the rearward ends of the support arms 4120-1, 4120-2 to provide structural rigidity. An arched panel 4138 extends across the row cleaner wheel support arms 4130-1, 4130-2 toward their forward end. The arched panel 4138 includes a notched opening 4402 discussed in more detail later in connection with the description of the depth adjuster 4400. Each of the row cleaner wheel support arm 4130-1, 4130-2 also includes the opening 4026 that aligns with the aperture 4025 in the rear strut subframe 4100D for receiving a pin 4024 for pivotally attaching the lower subframe 4100C to the rear strut subframe 4100D (see FIG. 64). Each row cleaner wheel support arm 4130-1, 4130-2 also includes the apertures 4008, 4018 for receiving the respective threaded connectors 4006, 4016 for connecting the respective intermediate subframe 4100B and the linkages 4200-1, 4200-2 as described above in connection with FIG. 63. Each of the first and second row cleaner wheel support arms 4130-1, 4130-2 an apertures 4135 for receiving the row cleaner wheel axle bolts 4061-1, 4061-2. A plurality of apertures 4135 spaced along the row cleaner wheel support arms 4130-1, 4130-2 may be provided to permit the row cleaner wheels to be positioned forwardly or rearwardly as desired depending on the size or configuration of the row cleaner wheels. In one embodiment, as best shown in FIG. 62, oversized rectangular openings 4155 may be formed or fabricated in the row cleaner wheel support arms 4130-1, 4130-2 to receive rectangular beveled washers 4156 having the aperture 4135 therein to receive the row cleaner wheel axle bolt 4060-1, 4060-2. The beveled washers 4156 may have different beveled pitches that may be oriented within the rectangular openings to provide different tilt angles (e.g., pitch, roll or yaw) for the row cleaner wheels depending on field conditions.

Figure 70:
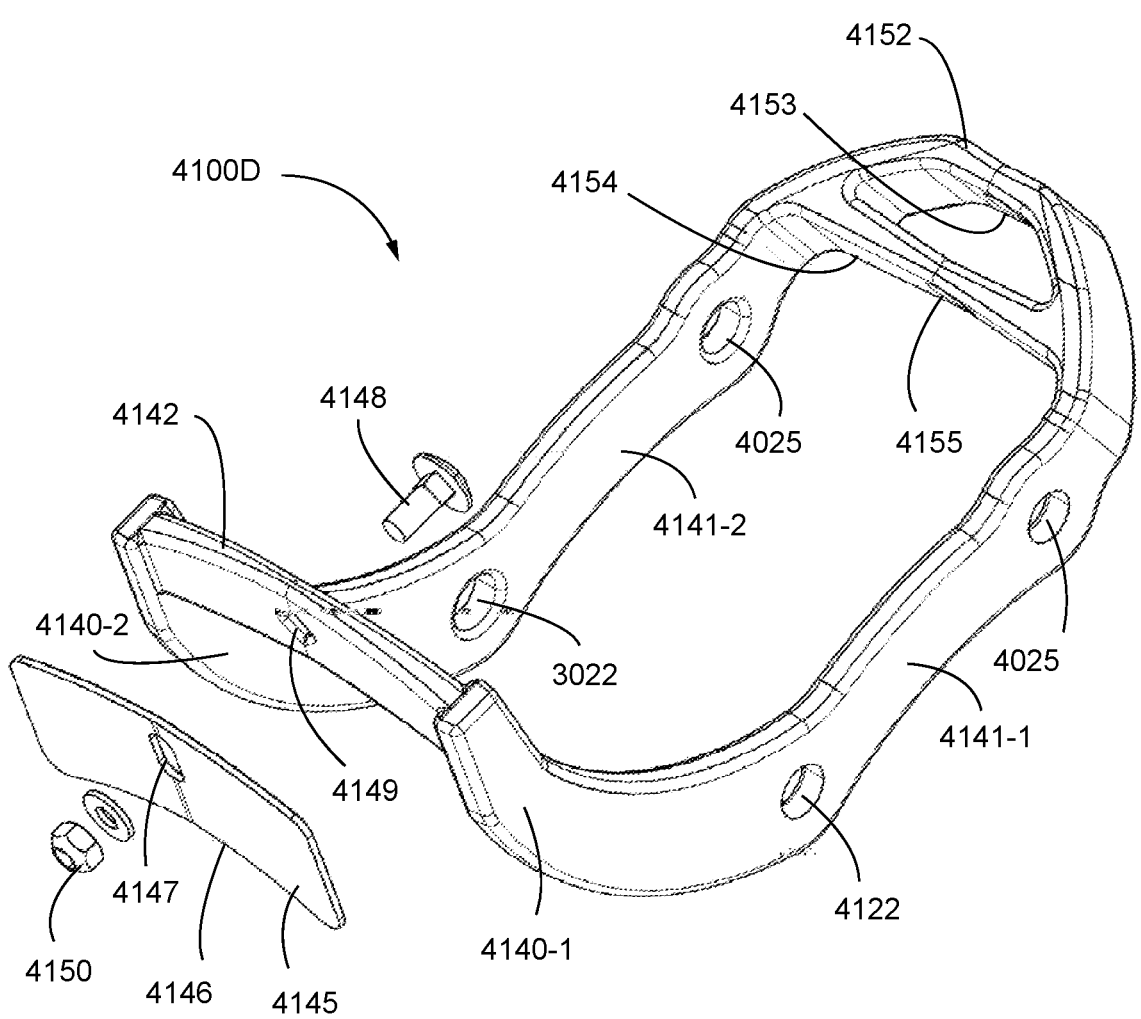
FIG. 70 is a rear perspective view of rear strut subframe of the frame assembly of FIG. 54.

FIG. 70 is a rear perspective view of the rear strut subframe 4100D. Again, in this embodiment, the rear strut subframe 4100D is shown as being a unitary casted member, but it may be made of individual parts connected by tabs and slots as described in connection with the embodiments 1000, 2000, 3000 above, or the individual parts may be joined by welding or by bolted connections. The rear strut subframe 4100D includes first and second struts 4140-1, 4140-2. A lateral member 4142 may extend between the struts 4140-1, 4140-2. Each of the struts 4140-1, 4140-2 include the aperture 4022 for receiving the axle wheel bolt 4051 as described above in connection with FIG. 63. In this embodiment, each of the struts 4140-1, 4140-2 include forwardly extending arms 4141-1, 4141-2 joined at their forward end by longitudinally spaced first and cross members 4152, 4154. The first cross member 4152 includes a first aperture 4153 and the second cross member 4154 includes a second aperture 4155 that is longitudinally aligned with the first aperture 4153. The apertures 4153, 4155 are configured to receive the depth selector 4400 discussed later.

The rear strut subframe 4100D may include a scraper 4145 to remove soil or debris that may build up on the gauge wheel 4050 during operation. The scraper 4145 may be attached to the lateral member 4142 between the struts 4140-1, 4140-2 and may comprise a plate having an arcuate edge 4146 that approximates the profile of the gauge wheel 4050 (see FIG. 58). The scraper 4145 may be attached to the lateral member 4142 with a bolt 4148 extending through an aperture 4149 in the lateral member 4142 and through an elongated hole in the scraper 4147 and secured by a nut 4150. The elongated hole 4147 permits the scraper 4145 to be adjustably positioned relative to the lateral plate 4142 to vary the distance to the gauge wheel 4050 to accommodate different gauge wheel sizes and profiles and to account for wear of the gauge wheel tread and the scraper 4145.

Referring to the exploded view of FIG. 64, a depth selector 4400 enables the angle or position of the lower subframe 4100C to be selectively adjusted relative to the rear strut subframe 4100D. The depth selector 4400 includes a handle 4404 attached to a base 4406. A shaft 4408 extends downwardly from the base 4406. The base 4406 also includes downwardly extending laterally spaced pegs 4410 that seat within the notches of the notched opening 4402 in the arched panel 4138 of the lower subframe 4100C. The shaft 4408 extends through the notched opening 4402 and through the first aperture 4153 in the first and second cross members 4152 and seats in the second aperture 4155 in the second cross member 4154 of the rear strut subframe 4100D. A spring (not shown) is retained on the shaft 4408 between the first and second cross members 4152, 4154 of the rear strut subframe 4100D. To adjust the angle or position of the lower subframe 3100C with respect to the rear strut subframe 4100D (thus increasing or decreasing the depth of penetration of the row cleaner wheels 4060-1, 4060-2 into the soil), the operator grasps the handle 4404 and exerts an upward force causing the spring to compress, disengaging the pegs 4410 from the notches of the notched opening 4402. With the pegs 4410 disengaged from the notches, the operator can pivot the lower subframe 4100C with respect to the rear strut subframe 4100D about the axis of the pins 4024 pivotally coupling the lower subframe 4100C with the rear strut subframe 4100D. Once the lower subframe 4100C is at the desired angle or position, the operator releases the upward pressure on the handle 4404 and the spring bias reseats the pegs 4410 within the notches of the notched opening 4402, thereby securely retaining the lower subframe 4100C at the desired angle or position with respect to the rear strut subframe 4100D corresponding to the desired row cleaner wheel depth.

Referring to FIG. 62, the first and second row cleaner wheels 4060-1, 4060-2 are respectively secured to the first and second row cleaner wheel support arms 4030-1, 4030-2 of the lower subframe 4100C with a row cleaner wheel axle bolt 4061-2, 4061-2. Each row cleaner wheel axle bolt 4061-2, 4061-2 extends through a central opening 4064 within each of the respective first and second cleaner wheels 4060-1, 4060-2. A bushing 4065 is received over the end of each row cleaner wheel axle bolts 4061-2, 4061-2 and the bushing is received within a hub 4070 having a central opening 4071. The hub 4070 is secured to the respective first and second row cleaner wheels 4060-1, 4060-2 by nuts 4072 threadably received over threaded connectors 4074 which extend through apertures 4066 in the row cleaner wheels 4060-1, 4060-2 and through aligned holes 4073 in the hub 4070. A nut 4075 on the back side the row cleaner wheel support arms 4030-1, 4030-2 receives the end of the wheel axle bolts 4061-2, 4061-2 thereby axially restraining the row cleaner wheels 4060-1, 4060-2 onto the respective row cleaner wheel axle bolts 4061-2, 4061-2, while the bushing 4065 permits the row cleaner wheels 4060-1, 4060-2 to freely rotate about the respective row cleaner wheel axle bolts 4061-2, 4061-2. A spacer 4063 and washers may be provided over the row cleaner axle bolts 4061-1, 4061-2 to position the row cleaner wheels 4060-1, 4060-2 outwardly away from the row cleaner wheel support arms 4130-1, 4130-2. FIG. 62 also shows a scraper 4076 that may be provided over the row cleaner axle bolts 4061-1, 4061-2 to scrape dirt or mud from the row cleaner wheels 4060-1, 4060-2 as they rotate.

Referring to FIGS. 54 and 61, the gauge wheel axle bolt 4051 extends through the aperture 4022 in the rear strut subframe 4100D and through the hub of the gauge wheel 4050. Spacer bushings 4053 (FIG. 61) may be disposed on the gauge wheel axle bolt 4051 on each side of the hub to keep the gauge wheel 4050 centered between the struts 4040-1, 4040-2. A nut 4054 threads onto the end of the gauge wheel axle bolt 4051 securing the gauge wheel 4050 to the rear strut subframe 4100D.

Referring to FIGS. 63 and 65, the actuator system 4300 may comprise first and second airbags 4302, 4304 disposed within the intermediate subframe 4100B and cooperating with the linkages 4200-1, 4200-2. The first airbag 4302, rearward of the second airbag 4304, is connected at its rearward end to the rearward plate 4122 of the intermediate subframe 4100B and is connected at its forward end to the lateral member 4202 between the first and second linkages 4200-1, 4200-2. The second airbag 4304 is connected at its rearward end to the same lateral member 4202 and is connected at its forward end to forward plate 4120 (FIG. 68) of the intermediate subframe 4100B. The operation of the actuator system 4300 with respect to exerting down force and lift force to the gauge wheel 4050 and the row cleaner wheels 4060-1, 4060-2 operates in substantially the same manner as explained above in connection with the embodiment of the row cleaner assembly 3000 described above with reference to FIGS. 52A and 52B and therefore it will not be repeated here.

Rather than airbags for the actuator system 4300, the first and second actuators 4302, 4304 may be any type of single acting or dual acting actuators that may be configured to provide an adjustable downforce and an optional lift force, including pneumatic cylinders, hydraulic cylinders, air bags, and electromechanical actuators. In still other embodiments, a single acting actuator, such as an airbag and a forward spring assembly similar to the spring assembly 2300 described above in connection with the second row cleaner assembly embodiment 2000 may be utilized. The downforce exerted by the actuator system 4300 on the gauge wheel 4050 and row cleaner wheels 4060-1, 4060-2 may be controlled by a controller (such as the "controller 300" referenced in U.S. Pat. No. 8,550,020) or by a fluid control port (such as the "fluid control port 10" described in PCT Publication No. WO2300/056395). The actuator system 4300 of each of the row cleaner assemblies 4000 of the planter 10 may be controlled on a row-by-row basis, or as groups by section of the planter 10, or collectively across the entire planter 10.

The desired amount of downforce may be a function of the soil conditions and the amount or type of crop residue and the depth at which the row cleaner wheels 4060 are set for engagement with the soil. For example, in dry soil conditions, more downforce may be desired such that the gauge wheel 4050 will more firmly pack the soil 40 in front of the opening assembly 234 for formation of a better seed trench 38 and to prevent or minimize soil falling into the seed trench 38 before the seed is deposited. Alternatively in wet soil conditions, less downforce may be desired. A downforce monitoring system (discussed later) may be employed for determining and regulating the downforce applied by the actuator system 4300.

Alternative Mounting Arrangements

Figure 71:
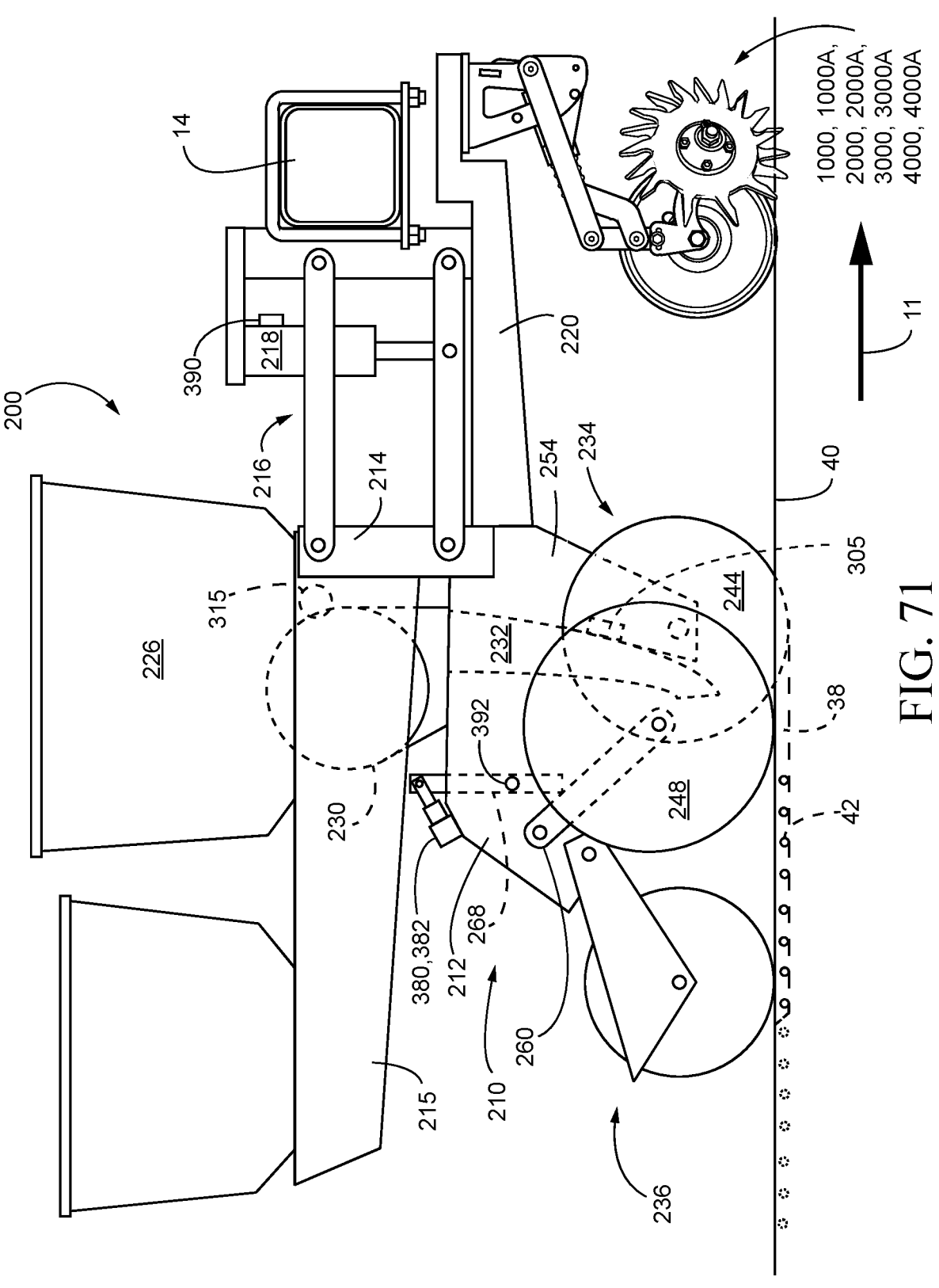
FIG. 71 is a side elevation view of another embodiment of a planter row unit showing an alternative mounting arrangement for any of the preceding embodiments of the row cleaner assemblies.

FIG. 71 illustrates an alternative mounting arrangement that may be utilized with any of the embodiments of the row cleaner assemblies 1000, 1000A, 2000, 2000A, 3000, 3000A, 4000, 4000A described above. Instead of mounting the row cleaner assemblies 1000, 1000A, 2000, 2000A, 3000, 3000A, 4000, 4000A to the toolbar 14 as shown in FIGS. 2, 2A, 18, 18A, 34, 34A, 53, 53A, the row cleaner assemblies 1000, 1000A, 2000, 2000A, 3000, 3000A, 4000 or 4000A may be mounted to the row unit frame shank 254 or to other structural members of the row unit frame 210 with a mounting bracket 220 as shown in FIG. 71. Although FIG. 71 is shown using the embodiment of the row cleaner assembly 1000, the same or similar mounting structure as recognized by those of skill in the art would be suitable for all of the embodiments of the row cleaner assemblies 1000, 1000A, 2000, 2000A, 3000, 3000A, 4000, 4000A. Thus, rather than including separate drawing figures for each of the row cleaner assembly embodiments to which this alternative mounting arrangement may be adapted, FIG. 71 includes reference numbers corresponding to each of the row cleaner assemblies 1000, 1000A, 2000, 2000A, 3000, 3000A, 4000, 4000A to represent that each of those embodiments may be mounted using the mounting bracket 220.

Figure 72:
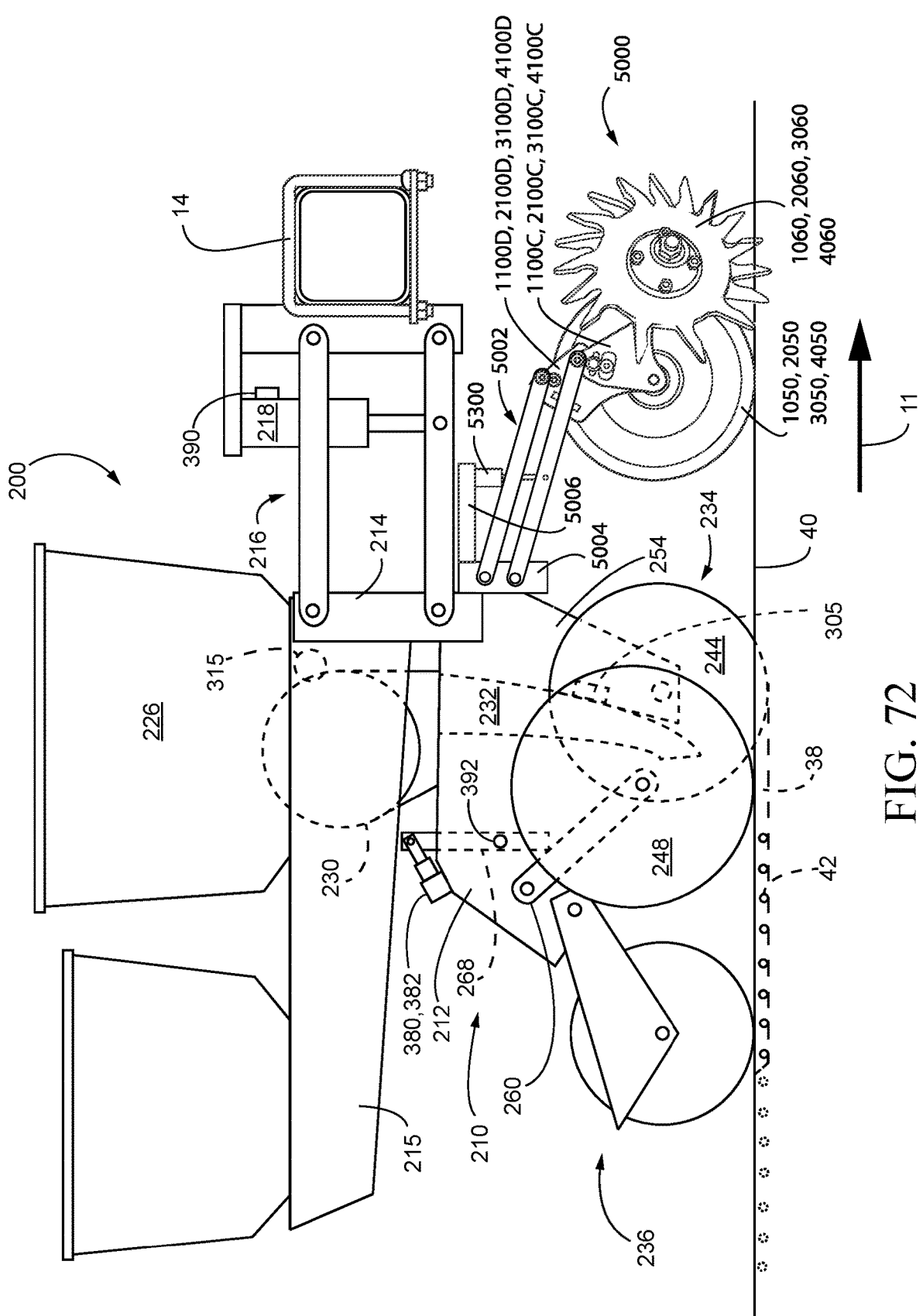
FIG. 72 is a side elevation view of another embodiment of a planter row unit showing another alternative embodiment of a row cleaner assembly and mounting arrangement, therefore.

FIG. 72 illustrates another alternative embodiment that may be utilized with any of the embodiments of the row cleaner assemblies 1000, 1000A, 2000, 2000A, 3000, 3000A, 4000, 4000A described above. In this arrangement a row cleaner assembly is designated generally by reference number 5000 and is shown as being similar to the row cleaner assembly 2000, in that it utilizes the same rear strut subframe 2100D, lower subframe 2100C, gauge wheel 2050 and row cleaner wheels 2060-1, 2060-2 as the row cleaner embodiment 2000. However, in this embodiment, the upper subframe 2100A, the intermediate subframe 2100B, the linkages 2200-1, 2200-2 are removed and replaced with a parallel arm linkage 5002. The parallel arm linkage 5002 is pivotally connect at its rearward end to a row unit bracket 5004 attached to the row unit frame 210. The forward end of the parallel arm linkage 5002 is pivotally attached to the rear strut subframe 2100D and to the lower subframe 2100C, at the same point as the intermediate subframe 2100B and linkages 2200-1, 2200-2 would have been pivotally connected in embodiment 2000. The actuator system 2300 is removed and replaced with the actuator system 5300 connected between a bracket member 5006 and the parallel arm linkage 5002 to provide the desired downforce and optional lift force to the gauge wheel 2050 and row cleaner wheels 2060-1, 2060-2. The actuator system 5300 may utilize any actuator that provides an adjustable downforce and an optional lift force, including pneumatic cylinders, hydraulic cylinders, air bags, and electromechanical actuators. The downforce and optional lift force exerted by the actuator system 5300 may be controlled by a controller (such as the "controller 300" referenced in U.S. Pat. No. 8,550,020) or by a fluid control port (such as the "fluid control port 10" described in PCT Publication No. WO2020/056395). The actuators comprising the actuator system 5300 may be controlled on a row-by-row basis, or as groups by section of the planter 10, or collectively across the entire planter 10.

Although not separately illustrated, the same or a substantially similar modifications may be used with each of the row unit assemblies 1000, 1000A, 2000, 2000A, 3000, 3000A, 4000, 4000A. Rather than including a separate drawing figure for each of the row cleaner assembly embodiments to which this alternative embodiment 5000 may be utilized, FIG. 72 includes reference numbers corresponding to each of the row cleaner assemblies 1000, 1000A, 2000, 2000A, 3000, 3000A, 4000, 4000A to represent that each of those embodiments may be adapted to utilize the alternative embodiment 5000 as described and illustrated in FIG. 72. For example, utilizing the row unit assembly 1000 or 1000A, the upper subframe 1100A, intermediate subframe 1100B, linkages 1200-1, 1200-2, may be removed and replaced with the parallel arm linkage 5002 and actuator system 1300 may be removed and replaced by the actuator system 5300 as described in the paragraph above. Similarly, utilizing the row unit assembly 3000, the intermediate subframe 3100B, linkages 3200-1, 3200-2 may be removed and replaced with the parallel arm linkage 5002 mounted to the lower subframe 3100C) and actuator system 3300 may be replaced by the actuator system 5300 as described in the paragraph above. Similarly, utilizing the row unit assembly 3000A (i.e., without the gauge wheel 3050), the upper subframe 3100A, intermediate subframe 3100B, linkages 3200-1, 3200-2 (and optionally the rear strut subframe 3100D) may be removed and replaced with the parallel arm linkage 5002 mounted to the lower subframe 3100C and the actuator system 3300 may be replaced with the actuator system 5300 as described in the paragraph above. Likewise, the utilizing the row unit assembly 4000 the upper subframe

4100A, intermediate subframe 4100B and linkages 4200-1, 4200-2 may be removed and replaced with the parallel arm linkage 5002 mounted to the lower subframe 4100C) and actuator system 4300 may be replaced by the actuator system 5300 as described above. Similarly, utilizing the row unit assembly 4000A (i.e., without the gauge wheel 4050), the upper subframe 4100A, intermediate subframe 4100B, linkages 4200-1, 4200-2 (and optionally the rear strut subframe 4100D) may be removed and replaced with the parallel arm linkage 5002 mounted to the lower subframe 4100C and the actuator system 4300 may be replaced with the actuator system 5300.

Third Row Cleaning Wheel Assembly

FIGS. 73-80 illustrate another embodiment of a row cleaner assembly 6000 incorporating an embodiment of a third row cleaner wheel assembly 6010. Although FIGS. 73-79 show the row cleaner assembly 6000 utilizing the embodiment of the row cleaner assembly 4000, it should be appreciated that any of the other embodiments of the row cleaner assemblies 1000, 1000A, 2000, 2000A, 3000, 3000A, 4000A, 5000 as previously described may be configured to incorporate a third row cleaner wheel assembly 6010. Thus, rather than including separate sets of drawing figures for each of the row cleaner assembly embodiments, FIGS. 73-80 include reference numbers corresponding to each of the row cleaner assembly frames 1100, 2100, 3100, 4100, their respective components that may be adapted to include the third row cleaner wheel assembly 6010.

Figures 73, 74:
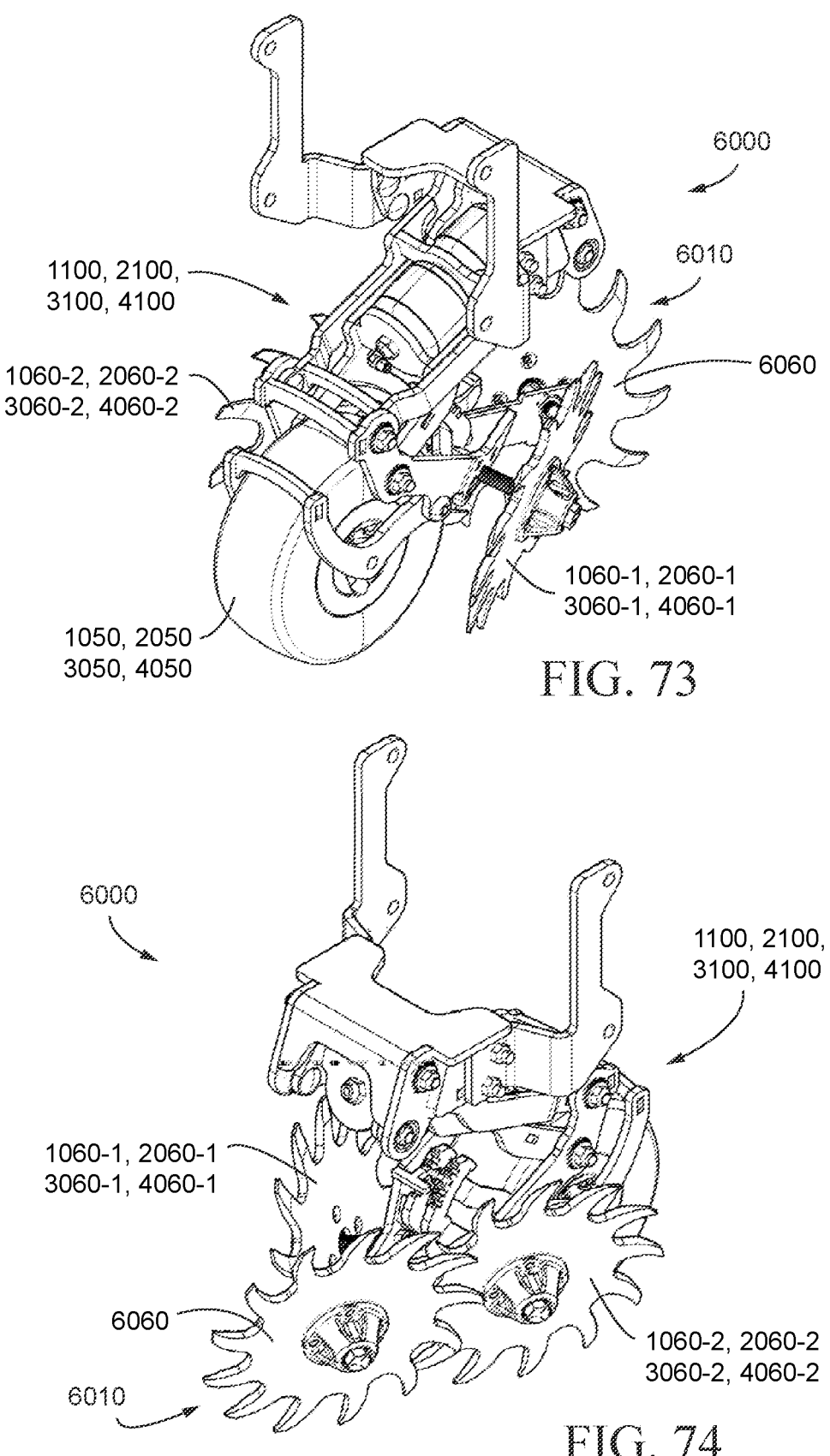
FIG. 73 is a rear perspective view of another embodiment of a row cleaner assembly incorporating an embodiment of a third row cleaner wheel assembly.
FIG. 74 is a front perspective view of the row cleaner assembly of FIG. 73.
Figures 75, 76:
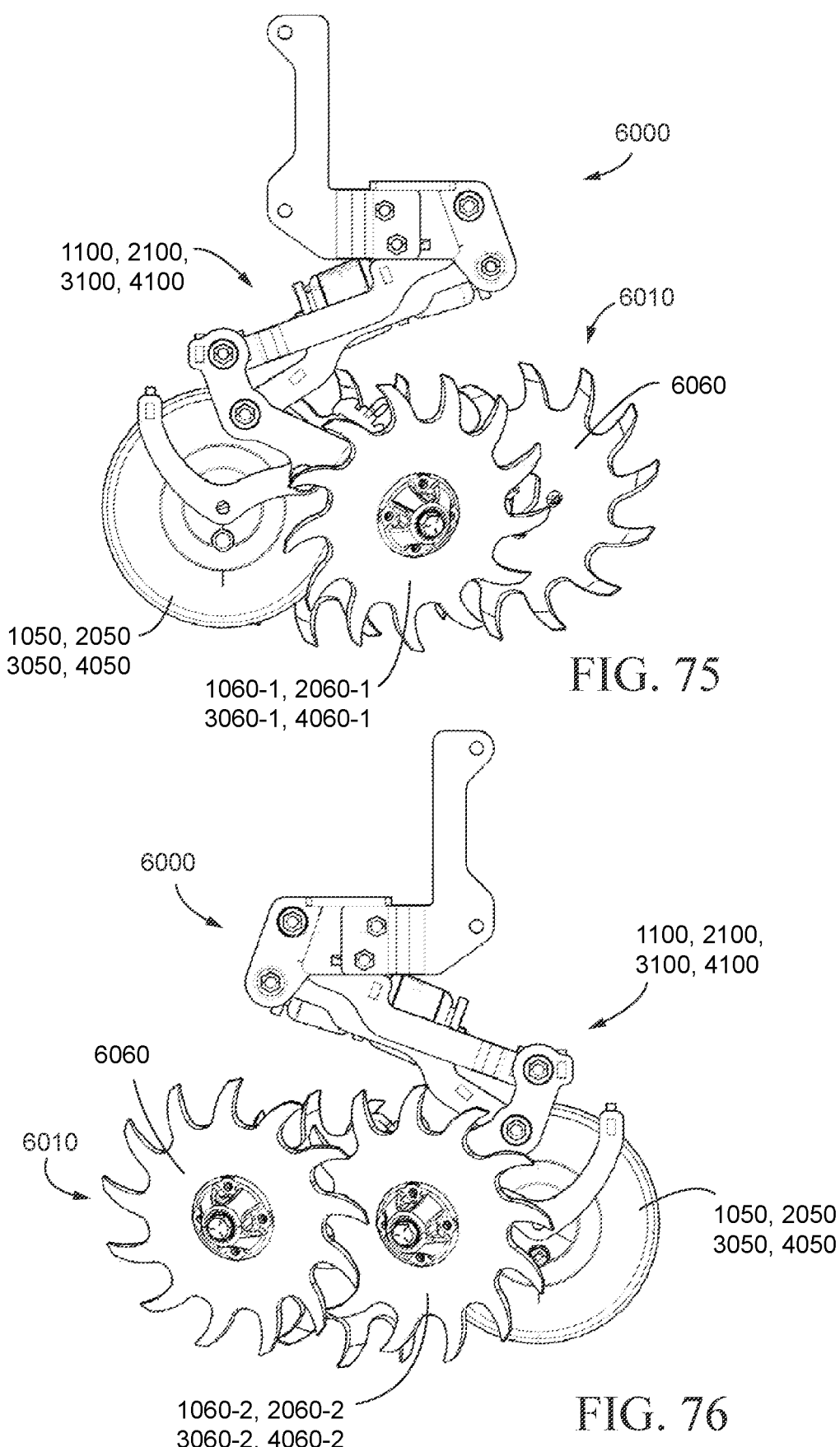
FIG. 75 is a right side elevation view of the row cleaner assembly of FIG. 73.
FIG. 76 is a left side elevation view of the row cleaner assembly of FIG. 73.
Figures 77, 78:
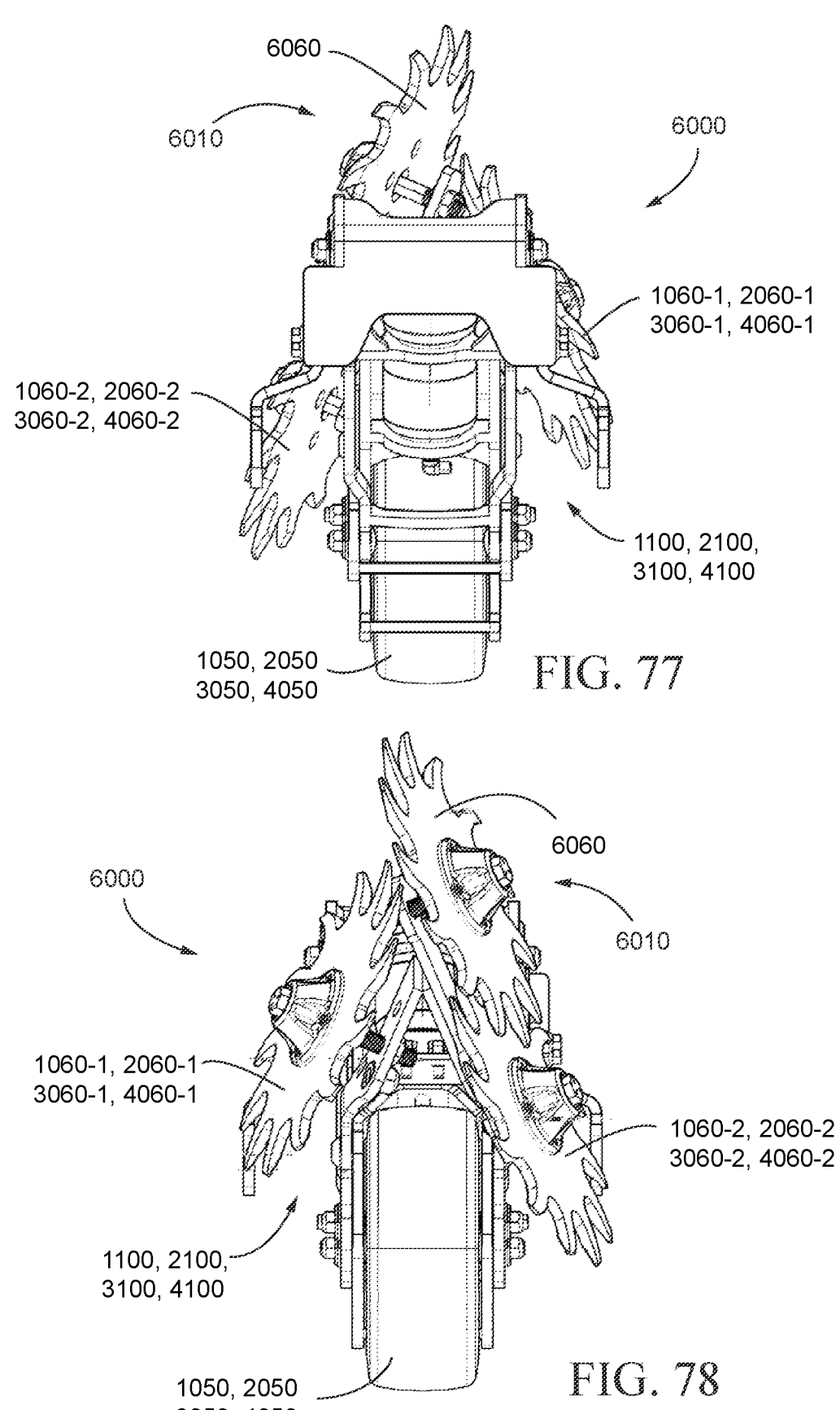
FIG. 77 is a top plan view of the row cleaner assembly of FIG. 73.
FIG. 78 is a bottom plan view of the row cleaner assembly of FIG. 73.
Figure 79:
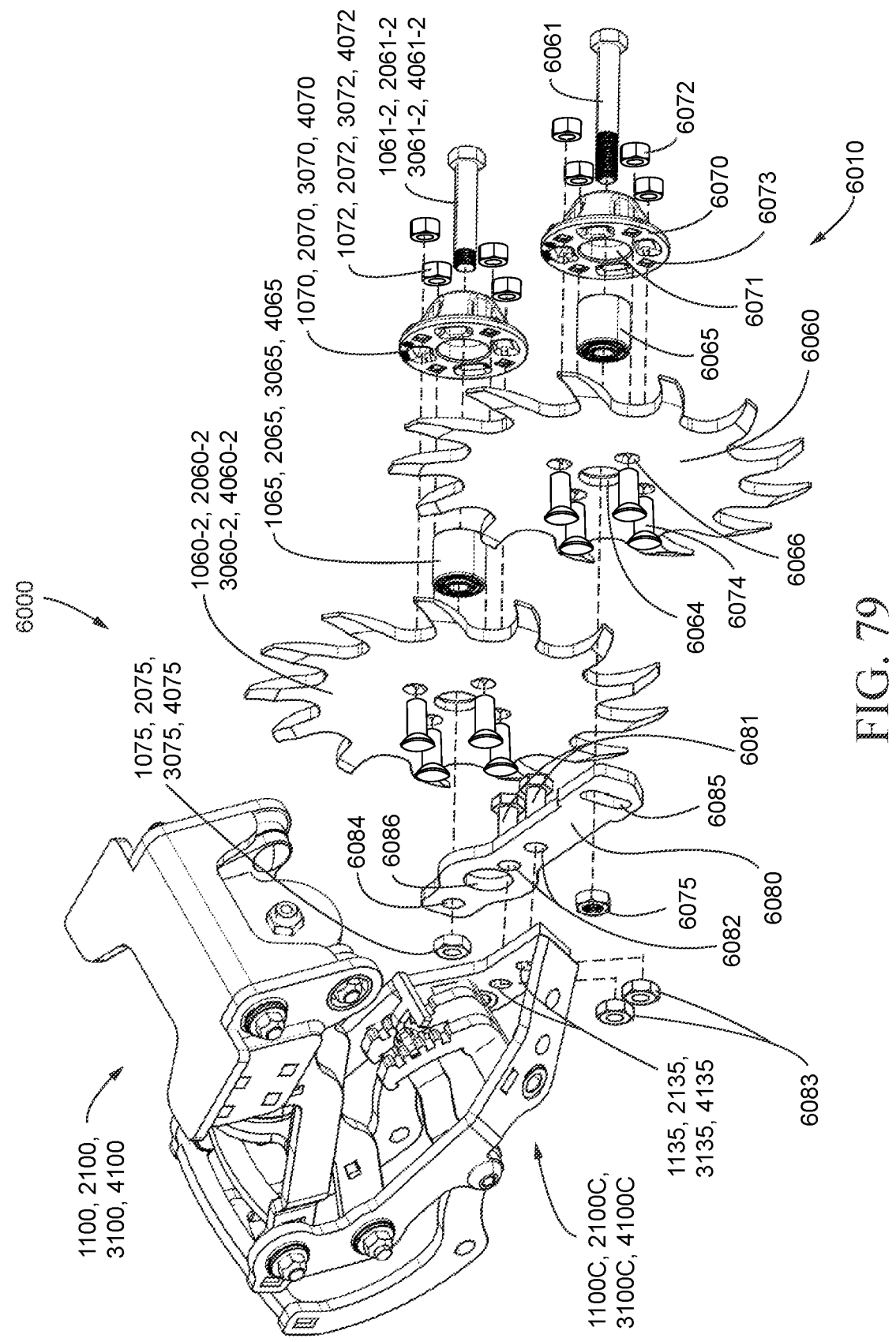
FIG. 79 is an exploded right front perspective view of row cleaner assembly of FIG. 73.
Figure 80:
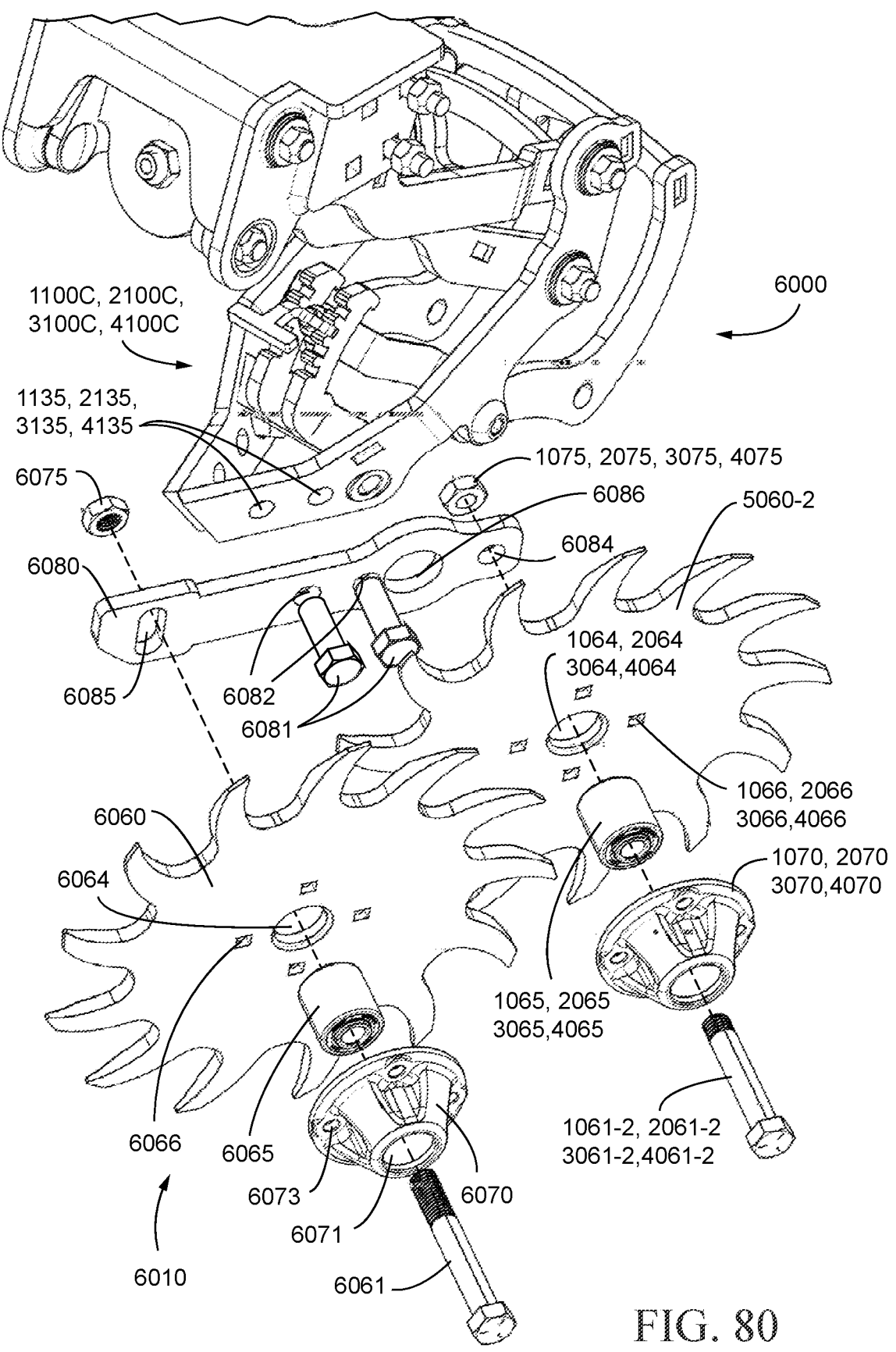
FIG. 80 is an exploded left front perspective view of the row cleaner assembly of FIG. 73.

FIG. 73 is a rear perspective view of the row cleaner assembly 6000 incorporating an embodiment of a third row cleaner wheel assembly 6010. FIG. 74 is a front perspective view of the row cleaner assembly 6000 of FIG. 73. FIGS. 75 and 76 are right and left side elevation views, respectively, of the row cleaner assembly 6000 of FIG. 73. FIGS. 77 and 78 are top and bottom plan views, respectively, of the row cleaner assembly 6000 of FIG. 73. FIG. 79 is an exploded right front perspective view of the row cleaner assembly 6000 of FIG. 73. FIG. 80 is an exploded left front perspective view of the row cleaner assembly 6000 of FIG. 73.

Referring to FIGS. 79 and 80, a mounting bar 6080 is configured to mount to the lower subframe 1100C, 2100C, 3100C, 4100C with threaded connectors 6081 extending through apertures 6082 in the mounting bar 6080 which align with the apertures 1035, 2025, 3025, 4035 in the respective row cleaner wheel support arms 1130-2, 2130-2, 3130-2, 4130-2. Nuts 6083 on the back side of the lower subframe 1100C, 2100C, 3100C, 4100C receive the threaded connectors 6081 securing the mounting bar 6080 to the lower subframe 1100C, 2100C, 3100C, 4100C. The mounting bar 6080 includes a rearward aperture 6084 for mounting the second row cleaner wheel 1060-2, 2060-2, 3060-2, 4060-2 to the mounting bar 6080 via the second row cleaner axle bolt 1061-2, 2061-2, 3061-2, 4061-2 in the same manner as previously described when mounting the second row cleaner wheel 1060-2, 2060-2, 3060-2, 4060-2 to the row cleaner wheel support arms 1130-2, 2130-2, 3130-2, 4130-2 of the respective lower subframe 1100C, 2100C, 3100C, 4100C. In alternative embodiments, the mounting bar 6080 may include an enlarged aperture 6086 for aligning with and receiving a bushing for securing the second row cleaner wheel 1060-2, 2060-2, 3060-2, 4060-2 to the row cleaner wheel support arms 1130-2, 2130-2, 3130-2, 4130-2 of the respective lower subframe 1100C, 2100C, 3100C, 4100C. The mounting bar 6080 includes an aperture 6086, which may be an elongated aperture, through which the third row cleaner wheel axle bolt 6061 extends. The third wheel axle bolt 6061 extends through a central opening 6064 in the third row cleaner wheel 6060. A bushing 6065 is received over the end of the third row cleaner wheel axle bolt 6061 and the bushing 6065 is received within a hub 6070 having a central opening 6071. The hub 6070 is secured to the third row cleaner wheel 6060 by nuts 6072 threadably received over threaded connectors 6074 which extend through apertures 6066 in the third row cleaner wheel 6060 and through aligned holes 6073 in the hub 6070. A nut 6075 on the back side the mounting bar 6080 receives the end of the third row wheel cleaner wheel axle bolt 6061 thereby axially restraining the third row cleaner wheel 6060 onto the mounting bar 6080, while the bushing 6065 permits the third row cleaner wheels 6060 to freely rotate about the respective row cleaner wheel axle bolt 6061. A spacer and washers (not shown) may be provided over the row cleaner axle bolt 6061 to position the third row cleaner wheel 6060 outwardly away from the mounting bar 6080 and the second row cleaner wheel 1060-2, 2060-2, 3060-2, 4060-2. Although not shown in FIG. 79, a scraper may be provided over the third row cleaner wheel axle bolts 6061 to scrape dirt or mud from the third row cleaner wheel 6060 as it rotates similar to that described above in connection with the embodiments 1000, 2000, 3000, 4000.

It should also be appreciated that although FIGS. 73-80 show the third row cleaner wheel 6060 being mounted on the second side, adjacent to the second row cleaner wheels 1060-2, 2060-2, 3060-2, 4060-2, the third row cleaner wheel 6060 may be mounted on the first side adjacent to the first row cleaner wheel 1060-1, 2060-1, 3060-1, 4060-1.

Row Cleaner Diverter Assembly

FIGS. 81-85 illustrate another embodiment of a row cleaner assembly 7000 incorporating an embodiment of a row cleaner diverter assembly 7010. Although FIGS. 81-85 show the row cleaner assembly 7000 utilizing the embodiment of the row cleaner assembly 4000, it should be appreciated that any of the other embodiments of the row cleaner assemblies 1000, 1000A, 2000, 2000A, 3000, 3000A, 4000A, 5000 as previously described may be configured to incorporate a row cleaner diverter assembly 7000. Thus, rather than including separate sets of drawing figures for each of the row cleaner assembly embodiments, FIGS. 81-85 include reference numbers corresponding to each of the row cleaner assembly frames 1100, 2100, 3100, 4100 and their respective components that may be adapted to include the row cleaner diverter assembly 7010.

Figure 81:
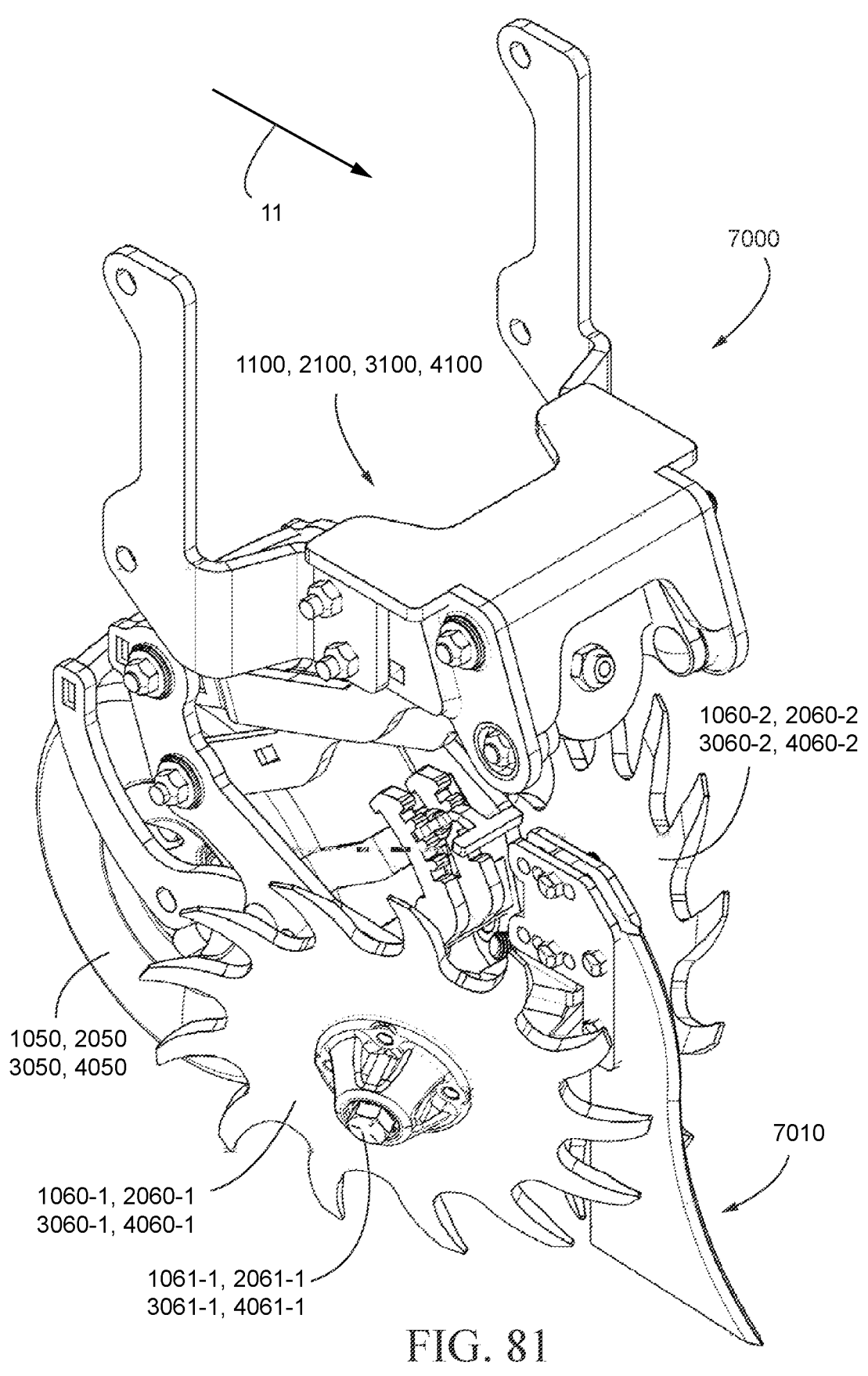
FIG. 81 is a front right perspective view of another embodiment of a row cleaner assembly incorporating an embodiment of a row cleaner diverter assembly.
Figure 82:
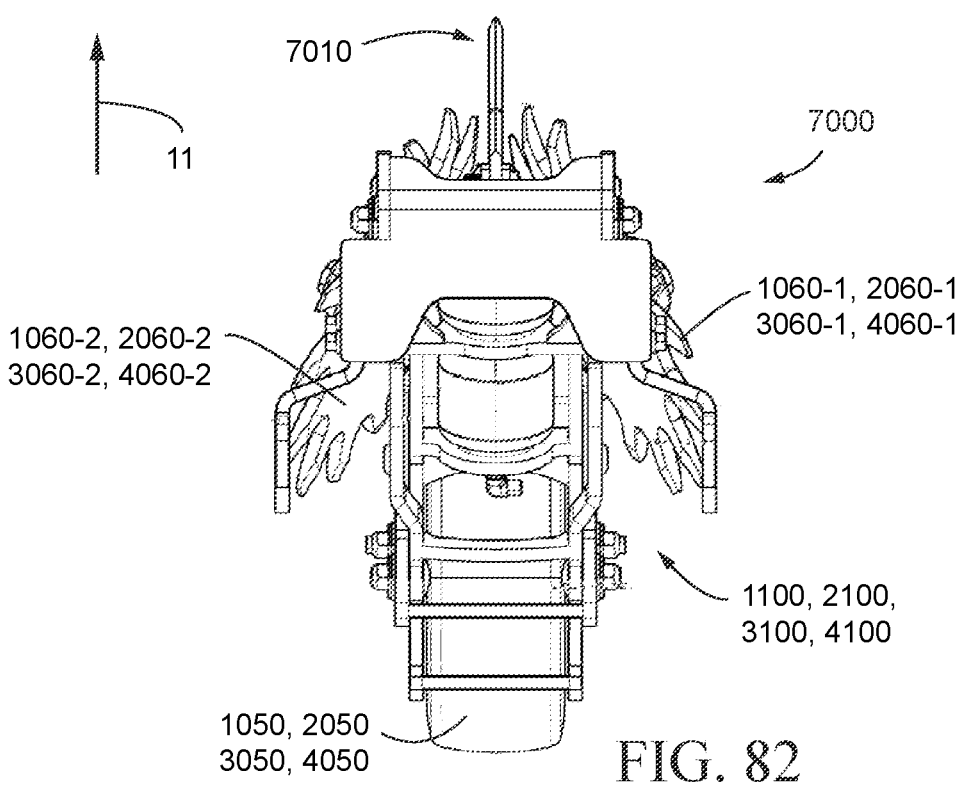
FIG. 82 is a top plan view of the row cleaner assembly with the row cleaner diverter assembly of FIG. 81.
Figure 83:
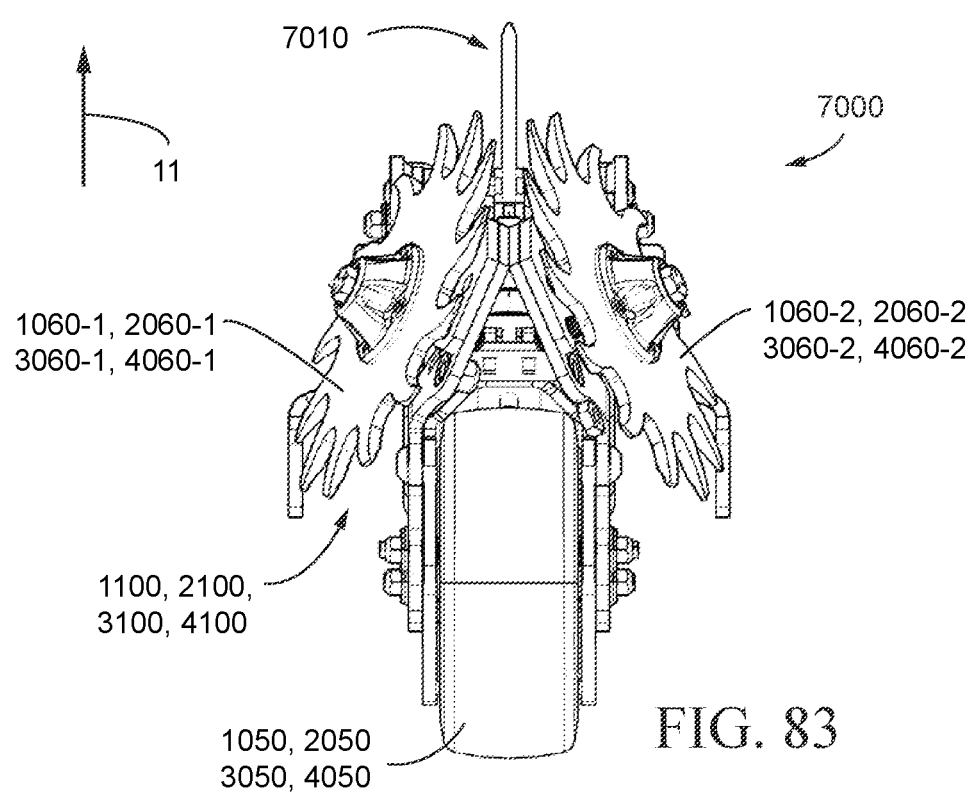
FIG. 83 is a bottom plan view of the row cleaner assembly with the row cleaner diverter assembly of FIG. 81.
Figure 84:
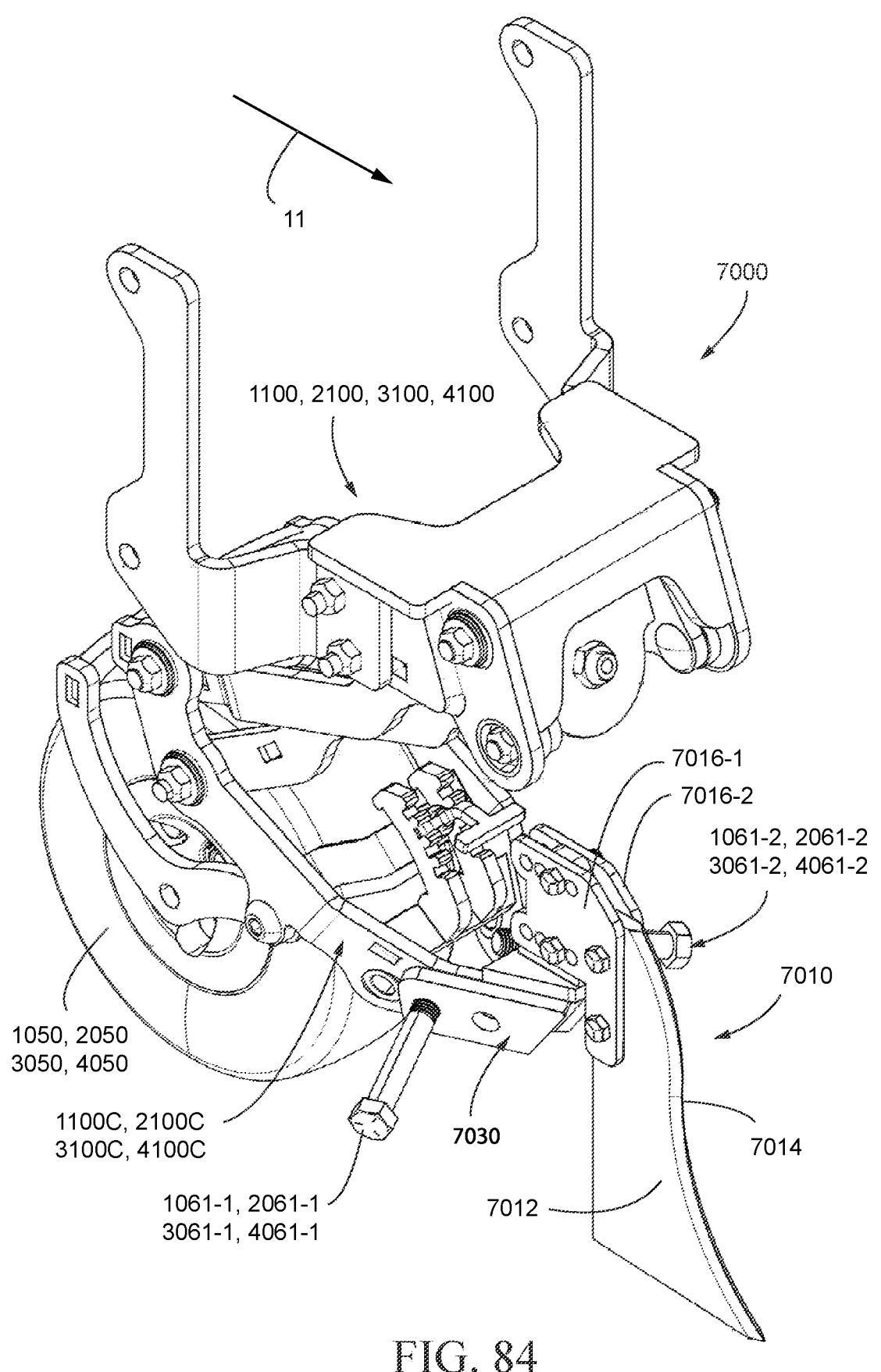
FIG. 84 is the same front right perspective view of the row cleaner assembly with the row cleaner diverter assembly of FIG. 81, but showing the row cleaner wheels removed to better show the diverter assembly.
Figure 85:
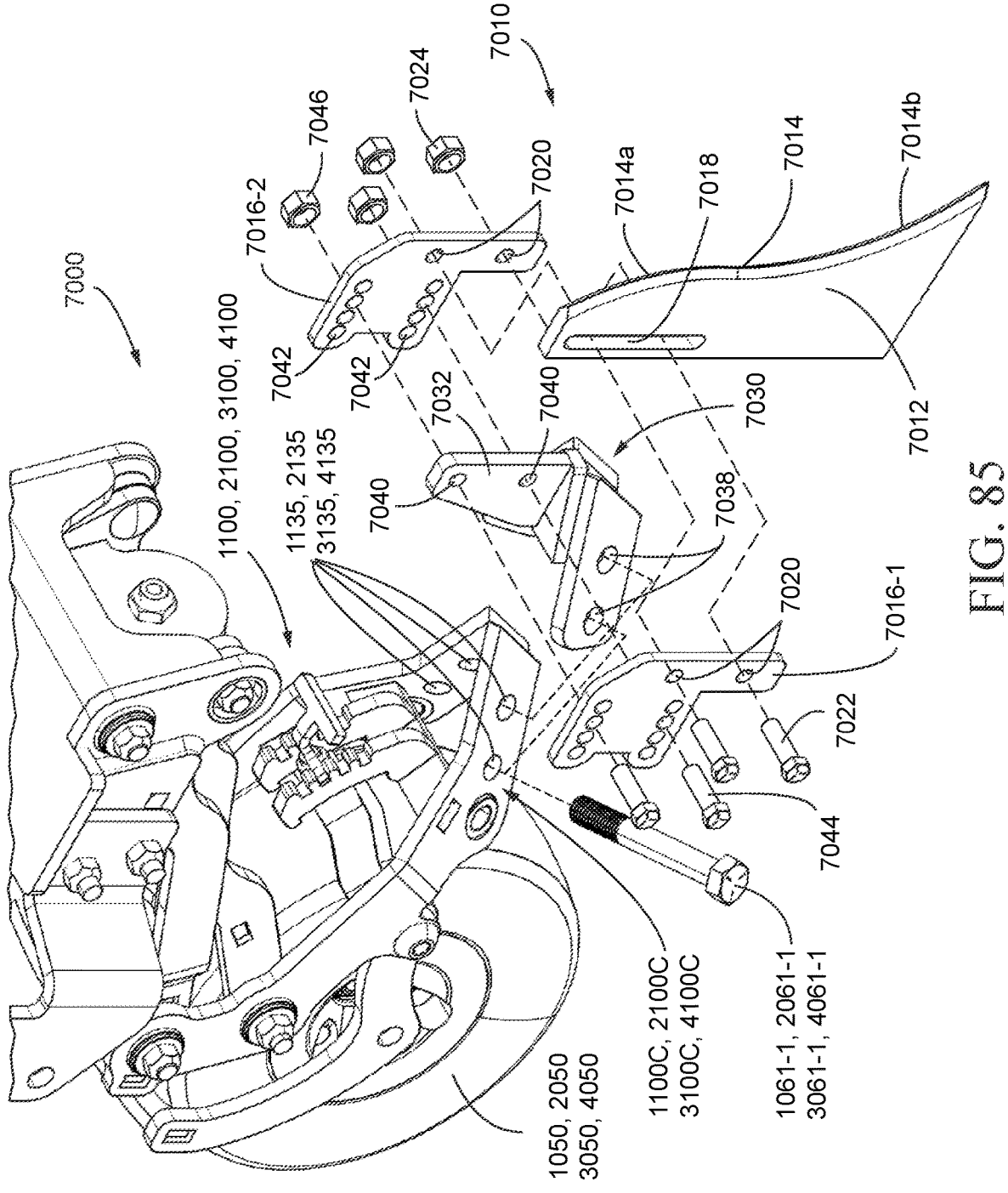
FIG. 85 is the same front right perspective view of the row cleaner assembly of FIG. 84, but showing the row cleaner diverter assembly of FIG. 81 exploded.
Figure 86:
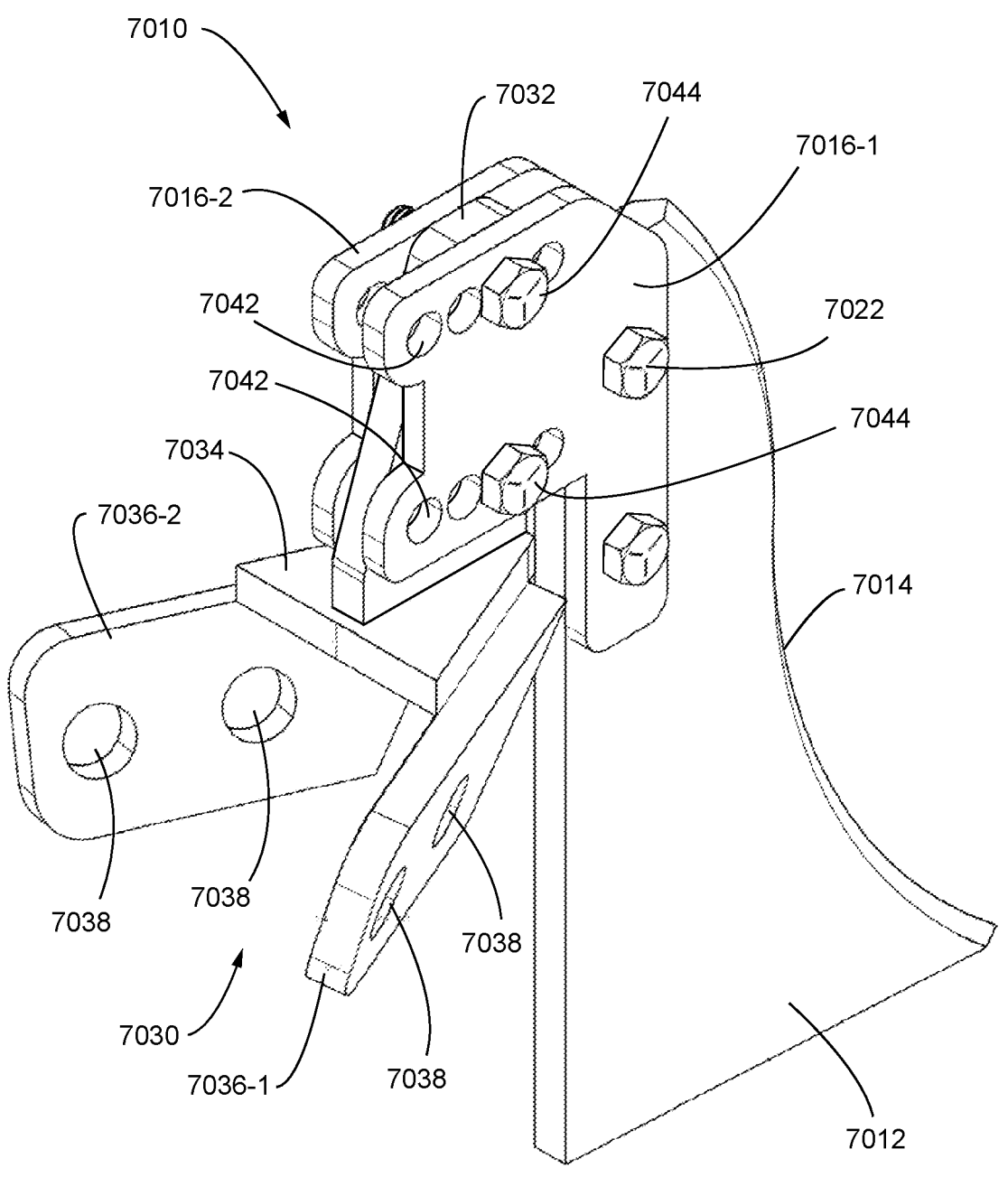
FIG. 86 is a rear perspective view of the row cleaner diverter assembly of FIG. 81.

FIG. 81 is a right front perspective view of the row cleaner assembly 7000 incorporating an embodiment of a row cleaner diverter assembly 7010. FIGS. 82 and 83 are top and bottom plan views, respectively, of the row cleaner assembly 7000 with the row cleaner diverter assembly of FIG. 81. FIG. 84 is the same view of the row cleaner assembly 7000 as shown in FIG. 81, but with the row cleaner wheels removed to better illustrate the embodiment of the row cleaner diverter assembly 7010. FIG. 85 is the same view as FIG. 84 but showing the row cleaner diverter assembly 7010 exploded. FIG. 86 is rear perspective view of the row cleaner diverter assembly of FIG. 81.

Referring to FIGS. 84-86, the row cleaner diverter assembly 7010 includes a vertically oriented diverter plate 7012 that is supported at the forward end of the lower subframe 1100C, 2100C, 3100C, 4100C of the row cleaner frame assembly 1100, 2100, 3100, 4100 of any of the row cleaner embodiments 1000, 1000A, 2000, 2000A, 3000, 3000A, 4000, 4000A, 5000 such that the diverter plate 7012 is disposed between and extends forwardly of the row cleaner wheels 1060-1, 1060-2; 2060-1, 2060-2, 3060-1, 3060-2; 4060-1, 4060-2 in the direction of travel as illustrated. It has been found that in some conditions, the row cleaner wheels 1060-1, 1060-2; 2060-1, 2060-2, 3060-1, 3060-2; 4060-1, 4060-2 may pull the crop residue in both directions while leaving some of the residue in the row or seed bed which can result in some crop residue being trapped in the seed trench 38 formed by the trailing opening assembly 234. Thus by positioning a diverter plate 7012 that extends forwardly and between the row cleaning wheels, the diverter plate 7012 lifts and divides the crop residue forward of the row cleaning wheels forcing the crop residue to one or both sides so the row cleaner wheels can more effectively move the crop residue from the row or seed bed, making it less likely that any crop residue will become trapped in the seed trench 38.

A leading edge 7014 of the diverter plate 7012 may be angled to form a sharp knife edge. In other embodiments, the leading edge 7014 may have a flat, rounded or blunt edge. In some embodiments, the diverter plate 7012 may have a profile such that an upper portion of the leading edge 7014*a* is convex in the direction of travel 11 and a lower portion 7014*b* is concave in the direction of travel 11.

In one embodiment, the diverter plate 7012 is sandwiched between two side plates 7016-1, 7016-2. As best viewed in FIG. 85, the diverter plate 7012 includes an elongated vertically oriented slot 7018 that aligns with apertures 7020 in the side plates 7016-1, 7016-2. Threaded connectors 7022 extend through the apertures 7020 and the elongated slot 7018 and are secured by nuts 7024. The elongated slot 7018 permits the diverter plate 7012 to be vertically adjustable relative to the side plates 7016-1, 7016-2 so that the diverter plate 7012 may be positioned to contact the soil surface or to penetrate into the soil surface at a desired depth, which may be less than the seed depth or greater than the seed depth.

As best viewed in FIGS. 84 and 85, the row cleaner diverter assembly 7010 may include an adaptor assembly 7030 configured to mount with the forwardly extending row cleaner wheel support arms 1130-1, 1130-2, 2130-1, 2130-2, 3130-1, 3130-2, 4130-1, 4130-2 comprising the lower subframe 1100C, 2100C, 3100C, 4100C. As best viewed in FIGS. 85 and 86, the adaptor assembly 7030 may include a vertically oriented plate 7032 attached to a base plate 7034 (such as by welding or other suitable connection means). Rearwardly extending arms 7036-1, 7036-2 may attach to the base plate 7034 (such as by welding or other suitable connection means). The rearwardly extending arms 7036-1, 7036-2 may have apertures 7038 positioned to align with the apertures 1135, 2135, 3135, 4135 (or other apertures) in the row cleaner wheel support arms 1130-1, 1130-2, 2130-1, 2130-2, 3130-1, 3130-2, 4130-1, 4130-2. If the apertures 7038 are positioned to align with the apertures 1135, 2135, 3135, 4135, the row cleaner axle bolts 1061-1, 1061-2; 2061-1, 2061-2; 3061-1, 3061-2; 4061-1, 4061-2 may be received through the aligned apertures 7038 and 1135, 2135, 3135, 4135 to secure the adaptor assembly 7030 to the row cleaner wheel support arms 1130-1, 1130-2, 2130-1, 2130-2, 3130-1, 3130-2, 4130-1, 4130-2 in combination with other bolts and nuts (not shown). The vertical plate 7032 may include vertically spaced apertures 7040 (FIG. 85) that align with any one of a series of upper and lower horizontally spaced apertures 7042 in the side plates 7016-1, 7016-2. Threaded connectors 7044 may extend through the aligned apertures 7040, 7042 and may be secured by nuts 7046 to secure the side plates 7016-1, 7016-2 and thus the diverter plate 7012 to the vertical plate 7032 of the adaptor assembly 7030. It should be appreciated that the series of apertures 7042 permit the side plates 7016-1, 7016-2 to be adjustably positioned forwardly and rearwardly with respect to the adapter assembly 7030, and thus the row cleaner wheel support arms 1130-1, 1130-2, 2130-1, 2130-2, 3130-1, 3130-2, 4130-1, 4130-2 and the row cleaner wheels 1060-1, 1060-2; 2060-1, 2060-2, 3060-1, 3060-2; 4060-1, 4060-2 to vary the distance that the diverter plate 7012 projects forwardly or rearwardly of the row cleaner wheels 1060-1, 1060-2; 2060-1, 2060-2, 3060-1, 3060-2; 4060-1, 4060-2.

Figure 87:
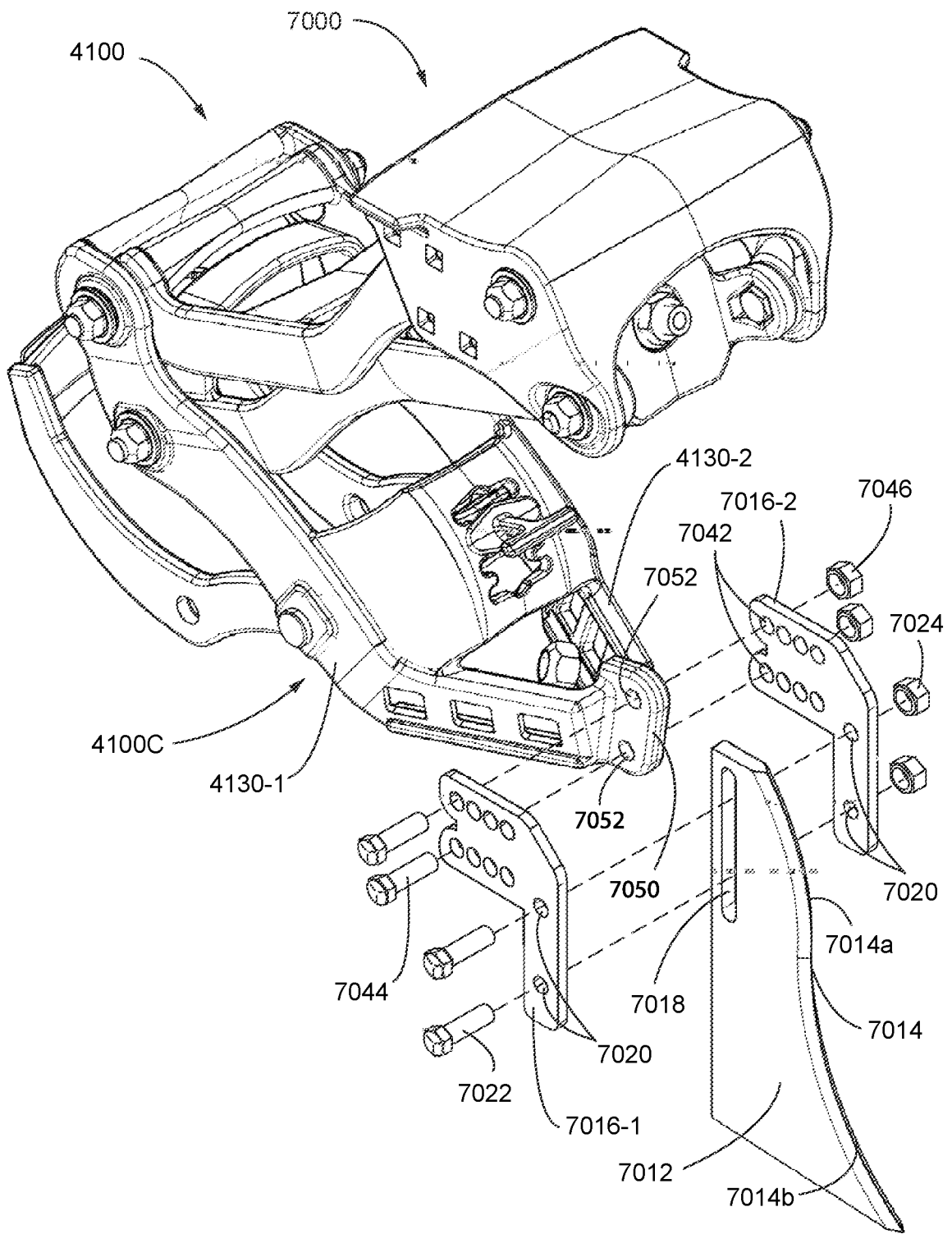
FIG. 87 is front perspective view of an alternative embodiment of the row cleaner diverter assembly adapted for the embodiment of the lower subframe as depicted in FIGS. 50 and 69.
Figure 88:
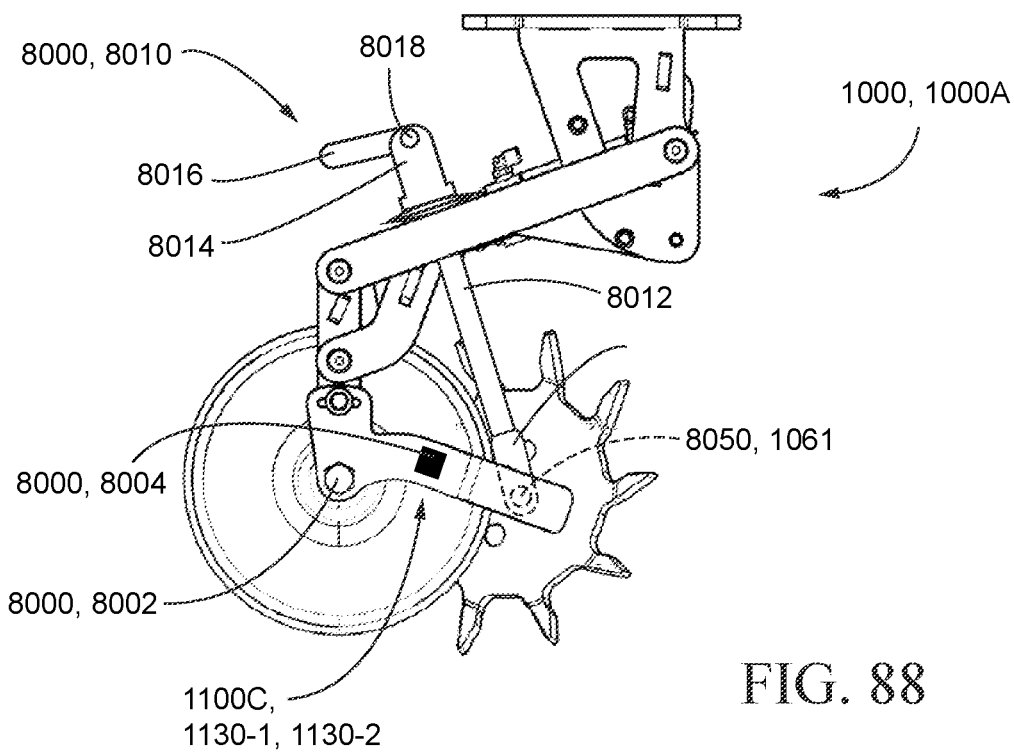
FIG. 88 is a side elevation view of the embodiment of the row cleaner assembly of FIG. 3 showing alternative placement of load sensors for determining downforce exerted on the row cleaner assembly.
Figure 89:
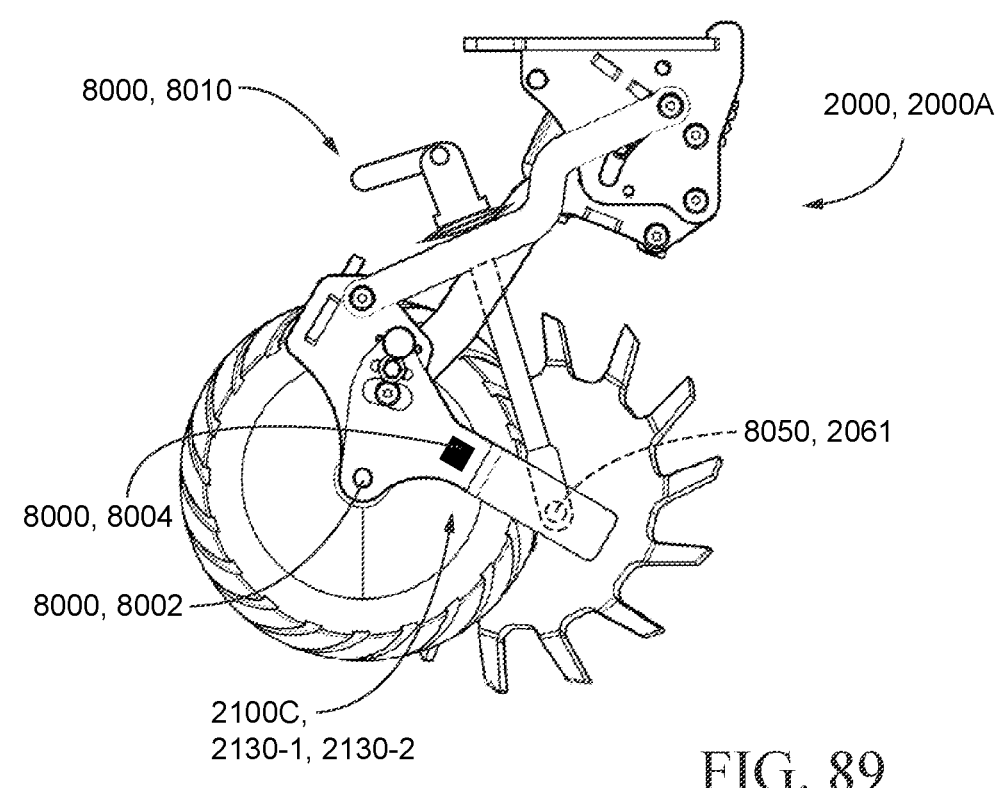
FIG. 89 is a side elevation view of the embodiment of the row cleaner assembly of FIG. 19 showing placement of load sensors for determining downforce exerted on the row cleaner assembly.
Figure 90:
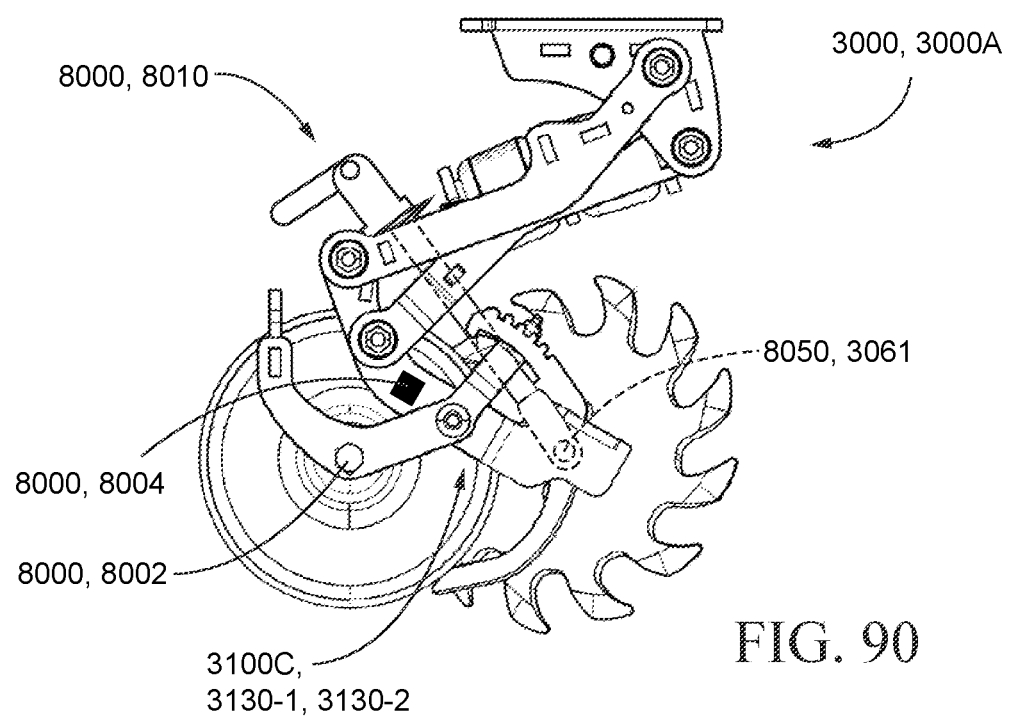
FIG. 90 is a side elevation view of the embodiment of the row cleaner assembly of FIG. 35 showing placement of load sensors for determining downforce exerted on the row cleaner assembly.
Figure 91:
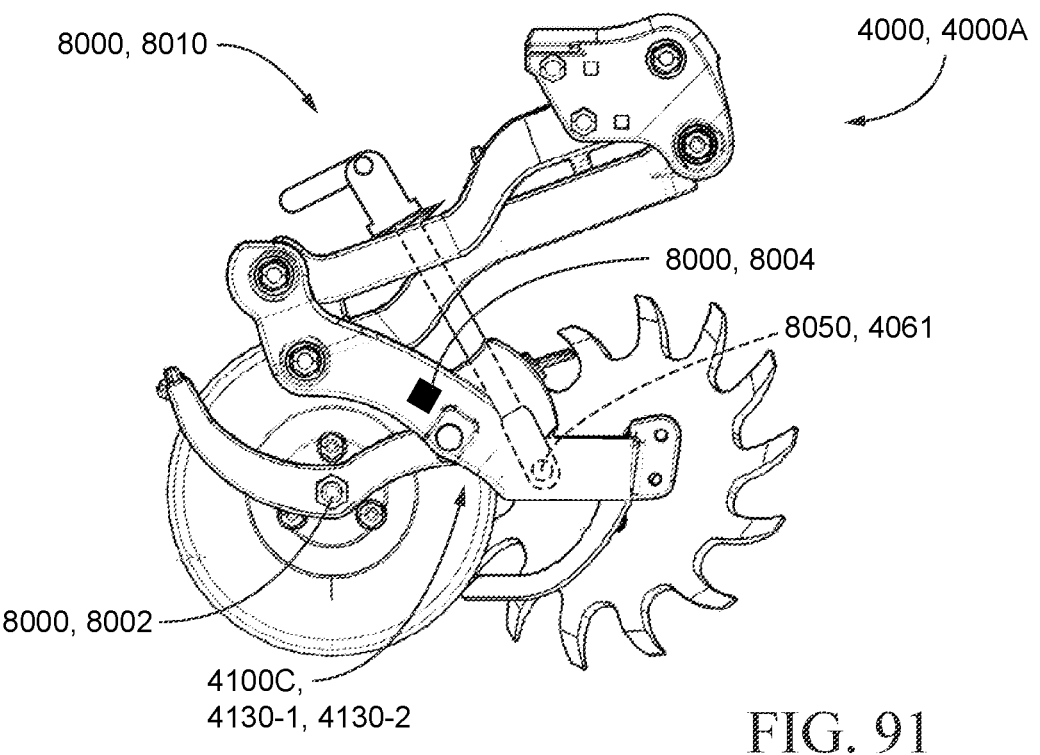
FIG. 91 is a side elevation view of the embodiment of the row cleaner assembly of FIG. 54 showing placement of load sensors for determining downforce exerted on the row cleaner assembly.

FIG. 87 is a front perspective view of an alternative embodiment of the diverter assembly adapted for use with the embodiment of the lower subframe 4100C of the row cleaner assembly 4000 as shown in FIGS. 50 and 69. In this embodiment, the lower subframe 4100C includes a front projection 7050 extending forwardly from the row cleaner support arms 4130-1, 4130-2. Each of the other embodiments of the row cleaner assemblies 1000, 1000A, 2000, 2000A, 3000, 3000A, 4000A and 5000 may be fabricated with a similar front projection 7050. With this embodiment, the adaptor assembly 7030 may be omitted and the side plates 7016-1, 7016-2 may mount directly to the front projection 7050 by threaded connectors 7044 extending through the apertures 7042 in the side plates 7016-1, 7016-2 and through the apertures 7052 in the front projection 7050, secured by nuts 7046. The diverter plate 7012 attaches to the side plates 7016-1, 7016-2 using the threaded connectors 7022 extending through the apertures 7020 in the side plates 7016-1, 7016-2 aligned with the elongated slot 7018 in the diverter plate 7012 and secured by nuts 7024 as in the previous embodiment.

Downforce Monitoring

It may be desirable to measure the load experienced by the row cleaner assembly 1000, 1000A, 2000, 2000A, 3000, 3000A, 4000, 4000A, 5000, 6000, 7000 to determine if more or less downforce should be exerted by the actuator system 1300, 2300, 3300, 4300, 5300. Referring to FIGS. 88-91 each of the embodiments 1000, 1000A, 2000, 2000A, 3000, 3000A, 4000, 4000A is shown in side elevation with the respective first row cleaner wheel 1060-1, 2060-2, 3060-1, 4060-1 removed.

One way to measure the load experienced by the respective row cleaner assemblies is to utilize a load sensor 8000 disposed on the lower subframe 1100C, 2100C, 3100C, 4100C. In one embodiment, the load sensor 8000 may be a load pin 8002 which replaces the gauge wheel axle bolt 1051, 2051, 3051, 4051 of the respective embodiments of the row cleaner assemblies 1000, 2000, 3000, 4000, 5000, 6000, 7000. An example of a suitable load pin 8002 is disclosed in U.S. Pat. No. 8,561,472.

In another embodiment, the load sensor 8000 may be a Wheatstone bridge 8004 disposed on one or both of the row cleaner support arms 1130-1, 1130-2; 2130-1, 2130-2; 3130-1, 3130-2; 4130-1, 4130-2 of the respective lower subframes 1100C, 2100C, 3100C, 4100C.

Figures 92, 93:
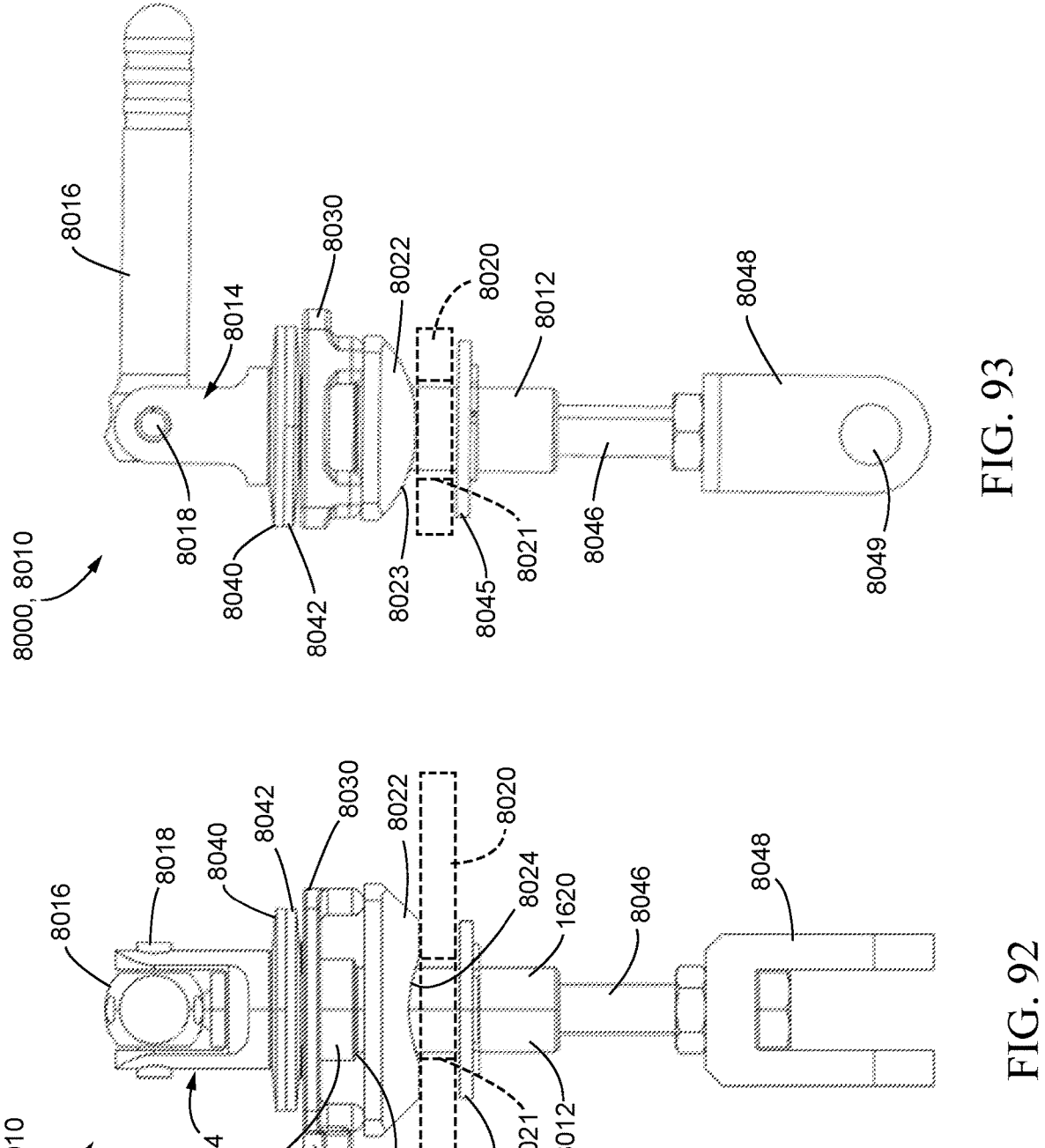
FIG. 92 is a front elevation view of an embodiment of one of the load sensors depicted in FIGS. 88-91.
FIG. 93 is a side elevation view of the load sensor of FIG. 92.

In another embodiment, load sensor 8000 may comprise a load sensor 8010 substantially the same as the handle assembly described in PCT Publication No. WO2019169369 which is designated by reference number (i.e., "1600") therein. Referring to FIGS. 88-93, the load sensor 8010 is an assembly comprising a sleeve 8012 having a handle bracket 8014 at an upper end for pivotally connecting a handle 8016 with a pivot pin 8018. Referring to FIGS. 92-93, a lateral plate 8020 extends between the linkages 1200-1, 1200-2; 2200-1, 2200-2; 3200-1, 3200-2; 4200-1, 4200-2, or between the side rails 1121-1, 1121-2; 2121-1, 2121-2; 3121-1, 3121-2; 4121-1, 4121-2 of the intermediate subframe 1100B, 2100B, 3100B, 4100B, depending on the configuration. In some embodiments, the lateral plate 8020 may be the base member 1120, 2120,

3120, 4120 of the intermediate subframe 1100B, 2100B, 3100B, 4100B. The lateral plate 8020 includes a hole 8021 through which the sleeve 8012 extends. A contact plate 8022 having a convex lower surface 8023 and a central bore 8024 therethrough is disposed above the lateral plate 8020 so that the convex lower surface 8023 contacts the lateral plate 8020. A load sensing member 8030, such as a "pancake" load sensor (FIGS. 95-96) having a hole 8032 therethrough, is disposed above the contact plate 8022. The load sensing member 8030 includes a plurality of feet 8033 (FIG. 96) positioned to allow the load sensing member 8030 to flex and measure force. The flexing of the load sensing member 8030 generates a load signal that is communicated to the monitor 50 or a control module (discussed later).

Figures 94, 95, 96:
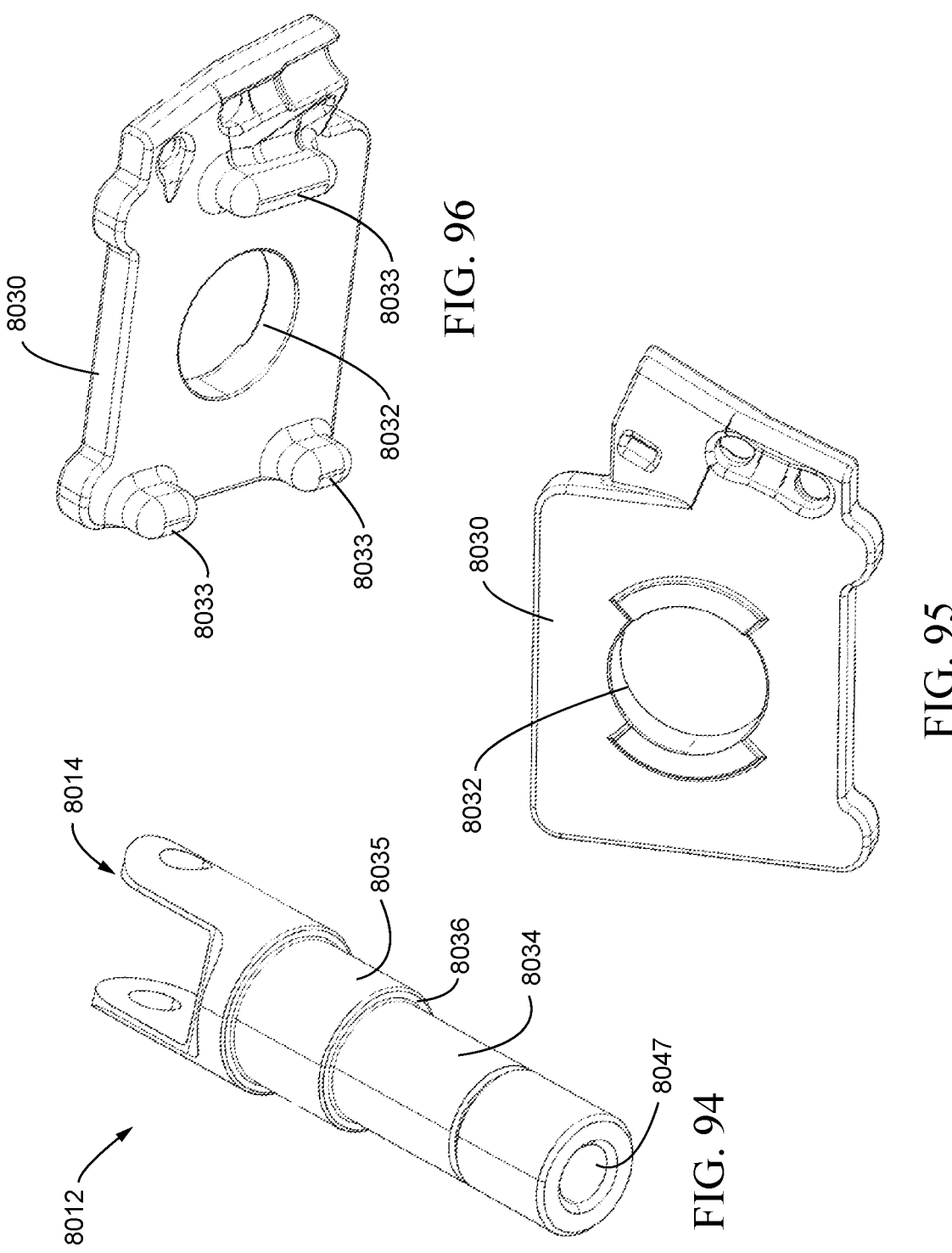
FIG. 94 is a perspective view of the sleeve of the load sensor of FIG. 92.
FIG. 95 is a bottom perspective view of load sensing member of load sensor of FIG. 92.
FIG. 96 is a top perspective view of the load sensing member of FIG. 94.

As best viewed in FIG. 94, the sleeve 8012 has a first diameter 8034 and a larger second diameter 8035 resulting in a shoulder 8036 therebetween. The first and second diameters 8034, 8035 pass through the hole 8032 in the load sensing member 8030. The first diameter 8034 is sized to pass through the central bore 8024 of the contact plate 8022, but the second diameter 8035 and shoulder 8036 are sized such that they are unable to pass through the central bore 8024 of the contact plate 8022.

Referring again to FIGS. 92 and 93, bevel washers 8040 and 8042 are disposed on the sleeve 8012 below the handle bracket 8014 and above the load sensing member 8030. The bevel washers 8040, 8042 are disposed with their concave surfaces facing each other allowing the bevel washers 8040, 8042 to resiliently compress or flatten to absorb shocks experienced by the row cleaner assembly 1000, 1000A, 2000, 2000A, 3000, 3000A, 4000, 4000A, 5000, 6000, 7000 to prevent overloading of the load sensing member 8030. Before the bevel washers 8040, 8042 can be fully compressed due to load, the shoulder 8036 of the sleeve 8012 will contact the upper surface of the contact plate 8022 to limit the vertical travel of the sleeve 8012. A washer 8045 may be disposed below the lateral plate 8020. A shaft 8046 is received within a bore 8047 (FIG. 94) at the lower end of the sleeve 8012. An axle bracket 8048 is mounted to the lower end of the shaft 8046. The axle bracket 8048 includes an aperture 8049 for receiving either the row cleaner wheel axle bolts 1061-1, 1061-2; 2061-1, 2061-2; 3061-1, 3061-2; 4061-1, 4061-2 or a rod 8050 extending between row cleaner wheel support arms 1130-1, 1130-2; 2130-1, 2130-2; 3130-1, 3130-2; 4130-1, 4130-2 proximate the axis of the row cleaner wheel axle bolts 1061-1, 1061-2; 2061-1, 2061-2; 3061-1, 3061-2; 4061-1, 4061-2.

It should be appreciated that although FIGS. 88-92 show all of the various types of load sensors 8000, 8002, 8004, 8010 on one row cleaner assembly 1000, 1000A, 2000, 2000A, 3000, 3000A, 4000, 4000A, it is for illustration purposes only to exemplify placement of the load sensors 8000, 8002, 8004, 8010 since only one type of load measuring device would be needed per row cleaner assembly 1000, 1000A, 2000, 2000A, 3000, 3000A, 4000, 4000A, 5000, 6000, 7000. The load sensors 8000, 8002, 8004, 8010 may be in signal communication with the monitor 50 to maintain a desired downforce. The load sensors 8000, 8002, 8004, 8010 may be in direct communication with the monitor or via a control module, or the load sensors 8000, 8002, 8004, 8010 may be part of a closed loop system or an open loop system together with the actuator system 1300, 2300, 3300, 4300, 5300 to maintain a desired downforce such as disclosed in International Publication No. WO2014018716. In arrangements utilizing a control module, such as disclosed in U.S. Pat. No. 9,173,339, the control module may be an on-row module controlling the downforce of a single row cleaner assembly 1000, 1000A, 2000, 2000A, 3000, 3000A, 4000, 4000A, 5000, 6000, 7000 or the control module may be configured to control the downforce across a plurality of row cleaner assemblies 1000, 1000A, 2000, 2000A, 3000, 3000A, 4000, 4000A, 5000, 6000, 7000 of the planter 10. In either case, the signals from the load sensors 8000, 8002, 8004, 8010 are communicated to and are processed by the control module. In yet another embodiment, the controller may be a single or multiple row control module as described in PCT Publication No. WO2014018717 wherein the load sensors 8000, 8002, 8004, 8010 are connected to a CAN network having a CAN processor. In such an embodiment, the CAN processor may communicate signals from the load sensors 8000, 8002, 8004, 8010 over the CAN network and the CAN processor may communicate control signals over the CAN network to control the downforce of one or more row cleaner assemblies 1000, 1000A, 2000, 2000A, 3000, 3000A, 4000, 4000A, 5000, 6000, 7000.

The foregoing description and drawings are intended to be illustrative and not restrictive. Various modifications to the embodiments and to the general principles and features of the modular metering system and meter modules, and processes described herein will be apparent to those of skill in the art. Thus, the disclosure should be accorded the widest scope consistent with the appended claims and the full scope of the equivalents to which such claims are entitled.

The invention claimed is:

1. A row cleaner assembly adapted to mount to an agricultural planter, the row cleaner assembly comprising:
   an upper subframe configured to mount to the agricultural planter forward of and longitudinally aligned with a trench opening assembly on the agricultural planter, the trench opening assembly configured to open a seed trench in a soil surface as the agricultural planter travels in a forward direction of travel;
   a lower subframe rotatably supporting first and second row cleaner wheels, the first and second row cleaner wheels oriented to diverge outwardly and rearwardly such that as the first and second row cleaner wheels rotate about their respective axes of rotation by engaging with the soil surface as the agricultural planter travels in the forward direction of travel;
   an intermediate subframe pivotally connected at a forward end to the upper subframe and pivotally connected at a rearward end to the lower subframe;
   a first linkage and a second linkage, each pivotally connected at a forward end to the upper subframe and each pivotally connected at a rearward end to the lower subframe;
   an actuator system connected with the intermediate subframe;
   wherein actuation of the actuator system causes the intermediate subframe in cooperation with the first and second linkages to rotationally move the lower subframe upward and downward relative to the upper subframe so as to adjust an amount of downforce on the first and second row cleaner wheels;
   wherein the lower subframe includes a rear strut subframe rotatably supporting a gauge wheel between and rearward of the first and second row cleaner wheels and wherein actuation of the actuator system causes the intermediate subframe in cooperation with the first and second linkages to rotationally move the lower subframe upward and downward relative to the upper subframe so as to adjust an amount of downforce on the gauge wheel.

2. The row cleaner assembly of claim 1, wherein the gauge wheel is rotatable about a gauge wheel axle supported by the rear strut subframe rearward of the first and second row cleaner wheels.

3. The row cleaner assembly of claim 2, further comprising a depth selector capable of selectively positioning the lower subframe with respect to the rear strut subframe to vary a depth of penetration of the row cleaner wheels into the soil surface.

4. The row cleaner assembly of claim 3, wherein the depth selector comprises an arcuate slot in the lower subframe and a threaded connector extending through the arcuate slot and received within an aperture in the rear strut subframe, whereby the selective positioning of the threaded connector with respect to the arcuate slot changes the position of the lower subframe with respect to the rear strut subframe and the depth of penetration of the row cleaner wheels.

5. The row cleaner assembly of claim 3, wherein the depth selector comprises a series of apertures arranged in an arc in the lower subframe and a threaded connector selectively positionable through one of the series of apertures and received in an aperture in the rear strut subframe, whereby the selective positioning of the threaded connector within one of the series of apertures changes the position of the lower subframe with respect to the rear strut subframe and the depth of penetration of the row cleaner wheels.

6. The row cleaner assembly of claim 3, wherein the depth selector comprises a thumbscrew threadably received in an aperture in the lower subframe, the end of the thumbscrew selectively positionable in one of a series of apertures arranged in an arc in the rear strut subframe, whereby the selective positioning of the thumbscrew within one of the series of apertures in the rear strut subframe changes the position of the lower subframe with respect to the rear strut subframe and the depth of penetration of the row cleaner wheels.

7. The row cleaner of claim 3, wherein the depth selector comprises a spring biased handle linking the rear strut subframe with the lower subframe, the spring biased handle selectively positionable along a notched arm, whereby the selective positioning of the spring biased handle along the notched arm changes the position of the lower subframe with respect to the rear strut subframe and the depth of penetration of the row cleaner wheels.

8. The row cleaner of claim 3, wherein the depth selector comprises a spring biased handle linking the rear strut subframe with the lower subframe, the spring biased handle selectively positionable along a notched opening in the lower subframe, whereby the selective positioning of the spring biased handle along the notched opening changes the position of the lower subframe with respect to the rear strut subframe and the depth of penetration of the row cleaner wheels.

9. The row cleaner assembly of claim 1, wherein the rear strut subframe includes a scraper selectively positionable with respect to the gauge wheel.

10. The row cleaner assembly of claim 1, wherein the actuator system includes a linear actuator coupled at a forward end to the upper subframe and coupled at a rearward end to the intermediate subframe, whereby extension and contraction of the linear actuator causes the intermediate subframe and lower subframe to move vertically with respect to the upper subframe.

11. The row cleaner assembly of claim 10, wherein the linear actuator is a pneumatic cylinder or a hydraulic cylinder.

12. The row cleaner assembly of claim 1, wherein the actuator system includes an airbag and a spring assembly, wherein the spring assembly is coupled between the upper subframe and the intermediate subframe and is configured to apply a lift force to the intermediate subframe, wherein the airbag is coupled to the upper subframe and the intermediate subframe and is configured to apply a down force to the intermediate subframe.

13. The row cleaner assembly of claim 1, wherein the actuator system includes a first airbag and a second airbag, the first airbag positioned rearward of the second airbag, wherein the first airbag is coupled at a forward end to the first and second linkages and at a rearward end to the intermediate subframe, and wherein the second airbag is coupled at a forward end to a forward end of the intermediate subframe and at a rearward end to the first and second linkages, whereby expansion of the second airbag produces a lift force on the intermediate subframe and whereby expansion of the first airbag produced a down force on the intermediate subframe.

14. The row cleaner assembly of claim 1, further comprising a third row cleaner wheel assembly, the third row cleaner wheel assembly including a mounting bar adapted to be attached to a row cleaner wheel support arm of the lower subframe, and a third row cleaner wheel rotatably mounted to a forward end of the mounting bar adjacent to and forward of one of the first and second row cleaner wheels.

15. The row cleaner assembly of claim 1, further comprising a row cleaner diverter assembly, the row cleaner diverter assembly comprising a vertically oriented diverter plate supported from a forward end of the lower subframe and disposed between the first and second row cleaner wheels, the diverter plate having a leading edge extending forwardly of the first and second row cleaner wheels.

16. The row cleaner assembly of claim 15, wherein the diverter plate is vertically adjustable relative to the lower subframe.

17. The row cleaner assembly of claim 16, wherein the diverter plate is longitudinally adjustable relative to the lower subframe.

18. The row cleaner assembly of claim 1, further comprising a load sensor configured to generate a load signal corresponding to a downforce exerted on the lower subframe.

19. The row cleaner assembly of claim 18, wherein the load sensor includes a load pin rotatably supporting a gauge wheel on a rear strut subframe comprising a part of the lower subframe.

20. The row cleaner assembly of claim 18, wherein the load sensor includes a Wheatstone bridge disposed on the lower subframe.

21. The row cleaner assembly of claim 18, wherein the load sensor comprises a load sensor assembly including a load sensing member receiving an applied load via a sleeve coupled to a rod attached to the lower subframe or an axle supporting at least one of the first and second row cleaner wheels.

22. The row cleaner assembly of claim 18, wherein the load sensor is in signal communication with a controller and the controller is configured to control the actuator system in response to the generated load signals to control the downforce applied by the actuator system to the lower subframe.

23. The row cleaner assembly of claim 18, wherein the load sensor is in signal communication with a fluid control port, the fluid control port configured to control the actuator system in response to the generated load signals to control the downforce applied by the actuator system to the lower subframe.

24. The row cleaner assembly of claim 18, wherein the load sensor is in signal communication with a monitor, the monitor being responsive to the generated load signals and operable to control the actuator system to maintain a desired downforce based on the generated load signals.

* * * * *